US009799036B2

(12) United States Patent
Holman et al.

(10) Patent No.: US 9,799,036 B2
(45) Date of Patent: Oct. 24, 2017

(54) DEVICES, METHODS, AND SYSTEMS FOR MANAGING REPRESENTATIONS OF ENTITIES THROUGH USE OF PRIVACY INDICATORS

(71) Applicant: Elwha LLC, Bellevue, WA (US)

(72) Inventors: Pablos Holman, Seattle, WA (US); Roderick A. Hyde, Redmond, WA (US); Royce A. Levien, Lexington, MA (US); Richard T. Lord, Gig Harbor, WA (US); Robert W. Lord, Seattle, WA (US); Mark A. Malamud, Seattle, WA (US)

(73) Assignee: Elwha LLC, Bellevue, WA (US)

( * ) Notice: Subject to any disclaimer, the term of this patent is extended or adjusted under 35 U.S.C. 154(b) by 0 days.

(21) Appl. No.: 14/218,790

(22) Filed: Mar. 18, 2014

(65) Prior Publication Data

US 2015/0269384 A1    Sep. 24, 2015

Related U.S. Application Data

(63) Continuation of application No. 14/218,746, filed on Mar. 18, 2014, which is a continuation-in-part of
(Continued)

(51) Int. Cl.
*G06F 21/60* (2013.01)
*G06Q 30/00* (2012.01)
*G06F 21/16* (2013.01)

(52) U.S. Cl.
CPC ............ *G06Q 30/00* (2013.01); *G06F 21/16* (2013.01); *G06F 2221/2111* (2013.01); *G06F 2221/2137* (2013.01)

(58) Field of Classification Search
CPC .... H04N 1/00281; H04N 5/232; H04N 5/772; H04N 2201/0017; H04N 2101/00
See application file for complete search history.

(56) References Cited

U.S. PATENT DOCUMENTS 5,644,727 A    7/1997 Atkins
5,862,217 A    1/1999 Steinberg et al.
(Continued)

FOREIGN PATENT DOCUMENTS

JP    2009188922 A    8/2009
JP    2009288245 A    12/2009

OTHER PUBLICATIONS

Gao, Yongsheng et al., "Face Recognition Using Line Edge Map," IEEE Transactions on Pattern Analysis and Intelligence, vol. 24, No. 6, Jun. 2002, pp. 764-779.
(Continued)

*Primary Examiner* — Amir Mehrmanesh

(57) ABSTRACT

Computationally implemented methods and systems include acquiring a block of encrypted data that corresponds to an image that has been encrypted through use of a unique device code associated with an image capture device configured to capture the image that includes a representation of a feature of an entity, obtaining a privacy metadata that corresponds to a detection of a privacy beacon in the image, said at least one image captured by the image capture device, said privacy beacon associated with the entity, and determining, at least partly based on the obtained privacy metadata, and partly based on a calculation related to the block of encrypted data that corresponds to the whether to allow one or more processes related to the encrypted data block. In addition to the foregoing, other aspects are described in the claims, drawings, and text.

27 Claims, 67 Drawing Sheets

Related U.S. Application Data application No. 14/051,213, filed on Oct. 10, 2013, and a continuation-in-part of application No. 14/055,471, filed on Oct. 16, 2013, now abandoned, and a continuation-in-part of application No. 14/055,543, filed on Oct. 16, 2013, now abandoned, and a continuation-in-part of application No. 14/084,254, filed on Nov. 19, 2013, now abandoned, and a continuation-in-part of application No. 14/084,579, filed on Nov. 19, 2013, and a continuation-in-part of application No. 14/084,581, filed on Nov. 19, 2013, and a continuation-in-part of application No. 14/084,591, filed on Nov. 19, 2013, now abandoned, and a continuation-in-part of application No. 14/108,077, filed on Dec. 16, 2013, now abandoned, and a continuation-in-part of application No. 14/108,107, filed on Dec. 16, 2013, and a continuation-in-part of application No. 14/108,185, filed on Dec. 16, 2013, and a continuation-in-part of application No. 14/108,217, filed on Dec. 16, 2013, now abandoned, and a continuation-in-part of application No. 14/109,682, filed on Dec. 17, 2013, and a continuation-in-part of application No. 14/109,726, filed on Dec. 17, 2013, now abandoned, and a continuation-in-part of application No. 14/145,873, filed on Dec. 31, 2013, now abandoned, and a continuation-in-part of application No. 14/145,886, filed on Dec. 31, 2013, and a continuation-in-part of application No. 14/148,523, filed on Jan. 6, 2014, and a continuation-in-part of application No. 14/148,560, filed on Jan. 6, 2014, and a continuation-in-part of application No. 14/185,741, filed on Feb. 20, 2014, now abandoned, and a continuation-in-part of application No. 14/186,528, filed on Feb. 21, 2014.

(56) References Cited

U.S. PATENT DOCUMENTS

| | | | |
|---|---|---|---|
| 6,067,399 | A | 5/2000 | Berger |
| 6,178,243 | B1 | 1/2001 | Pomerantz et al. |
| 6,424,727 | B1 | 7/2002 | Musgrave et al. |
| 6,456,985 | B1 | 9/2002 | Ohtsuka |
| 6,526,158 | B1 | 2/2003 | Goldberg |
| 6,532,541 | B1 | 3/2003 | Chang et al. |
| 6,727,935 | B1 | 4/2004 | Allen et al. |
| 6,765,608 | B1 | 7/2004 | Himeda et al. |
| 6,775,775 | B1 | 8/2004 | Yoshiura et al. |
| 7,013,288 | B1 | 3/2006 | Reifel et al. |
| 7,036,019 | B1 | 4/2006 | Saito |
| 7,117,519 | B1 | 10/2006 | Anderson et al. |
| 7,603,321 | B2 | 10/2009 | Gurvey |
| 7,864,218 | B2 | 1/2011 | Kusaka et al. |
| 8,085,995 | B2 | 12/2011 | Yagnik |
| 8,301,505 | B2 | 10/2012 | Farouki et al. |
| 8,412,602 | B2 | 4/2013 | Paz-Pujalt |
| 8,468,097 | B2 | 6/2013 | Alrabady et al. |
| 8,497,912 | B2 | 7/2013 | Wun |
| 8,620,800 | B1 | 12/2013 | Micaelian et al. |
| 8,824,861 | B2 | 9/2014 | Gentile et al. |
| 8,831,299 | B2 | 9/2014 | Kurtz et al. |
| 8,854,465 | B1 | 10/2014 | McIntyre |
| 8,898,468 | B2 | 11/2014 | Reddy et al. |
| 9,065,979 | B2 | 6/2015 | Cohen et al. |
| 9,083,937 | B1 | 7/2015 | Oliphant |
| 9,360,990 | B1 | 6/2016 | Emigh et al. |
| 9,426,345 | B1 | 8/2016 | Turner, Jr. et al. |
| 2001/0052037 | A1 | 12/2001 | Terasaki et al. |
| 2002/0038076 | A1 | 3/2002 | Sheehan et al. |
| 2002/0039479 | A1 | 4/2002 | Watanabe et al. |
| 2002/0057915 | A1 | 5/2002 | Mann |
| 2002/0065779 | A1 | 5/2002 | Dutta |
| 2002/0088000 | A1 | 7/2002 | Morris |
| 2002/0114452 | A1 | 8/2002 | Hamilton |
| 2002/0120589 | A1 | 8/2002 | Aoki |
| 2002/0164048 | A1 | 11/2002 | Bruckstein et al. |
| 2003/0037138 | A1 | 2/2003 | Brown et al. |
| 2003/0069788 | A1 | 4/2003 | Han |
| 2003/0179407 | A1 | 9/2003 | Herr |
| 2003/0231769 | A1 | 12/2003 | Bolle et al. |
| 2004/0022444 | A1 | 2/2004 | Rhoads |
| 2004/0075749 | A1 | 4/2004 | Kondo et al. |
| 2004/0096002 | A1 | 5/2004 | Zdepski et al. |
| 2004/0120522 | A1 | 6/2004 | Takeda et al. |
| 2004/0152485 | A1 | 8/2004 | Deeds |
| 2004/0162981 | A1 | 8/2004 | Wong |
| 2004/0202382 | A1 | 10/2004 | Pilu |
| 2004/0204238 | A1 | 10/2004 | Aoki |
| 2004/0204985 | A1 | 10/2004 | Gibson et al. |
| 2004/0227634 | A1 | 11/2004 | Caulfield et al. |
| 2004/0249709 | A1 | 12/2004 | Donovan et al. |
| 2004/0260614 | A1 | 12/2004 | Taratino et al. |
| 2005/0008226 | A1 | 1/2005 | Aoki |
| 2005/0010776 | A1 | 1/2005 | Kenen et al. |
| 2005/0049971 | A1 | 3/2005 | Bellinger |
| 2005/0060545 | A1 | 3/2005 | Mont et al. |
| 2005/0066187 | A1 | 3/2005 | Peinado et al. |
| 2005/0093980 | A1 | 5/2005 | Nonaka et al. |
| 2005/0096979 | A1 | 5/2005 | Koningstein |
| 2005/0111660 | A1 | 5/2005 | Hosoda |
| 2005/0180573 | A1 | 8/2005 | Pelly et al. |
| 2005/0196013 | A1 | 9/2005 | Rhoads |
| 2005/0206960 | A1 | 9/2005 | Shibata |
| 2005/0223045 | A1 | 10/2005 | Funahashi et al. |
| 2005/0226413 | A1 | 10/2005 | Wada |
| 2005/0243265 | A1 | 11/2005 | Winlow et al. |
| 2005/0275720 | A1 | 12/2005 | Noguchi |
| 2006/0028558 | A1 | 2/2006 | Sato et al. |
| 2006/0044599 | A1 | 3/2006 | Lipowitz et al. |
| 2006/0135233 | A1 | 6/2006 | Willis et al. |
| 2006/0206911 | A1 | 9/2006 | Kim et al. |
| 2006/0287813 | A1 | 12/2006 | Quigley |
| 2007/0040654 | A1 | 2/2007 | Lee et al. |
| 2007/0061267 | A1 | 3/2007 | Saito |
| 2007/0067626 | A1 | 3/2007 | Briancon et al. |
| 2007/0086626 | A1 | 4/2007 | Mariani et al. |
| 2007/0100757 | A1 | 5/2007 | Rhoads |
| 2007/0112968 | A1 | 5/2007 | Schwab |
| 2007/0115350 | A1 | 5/2007 | Currivan et al. |
| 2007/0153091 | A1 | 7/2007 | Watlington et al. |
| 2007/0172155 | A1 | 7/2007 | Guckenberger |
| 2007/0174321 | A1 | 7/2007 | Viikari et al. |
| 2007/0192872 | A1 | 8/2007 | Rhoads et al. |
| 2007/0255962 | A1 | 11/2007 | Lu et al. |
| 2007/0291155 | A1 | 12/2007 | Kawaguchi et al. |
| 2007/0296817 | A1 | 12/2007 | Ebrahimi et al. |
| 2007/0297610 | A1 | 12/2007 | Chen et al. |
| 2008/0059255 | A1 | 3/2008 | Birkby |
| 2008/0071770 | A1 | 3/2008 | Schloter et al. |
| 2008/0117295 | A1 | 5/2008 | Ebrahimi et al. |
| 2008/0181533 | A1 | 7/2008 | Jung et al. |
| 2008/0195664 | A1 | 8/2008 | Maharajh et al. |
| 2008/0222127 | A1 | 9/2008 | Bergin |
| 2008/0228821 | A1 | 9/2008 | Mick et al. |
| 2008/0239096 | A1 | 10/2008 | Shasa |
| 2008/0267403 | A1 | 10/2008 | Boult |
| 2008/0275763 | A1 | 11/2008 | Tran et al. |
| 2008/0297586 | A1 | 12/2008 | Kurtz et al. |
| 2008/0297587 | A1 | 12/2008 | Kurtz et al. |
| 2008/0297588 | A1 | 12/2008 | Kurtz et al. |
| 2008/0297589 | A1 | 12/2008 | Kurtz et al. |
| 2008/0298571 | A1 | 12/2008 | Kurtz et al. |
| 2008/0313226 | A1 | 12/2008 | Bowden et al. |
| 2009/0021591 | A1 | 1/2009 | Sako |
| 2009/0037515 | A1 | 2/2009 | Zapata et al. |
| 2009/0037949 | A1 | 2/2009 | Birch |
| 2009/0070206 | A1 | 3/2009 | Sengamedu |
| 2009/0122149 | A1 | 5/2009 | Ishii |
| 2009/0132435 | A1 | 5/2009 | Titus et al. |
| 2009/0150210 | A1 | 6/2009 | Athsani et al. |

(56) References Cited

U.S. PATENT DOCUMENTS

| | | |
|---|---|---|
| 2009/0193055 A1 | 7/2009 | Kuberka et al. |
| 2009/0203361 A1 | 8/2009 | Huang et al. |
| 2009/0216769 A1 | 8/2009 | Bellwood et al. |
| 2009/0245512 A1 | 10/2009 | Masui et al. |
| 2009/0254572 A1 | 10/2009 | Redlich et al. |
| 2009/0257589 A1 | 10/2009 | Yokota et al. |
| 2009/0285506 A1 | 11/2009 | Benson et al. |
| 2010/0002084 A1 | 1/2010 | Hattori et al. |
| 2010/0024045 A1 | 1/2010 | Sastry et al. |
| 2010/0052852 A1 | 3/2010 | Mohanty |
| 2010/0088686 A1 | 4/2010 | Langworthy et al. |
| 2010/0094878 A1 | 4/2010 | Soroca et al. |
| 2010/0110095 A1 | 5/2010 | Sekiguchi et al. |
| 2010/0124363 A1 | 5/2010 | Ek et al. |
| 2010/0149782 A1 | 6/2010 | Smith, Jr. et al. |
| 2010/0182447 A1 | 7/2010 | Namba et al. |
| 2010/0201498 A1 | 8/2010 | Griffin |
| 2010/0278453 A1 | 11/2010 | King |
| 2010/0287048 A1 | 11/2010 | Ramer et al. |
| 2010/0289920 A1 | 11/2010 | Mizuno |
| 2010/0316222 A1 | 12/2010 | Inami et al. |
| 2010/0317420 A1 | 12/2010 | Hoffberg |
| 2010/0323608 A1 | 12/2010 | Sanhedrai et al. |
| 2010/0333152 A1 | 12/2010 | Redmann et al. |
| 2011/0019816 A1 | 1/2011 | Inarni et al. |
| 2011/0035275 A1 | 2/2011 | Frankel et al. |
| 2011/0082902 A1 | 4/2011 | Rottler et al. |
| 2011/0096922 A1 | 4/2011 | Oya |
| 2011/0109792 A1 | 5/2011 | Montag |
| 2011/0129120 A1 | 6/2011 | Chan |
| 2011/0138183 A1 | 6/2011 | Reddy et al. |
| 2011/0145574 A1 | 6/2011 | Ju et al. |
| 2011/0184814 A1 | 7/2011 | Konkol et al. |
| 2011/0234829 A1 | 9/2011 | Gagvani et al. |
| 2011/0292230 A1 | 12/2011 | Winters |
| 2011/0292231 A1 | 12/2011 | Winters |
| 2011/0317922 A1 | 12/2011 | Chertok et al. |
| 2012/0045095 A1 | 2/2012 | Tate et al. |
| 2012/0054029 A1 | 3/2012 | Trice et al. |
| 2012/0054838 A1 | 3/2012 | Kim et al. |
| 2012/0056546 A1 | 3/2012 | Harvey |
| 2012/0058747 A1 | 3/2012 | Yiannios et al. |
| 2012/0121084 A1 | 5/2012 | Tomlinson et al. |
| 2012/0131471 A1 | 5/2012 | Terlouw et al. |
| 2012/0154418 A1 | 6/2012 | Mikawa |
| 2012/0215811 A1 | 8/2012 | Tipper et al. |
| 2012/0233000 A1 | 9/2012 | Fisher et al. |
| 2012/0317227 A1 | 12/2012 | Bettinger |
| 2012/0321143 A1 | 12/2012 | Krupka et al. |
| 2013/0073359 A1 | 3/2013 | Caplan |
| 2013/0078962 A1 | 3/2013 | Clarke et al. |
| 2013/0088616 A1 | 4/2013 | Ingrassia, Jr. |
| 2013/0093913 A1 | 4/2013 | Okumura et al. |
| 2013/0095924 A1 | 4/2013 | Geisner et al. |
| 2013/0156331 A1 | 6/2013 | Kurabayashi et al. |
| 2013/0169781 A1 | 7/2013 | Hanina et al. |
| 2013/0169853 A1 | 7/2013 | Luong |
| 2013/0182917 A1 | 7/2013 | Kritt et al. |
| 2013/0198280 A1 | 8/2013 | Liu et al. |
| 2013/0217332 A1 | 8/2013 | Altman et al. |
| 2013/0232012 A1 | 9/2013 | Yan et al. |
| 2013/0246692 A1 | 9/2013 | Macor |
| 2013/0262314 A1 | 10/2013 | Butler et al. |
| 2013/0262588 A1 | 10/2013 | Barak et al. |
| 2013/0269013 A1 | 10/2013 | Parry et al. |
| 2013/0275232 A1 | 10/2013 | Oh et al. |
| 2013/0283061 A1 | 10/2013 | Jeong |
| 2013/0305383 A1 | 11/2013 | Garralda et al. |
| 2013/0342699 A1 | 12/2013 | Hansen |
| 2014/0016107 A1 | 1/2014 | Coulson |
| 2014/0036088 A1 | 2/2014 | Gabriel |
| 2014/0049653 A1 | 2/2014 | Leonard et al. |
| 2014/0051946 A1 | 2/2014 | Arne et al. |
| 2014/0101197 A1 | 4/2014 | Charytoniuk |
| 2014/0101456 A1 | 4/2014 | Meunier et al. |
| 2014/0112534 A1 | 4/2014 | Sako et al. |
| 2014/0122889 A1 | 5/2014 | Freund et al. |
| 2014/0139680 A1 | 5/2014 | Huang et al. |
| 2014/0140575 A1 | 5/2014 | Wolf |
| 2014/0160248 A1 | 6/2014 | Pomerantz et al. |
| 2014/0160250 A1 | 6/2014 | Pomerantz et al. |
| 2014/0168272 A1 | 6/2014 | Chedeau et al. |
| 2014/0173648 A1 | 6/2014 | Ball et al. |
| 2014/0176663 A1 | 6/2014 | Cutler et al. |
| 2014/0176733 A1 | 6/2014 | Drooker et al. |
| 2014/0177830 A1 | 6/2014 | Gajek |
| 2014/0196152 A1 | 7/2014 | Ur et al. |
| 2014/0201527 A1 | 7/2014 | Krivorot |
| 2014/0201844 A1 | 7/2014 | Buck |
| 2014/0247272 A1 | 9/2014 | Sako et al. |
| 2014/0263623 A1 | 9/2014 | Robison et al. |
| 2014/0278403 A1 | 9/2014 | Jacob et al. |
| 2014/0280533 A1 | 9/2014 | Chedeau et al. |
| 2014/0294293 A1 | 10/2014 | Yamamura |
| 2014/0344948 A1 | 11/2014 | Hayato et al. |
| 2014/0363143 A1 | 12/2014 | Dharssi et al. |
| 2015/0032535 A1 | 1/2015 | Li et al. |
| 2015/0049487 A1 | 2/2015 | Connor |
| 2015/0058229 A1 | 2/2015 | Wiacek et al. |
| 2015/0104103 A1 | 4/2015 | Candelore |
| 2015/0113661 A1 | 4/2015 | Mishra |
| 2015/0178565 A1 | 6/2015 | Rivlin et al. |
| 2016/0171244 A1 | 6/2016 | Ur et al. |
| 2016/0188635 A1 | 6/2016 | Shah et al. |
| 2016/0232375 A1 | 8/2016 | Loeb et al. |
| 2017/0126630 A1 | 5/2017 | Ekambaram et al. |

OTHER PUBLICATIONS

Kim, Dong-Ju et al., "Face Recognition via Local Directional Pattern," International Journal of Security and Its Applications, vol. 7, No. 2, Mar. 2013, pp. 191-200.

Kodate, Kashiko et al., "Compact Parallel Optical Correlator for Face Recognition, and Its Application," Face Recognition, Kresimir Delac and Mislav Grgic (Ed.), ISBN: 978-3-902613-03-5, InTech,Available from: http://www.intechopen.com/books/face_recognition/compact_parallel_optical_correlator_for_face_recognition_and_its_application, Jun. 2007, pp. 235-249.

Krawczyk, H. et al., "HMAC-based Extract-and-Expand Key Derivation Function (HKDF)," Internet Engineering Force (IETF), Request for Comments: 5869, May 2010, 15 pages.

Vander Lugt, A.B., "Signal Detection by Complex Spatial Filtering," Report of Project Michigan, Institute of Science and Technology, The University of Michigan, Jul. 1963, 56 pages.

PCT International Search Report; International App. No. PCT/US2014/060148; Mar. 31, 2015; pp. 1-4.

PCT International Search Report; International App. No. PCT/US2014/060141; Jan. 16, 2015; pp. 1-4.

"Liquidated damages"; Wikipedia; bearing a date of May 4, 2011; printed on Jan. 12, 2017; pp. 1-2 located at: http://en.wikipedia.org/wiki/Liquidated_damages.

Ashok et al.; "Do Not Share! Invisible Light Beacons for Signaling Preferences to Privacy-Respecting Cameras"; VLCS'14; Sep. 7, 2014; pp. 1-6; ACM.

Chattopadhyay et al.; "PrivacyCam: a Privacy Preserving Camera Using uCLinux on the Blackfin DSP"; IEEE Workshop on Embedded Vision Systems; Jun. 2007; pp. 1-8; IEEE.

Kapadia et al. "Virtual Walls: Protecting Digital Privacy in Pervasive Environments"; Pervasive; 2007; pp. 162-179; Springer-Verlag, Berlin Heidelberg, Germany.

Könings et al; "PriFi Beacons: Piggybacking Privacy Implications on WiFi Beacons"; UbiComp'13; Sep. 8-12, 2013; pp. 83-86; ACM; Zurich, Switzerland.

Laibowitz et al.; "Wearable Sensing for Dynamic Management of Dense Ubiquitous Media"; IEEE; 2009; pp. 1-6.

Pidcock et al; "NotiSense: An Urban Sensing Notification System to Improve Bystander Privacy"; 2011; pp. 1-5; PhoneSense.

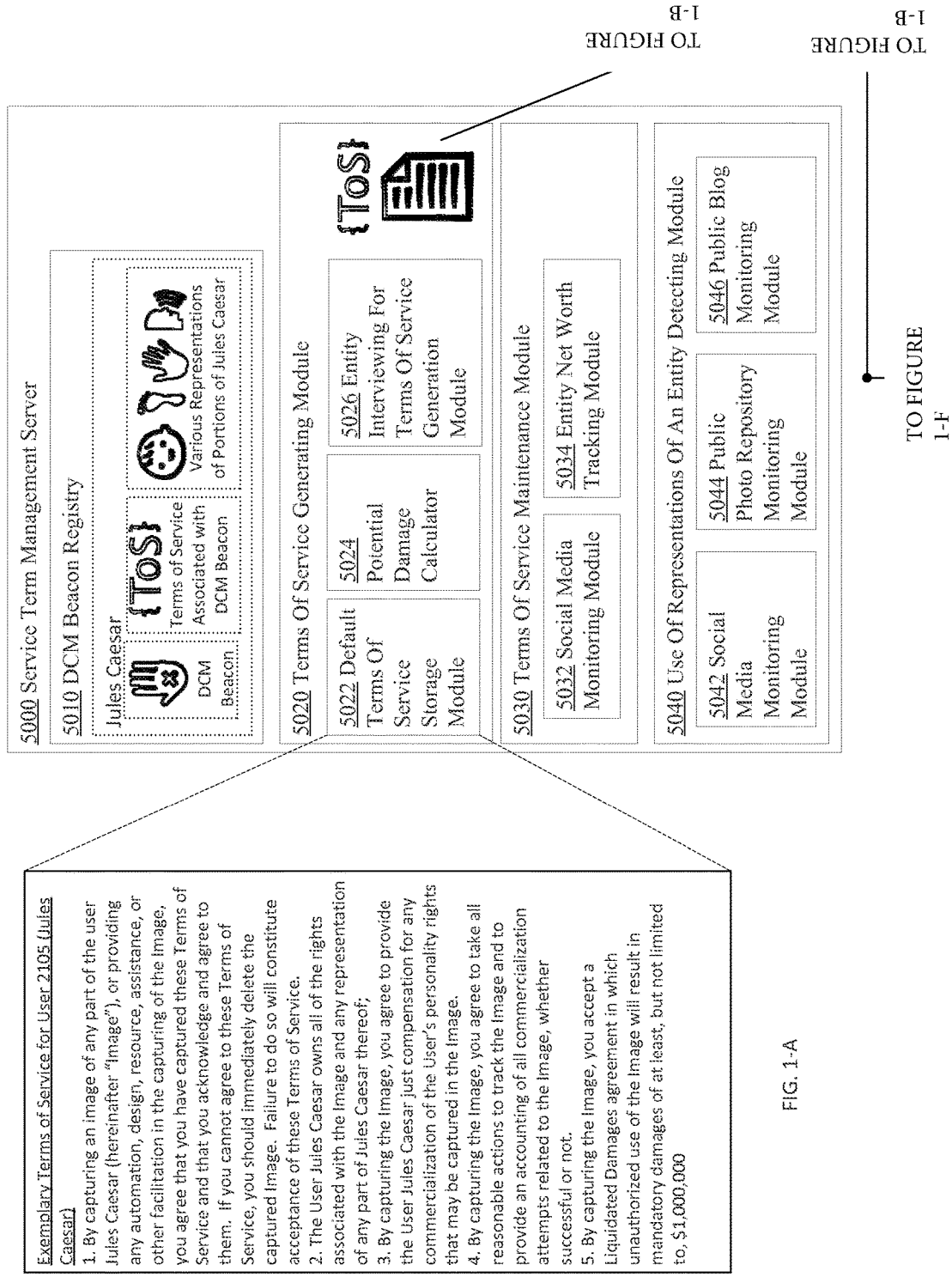
FIG. 1-A

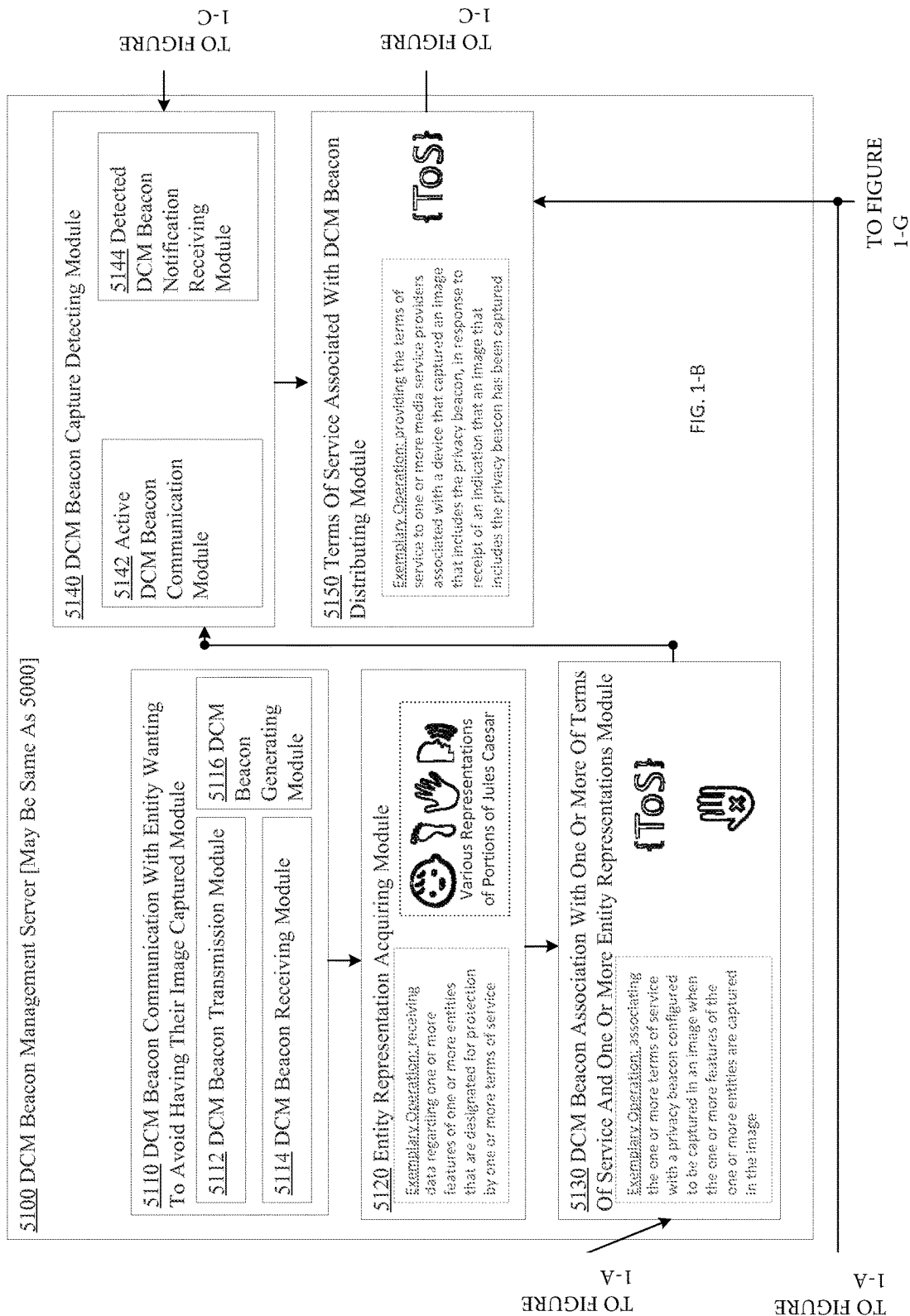
FIG. 1-B

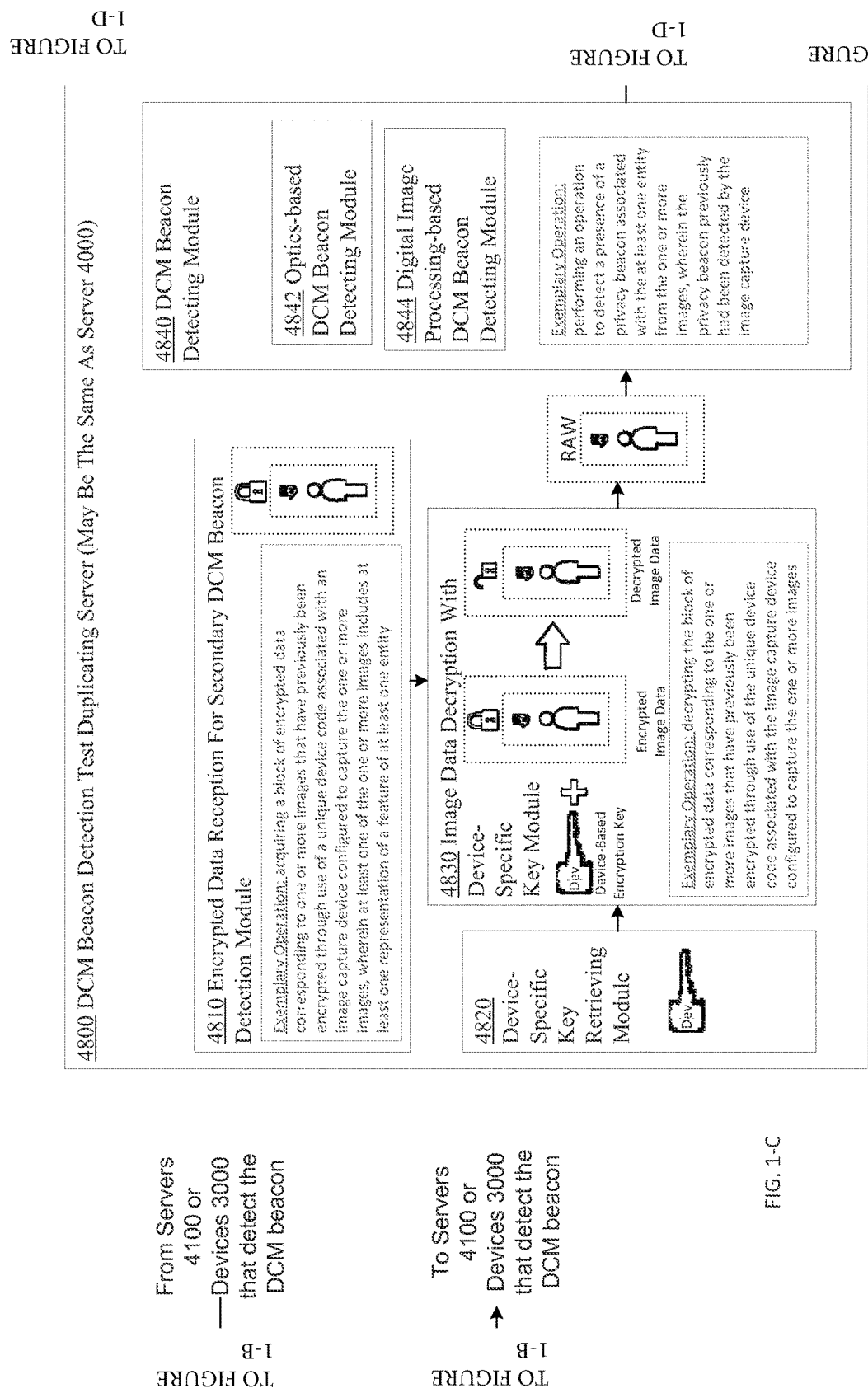
FIG. 1-C

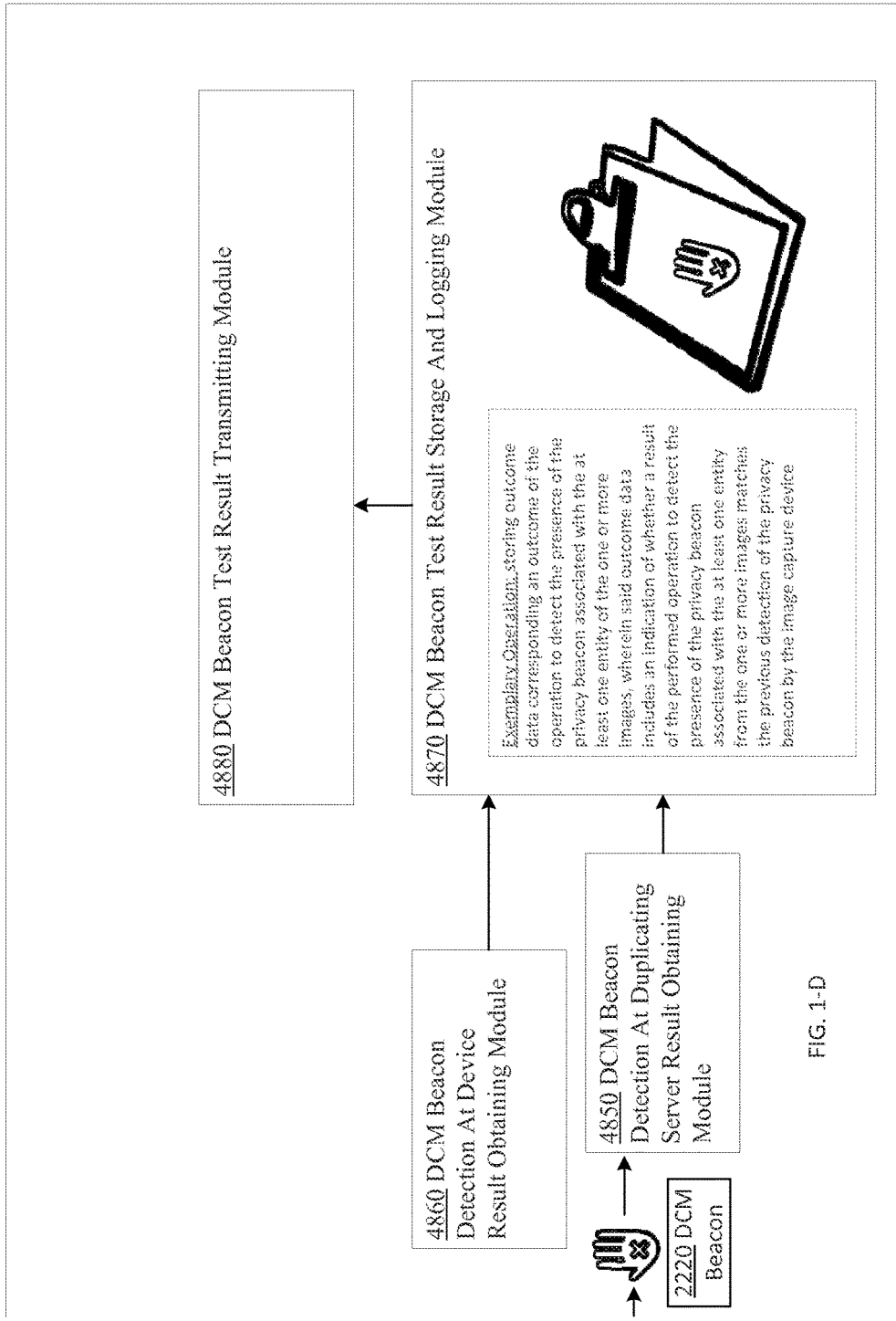
FIG. 1-D

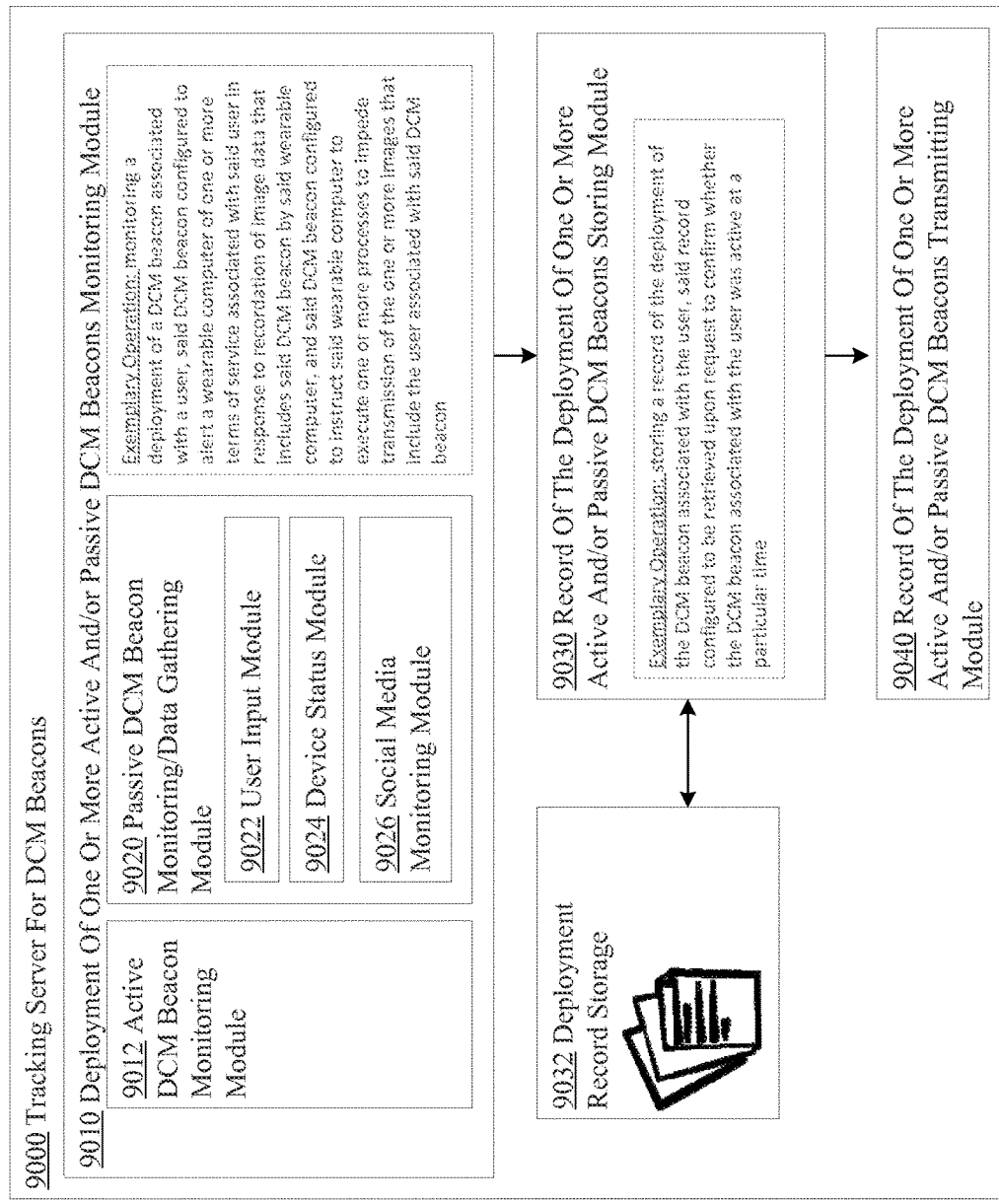
FIG. 1-E

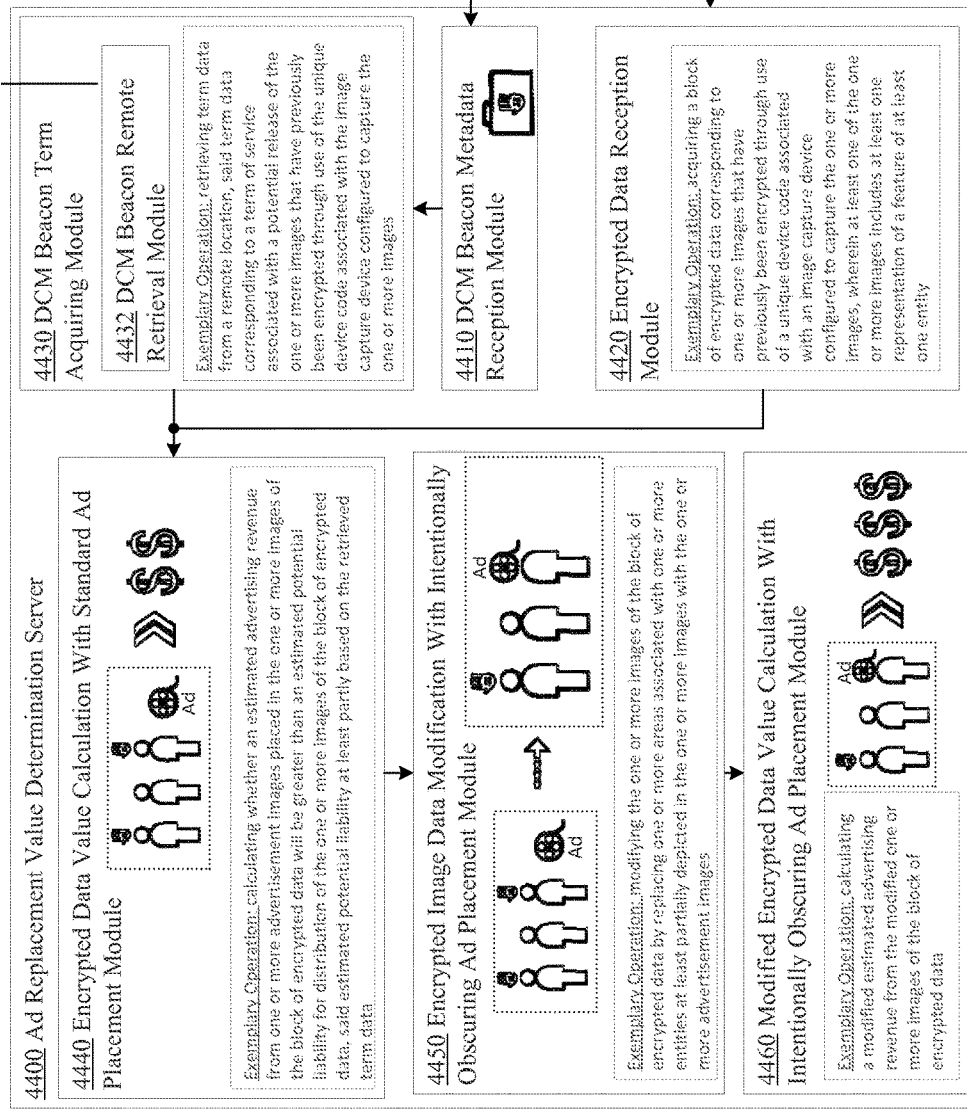
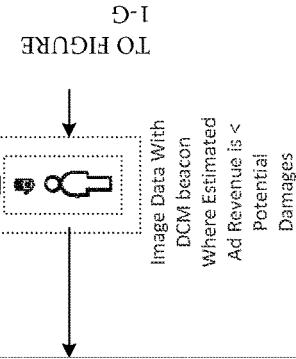
FIG. 1-F

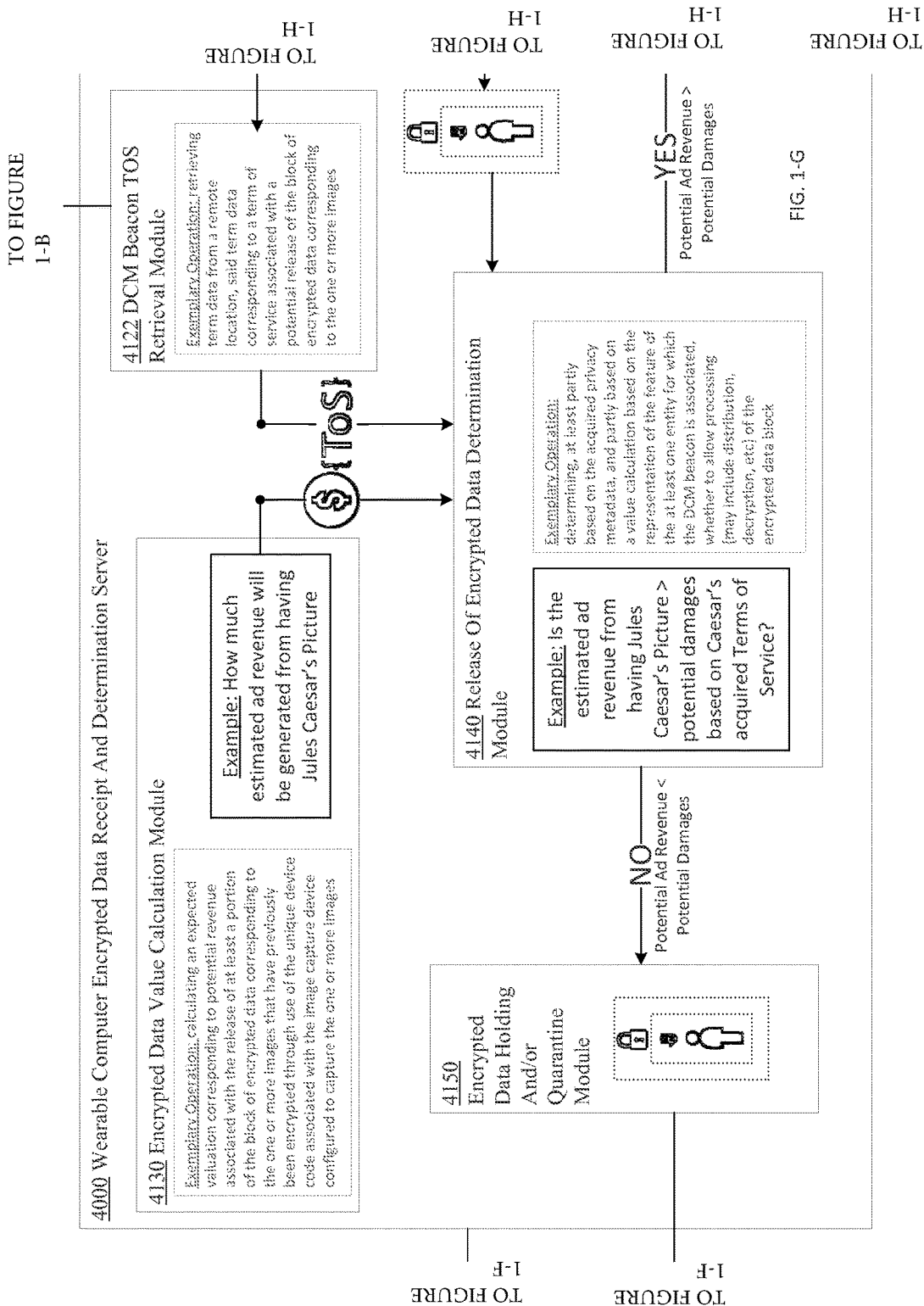
FIG. 1-G

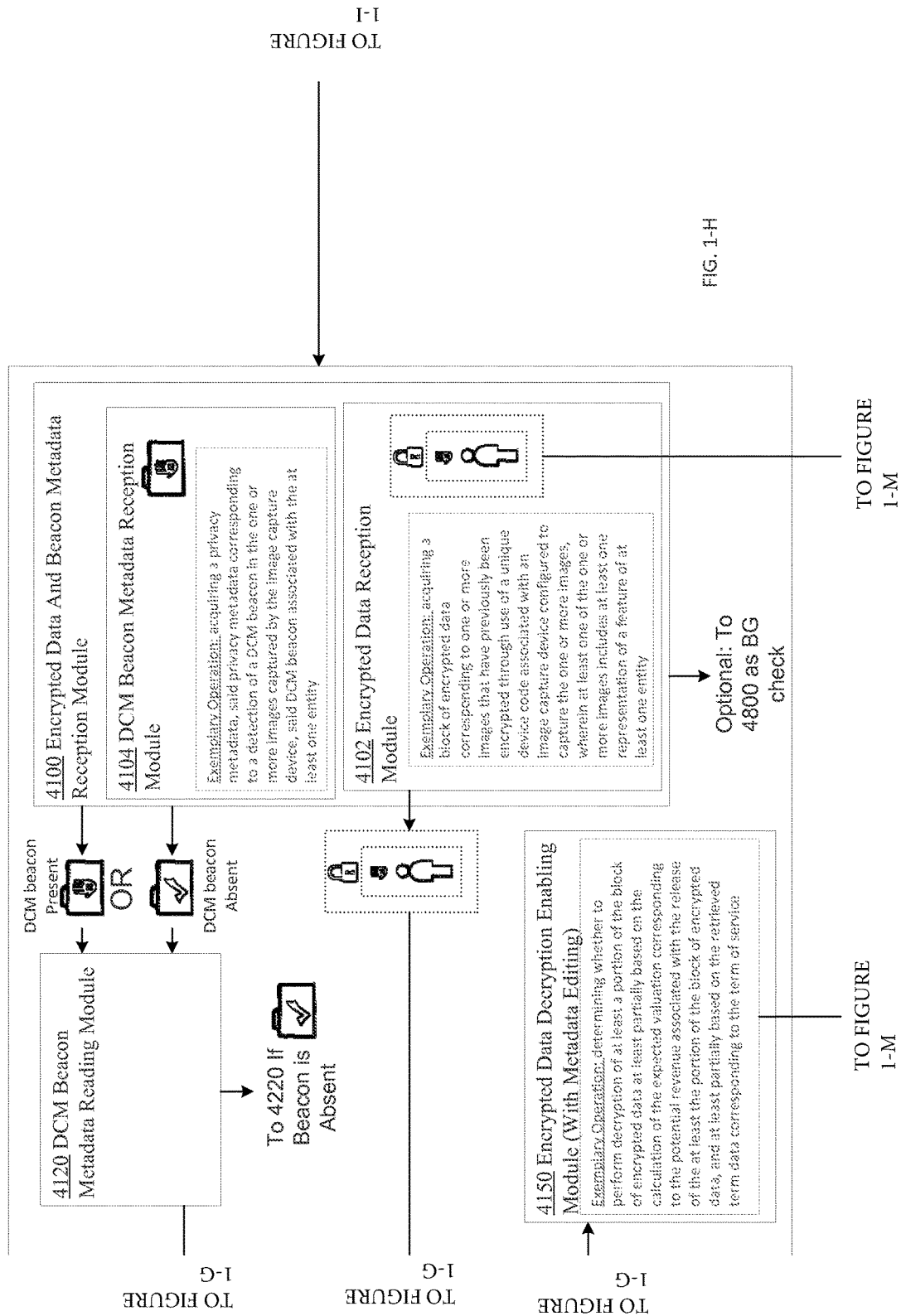
FIG. 1-H

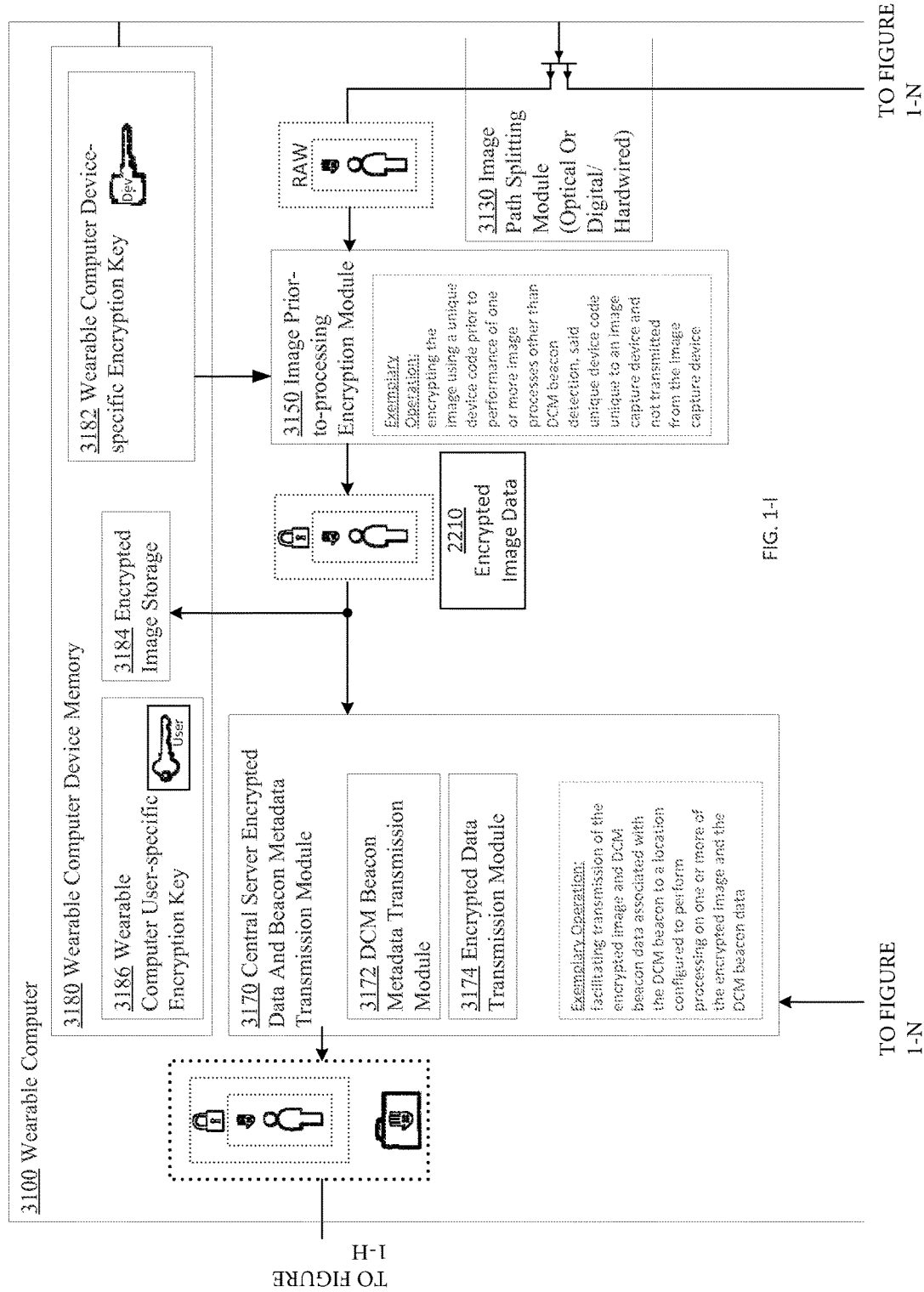

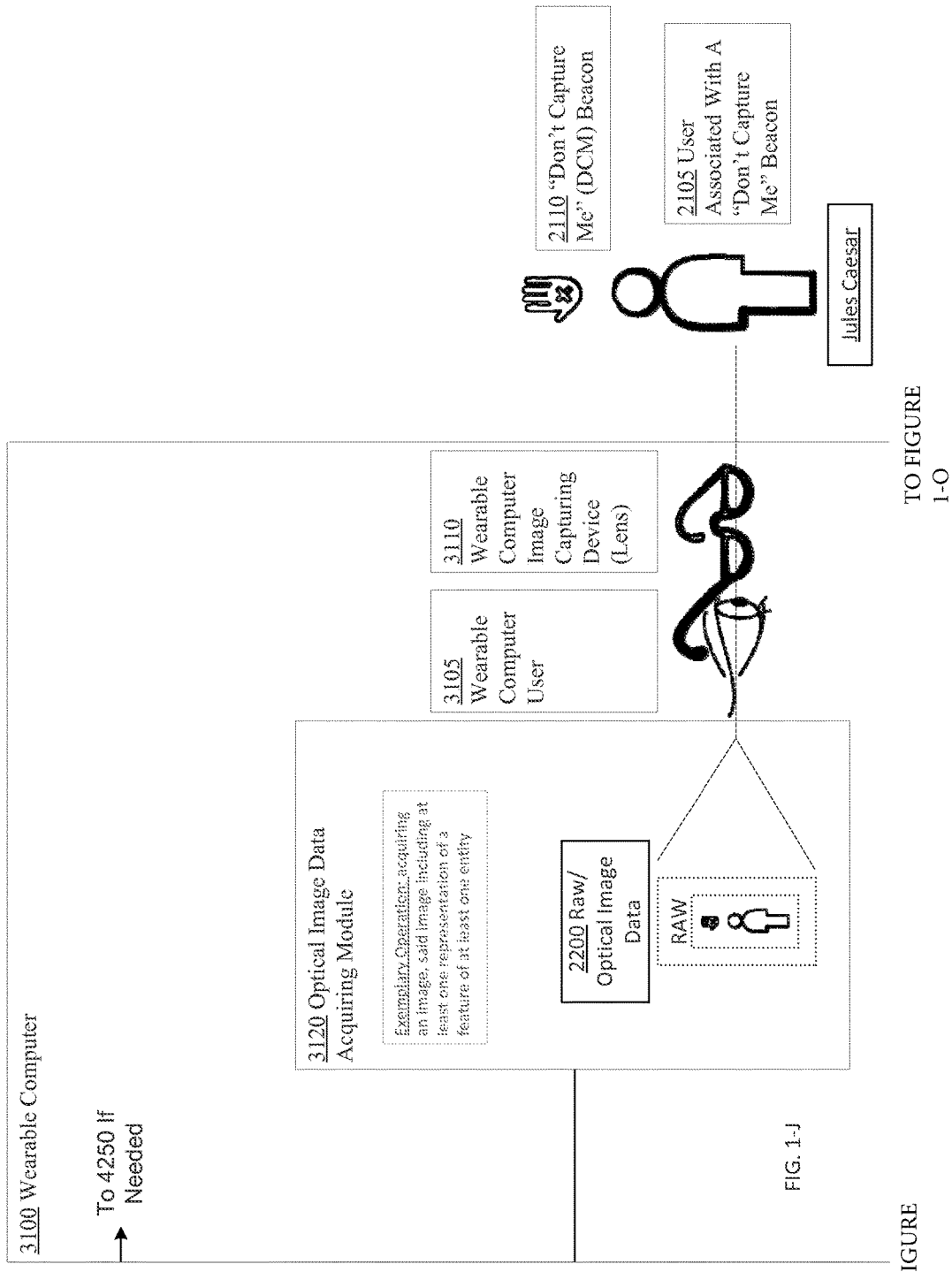
FIG. 1-J

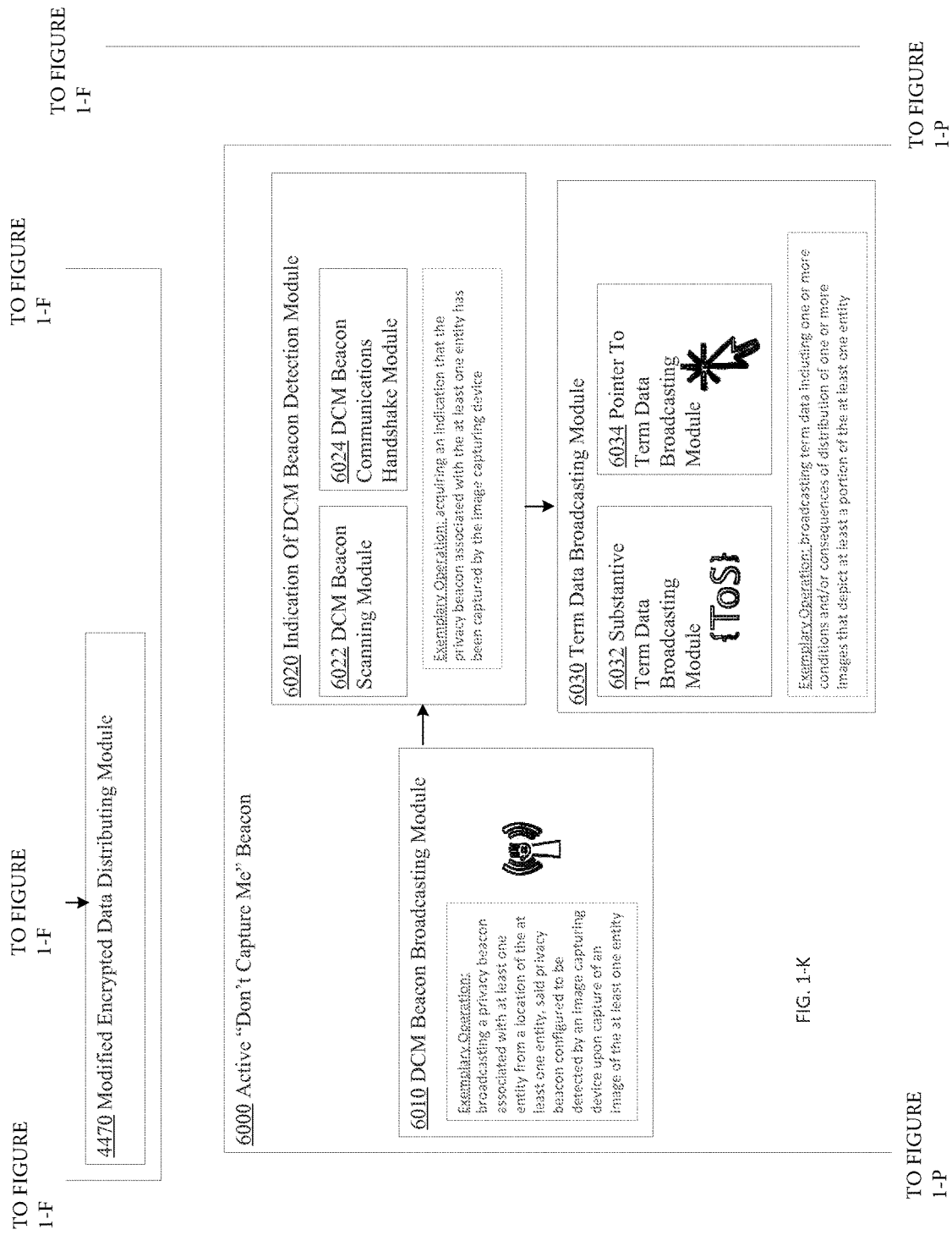
FIG. 1-K

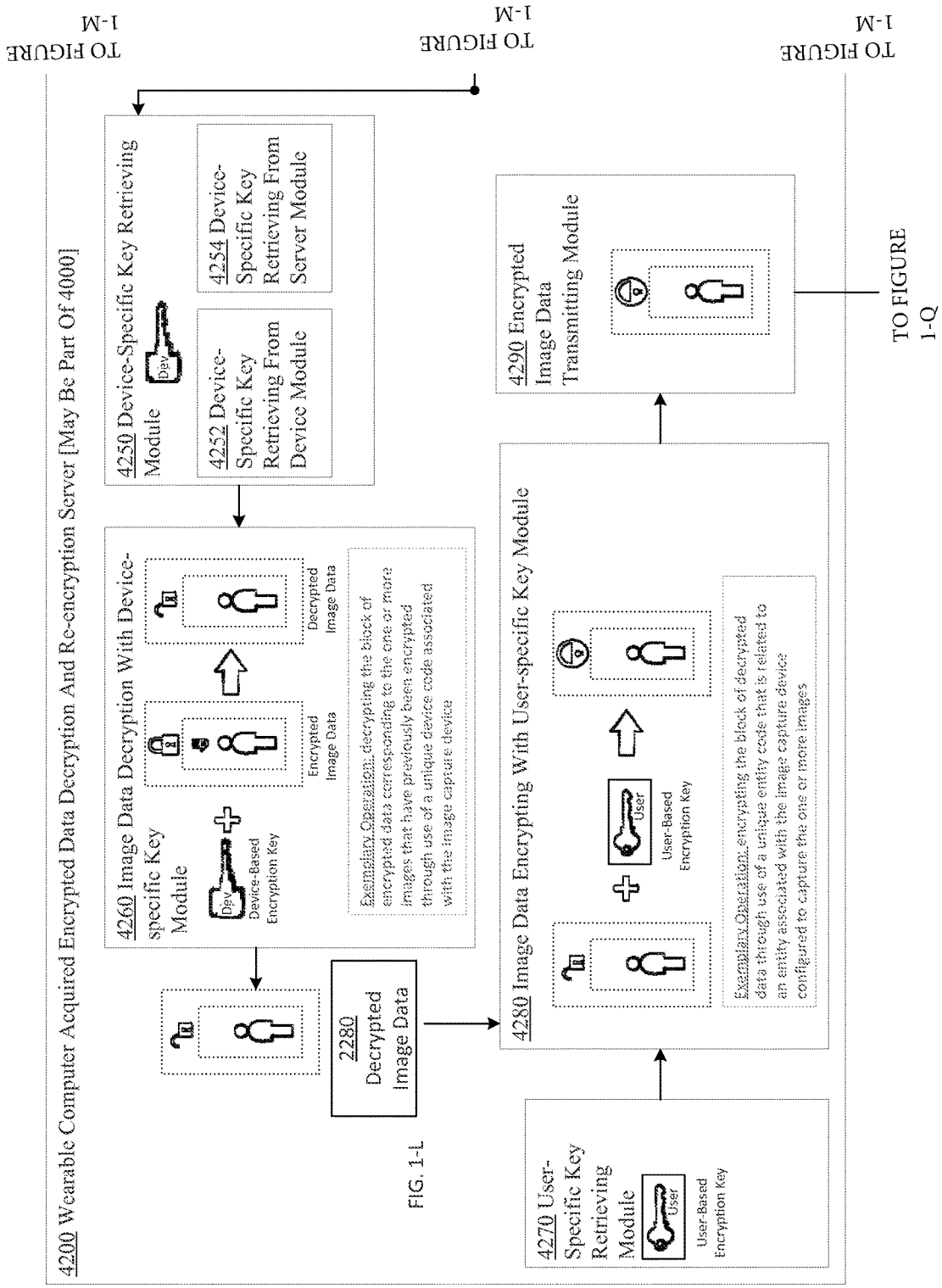
FIG. 1-L

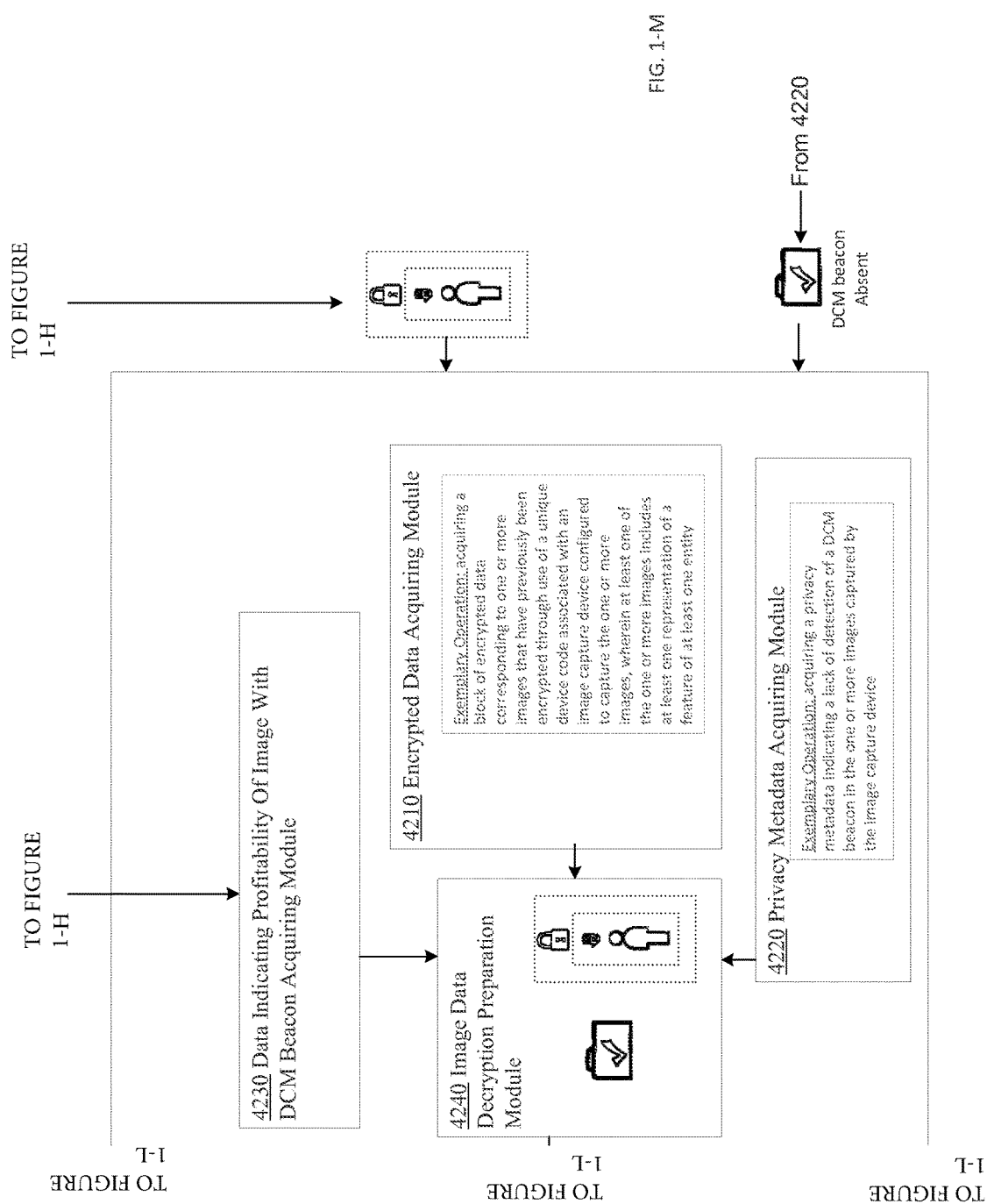

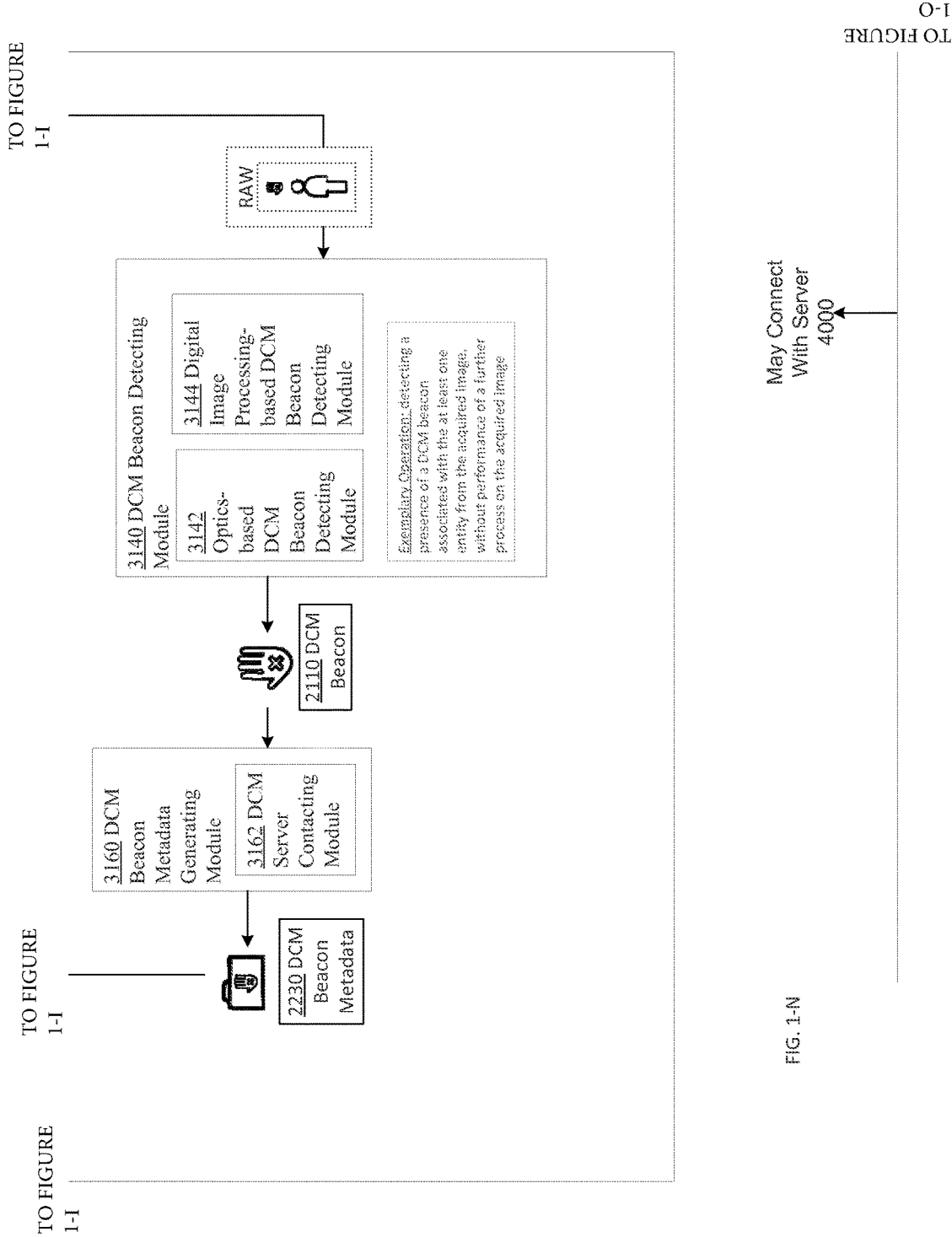
FIG. 1-N

2610 Active "Don't Capture Me" (DCM) Beacon

2107 User Associated With An Active "Don't Capture Me" Beacon

| Fig. 1-A | Fig. 1-B | Fig. 1-C | Fig. 1-D | Fig. 1-E |
|---|---|---|---|---|
| Fig. 1-F | Fig. 1-G | Fig. 1-H | Fig. 1-I | Fig. 1-J |
| Fig. 1-K | Fig. 1-L | Fig. 1-M | Fig. 1-N | Fig. 1-O |
| Fig. 1-P | Fig. 1-Q | Fig. 1-R | Fig. 1-S | Fig. 1-T |

FIG. 1-P

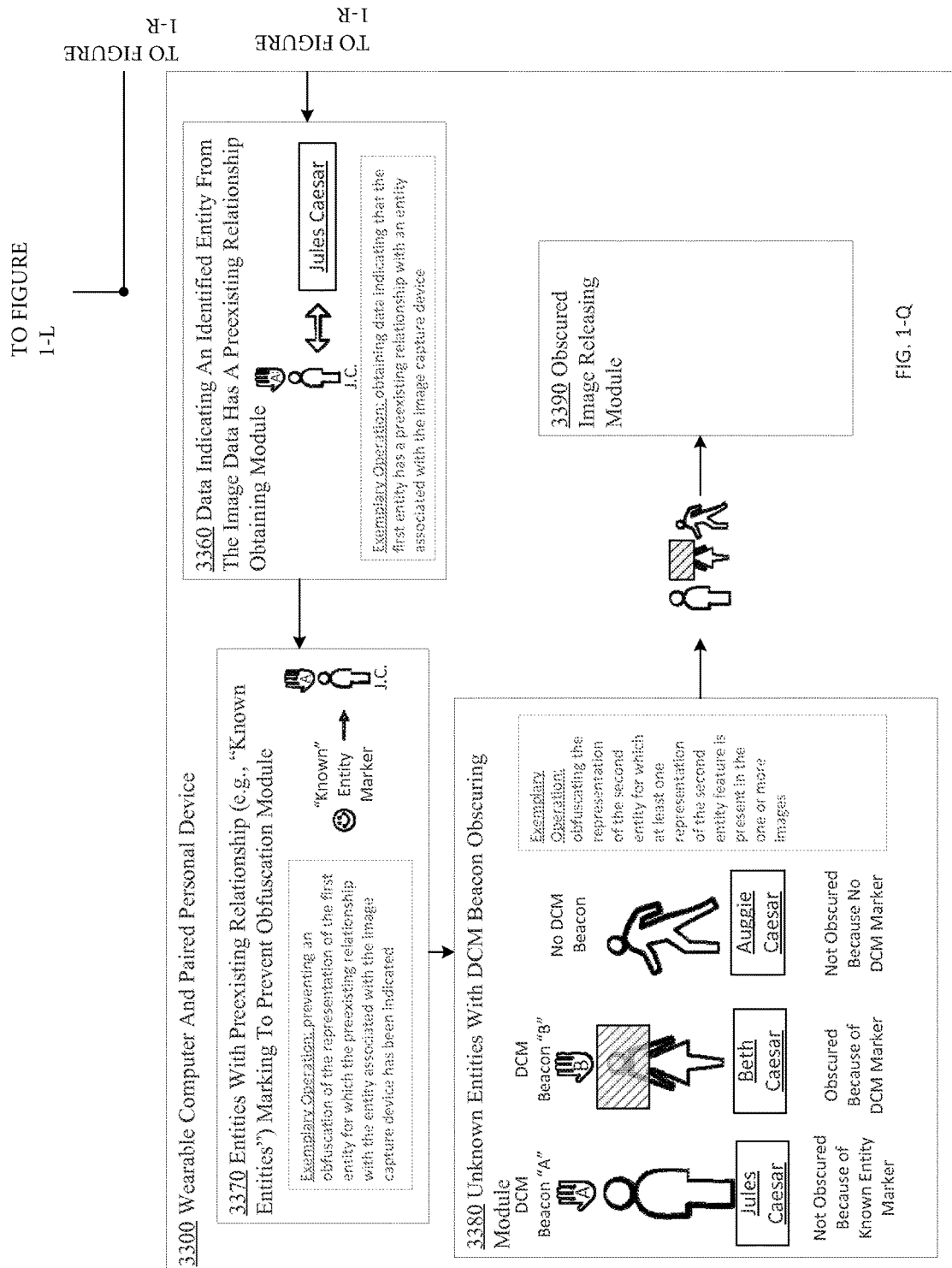

FIG. 1-R

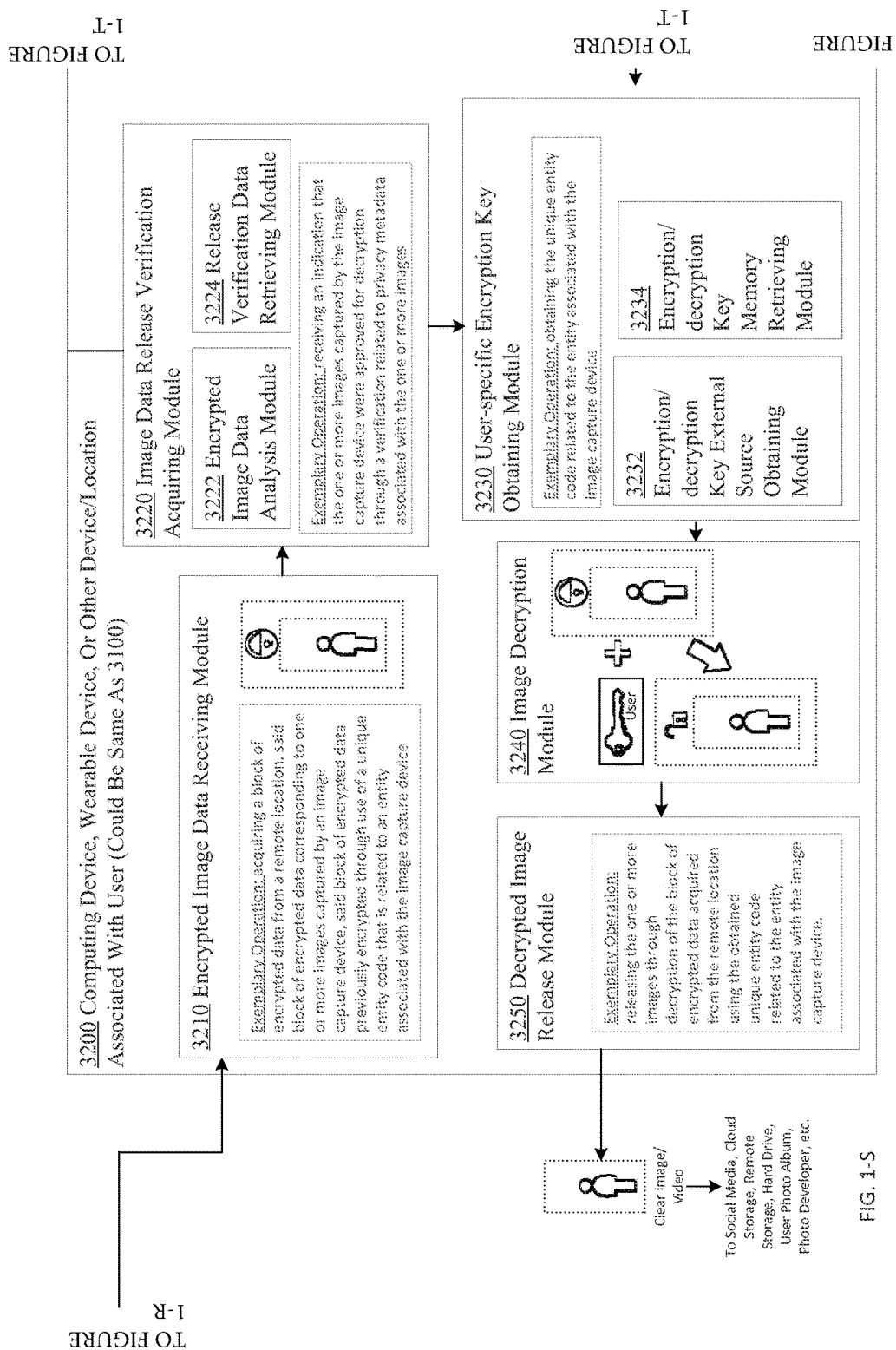
FIG. 1-S

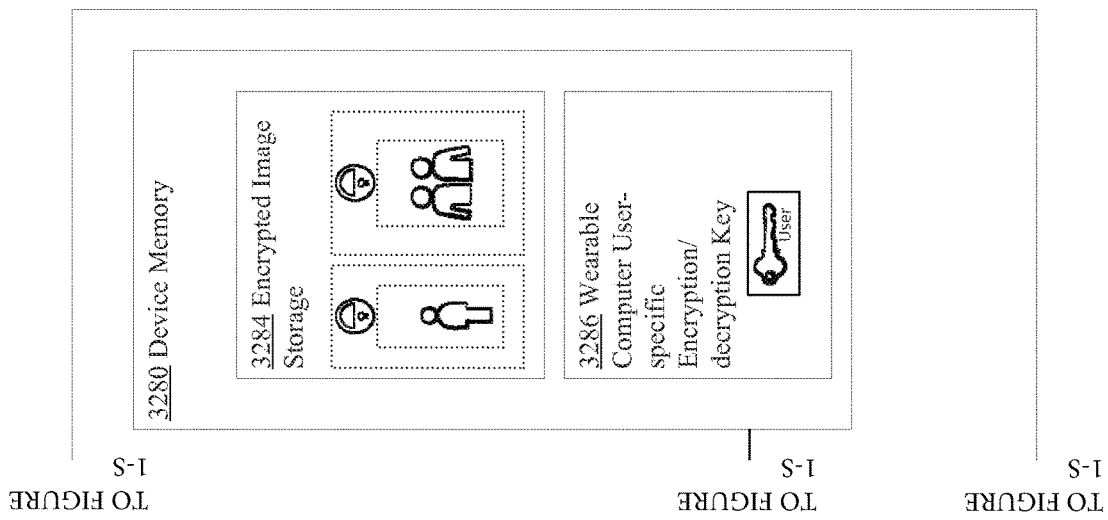

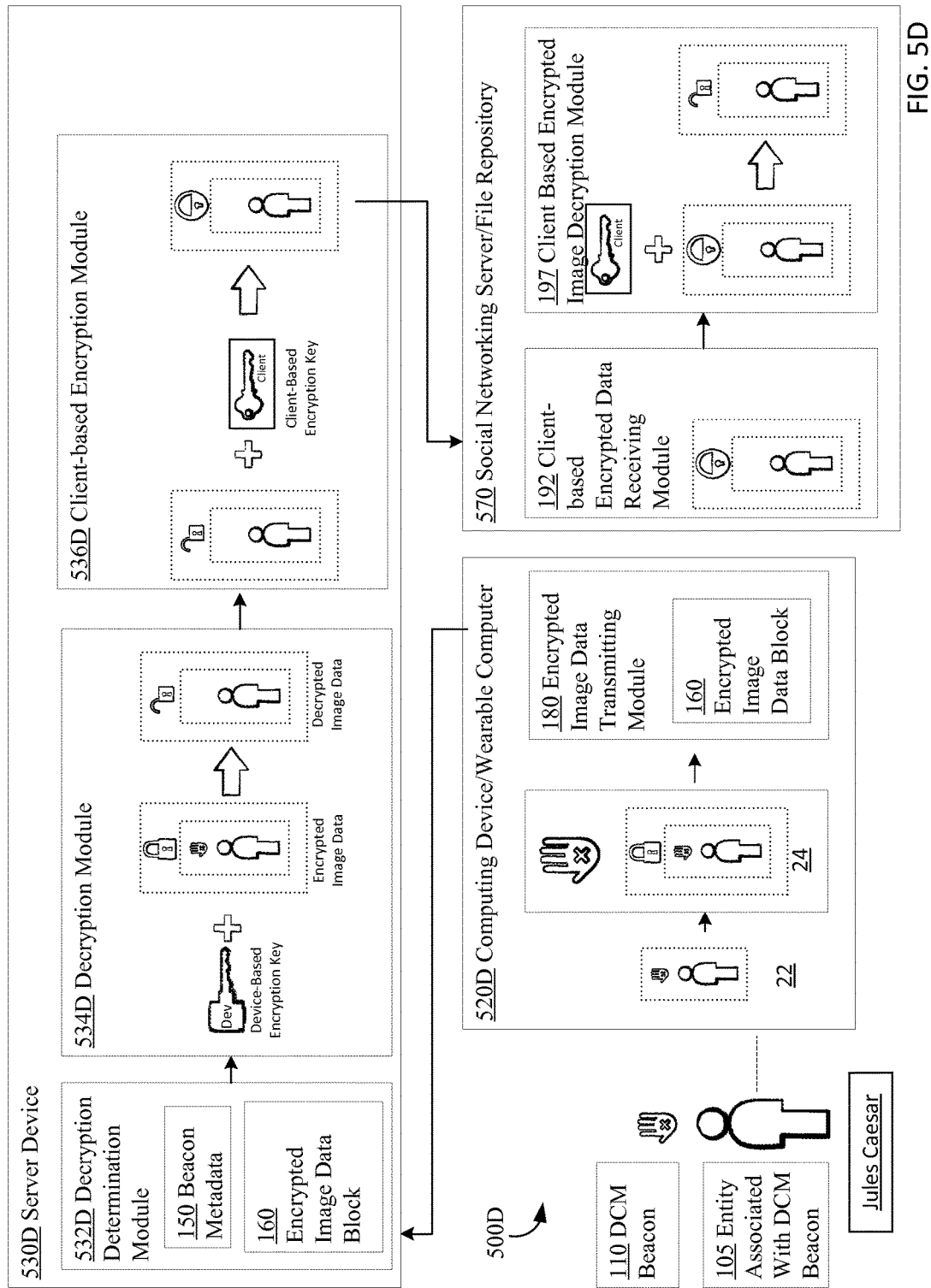

252 Active Indicator Generator Broadcasting Of A Privacy Indicator That Indicates A Presence Of Term Data That Regards An Entity Module 602 Active Indicator Generation Component Broadcasting Of A Privacy Indicator That Indicates A Presence Of Term Data That Regards An Entity Module

| 604 Active Indicator Generation Component Broadcasting Of A Privacy Indicator That Indicates A Presence Of Term Data That Regards An Entity Module That Is Part Of A Smartphone Device | 606 Active Indicator Generation Component Broadcasting Of A Privacy Indicator That Indicates A Presence Of Term Data That Regards An Entity Module That Is Part Of An Entity-associated Device | 608 Active Indicator Generation Component Broadcasting Of A Privacy Indicator That Indicates A Presence Of Term Data That Regards An Entity Module That Is Part Of A Device Under Control Of The Entity | 610 Active Indicator Generation Component Broadcasting Of A Privacy Indicator That Indicates A Presence Of Term Data That Regards An Entity Module That Is Part Of A Device That Stores Data That Regards The Entity | 612 Active Indicator Generation Component Broadcasting Of A Privacy Indicator That Indicates A Presence Of Term Data That Regards An Entity Module That Is Within A Particular Proximity To The Entity |

Fig. 6

| Fig. 6A | Fig. 6B | Fig. 6C | Fig. 6D | Fig. 6E |

FIG. 6A

252 Active Indicator Generator Broadcasting Of A Privacy Indicator That Indicates A Presence Of Term Data That Regards An Entity Module 614 Active Indicator Generator Transmitting Of The Privacy Indicator That Indicates The Presence Of Term Data That Regards An Entity Module 616 Active Indicator Generator Transmitting, Without Regard For Receipt Status, Of The Privacy Indicator That Indicates The Presence Of Term Data That Regards An Entity Module 618 Active Indicator Generator Transmitting, To Two Or More Discrete Devices, Of The Privacy Indicator That Indicates The Presence Of Term Data That Regards An Entity Module

Fig. 6

| Fig. 6A | Fig. 6B | Fig. 6C | Fig. 6D | Fig. 6E |

FIG. 6B

252 Active Indicator Generator Broadcasting Of A Privacy Indicator That Indicates A Presence Of Term Data That Regards An Entity Module 620 Active Indicator Generator Broadcasting Of A Privacy Indicator That Is A Detectable Signal That Indicates A Presence Of Term Data That Regards An Entity Module 622 Active Indicator Generator Broadcasting Of A Privacy Indicator That Is An Optically-detectable Signal That Indicates A Presence Of Term Data That Regards An Entity Module 624 Active Indicator Generator Broadcasting Of A Privacy Indicator That Is A Light Beam Signal That Indicates A Presence Of Term Data That Regards An Entity Module 626 Active Indicator Generator Broadcasting Of A Privacy Indicator That Is A Light Beam Of A Particular Wavelength That Indicates A Presence Of Term Data That Regards An Entity Module 628 Active Indicator Generator Broadcasting Of A Privacy Indicator That Is A Light Beam Of A Particular Wavelength In A Visible Spectrum That Indicates A Presence Of Term Data That Regards An Entity Module 630 Active Indicator Generator Broadcasting Of A Privacy Indicator That Is A Detectable Signal In A Particular Pattern That Indicates A Presence Of Term Data That Regards An Entity Module 632 Active Indicator Generator Broadcasting Of A Privacy Indicator That Is A Detectable Signal In A Particular Pattern Of A Particular Shape That Indicates A Presence Of Term Data That Regards An Entity Module

FIG. 6C

| Fig. 6 |
| Fig. 6A | Fig. 6B | Fig. 6C | Fig. 6D | Fig. 6E |

252 Active Indicator Generator Broadcasting Of A Privacy Indicator That Indicates A Presence Of Term Data That Regards An Entity Module 634 Active Indicator Generator Emitting Of A Signal That Indicates A Presence Of Term Data That Regards An Entity Module

| 636 Active Indicator Generator Emitting Of A Radio Wave Signal That Indicates A Presence Of Term Data That Regards An Entity Module | 638 Active Indicator Generator Emitting Of A Sonic Wave Signal That Indicates A Presence Of Term Data That Regards An Entity Module |

640 Active Indicator Generator Emitting Of An Electromagnetic Wave That Indicates A Presence Of Term Data That Regards An Entity Module, Said Emitting Of The Electromagnetic Wave In Response To Detection Of An Electromagnetic Trigger Wave 642 Active Indicator Generator Emitting Of An Electromagnetic Wave That Indicates A Presence Of Term Data That Regards An Entity Module, Said Emitting Of The Electromagnetic Wave In Response To Detection Of An Electromagnetic Trigger Wave Associated With A Particular Type Of Device 644 Active Indicator Generator Emitting Of An Electromagnetic Wave That Indicates A Presence Of Term Data That Regards An Entity Module, Said Emitting Of The Electromagnetic Wave In Response To Detection Of An Electromagnetic Trigger Wave Associated With An Image Capture Device 646 Active Indicator Generator Emitting Of An Electromagnetic Wave That Indicates A Presence Of Term Data That Regards An Entity Module, Said Emitting Of The Electromagnetic Wave In Response To Detection Of An Electromagnetic Trigger Wave Associated With An Image Capture Device Produced At Least In Part By A Particular Manufacturer 648 Active Indicator Generator Emitting Of An Electromagnetic Wave That Indicates A Presence Of Term Data That Regards An Entity Module, Said Emitting Of The Electromagnetic Wave In Response To Detection Of An Electromagnetic Trigger Wave That Is Associated With Image Capture Functionality

| Fig. 6A | Fig. 6B | Fig. 6C | Fig. 6D | Fig. 6E |

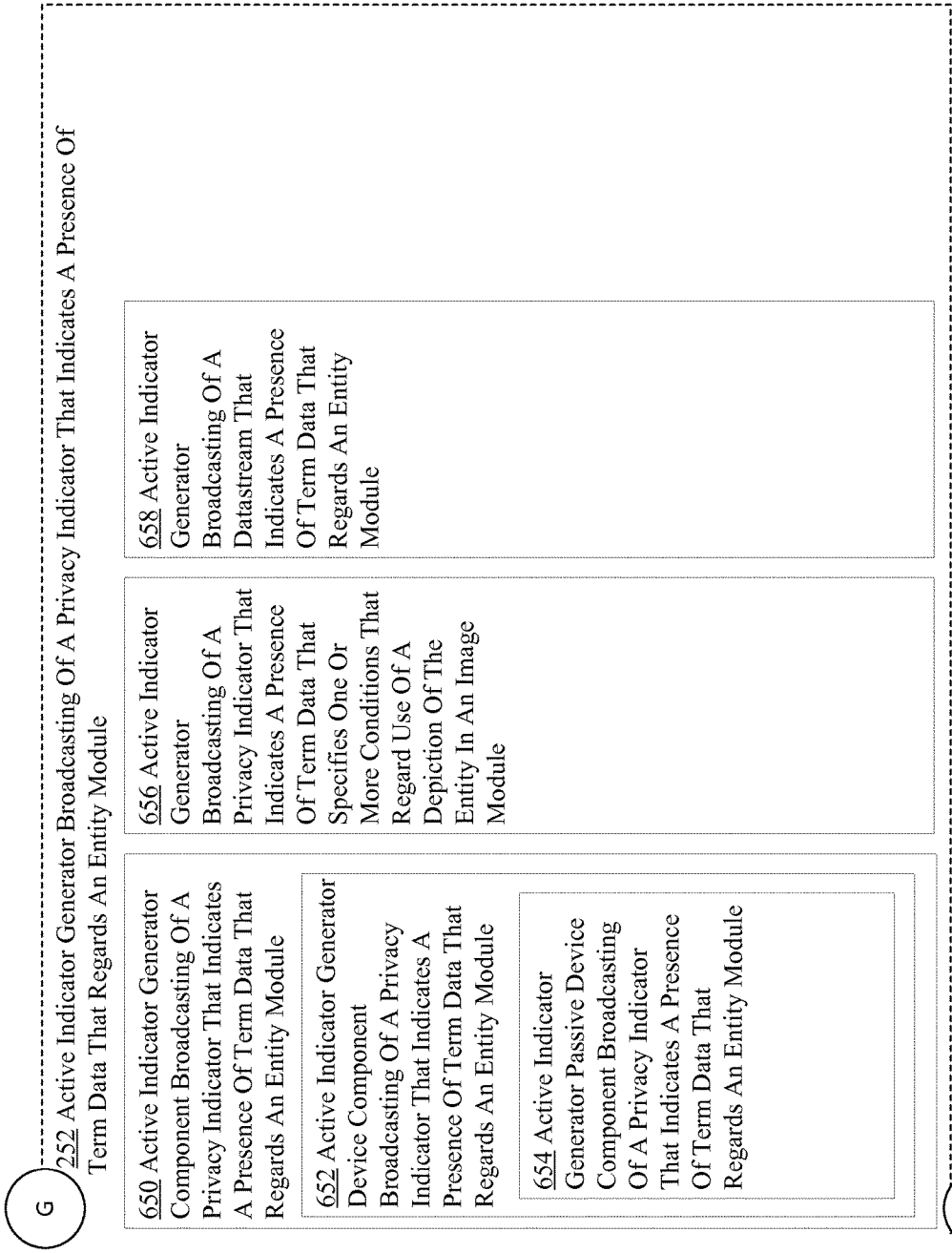

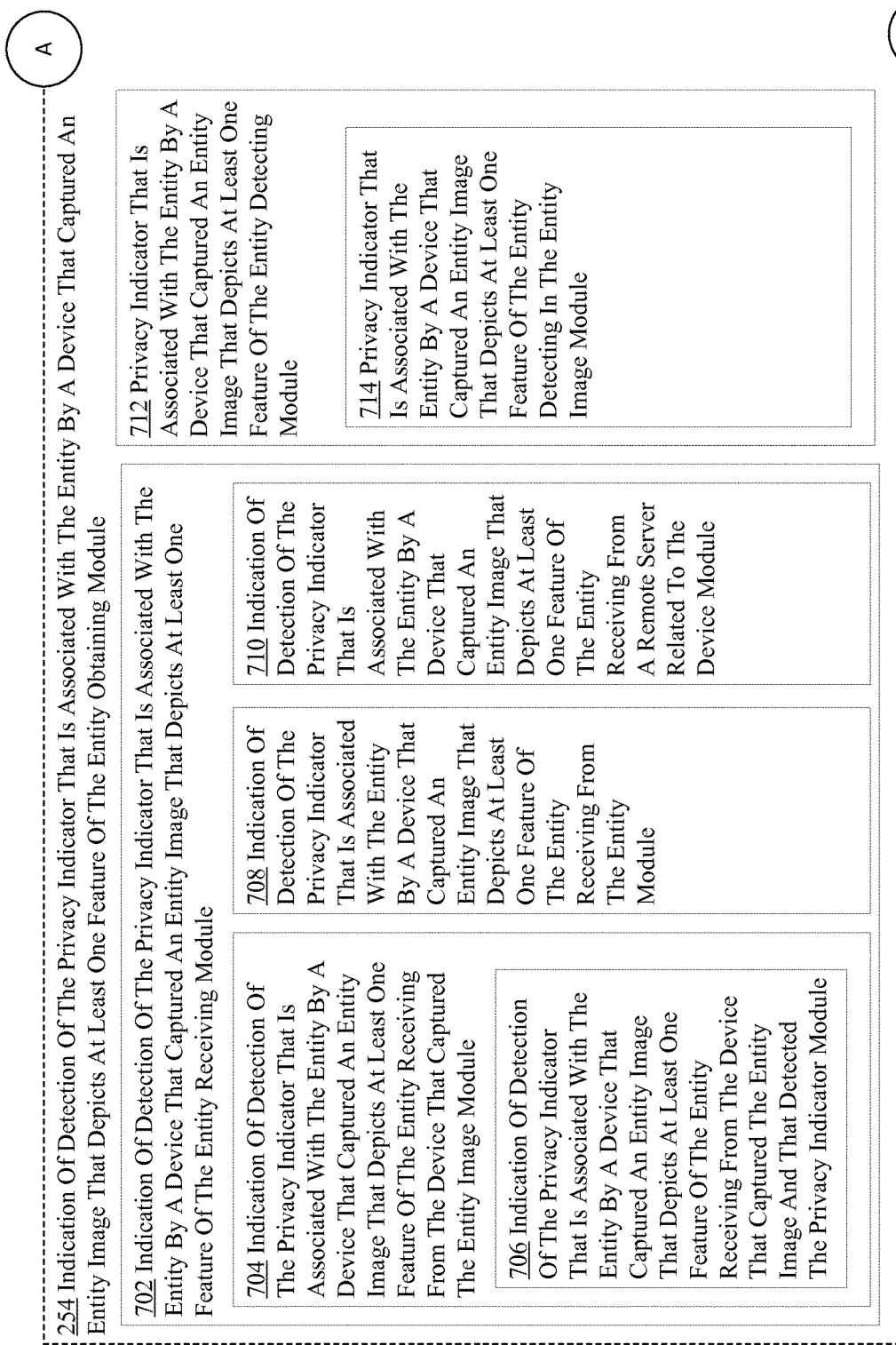

254 Indication Of Detection Of The Privacy Indicator That Is Associated With The Entity By A Device That Captured An Entity Image That Depicts At Least One Feature Of The Entity Obtaining Module 716 Notification Of Detection Of The Privacy Indicator That Is Associated With The Entity By A Device That Captured An Entity Image That Depicts At Least One Feature Of The Entity Receiving Module 718 Notification Of Detection Of The Privacy Indicator That Is Associated With The Entity And Acquisition Of The Term Data By A Device That Captured An Entity Image That Depicts At Least One Feature Of The Entity Receiving Module 720 Notification Of Detection Of The Privacy Indicator That Is Associated With The Entity And Acquisition Of The Term Data By A Device That Captured An Entity Image That Depicts At Least One Feature Of The Entity Receiving From A Term Data Management Server Module 722 Notification Of Detection Of The Privacy Indicator That Is Associated With The Entity And Acquisition Of The Term Data By A Device That Captured An Entity Image That Depicts At Least One Feature Of The Entity Receiving From The Device That Captured The Entity Image Module 724 Indication Of Detection Of The Privacy Indicator That Is Associated With The Entity By A Device That Captured An Entity Image That Depicts At Least One Feature Of The Entity Obtaining At A Time Of Entity Image Capture Module 726 Indication Of Detection In The Entity Image Of The Privacy Indicator That Is Associated With The Entity By The Device That Captured The Entity Image That Depicts At Least One Feature Of The Entity Obtaining Module

Fig. 7

| Fig. 7A | Fig. 7B | Fig. 7C | Fig. 7D | Fig. 7E | Fig. 7F |

FIG. 7B

254 Indication Of Detection Of The Privacy Indicator That Is Associated With The Entity By A Device That Captured An Entity Image That Depicts At Least One Feature Of The Entity Obtaining Module 740 Indication Of Detection Of The Privacy Indicator That Is Associated With The Entity By An Image Capture Device That Captured An Entity Image That Depicts At Least One Feature Of The Entity Obtaining Module 742 Indication Of Detection Of The Privacy Indicator That Is Associated With The Entity By A Wearable Computing Device That Captured An Entity Image That Depicts At Least One Feature Of The Entity Obtaining Module 744 Indication Of Detection Of The Privacy Indicator That Is Associated With The Entity By A Wearable Computing Device That Surreptitiously Captured An Entity Image That Depicts At Least One Feature Of The Entity Obtaining Module 746 Indication Of Detection Of The Privacy Indicator That Is Associated With The Entity By An Image Capture Device That Attempted To Covertly Capture The Entity Image That Depicts At Least One Feature Of The Entity Obtaining Module 748 Detection Of The Privacy Indicator That Is Associated With The Entity By An Image Capture Device That Attempted To Covertly Capture The Entity Image That Depicts At Least One Feature Of The Entity Detecting Module 750 Indication Of Detection Of The Privacy Indicator That Is Associated With The Entity By A Device That Captured An Entity Image That Depicts At Least One Feature Of The Entity Obtaining From The Active Indicator Generator Module

Fig. 7

| Fig. 7A | Fig. 7B | Fig. 7C | Fig. 7D | Fig. 7E | Fig. 7F |

FIG. 7D

254 Indication Of Detection Of The Privacy Indicator That Is Associated With The Entity By A Device That Captured An Entity Image That Depicts At Least One Feature Of The Entity Obtaining Module 752 Indication Of Detection Of The Privacy Indicator That Is Associated With The Entity By A Device That Captured An Entity Image In Violation Of One Or More Acquired Device Restrictions Obtaining Module 754 Indication Of Detection Of The Privacy Indicator That Is Associated With The Entity By A Device That Captured An Entity Image In Violation Of A Restriction On Device Capture At A Particular Location Obtaining Module 756 Indication Of Detection Of The Privacy Indicator That Is Associated With The Entity By A Device That Captured An Entity Image In Violation Of A Restriction On Device Capture At A Movie Theater Obtaining Module 758 Indication Of Detection Of The Privacy Indicator That Is Associated With The Entity By A Device That Captured A Screen Image In Violation Of A Restriction On Device Capture At A Movie Theater Obtaining Module 760 Indication Of Detection Of The Privacy Indicator That Is Associated With The Entity By A Device That Captured A Screen Image In Violation Of A Restriction On Device Capture At A Movie Theater At A Time When A Particular Protected Portion Of A Movie Was Displayed Obtaining Module 762 Indication Of Detection Of The Privacy Indicator That Is Associated With The Entity By A Device That Captured An Entity Image In Violation Of A Restriction On Device Capture That Has A Particular Velocity Range Obtaining Module

| Fig. 7A | Fig. 7B | Fig. 7C | Fig. 7D | Fig. 7E | Fig. 7F |

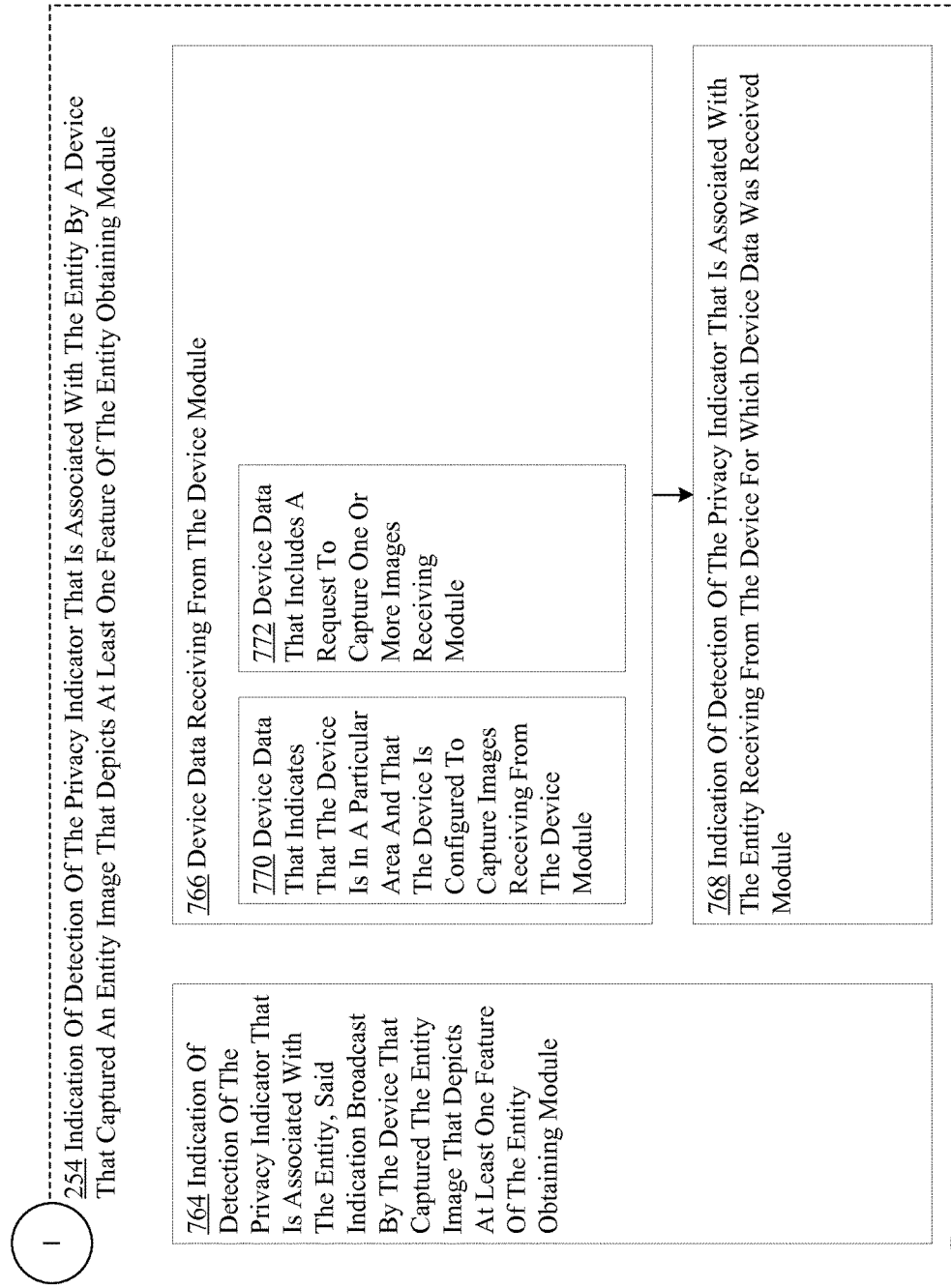

256 Term Data That Specifies One Or More Conditions That Govern Use Of The Entity Image That Depicts At Least A Portion Of The Entity Transmission Facilitating Module 802 Term Data That Specifies One Or More Conditions That Govern Use Of The Entity Image That Depicts At Least A Portion Of The Entity Transmitting Module 804 Instructions For Transmission Of Term Data That Specifies One Or More Conditions That Govern Use Of The Entity Image That Depicts At Least A Portion Of The Entity Providing To A Term Transmission Station Module 806 Instructions For Transmission Of Term Data That Specifies One Or More Conditions That Govern Use Of The Entity Image That Depicts At Least A Portion Of The Entity Providing To A Term Transmission Station Configured To Manage Term Data Module 808 Term Data That Specifies One Or More Conditions That Govern Distribution Of The Entity Image That Depicts At Least A Portion Of The Entity Transmission Facilitating Module 810 Term Data That Specifies One Or More Conditions That Govern Distribution On A Social Network Of The Entity Image That Depicts At Least A Portion Of The Entity Transmission Facilitating Module

Fig. 8

| Fig. 8A | Fig. 8B | Fig. 8C |

FIG. 8A

256 Term Data That Specifies One Or More Conditions That Govern Use Of The Entity Image That Depicts At Least A Portion Of The Entity Transmission Facilitating Module 812 Term Data That Specifies One Or More Conditions That Specify A Potential Liability For Use Of The Entity Image That Depicts The At Least The Portion Of The Entity Transmission Facilitating Module 814 Term Data That Specifies One Or More Conditions That Specify A Potential Monetary Liability For Use Of The Entity Image That Depicts The At Least The Portion Of The Entity Transmission Facilitating Module 816 Term Data That Specifies One Or More Conditions That Specify A Liquidated Damages Clause That Enumerates A Monetary Liability For Use Of The Entity Image That Depicts The At Least The Portion Of The Entity Transmission Facilitating Module 818 Term Data That Specifies One Or More Conditions That Specify A Foreseeable Damages Clause That Enumerates A Type Of Monetary Liability Incurred For Use Of The Entity Image That Depicts The At Least The Portion Of The Entity Transmission Facilitating Module 820 Term Data That Includes A Contract That Governs Use Of The Entity Image That Depicts At Least A Portion Of The Entity Transmission Facilitating Module 822 Term Data That Includes A Contract That Governs Use Of The Entity Image That Depicts At Least A Portion Of The Entity And That Is Binding Upon Receipt Transmission Facilitating Module

Fig. 8

| Fig. 8A | Fig. 8B | Fig. 8C |

FIG. 8B

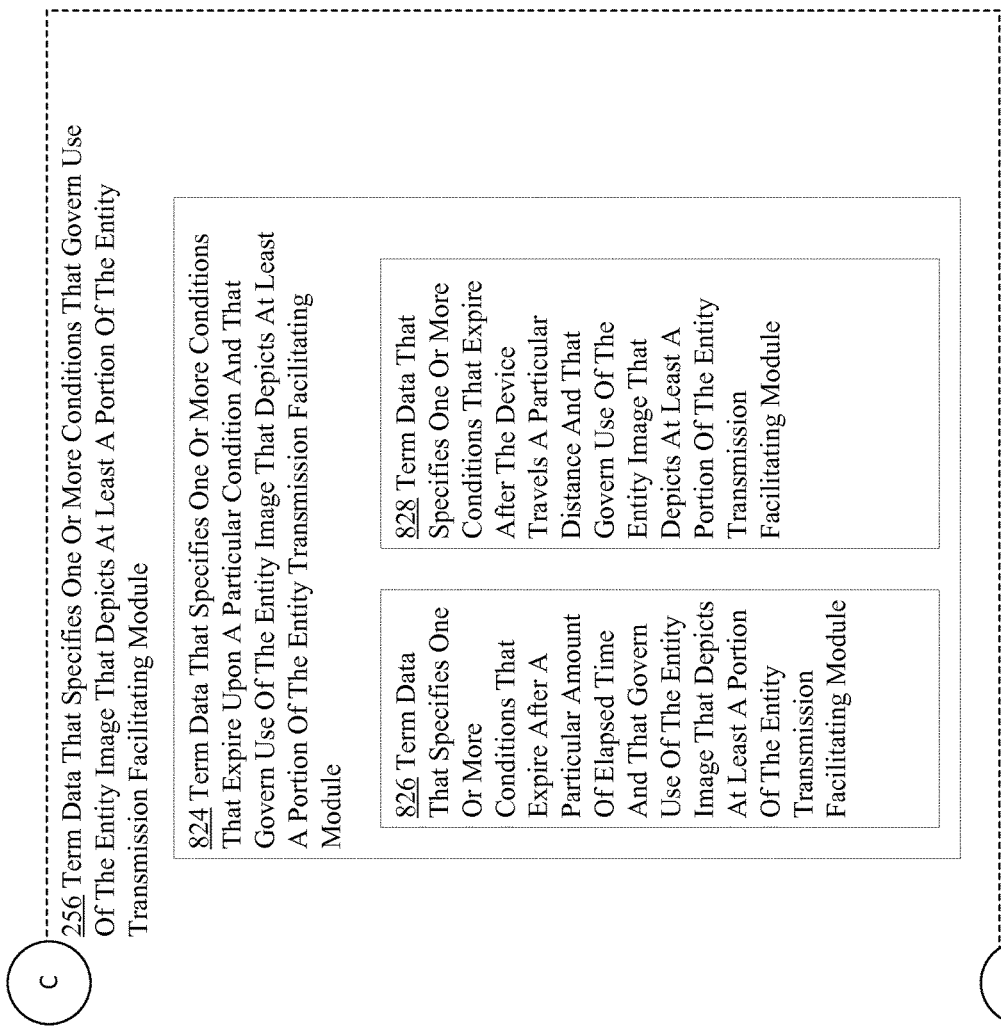

902 Broadcasting, From An Active Indicator Generator Associated With An Entity, A Privacy Indicator That Is Configured To Indicate A Presence Of Term Data Associated With The Entity 1002 Broadcasting, From An Active Indicator Generation Device Associated With The Entity, A Privacy Indicator That Is Configured To Indicate A Presence Of Term Data Associated With The Entity

| 1004 Broadcasting, From A Smartphone Device That Is The Active Indicator Generation Device Associated With The Entity, A Privacy Indicator That Is Configured To Indicate The Presence Of The Term Data Associated With The Entity | 1006 Broadcasting, From The Active Indicator Generation Device Carried By The Entity, A Privacy Indicator That Is Configured To Indicate A Presence Of Term Data Associated With The Entity | 1008 Broadcasting, From The Active Indicator Generation Device Under Control And/or Dominion Of The Entity, The Privacy Indicator That Is Configured To Indicate A Presence Of Term Data Associated With The Entity | 1010 Broadcasting, From The Active Indicator Generation Device That Has Access To Data About The Entity, The Privacy Indicator That Is Configured To Indicate A Presence Of Term Data Associated With The Entity | 1012 Broadcasting, From An Active Indicator Generation Device That Is Within A Particular Proximity To The Entity, The Privacy Indicator That Is Configured To Indicate A Presence Of Term Data Associated With The Entity |

FIG. 10A

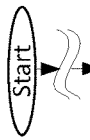
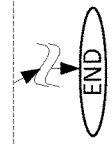

902 Broadcasting, From An Active Indicator Generator Associated With An Entity, A Privacy Indicator That Is Configured To Indicate A Presence Of Term Data Associated With The Entity 1020 Broadcasting, From The Active Indicator Generator Associated With The Entity, The Privacy Indicator That Is A Detectable Signal That Is Configured To Indicate The Presence Of The Term Data Associated With The Entity 1022 Broadcasting, From The Active Indicator Generator Associated With The Entity, The Privacy Indicator That Is An Optically Detectable Signal That Is Configured To Indicate The Presence Of The Term Data Associated With The Entity 1024 Broadcasting, From The Active Indicator Generator Associated With The Entity, The Privacy Indicator That Is A Light Beam That Is Configured To Indicate The Presence Of The Term Data Associated With The Entity 1026 Broadcasting, From The Active Indicator Generator Associated With The Entity, The Privacy Indicator That Is A Light Beam Of A Particular Wavelength That Is Configured To Indicate The Presence Of The Term Data Associated With The Entity 1028 Broadcasting, From The Active Indicator Generator Associated With The Entity, The Privacy Indicator That Is A Light Beam Of A Particular Wavelength In The Visible Spectrum That Is Configured To Indicate The Presence Of The Term Data Associated With The Entity 1030 Broadcasting, From The Active Indicator Generator Associated With The Entity, The Privacy Indicator That Is A Detectable Signal That Is Configured To Indicate The Presence Of The Term Data Associated With The Entity, Wherein The Active Indicator Generator Is Configured To Generate A Signal That Appears As A Particular Pattern 1032 Broadcasting, From The Active Indicator Generator Associated With The Entity, The Privacy Indicator That Is A Detectable Signal That Is Configured To Indicate The Presence Of The Term Data Associated With The Entity, Wherein The Active Indicator Generator Is Configured To Generate A Signal That Appears As A Particular Shape When Captured In An Image

FIG. 10C

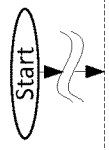

902 Broadcasting, From An Active Indicator Generator Associated With An Entity, A Privacy Indicator That Is Configured To Indicate A Presence Of Term Data Associated With The Entity 1034 Broadcasting, From The Active Indicator Generator That Is Configured To Emit A Signal And That Is Associated With The Entity, The Privacy Indicator That Is The Signal That Is Configured To Indicate The Presence Of The Term Data Associated With The Entity 1036 Broadcasting, From The Active Indicator Generator That Is Configured To Emit A Radio Wave And That Is Associated With The Entity, The Privacy Indicator That Is A Radio Wave Signal That Is Configured To Indicate The Presence Of The Term Data Associated With The Entity 1038 Broadcasting, From The Active Indicator Generator That Is Configured To Emit A Sonic Wave And That Is Associated With The Entity, The Privacy Indicator That Is A Sonic Wave Signal That Is Configured To Indicate The Presence Of The Term Data Associated With The Entity 1040 Broadcasting, From The Active Indicator Generator That Is Configured To Emit An Electromagnetic Wave In Response To Detecting A Particular Electromagnetic Wave And That Is Associated With The Entity, The Privacy Indicator That Is The Electromagnetic Wave That Is Configured To Indicate The Presence Of The Term Data Associated With The Entity 1042 Broadcasting, From The Active Indicator Generator That Is Configured To Emit An Electromagnetic Wave In Response To Detecting A Particular Electromagnetic Wave Associated With A Particular Type Of Device, The Privacy Indicator That Is The Electromagnetic Wave That Is Configured To Indicate The Presence Of The Term Data Associated With The Entity 1044 Broadcasting, From The Active Indicator Generator That Is Configured To Emit An Electromagnetic Wave In Response To Detecting A Particular Electromagnetic Wave Associated With An Image Capture Device, The Privacy Indicator That Is The Electromagnetic Wave That Is Configured To Indicate The Presence Of The Term Data Associated With The Entity

FIG. 10D

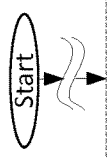
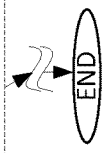

902 Broadcasting, From An Active Indicator Generator Associated With An Entity, A Privacy Indicator That Is Configured To Indicate A Presence Of Term Data Associated With The Entity 1034 Broadcasting, From The Active Indicator Generator That Is Configured To Emit A Signal And That Is Associated With The Entity, The Privacy Indicator That Is The Signal That Is Configured To Indicate The Presence Of The Term Data Associated With The Entity 1040 Broadcasting, From The Active Indicator Generator That Is Configured To Emit An Electromagnetic Wave In Response To Detecting A Particular Electromagnetic Wave And That Is Associated With The Entity, The Privacy Indicator That Is The Electromagnetic Wave That Is Configured To Indicate The Presence Of The Term Data Associated With The Entity 1042 Broadcasting, From The Active Indicator Generator That Is Configured To Emit An Electromagnetic Wave In Response To Detecting A Particular Electromagnetic Wave Associated With A Particular Type Of Device, The Privacy Indicator That Is The Electromagnetic Wave That Is Configured To Indicate The Presence Of The Term Data Associated With The Entity 1044 Broadcasting, From The Active Indicator Generator That Is Configured To Emit An Electromagnetic Wave In Response To Detecting A Particular Electromagnetic Wave Associated With An Image Capture Device . . .

1046 Broadcasting, From The Active Indicator Generator That Is Configured To Emit An Electromagnetic Wave In Response To Detecting A Particular Electromagnetic Wave Associated With An Image Capture Device Manufacture By A Particular Manufacturer, The Privacy Indicator That Is The Electromagnetic Wave That Is Configured To Indicate The Presence Of The Term Data Associated With The Entity 1048 Broadcasting, From The Active Indicator Generator That Is Configured To Emit The Electromagnetic Wave In Response To Detecting The Particular Electromagnetic Wave Associated With Image Capture Functionality, The Privacy Indicator That Is The Electromagnetic Wave That Is Configured To Indicate The Presence Of The Term Data Associated With The Entity

FIG. 10E

902 Broadcasting, From An Active Indicator Generator Associated With An Entity, A Privacy Indicator That Is Configured To Indicate A Presence Of Term Data Associated With The Entity

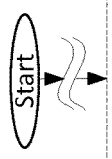

1050 Broadcasting, From An Active Indicator Generator Component That Is Associated With The Entity, A Privacy Indicator That Is Configured To Indicate A Presence Of Term Data Associated With The Entity

1052 Broadcasting, From An Active Indicator Generator Component That Is Part Of A Device That Is Associated With The Entity, A Privacy Indicator That Is Configured To Indicate A Presence Of Term Data Associated With The Entity

1054 Broadcasting, From The Active Indicator Generator Component That Is Part Of A Passive Device That Is Associated With The Entity, The Privacy Indicator That Is Configured To Indicate The Presence Of Term Data Associated With The Entity

1056 Broadcasting, From The Active Indicator Generator Associated With The Entity, A Privacy Indicator That Is Configured To Indicate The Presence Of Term Data Associated With The Entity, Said Term Data Configured To Specify One Or More Conditions That Regard Use Of The Entity Image That Depicts At Least A Portion Of The Entity

1058 Broadcasting, From An Active Indicator Generator That Is Associated With The Entity, A Datastream That Defines The Presence Of Term Data Associated With The Entity

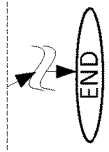

FIG. 10F

904 Acquiring An Indication That The Privacy Indicator Associated With The Entity Has Been Detected By A Device That Captured An Entity Image That Depicts At Least One Feature Of The Entity 1140 Acquiring The Indication That The Privacy Indicator Associated With The Entity Has Been Detected By An Image Capture Device That Captured The Entity Image That Depicts At Least One Feature Of The Entity 1142 Acquiring The Indication That The Privacy Indicator Associated With The Entity Has Been Detected By A Wearable Computer That Covertly Captured The Entity Image That Depicts At Least One Feature Of The Entity 1144 Acquiring The Indication, From The Active Indicator Generator, That The Privacy Indicator Associated With The Entity Has Been Detected By A Wearable Computer That Covertly Captured The Entity Image That Depicts At Least One Feature Of The Entity 1146 Acquiring The Indication That The Privacy Indicator Associated With The Entity Has Been Detected By The Image Capture Device That Attempted To Surreptitiously Capture The Entity Image That Depicts At Least One Feature Of The Entity 1148 Detecting That The Privacy Indicator Associated With The Entity Has Been Detected By The Image Capture Device That Attempted To Surreptitiously Capture The Entity Image That Depicts At Least One Feature Of The Entity 1150 Acquiring, From The Active Indicator Generator, The Indication That The Privacy Indicator Associated With The At Least One Entity Has Been Captured By The Device That Obtained The Entity Image That Depicts At Least One Feature Of The Entity

FIG. 11D

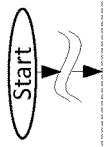
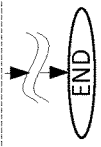
FIG. 11E

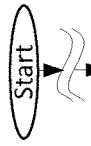
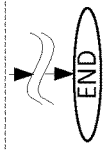

906 Facilitating Transmission Of The Term Data That Includes One Or More Conditions That Regard Use Of The Entity Image That Depicts At Least A Portion Of The Entity 1212 Facilitating Transmission Of The Term Data That Includes One Or More Conditions That Specify A Potential Liability For Use Of The Entity Image That Depicts At Least A Portion Of The Entity 1214 Facilitating Transmission Of The Term Data That Includes One Or More Conditions That Specify Monetary Damage Liability For Use Of The Entity Image That Depicts At Least A Portion Of The Entity 1216 Facilitating Transmission Of The Term Data That Includes One Or More Conditions That Specify A Liquidated Damages Of A Particular Monetary Amount Clause For Use Of The Entity Image That Depicts At Least A Portion Of The Entity 1218 Facilitating Transmission Of The Term Data That Includes One Or More Conditions That Specify Foreseeable Damages Of A Calculable Monetary Amount Clause For Use Of The Entity Image That Depicts At Least A Portion Of The Entity 1220 Facilitating Transmission Of The Term Data That Includes A Terms Of Service Contract, Wherein The Terms Of Service Contract Regards Use Of The Entity Image 1222 Facilitating Transmission Of The Term Data That Includes A Terms Of Service Contract That Is Binding Upon Receipt Of The Term Data, Wherein The Terms Of Service Contract Regards Use Of The Entity Image

FIG. 12B

DEVICES, METHODS, AND SYSTEMS FOR MANAGING REPRESENTATIONS OF ENTITIES THROUGH USE OF PRIVACY INDICATORS

CROSS-REFERENCE TO RELATED APPLICATIONS

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority application(s)). In addition, the present application is related to the "Related applications," if any, listed below.

PRIORITY APPLICATIONS

For purposes of the USPTO extra-statutory requirements, the present application constitutes a continuation of U.S. patent application Ser. No. 14/218,746, entitled DEVICES, METHODS, AND SYSTEMS FOR MANAGING REPRESENTATIONS OF ENTITIES THROUGH USE OF PRIVACY INDICATORS, naming Pablos Holman, Roderick A. Hyde, Royce A. Levien, Richard T. Lord, Robert W. Lord, and Mark A. Malamud as inventors, filed 18 Mar. 2014, which is currently co-pending or is an application of which a currently co-pending application is entitled to the benefit of the filing date.

For purposes of the USPTO extra-statutory requirements, the present application constitutes a continuation-in-part of U.S. patent application Ser. No. 14/051,213, entitled METHODS, SYSTEMS, AND DEVICES FOR FACILITATING VIABLE DISTRIBUTION OF DATA COLLECTED BY WEARABLE COMPUTATION, naming Pablos Holman, Roderick A. Hyde, Royce A. Levien, Richard T. Lord, Robert W. Lord, and Mark A. Malamud as inventors, filed 10 Oct. 2013, which is currently co-pending or is an application of which a currently co-pending application is entitled to the benefit of the filing date.

For purposes of the USPTO extra-statutory requirements, the present application constitutes a continuation-in-part of U.S. patent application Ser. No. 14/055,471, entitled METHODS, SYSTEMS, AND DEVICES FOR HANDLING IMAGE DATA FROM CAPTURED IMAGES, naming Pablos Holman, Roderick A. Hyde, Royce A. Levien, Richard T. Lord, Robert W. Lord, and Mark A. Malamud as inventors, filed 16 Oct. 2013, which is currently co-pending or is an application of which a currently co-pending application is entitled to the benefit of the filing date.

For purposes of the USPTO extra-statutory requirements, the present application constitutes a continuation-in-part of U.S. patent application Ser. No. 14/055,543, entitled METHODS, SYSTEMS, AND DEVICES FOR HANDLING IMAGE DATA FROM CAPTURED IMAGES, naming Pablos Holman, Roderick A. Hyde, Royce A. Levien, Richard T. Lord, Robert W. Lord, and Mark A. Malamud as inventors, filed 16 Oct. 2013, which is currently co-pending or is an application of which a currently co-pending application is entitled to the benefit of the filing date.

For purposes of the USPTO extra-statutory requirements, the present application constitutes a continuation-in-part of U.S. patent application Ser. No. 14/084,254, entitled DEVICES, METHODS, AND SYSTEMS FOR ANALYZING CAPTURED IMAGE DATA AND PRIVACY DATA, naming Pablos Holman, Roderick A. Hyde, Royce A. Levien, Richard T. Lord, Robert W. Lord, and Mark A. Malamud as inventors, filed 19 Nov. 2013, which is currently co-pending or is an application of which a currently co-pending application is entitled to the benefit of the filing date.

For purposes of the USPTO extra-statutory requirements, the present application constitutes a continuation-in-part of U.S. patent application Ser. No. 14/084,579 entitled DEVICES, METHODS, AND SYSTEMS FOR ANALYZING CAPTURED IMAGE DATA AND PRIVACY DATA, naming Pablos Holman, Roderick A. Hyde, Royce A. Levien, Richard T. Lord, Robert W. Lord, and Mark A. Malamud as inventors, filed 19 Nov. 2013, which is currently co-pending or is an application of which a currently co-pending application is entitled to the benefit of the filing date.

For purposes of the USPTO extra-statutory requirements, the present application constitutes a continuation-in-part of U.S. patent application Ser. No. 14/084,581, entitled METHODS, SYSTEMS, AND DEVICES FOR HANDLING IMAGE DATA FROM CAPTURED IMAGES, naming Pablos Holman, Roderick A. Hyde, Royce A. Levien, Richard T. Lord, Robert W. Lord, and Mark A. Malamud as inventors, filed 19 Nov. 2013, which is currently co-pending or is an application of which a currently co-pending application is entitled to the benefit of the filing date.

For purposes of the USPTO extra-statutory requirements, the present application constitutes a continuation-in-part of U.S. patent application Ser. No. 14/084,591, entitled METHODS, SYSTEMS, AND DEVICES FOR HANDLING IMAGE DATA FROM CAPTURED IMAGES, naming Pablos Holman, Roderick A. Hyde, Royce A. Levien, Richard T. Lord, Robert W. Lord, and Mark A. Malamud as inventors, filed 19 Nov. 2013, which is currently co-pending or is an application of which a currently co-pending application is entitled to the benefit of the filing date.

For purposes of the USPTO extra-statutory requirements, the present application constitutes a continuation-in-part of U.S. patent application Ser. No. 14/108,077, entitled METHODS, SYSTEMS, AND DEVICES FOR DELIVERING IMAGE DATA FROM CAPTURED IMAGES TO DEVICES, naming Pablos Holman, Roderick A. Hyde, Royce A. Levien, Richard T. Lord, Robert W. Lord, and Mark A. Malamud as inventors, filed 16 Dec. 2013, which is currently co-pending or is an application of which a currently co-pending application is entitled to the benefit of the filing date.

For purposes of the USPTO extra-statutory requirements, the present application constitutes a continuation-in-part of U.S. patent application Ser. No. 14/108,107, entitled METHODS, SYSTEMS, AND DEVICES FOR DELIVERING IMAGE DATA FROM CAPTURED IMAGES TO DEVICES, naming Pablos Holman, Roderick A. Hyde, Royce A. Levien, Richard T. Lord, Robert W. Lord, and Mark A. Malamud as inventors, filed 16 Dec. 2013, which is currently co-pending or is an application of which a currently co-pending application is entitled to the benefit of the filing date.

For purposes of the USPTO extra-statutory requirements, the present application constitutes a continuation-in-part of U.S. patent application Ser. No. 14/108,185, entitled METHODS, SYSTEMS, AND DEVICES FOR HANDLING INSERTED DATA INTO CAPTURED IMAGES, naming Pablos Holman, Roderick A. Hyde, Royce A. Levien, Richard T. Lord, Robert W. Lord, and Mark A. Malamud as inventors, filed 16 Dec. 2013, which is currently co-pending or is an application of which a currently co-pending application is entitled to the benefit of the filing date.

For purposes of the USPTO extra-statutory requirements, the present application constitutes a continuation-in-part of U.S. patent application Ser. No. 14/108,217, entitled METHODS, SYSTEMS, AND DEVICES FOR HANDLING INSERTED DATA INTO CAPTURED IMAGES, naming Pablos Holman, Roderick A. Hyde, Royce A. Levien, Richard T. Lord, Robert W. Lord, and Mark A. Malamud as inventors, filed 16 Dec. 2013, which is currently co-pending or is an application of which a currently co-pending application is entitled to the benefit of the filing date.

For purposes of the USPTO extra-statutory requirements, the present application constitutes a continuation-in-part of U.S. patent application Ser. No. 14/109,682, entitled METHODS, SYSTEMS, AND DEVICES FOR HANDLING CAPTURED IMAGE DATA THAT IS RECEIVED BY DEVICES, naming Pablos Holman, Roderick A. Hyde, Royce A. Levien, Richard T. Lord, Robert W. Lord, and Mark A. Malamud as inventors, filed 17 Dec. 2013, which is currently co-pending or is an application of which a currently co-pending application is entitled to the benefit of the filing date.

For purposes of the USPTO extra-statutory requirements, the present application constitutes a continuation-in-part of U.S. patent application Ser. No. 14/109,726, entitled METHODS, SYSTEMS, AND DEVICES FOR HANDLING CAPTURED IMAGE DATA THAT IS RECEIVED BY DEVICES, naming Pablos Holman, Roderick A. Hyde, Royce A. Levien, Richard T. Lord, Robert W. Lord, and Mark A. Malamud as inventors, filed 17 Dec. 2013, which is currently co-pending or is an application of which a currently co-pending application is entitled to the benefit of the filing date.

For purposes of the USPTO extra-statutory requirements, the present application constitutes a continuation-in-part of U.S. patent application Ser. No. 14/145,873, entitled METHODS, SYSTEMS, AND DEVICES FOR MONITORING PRIVACY BEACONS RELATED TO ENTITIES DEPICTED IN IMAGES, naming Pablos Holman, Roderick A. Hyde, Royce A. Levien, Richard T. Lord, Robert W. Lord, and Mark A. Malamud as inventors, filed 31 Dec. 2013, which is currently co-pending or is an application of which a currently co-pending application is entitled to the benefit of the filing date.

For purposes of the USPTO extra-statutory requirements, the present application constitutes a continuation-in-part of U.S. patent application Ser. No. 14/145,886, entitled METHODS, SYSTEMS, AND DEVICES FOR MONITORING PRIVACY BEACONS RELATED TO ENTITIES DEPICTED IN IMAGES, naming Pablos Holman, Roderick A. Hyde, Royce A. Levien, Richard T. Lord, Robert W. Lord, and Mark A. Malamud as inventors, filed 31 Dec. 2013, which is currently co-pending or is an application of which a currently co-pending application is entitled to the benefit of the filing date.

For purposes of the USPTO extra-statutory requirements, the present application constitutes a continuation-in-part of U.S. patent application Ser. No. 14/148,523, entitled DEVICES, METHODS, AND SYSTEMS FOR MANAGING REPRESENTATIONS OF ENTITIES THROUGH USE OF PRIVACY BEACONS, naming Pablos Holman, Roderick A. Hyde, Royce A. Levien, Richard T. Lord, Robert W. Lord, and Mark A. Malamud as inventors, filed 6 Jan. 2014, which is currently co-pending or is an application of which a currently co-pending application is entitled to the benefit of the filing date.

For purposes of the USPTO extra-statutory requirements, the present application constitutes a continuation-in-part of U.S. patent application Ser. No. 14/148,560, entitled DEVICES, METHODS, AND SYSTEMS FOR MANAGING REPRESENTATIONS OF ENTITIES THROUGH USE OF PRIVACY BEACONS, naming Pablos Holman, Roderick A. Hyde, Royce A. Levien, Richard T. Lord, Robert W. Lord, and Mark A. Malamud as inventors, filed 6 Jan. 2014, which is currently co-pending or is an application of which a currently co-pending application is entitled to the benefit of the filing date.

For purposes of the USPTO extra-statutory requirements, the present application constitutes a continuation-in-part of U.S. patent application Ser. No. 14/185,741, entitled METHODS, SYSTEMS, AND DEVICES FOR OBSCURING ENTITIES DEPICTED IN CAPTURED IMAGES, naming Pablos Holman, Roderick A. Hyde, Royce A. Levien, Richard T. Lord, Robert W. Lord, and Mark A. Malamud as inventors, filed 20 Feb. 2014, which is currently co-pending or is an application of which a currently co-pending application is entitled to the benefit of the filing date.

For purposes of the USPTO extra-statutory requirements, the present application constitutes a continuation-in-part of U.S. patent application Ser. No. 14/186,528, entitled METHODS, SYSTEMS, AND DEVICES FOR OBSCURING ENTITIES DEPICTED IN CAPTURED IMAGES, naming Pablos Holman, Roderick A. Hyde, Royce A. Levien, Richard T. Lord, Robert W. Lord, and Mark A. Malamud as inventors, filed 21 Feb. 2014, which is currently co-pending or is an application of which a currently co-pending application is entitled to the benefit of the filing date.

RELATED APPLICATIONS

None.
The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed Application, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority applications section of the ADS and to each application that appears in the Priority applications section of this application.

All subject matter of the Priority applications and the Related applications and of any and all parent, grandparent, great-grandparent, etc. applications of the Priority applications and the Related applications, including any priority claims, is incorporated herein by reference to the extent such subject matter is not inconsistent herewith.

BACKGROUND

This application is related to the handling of the capture of images that may include personality rights.

SUMMARY

Recently, there has been an increased popularity in wearable computers, e.g., computers that are placed in articles of clothing or clothing accessories, e.g., watches, eyeglasses, shoes, jewelry, accessories, shirts, pants, headbands, and the like. As technology allows electronic devices to become smaller and smaller, more and more items may be "smart" items, e.g., may contain a computer.

In addition, image capturing technology has also improved, allowing for high quality digital cameras that can capture pictures, audio, video, or a combination thereof. These digital cameras may be small enough to fit onto wearable computers, e.g., inside of eyeglasses. In some instances, the digital camera may blend into the eyeglasses mold, and may not be immediately recognizable as a camera. Such eyeglasses may be indistinguishable or somewhat distinguishable from standard eyeglasses that do not contain a camera and/or a computer.

Further, the cost of data storage has decreased dramatically, and it is not uncommon for an average person in a developed nation to have access to enough digital storage to store months' and/or years' worth of video and pictures. As the cost of data storage has decreased dramatically, so too has the cost of processors to process that data, meaning that automation may be able to take an entire day's worth of surreptitious recording, and isolate those portions of the recording that captured persons, either specific persons or persons in general.

Accordingly, with technology, it is possible for a person to "wear" a computer, in the form of eyeglasses, watches, shirts, hats, or through a pocket-sized device carried by a person, e.g., a cellular telephone device. This wearable computer may be used to record people, e.g., to capture pictures, audio, video, or a combination thereof a person, without their knowledge. Thus, conversations that a person may assume to be private, may be recorded and widely distributed. Moreover, a person may be surreptitiously recorded while they are in a locker room, in a bathroom, or in a telephone booth. It may be difficult or impossible to tell when a person is being recorded. Further, once proliferation of these wearable computers with digital cameras becomes widespread, people must assume that they are under surveillance 100% of the time that they are not in their house.

Therefore, a need has arisen to provide systems that attempt to limit the capture and distribution of a person's personality rights. The present invention is directed to devices, methods, and systems that attempt to limit the capture and distribution of captured images of persons. Specifically, the present invention is directed to devices, methods, and systems that attempt to limit the capture and distribution of captured images of persons, implemented at a device that carries out the capturing of the image. In some embodiments, this device may be a wearable computer, but in other embodiments, any image capturing device or any device that has an image capturing device incorporated into its functionality may implement the devices, methods, and systems described herein.

In various embodiments, devices, methods, and systems may have a capability to capture images, and in which the capture of those images may include capturing images of a person, persons, or portion(s) of a person for which a privacy beacon may be associated. The privacy beacon may be optical, digital, or other form (e.g., radio, electromagnetic, biomechanic, quantum-state, and the like), and may be detected through digital or optical operations, as discussed herein.

The instant application is directed at least in part to, but not limited by, devices, methods, and systems that acquire a captured encrypted image, and that acquire beacon data, and that make a determination at least partly based on data that is acquired and that is related to one or more of the captured image and the privacy beacon, whether directly or indirectly, e.g., inferentially or tangentially.

In one or more various aspects, a method includes but is not limited to broadcasting, from an active indicator generator associated with an entity, a privacy indicator that is configured to indicate a presence of term data associated with the entity, acquiring an indication that the privacy indicator associated with the entity has been detected by a device that captured an entity image that depicts at least one feature of the entity, and facilitating transmission of the term data that includes one or more conditions that regard use of the entity image that depicts at least a portion of the entity. In addition to the foregoing, other method aspects are described in the claims, drawings, and text forming a part of the disclosure set forth herein.

In one or more various aspects, one or more related systems may be implemented in machines, compositions of matter, or manufactures of systems, limited to patentable subject matter under 35 U.S.C. 101. The one or more related systems may include, but are not limited to, circuitry and/or programming for affecting the herein-referenced method aspects. The circuitry and/or programming may be virtually any combination of hardware, software, and/or firmware configured to effect the herein-referenced method aspects depending upon the design choices of the system designer, and limited to patentable subject matter under 35 USC 101.

In one or more various aspects, a system includes, but is not limited to, circuitry for broadcasting, from an active indicator generator associated with an entity, a privacy indicator that is configured to indicate a presence of term data associated with the entity, circuitry for acquiring an indication that the privacy indicator associated with the entity has been detected by a device that captured an entity image that depicts at least one feature of the entity, and circuitry for facilitating transmission of the term data that includes one or more conditions that regard use of the entity image that depicts at least a portion of the entity. In addition to the foregoing, other system aspects are described in the claims, drawings, and text forming a part of the disclosure set forth herein.

In one or more various aspects, a system includes, but is not limited to, means for broadcasting, from an active indicator generator associated with an entity, a privacy indicator that is configured to indicate a presence of term data associated with the entity, means for acquiring an indication that the privacy indicator associated with the entity has been detected by a device that captured an entity image that depicts at least one feature of the entity, and means for facilitating transmission of the term data that includes one or more conditions that regard use of the entity image that depicts at least a portion of the entity. In addition to the foregoing, other system aspects are described in the claims, drawings, and text forming a part of the disclosure set forth herein.

In one or more various aspects, a computer program product, comprising a signal bearing medium, bearing one or more instructions including, but not limited to, one or more instructions for broadcasting, from an active indicator generator associated with an entity, a privacy indicator that is configured to indicate a presence of term data associated with the entity, one or more instructions for acquiring an indication that the privacy indicator associated with the entity has been detected by a device that captured an entity image that depicts at least one feature of the entity, and one or more instructions for facilitating transmission of the term data that includes one or more conditions that regard use of the entity image that depicts at least a portion of the entity. In addition to the foregoing, other computer program product aspects are described in the claims, drawings, and text forming a part of the disclosure set forth herein.

In one or more various aspects, a device is defined by a computational language, such that the device comprises one or more interchained physical machines ordered for broadcasting, from an active indicator generator associated with an entity, a privacy indicator that is configured to indicate a presence of term data associated with the entity, one or more interchained physical machines ordered for acquiring an indication that the privacy indicator associated with the entity has been detected by a device that captured an entity image that depicts at least one feature of the entity, and one or more interchained physical machines ordered for facilitating transmission of the term data that includes one or more conditions that regard use of the entity image that depicts at least a portion of the entity.

In addition to the foregoing, various other method and/or system and/or program product aspects are set forth and described in the teachings such as text (e.g., claims and/or detailed description) and/or drawings of the present disclosure.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent by reference to the detailed description, the corresponding drawings, and/or in the teachings set forth herein.

BRIEF DESCRIPTION OF THE FIGURES

For a more complete understanding of embodiments, reference now is made to the following descriptions taken in connection with the accompanying drawings. The use of the same symbols in different drawings typically indicates similar or identical items, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 1 forms a partially schematic diagram of an environment(s) and/or an implementation(s) of technologies described herein when FIGS. 1-A through 1-T are stitched together in the manner shown in FIG. 1-P, which is reproduced below in table format.

In accordance with 37 C.F.R. §1.84(h)(2), FIG. 1 shows "a view of a large machine or device in its entirety . . . broken into partial views . . . extended over several sheets" labeled FIG. 1-A through FIG. 1-T (Sheets 1-20). The "views on two or more sheets form, in effect, a single complete view, [and] the views on the several sheets . . . [are] so arranged that the complete figure can be assembled" from "partial views drawn on separate sheets . . . linked edge to edge. Thus, in FIG. 1, the partial view FIGS. 1-A through 1-T are ordered alphabetically, by increasing in columns from left to right, and increasing in rows top to bottom, as shown in the following table:

TABLE 1

Table showing alignment of enclosed drawings to form partial schematic of one or more environments.

Figure 1:
FIG. 1, including FIGS. 1-A through 1-T, shows a high-level system diagram of one or more exemplary environments in which transactions and potential transactions may be carried out, according to one or more embodiments.
Figure 1:
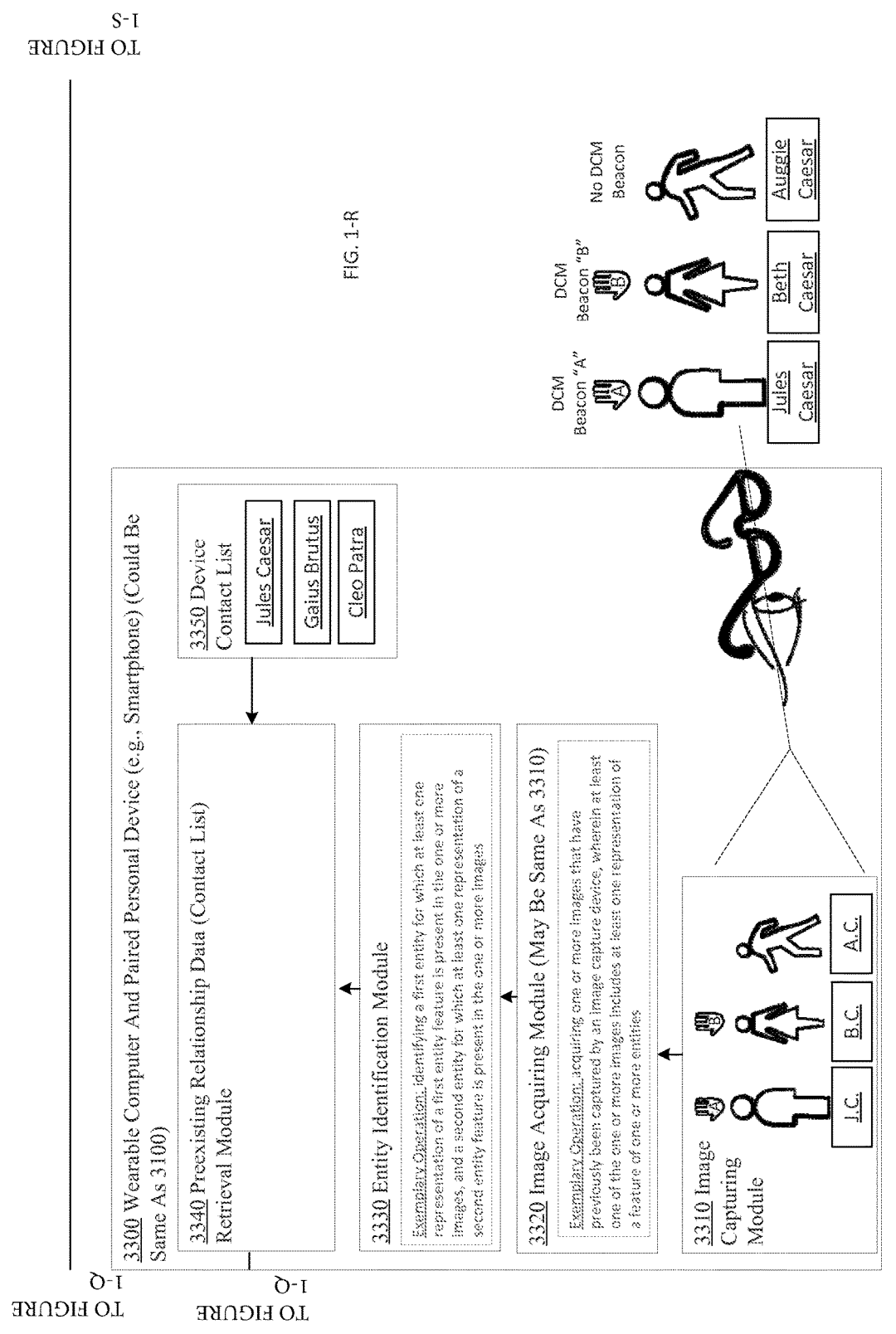

| (1,1)—FIG. 1-A | (1,2)—FIG. 1-B | (1,3)—FIG. 1-C | (1,4)—FIG. 1-D | (1,5)—FIG. 1-E |
|---|---|---|---|---|
| (2,1)—FIG. 1-F | (2,2)—FIG. 1-G | (2,3)—FIG. 1-H | (2,4)—FIG. 1-I | (2,5)—FIG. 1-J |
| (3,1)—FIG. 1-K | (3,2)—FIG. 1-L | (3,3)—FIG. 1-M | (3,4)—FIG. 1-N | (3,5)—FIG. 1-O |
| (4,1)—FIG. 1-P | (4,2)—FIG. 1-Q | (4,3)—FIG. 1-R | (4,4)—FIG. 1-S | (4,5)—FIG. 1-T |

In accordance with 37 C.F.R. §1.84(h)(2), FIG. 1 is " . . . a view of a large machine or device in its entirety . . . broken into partial views . . . extended over several sheets . . . [with] no loss in facility of understanding the view." The partial views drawn on the several sheets indicated in the above table are capable of being linked edge to edge, so that no partial view contains parts of another partial view. As here, "where views on two or more sheets form, in effect, a single complete view, the views on the several sheets are so arranged that the complete figure can be assembled without concealing any part of any of the views appearing on the various sheets." 37 C.F.R. §1.84(h)(2).

It is noted that one or more of the partial views of the drawings may be blank, or may not contain substantive elements (e.g., may show only lines, connectors, and the like). These drawings are included in order to assist readers of the application in assembling the single complete view from the partial sheet format required for submission by the USPTO, and, while their inclusion is not required and may be omitted in this or other applications, their inclusion is proper, and should be considered intentional.

FIG. 1-A, when placed at position (1,1), forms at least a portion of a partially schematic diagram of an environment(s) and/or an implementation(s) of technologies described herein.

FIG. 1-B, when placed at position (1,2), forms at least a portion of a partially schematic diagram of an environment(s) and/or an implementation(s) of technologies described herein.

FIG. 1-C, when placed at position (1,3), forms at least a portion of a partially schematic diagram of an environment(s) and/or an implementation(s) of technologies described herein.

FIG. 1-D, when placed at position (1,4), forms at least a portion of a partially schematic diagram of an environment(s) and/or an implementation(s) of technologies described herein.

FIG. 1-E, when placed at position (1,5), forms at least a portion of a partially schematic diagram of an environment(s) and/or an implementation(s) of technologies described herein.

FIG. 1-F, when placed at position (2,1), forms at least a portion of a partially schematic diagram of an environment(s) and/or an implementation(s) of technologies described herein.

FIG. 1-G, when placed at position (2,2), forms at least a portion of a partially schematic diagram of an environment(s) and/or an implementation(s) of technologies described herein.

FIG. 1-H, when placed at position (2,3), forms at least a portion of a partially schematic diagram of an environment(s) and/or an implementation(s) of technologies described herein.

FIG. 1-I, when placed at position (2,4), forms at least a portion of a partially schematic diagram of an environment(s) and/or an implementation(s) of technologies described herein.

FIG. 1-J, when placed at position (2,5), forms at least a portion of a partially schematic diagram of an environment(s) and/or an implementation(s) of technologies described herein.

FIG. 1-K, when placed at position (3,1), forms at least a portion of a partially schematic diagram of an environment(s) and/or an implementation(s) of technologies described herein.

FIG. 1-L, when placed at position (3,2), forms at least a portion of a partially schematic diagram of an environment(s) and/or an implementation(s) of technologies described herein.

FIG. 1-M, when placed at position (3,3), forms at least a portion of a partially schematic diagram of an environment(s) and/or an implementation(s) of technologies described herein.

FIG. 1-N, when placed at position (3,4), forms at least a portion of a partially schematic diagram of an environment(s) and/or an implementation(s) of technologies described herein.

FIG. 1-O, when placed at position (3,5), forms at least a portion of a partially schematic diagram of an environment(s) and/or an implementation(s) of technologies described herein.

FIG. 1-P, when placed at position (4,1), forms at least a portion of a partially schematic diagram of an environment(s) and/or an implementation(s) of technologies described herein.

FIG. 1-Q, when placed at position (4,2), forms at least a portion of a partially schematic diagram of an environment(s) and/or an implementation(s) of technologies described herein.

FIG. 1-R, when placed at position (4,3), forms at least a portion of a partially schematic diagram of an environment(s) and/or an implementation(s) of technologies described herein.

FIG. 1-S, when placed at position (4,4), forms at least a portion of a partially schematic diagram of an environment(s) and/or an implementation(s) of technologies described herein.

FIG. 1-T, when placed at position (4,5), forms at least a portion of a partially schematic diagram of an environment(s) and/or an implementation(s) of technologies described herein.

Figure 2A:
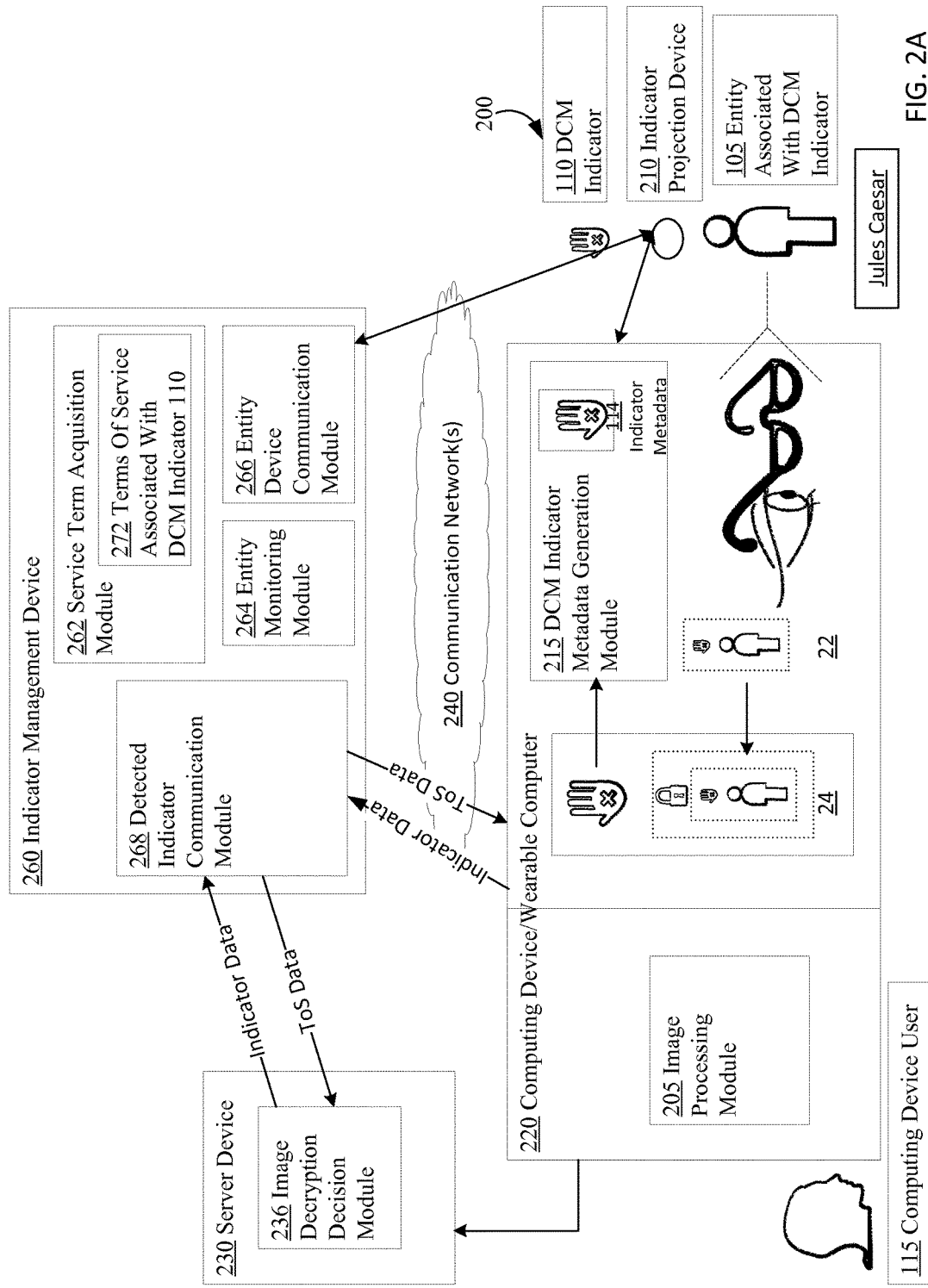

FIG. 2A shows a high-level block diagram of an exemplary environment 200, according to one or more embodiments.

Figure 2B:
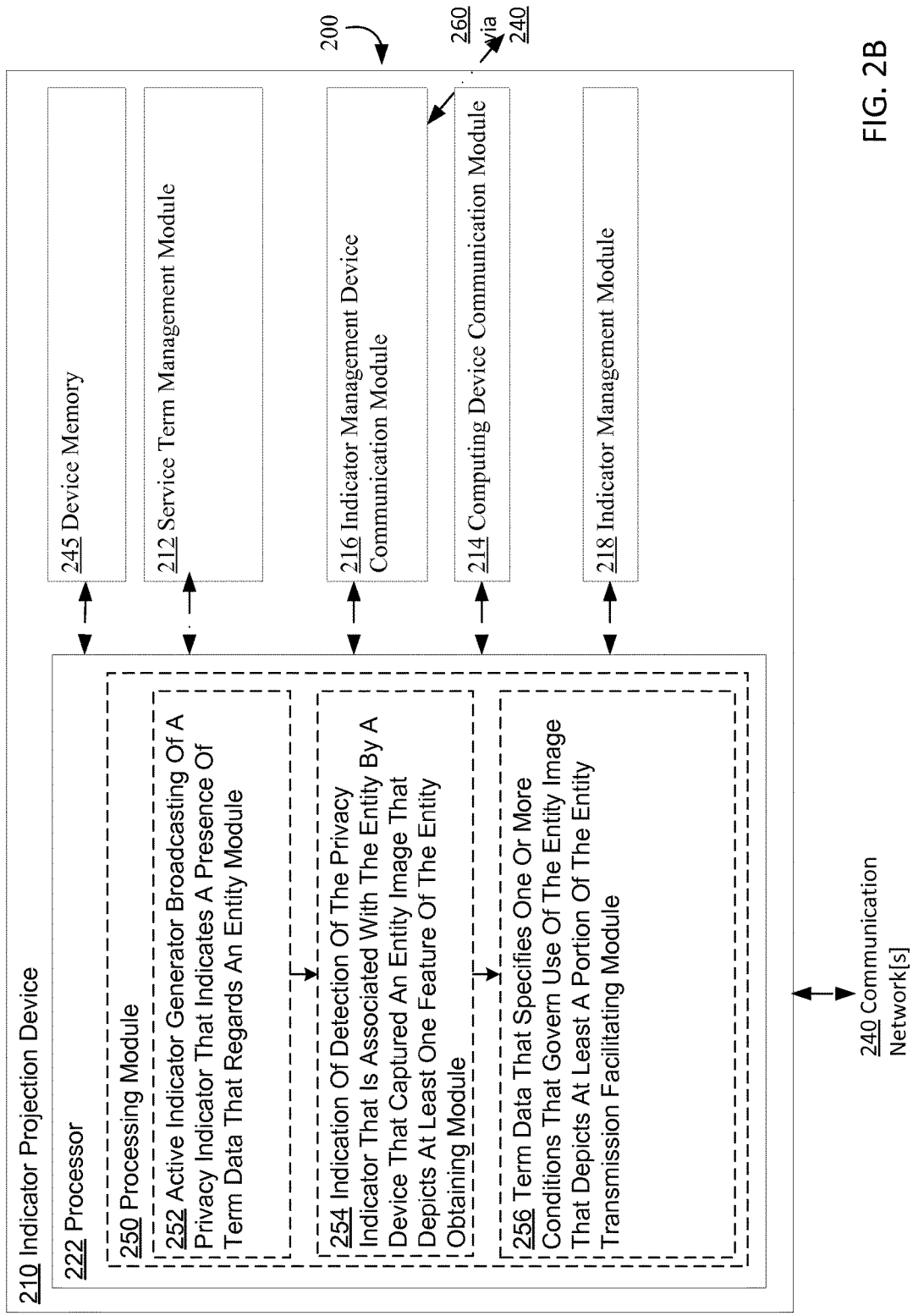

FIG. 2B shows a high-level block diagram of a computing device, e.g., an indicator projection device 210 operating in an exemplary environment 200, according to one or more embodiments.

Figure 3A:
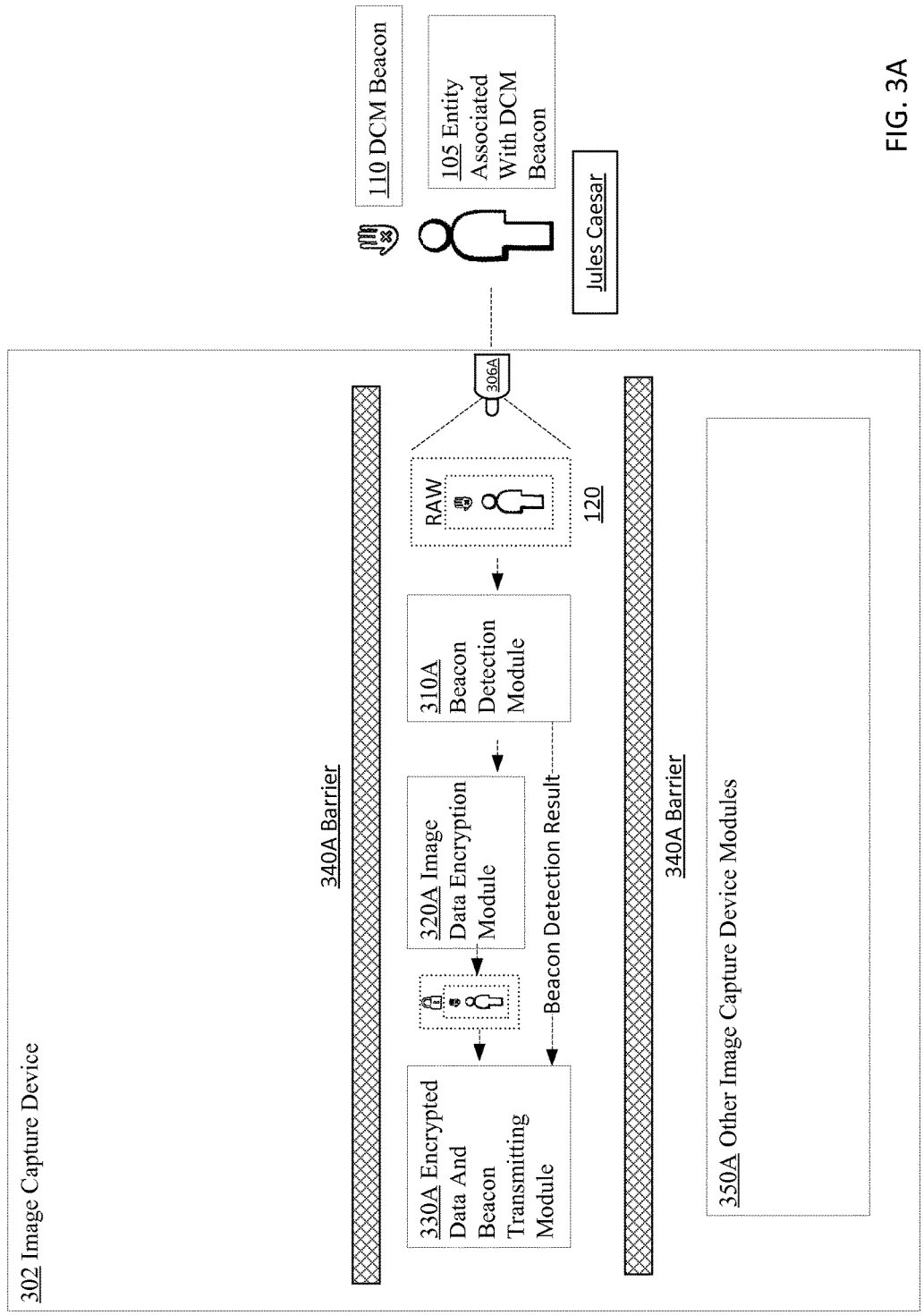

FIG. 3A shows a high-level block diagram of an exemplary image capture device 302, according to one or more embodiments.

Figure 3B:
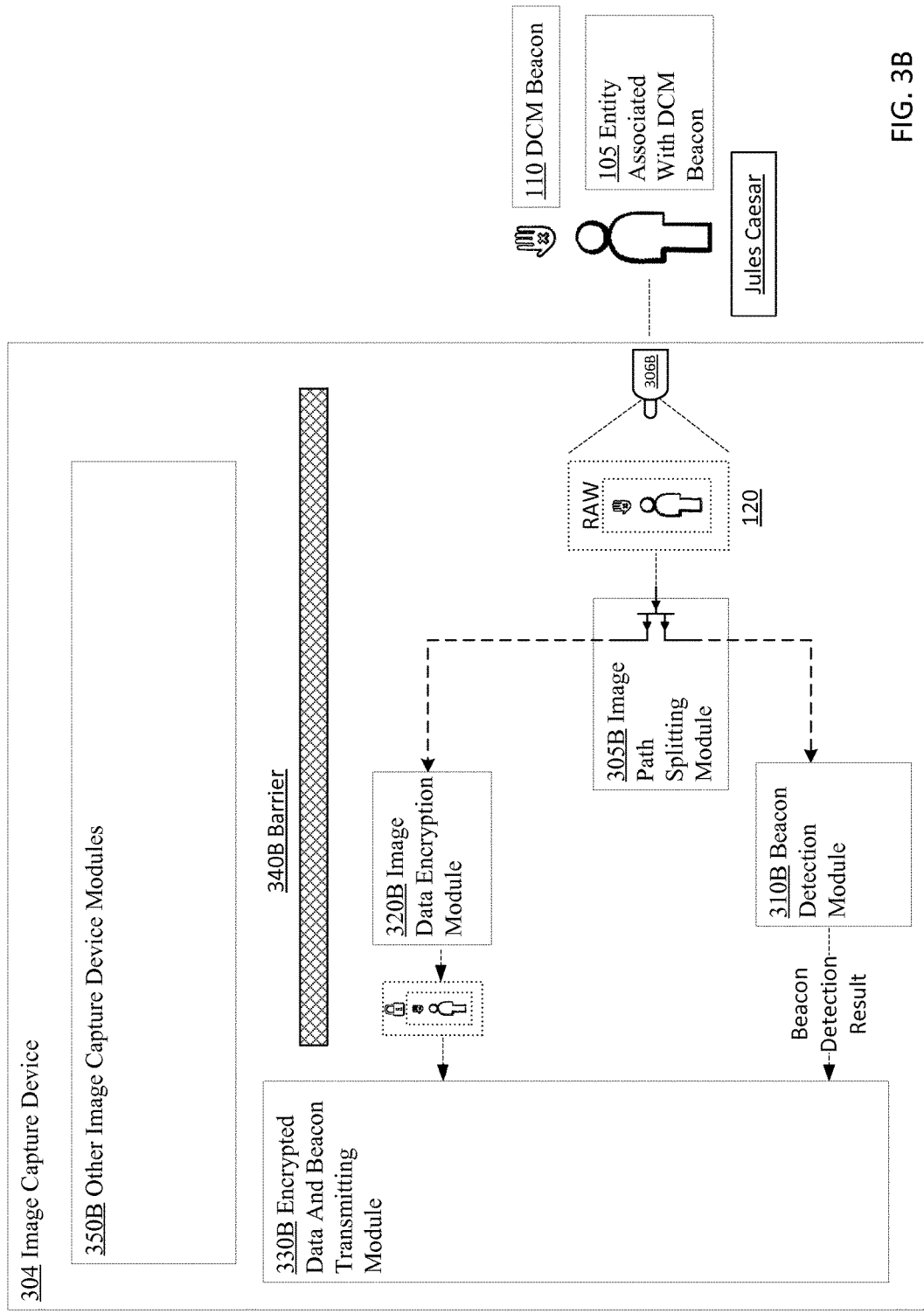

FIG. 3B shows a high-level block diagram of an exemplary image capture device 304, according to one or more embodiments.

Figure 3C:
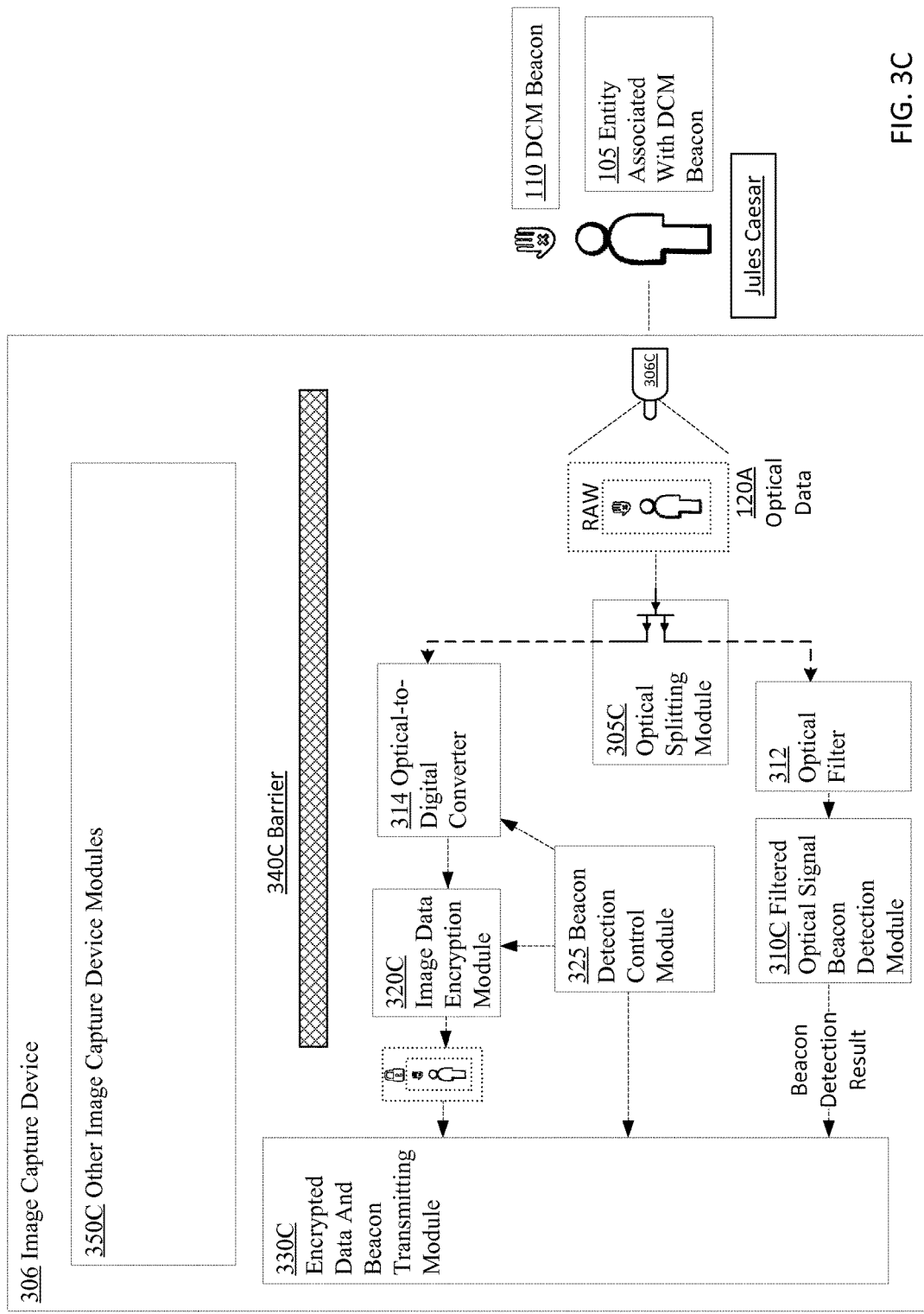

FIG. 3C shows a high-level block diagram of an exemplary image capture device 306, according to one or more embodiments.

Figure 3D:
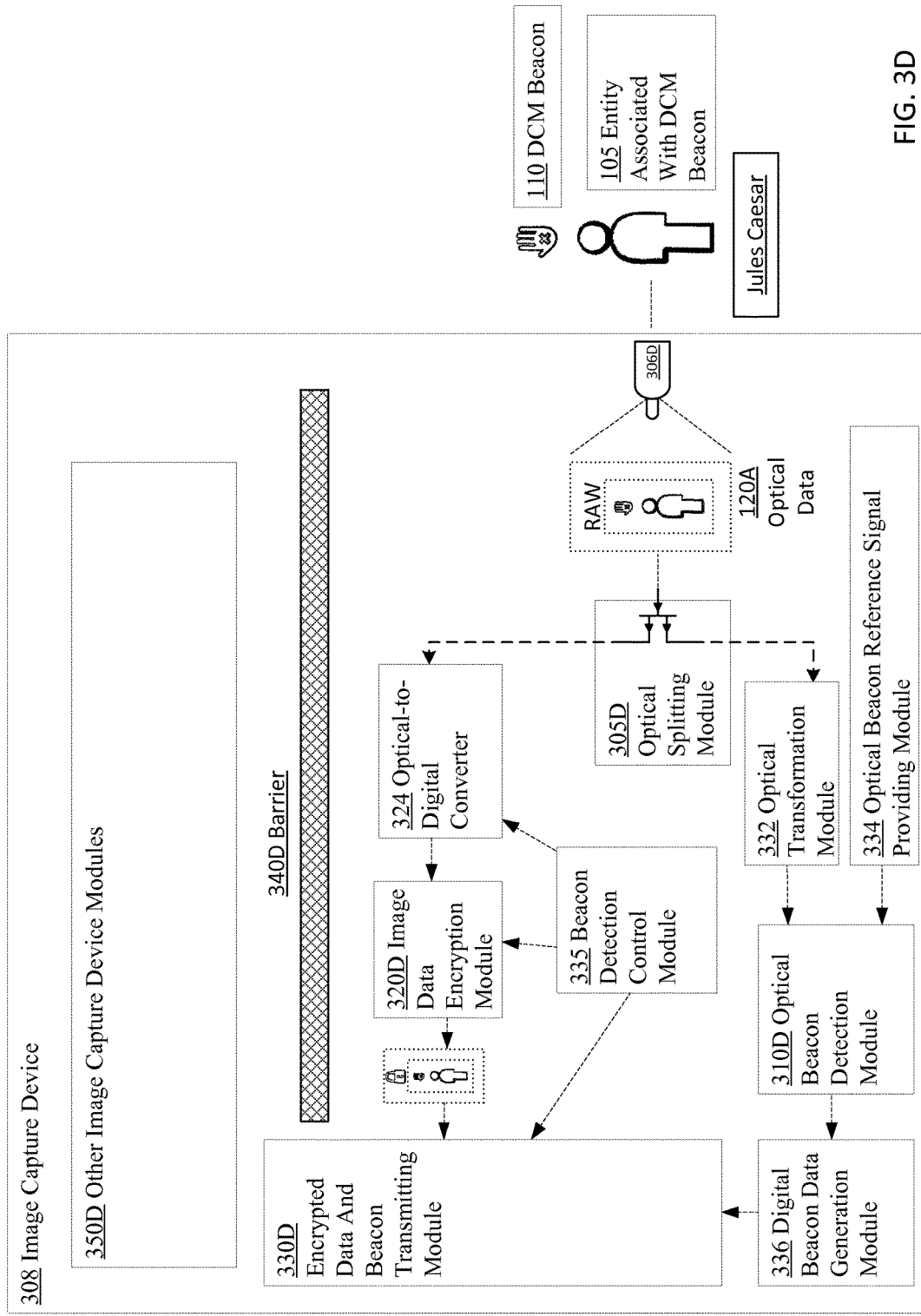

FIG. 3D shows a high-level block diagram of an exemplary image capture device 308, according to one or more embodiments.

Figure 3E:
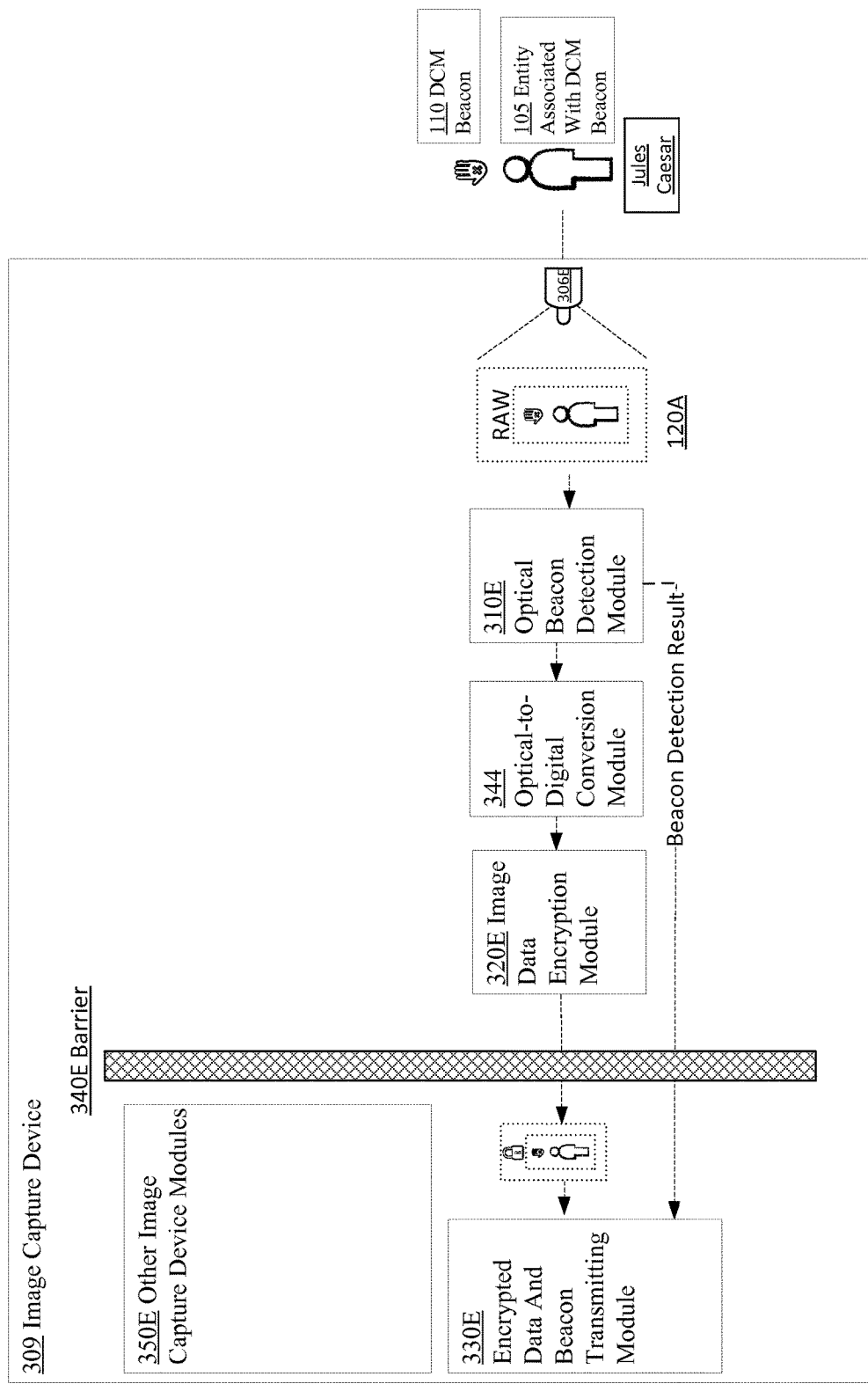

FIG. 3E shows a high-level block diagram of an exemplary image capture device 309, according to one or more embodiments.

Figure 4A:
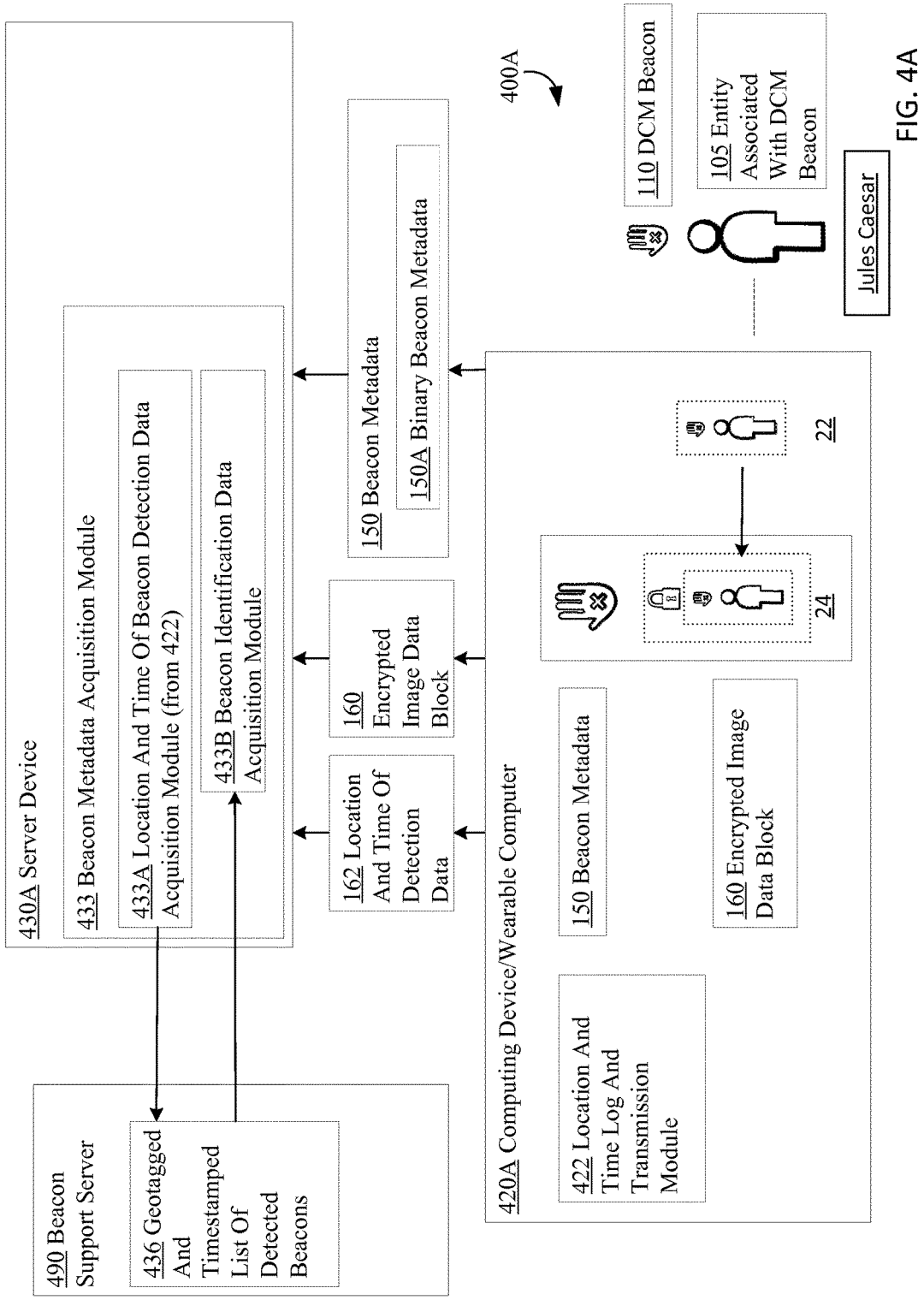

FIG. 4A shows a high-level block diagram of an exemplary environment 400A including a computing device 420A and a server device 430A.

Figure 4B:
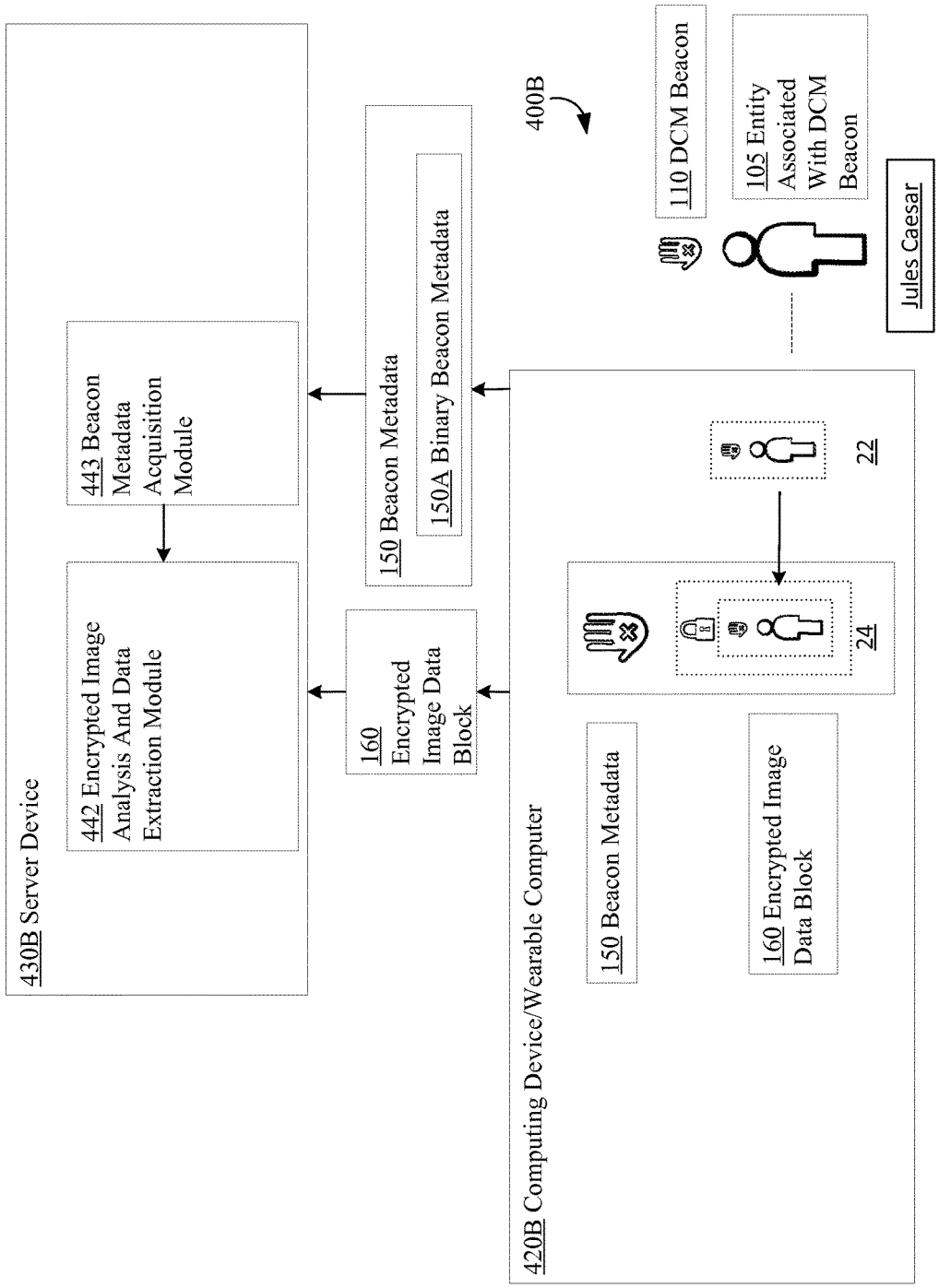

FIG. 4B shows a high-level block diagram of an exemplary environment 400B including a computing device 420B and a server device 430B.

Figure 4C:
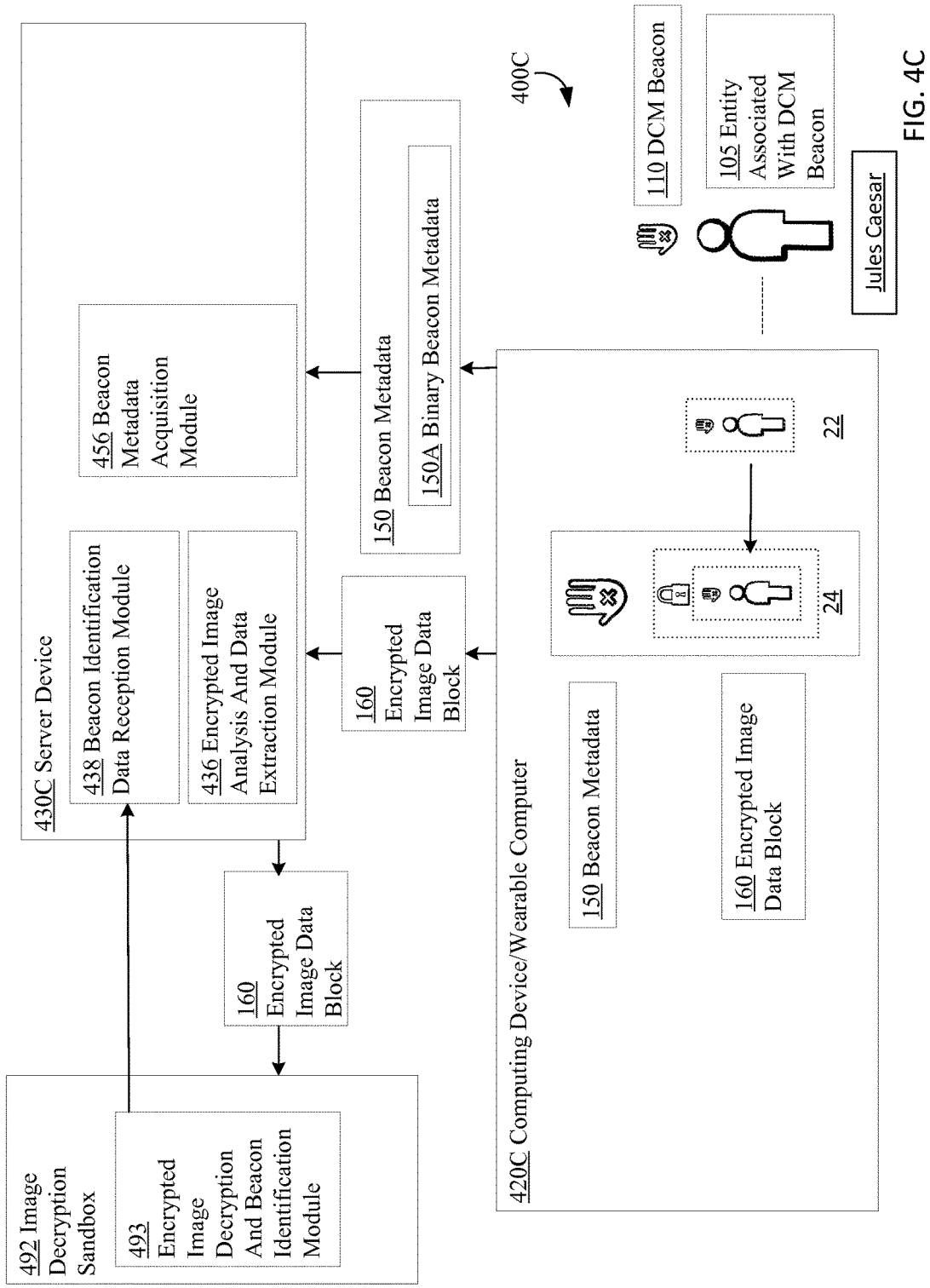

FIG. 4C shows a high-level block diagram of an exemplary environment 400C including a computing device 420C and a server device 430C.

Figure 4D:
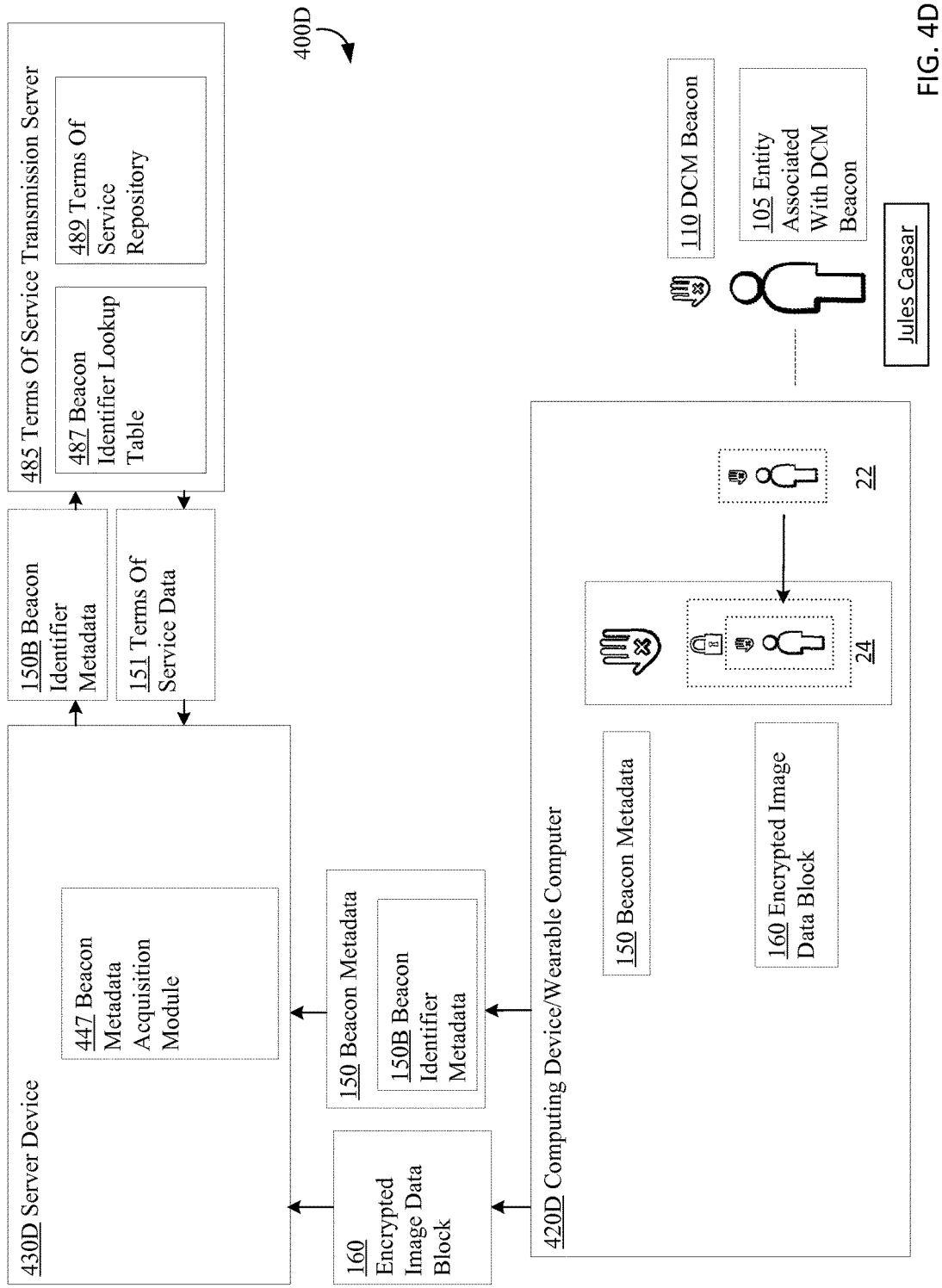

FIG. 4D shows a high-level block diagram of an exemplary environment 400D including a computing device 420D and a server device 430D.

Figure 4E:
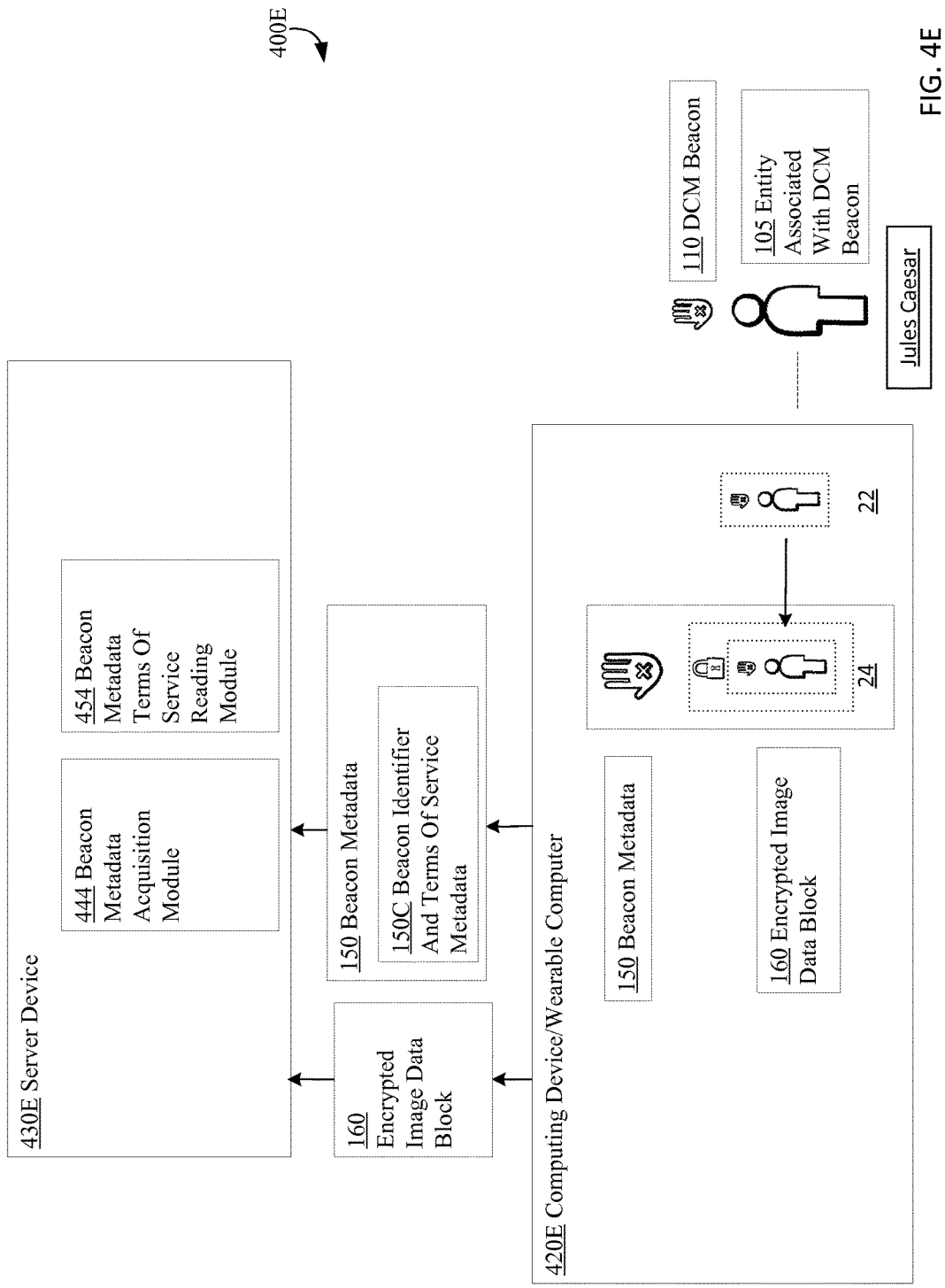

FIG. 4E shows a high-level block diagram of an exemplary environment 400E including a computing device 420E and a server device 430E.

Figure 5A:
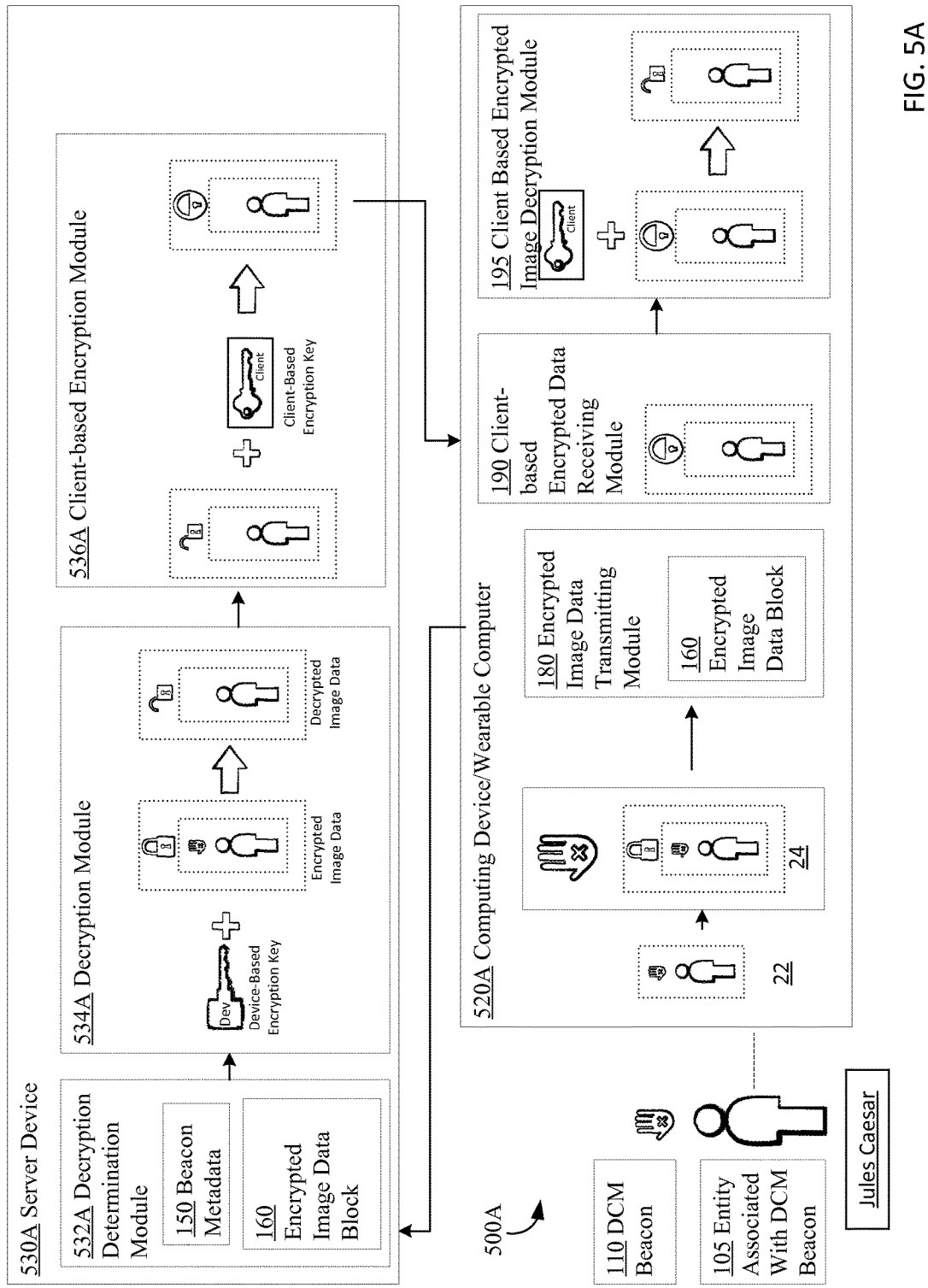

FIG. 5A shows a high-level block diagram of an exemplary environment 500A including a computing device 520A and a server device 530A.

Figure 5B:
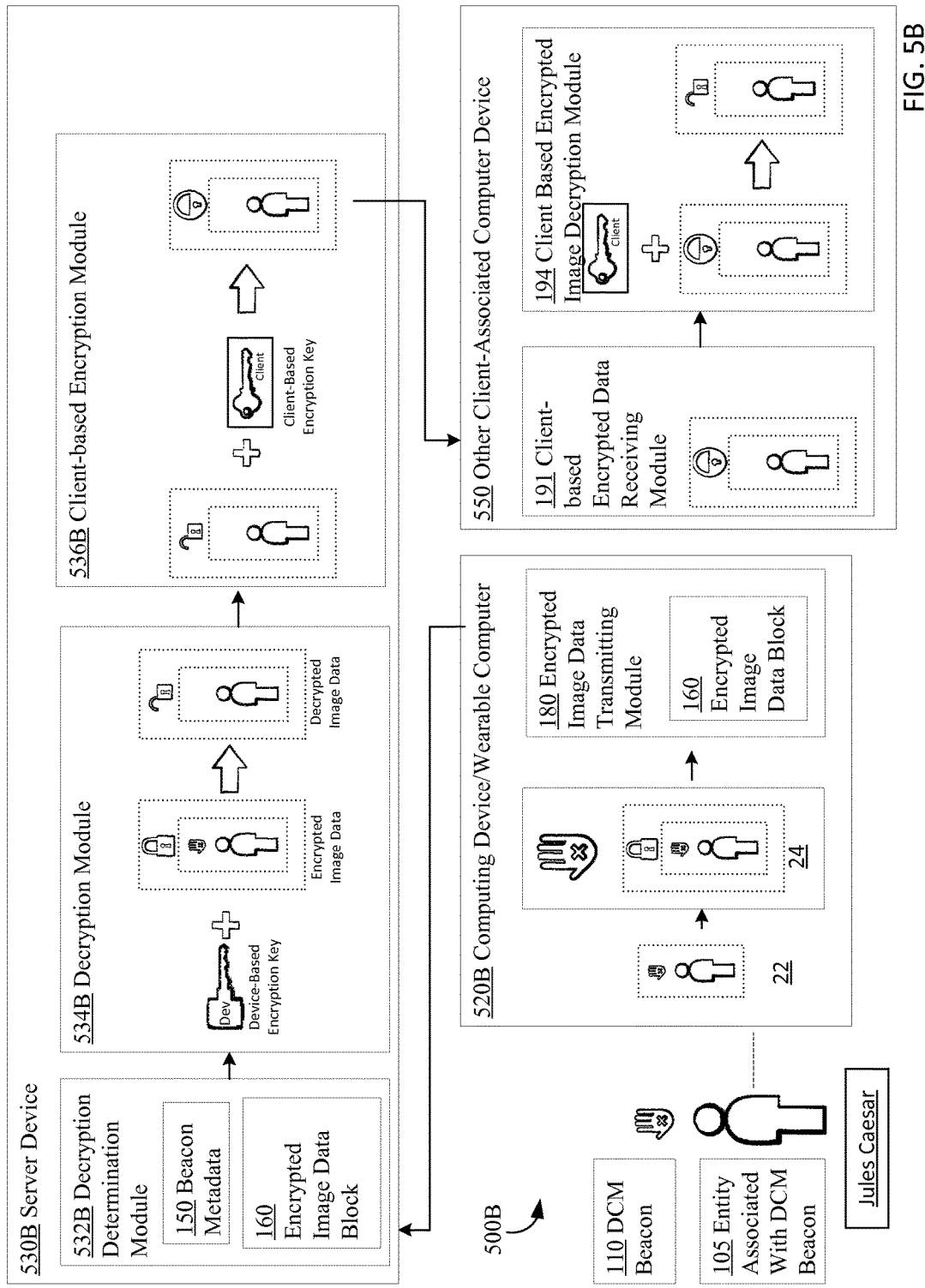

FIG. 5B shows a high-level block diagram of an exemplary environment 500B including a computing device 520B and a server device 530B.

Figure 5C:
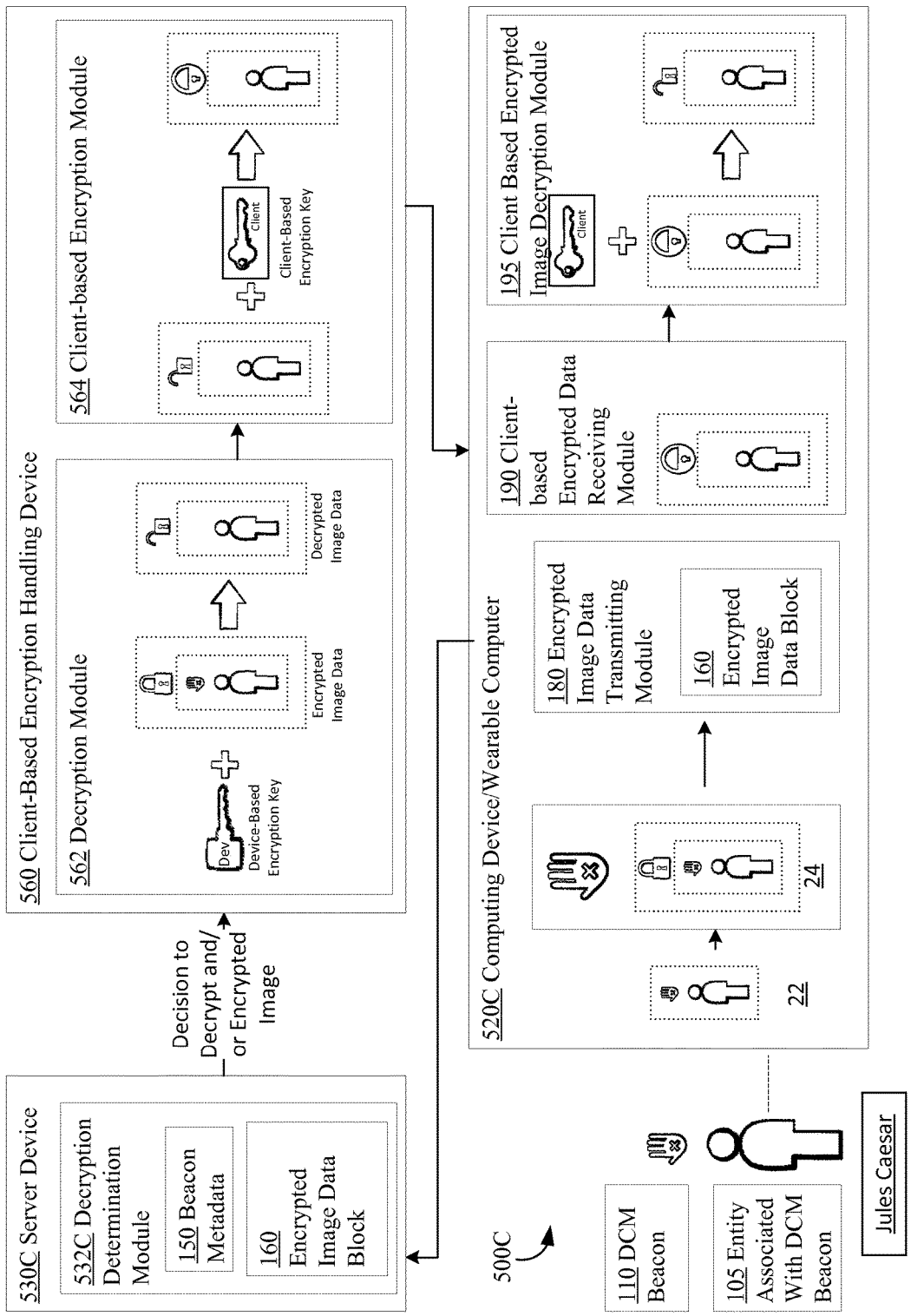

FIG. 5C shows a high-level block diagram of an exemplary environment 500C including a computing device 520C and a server device 530C.

FIG. 5D shows a high-level block diagram of an exemplary environment 500D including a computing device 520D and a server device 530D.

FIG. 6, including FIGS. 6A-6E, shows a particular perspective of an active indicator generator broadcasting of a privacy indicator that indicates a presence of term data that regards an entity module 252 of processing module 250 of indicator projection device 210 of FIG. 2B, according to an embodiment.

Figure 7C:
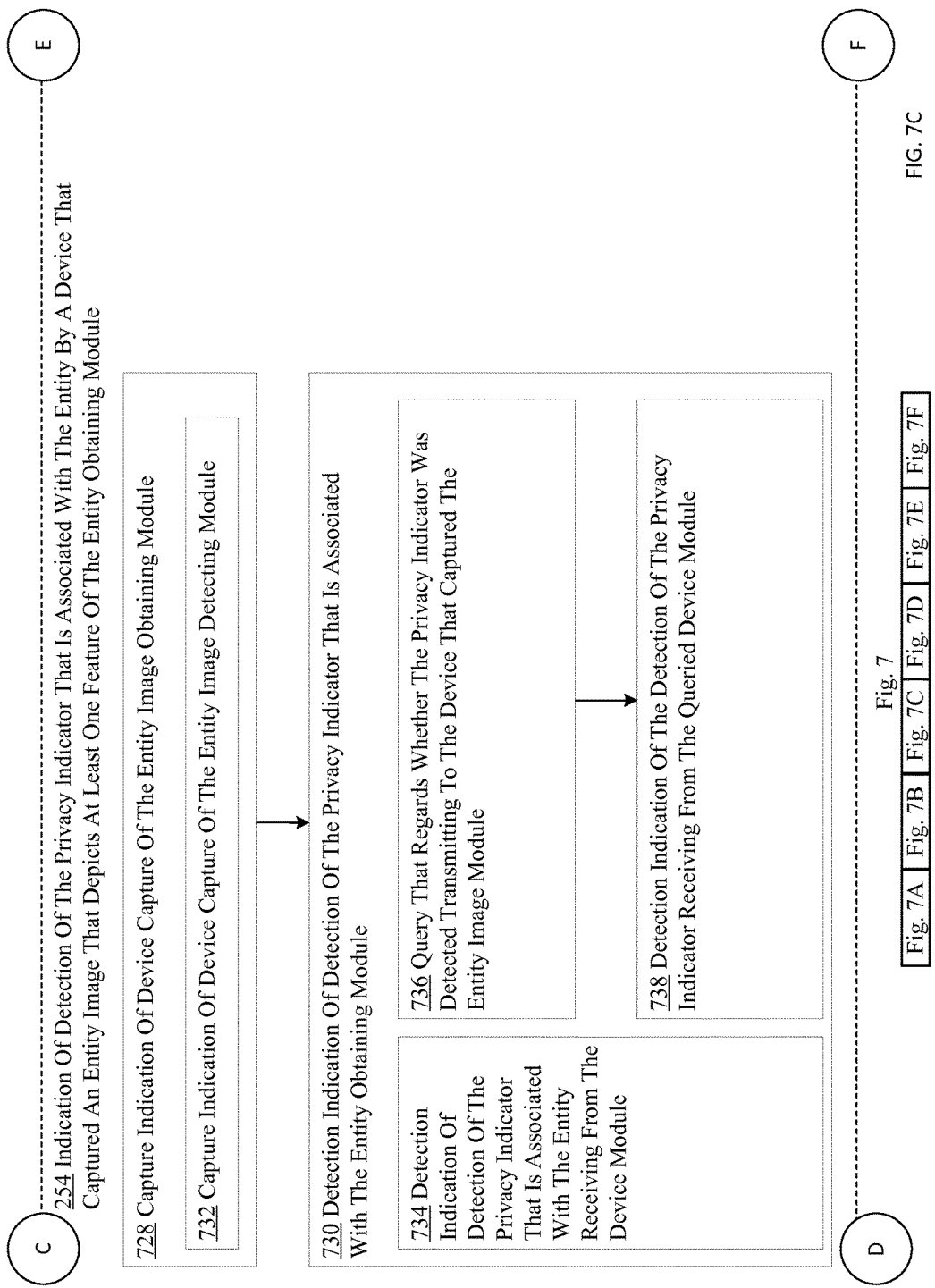

FIG. 7, including FIGS. 7A-7F, shows a particular perspective of an indication of detection of the privacy indicator that is associated with the entity by a device that captured an entity image that depicts at least one feature of the entity obtaining module 254 of processing module 250 of indicator projection device 210 of FIG. 2B, according to an embodiment.

FIG. 8, including FIGS. 8A-8C, shows a particular perspective of an term data that specifies one or more conditions that govern use of the entity image that depicts at least a portion of the entity transmission facilitating module 256 of processing module 250 of indicator projection device 210 of FIG. 2B, according to an embodiment.

Figure 9:
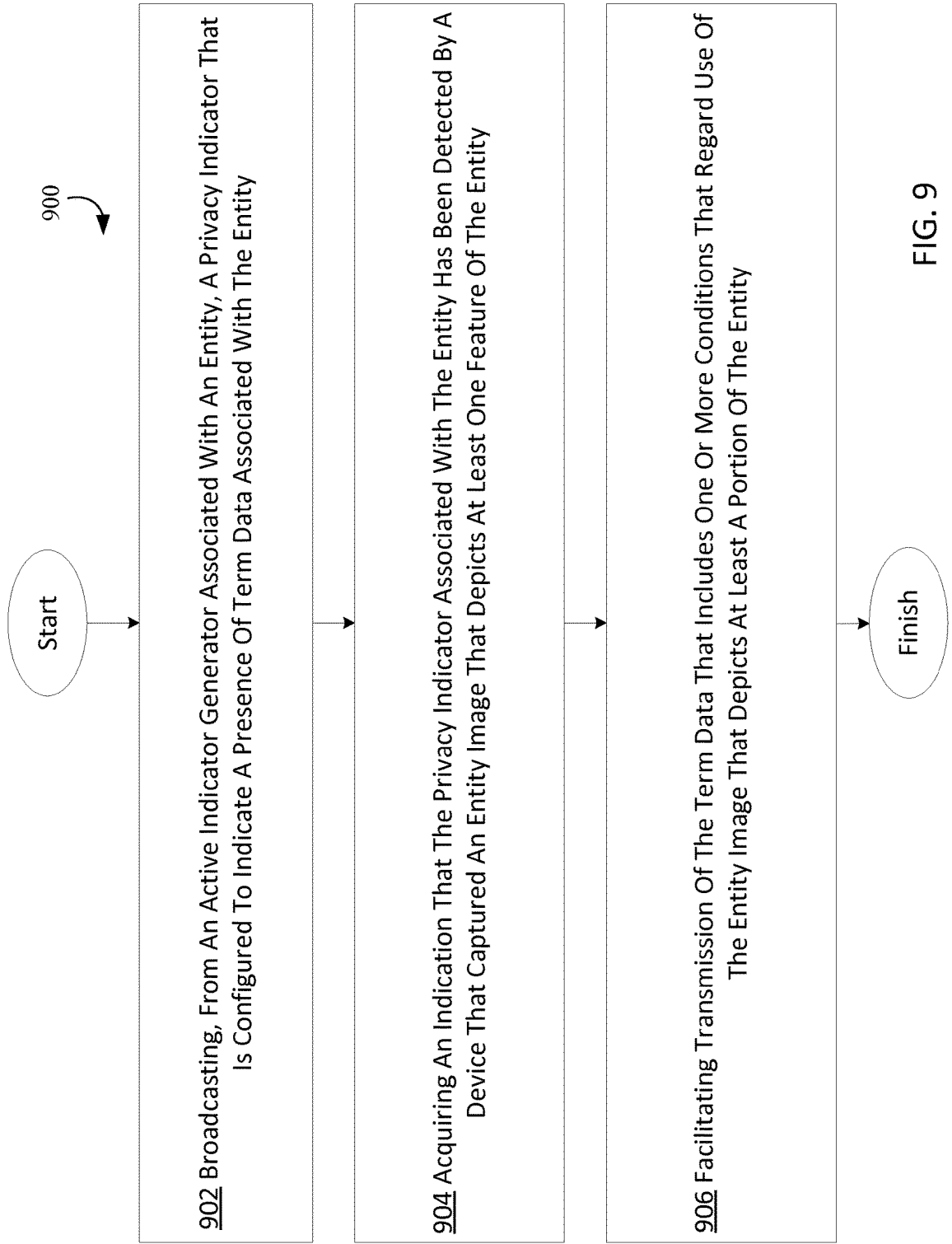

FIG. 9 is a high-level logic flowchart of a process, e.g., operational flow 900, according to an embodiment.

FIG. 10A is a high-level logic flow chart of a process depicting alternate implementations of a broadcasting a privacy indicator operation 902, according to one or more embodiments.

Figure 10B:
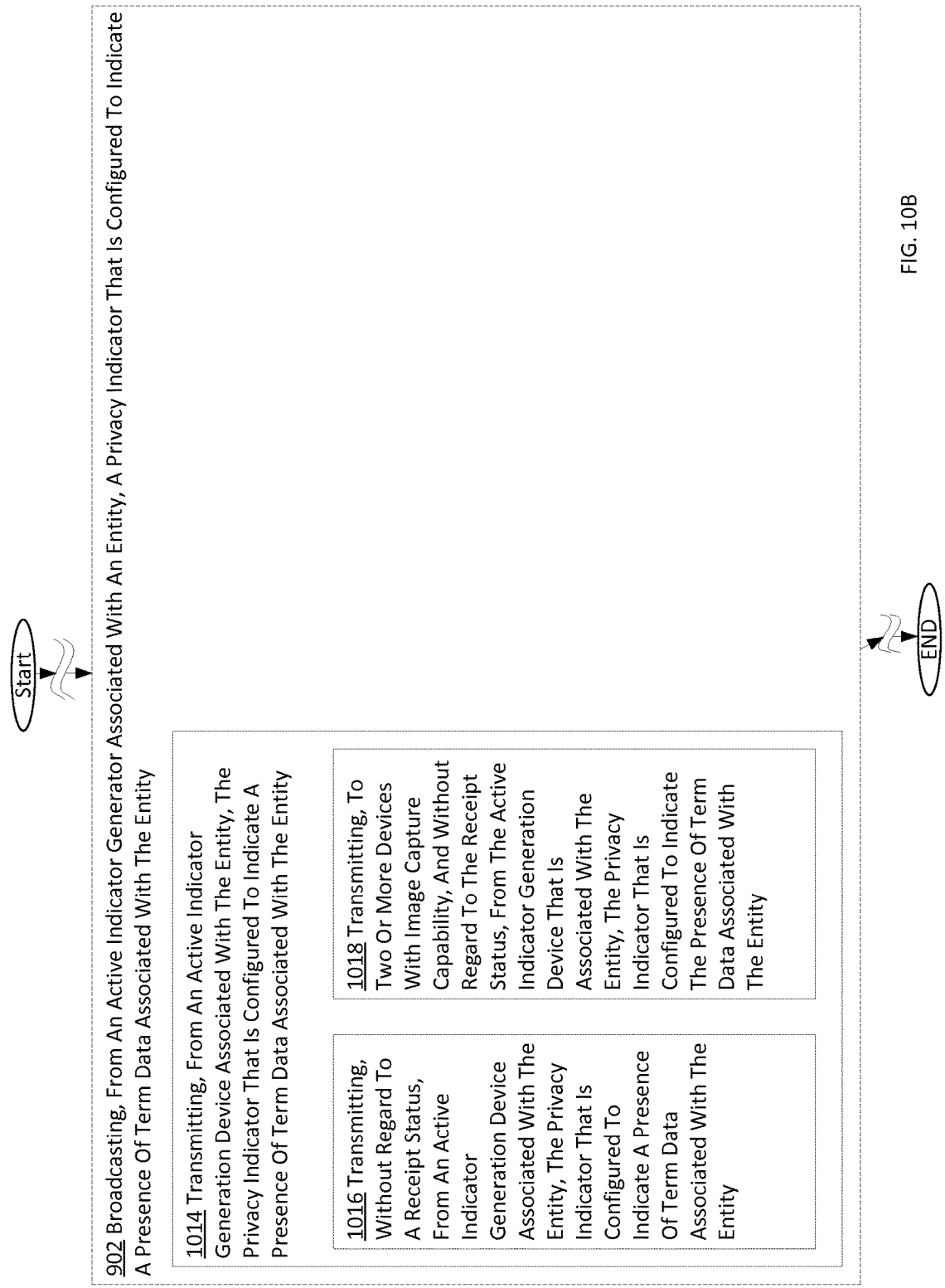

FIG. 10B is a high-level logic flow chart of a process depicting alternate implementations of a broadcasting a privacy indicator operation 902, according to one or more embodiments.

FIG. 10C is a high-level logic flow chart of a process depicting alternate implementations of a broadcasting a privacy indicator operation 902, according to one or more embodiments.

FIG. 10D is a high-level logic flow chart of a process depicting alternate implementations of a broadcasting a privacy indicator operation 902, according to one or more embodiments.

FIG. 10E is a high-level logic flow chart of a process depicting alternate implementations of a broadcasting a privacy indicator operation 902, according to one or more embodiments.

FIG. 10F is a high-level logic flow chart of a process depicting alternate implementations of a broadcasting a privacy indicator operation 902, according to one or more embodiments.

Figure 11A:
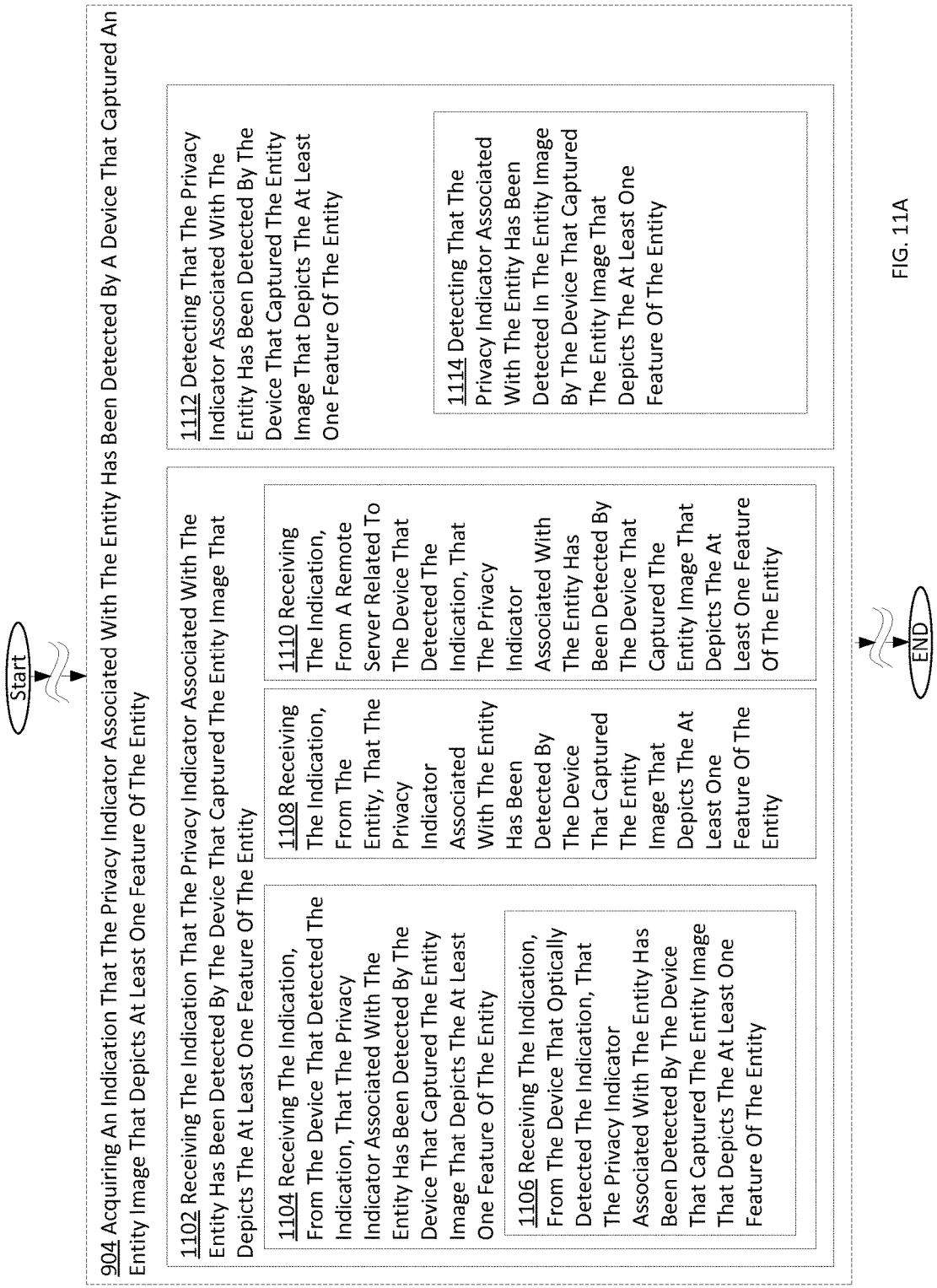

FIG. 11A is a high-level logic flow chart of a process depicting alternate implementations of an acquiring an indication operation 904, according to one or more embodiments.

Figure 11B:
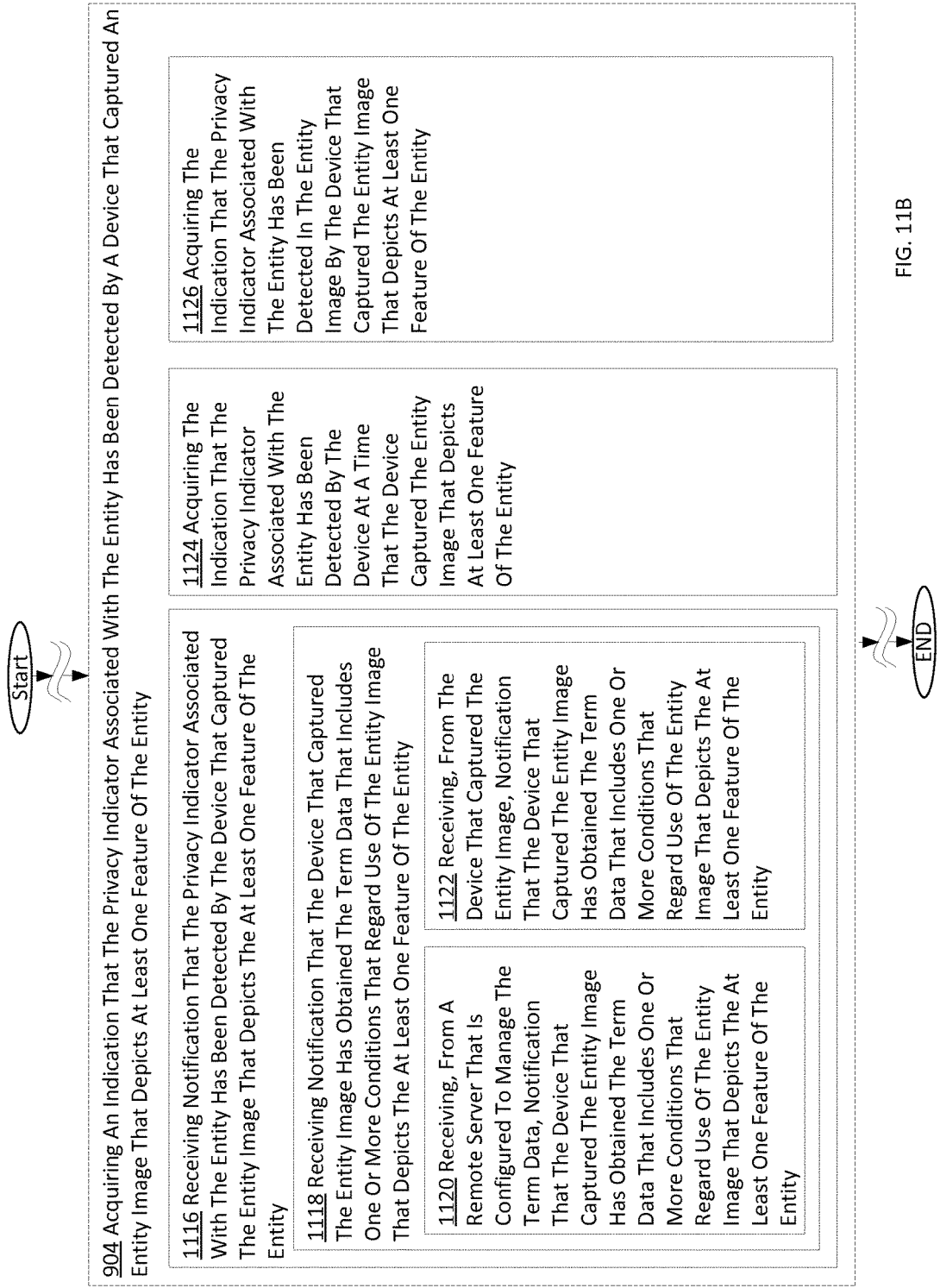

FIG. 11B is a high-level logic flow chart of a process depicting alternate implementations of an acquiring an indication operation 904, according to one or more embodiments.

Figure 11C:
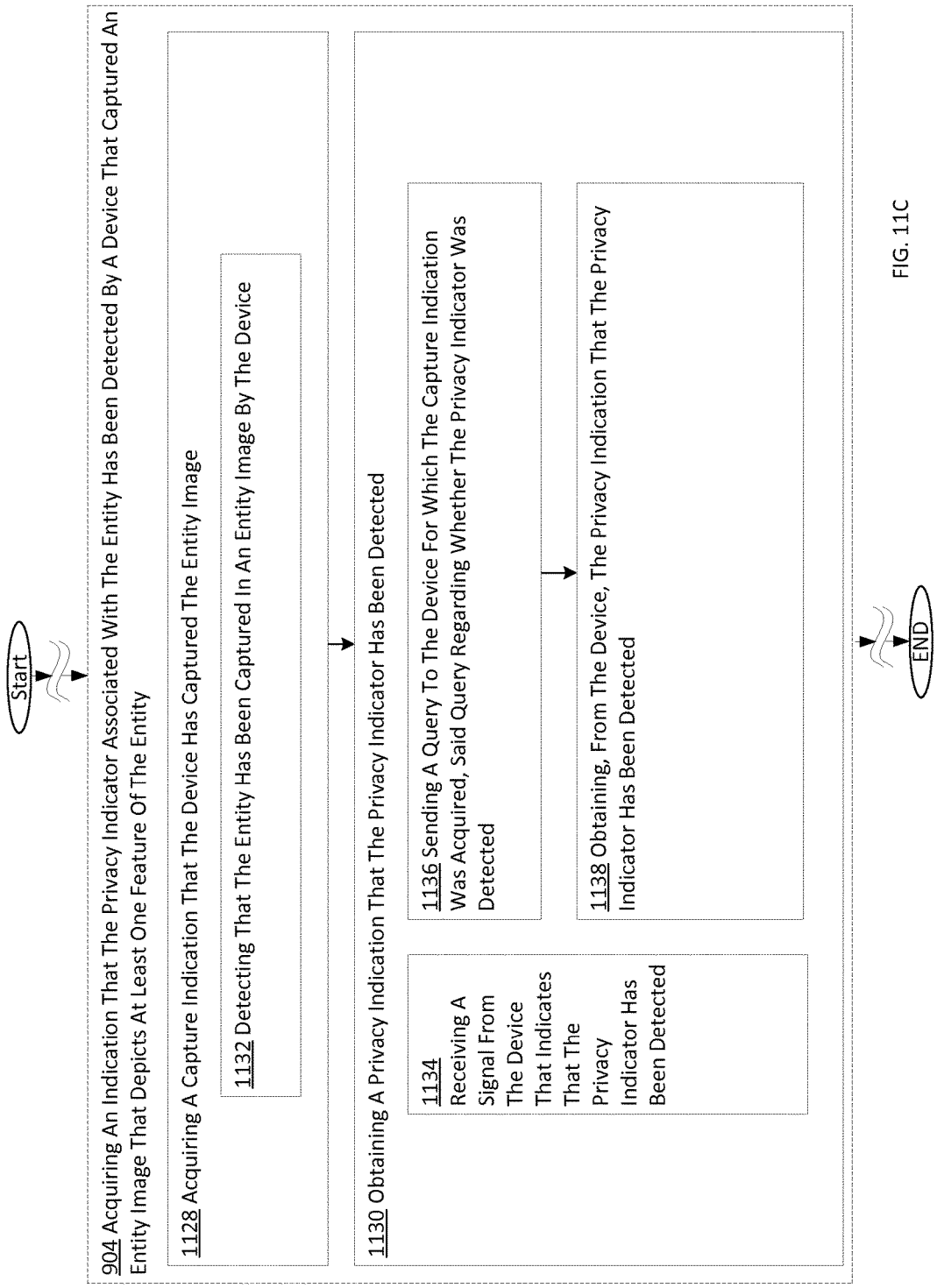

FIG. 11C is a high-level logic flow chart of a process depicting alternate implementations of an acquiring an indication operation 904, according to one or more embodiments.

FIG. 11D is a high-level logic flow chart of a process depicting alternate implementations of an acquiring an indication operation 904, according to one or more embodiments.

FIG. 11E is a high-level logic flow chart of a process depicting alternate implementations of an acquiring an indication operation 904, according to one or more embodiments.

Figure 11F:
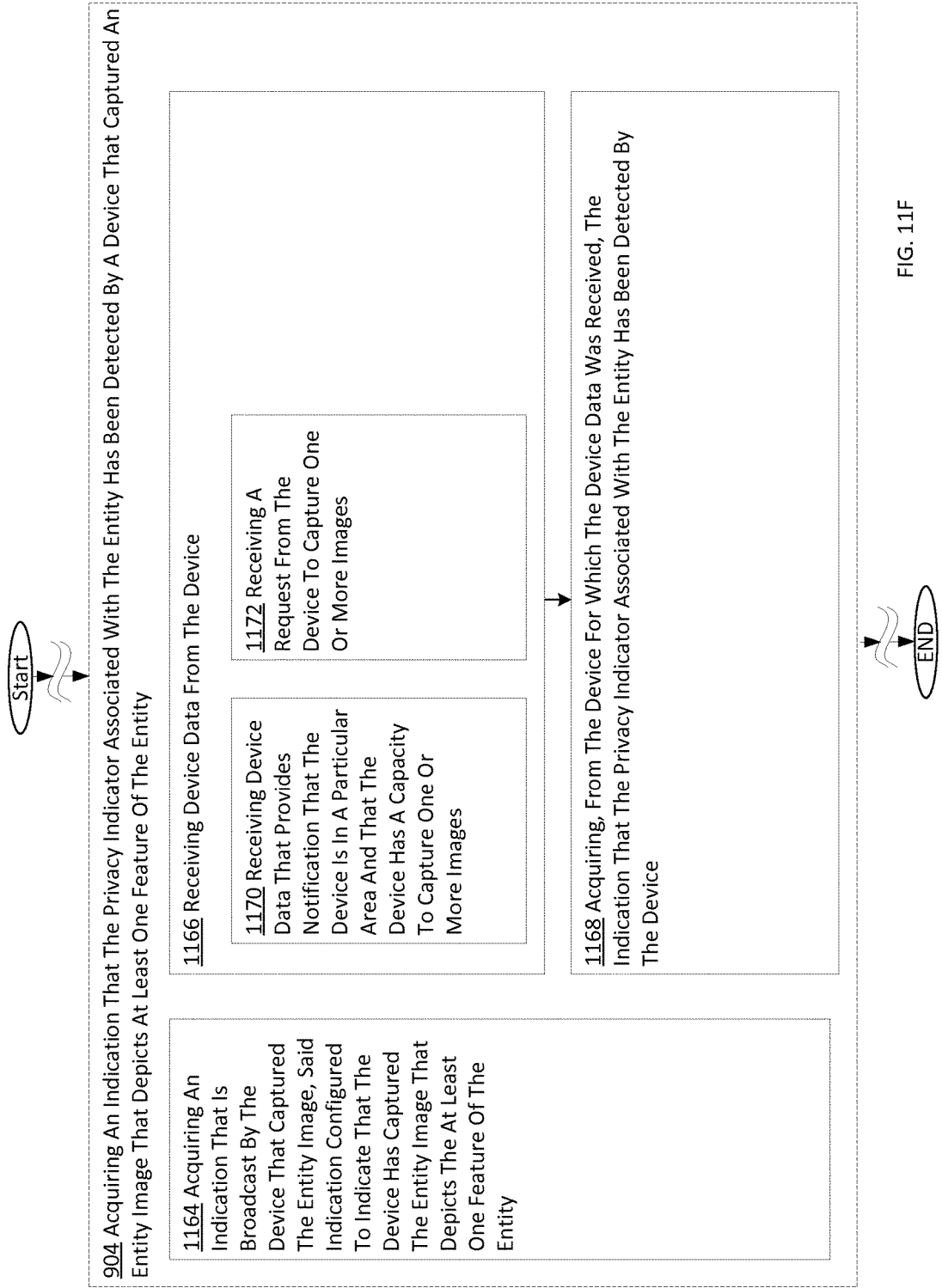

FIG. 11F is a high-level logic flow chart of a process depicting alternate implementations of an acquiring an indication operation 904, according to one or more embodiments.

Figure 12A:
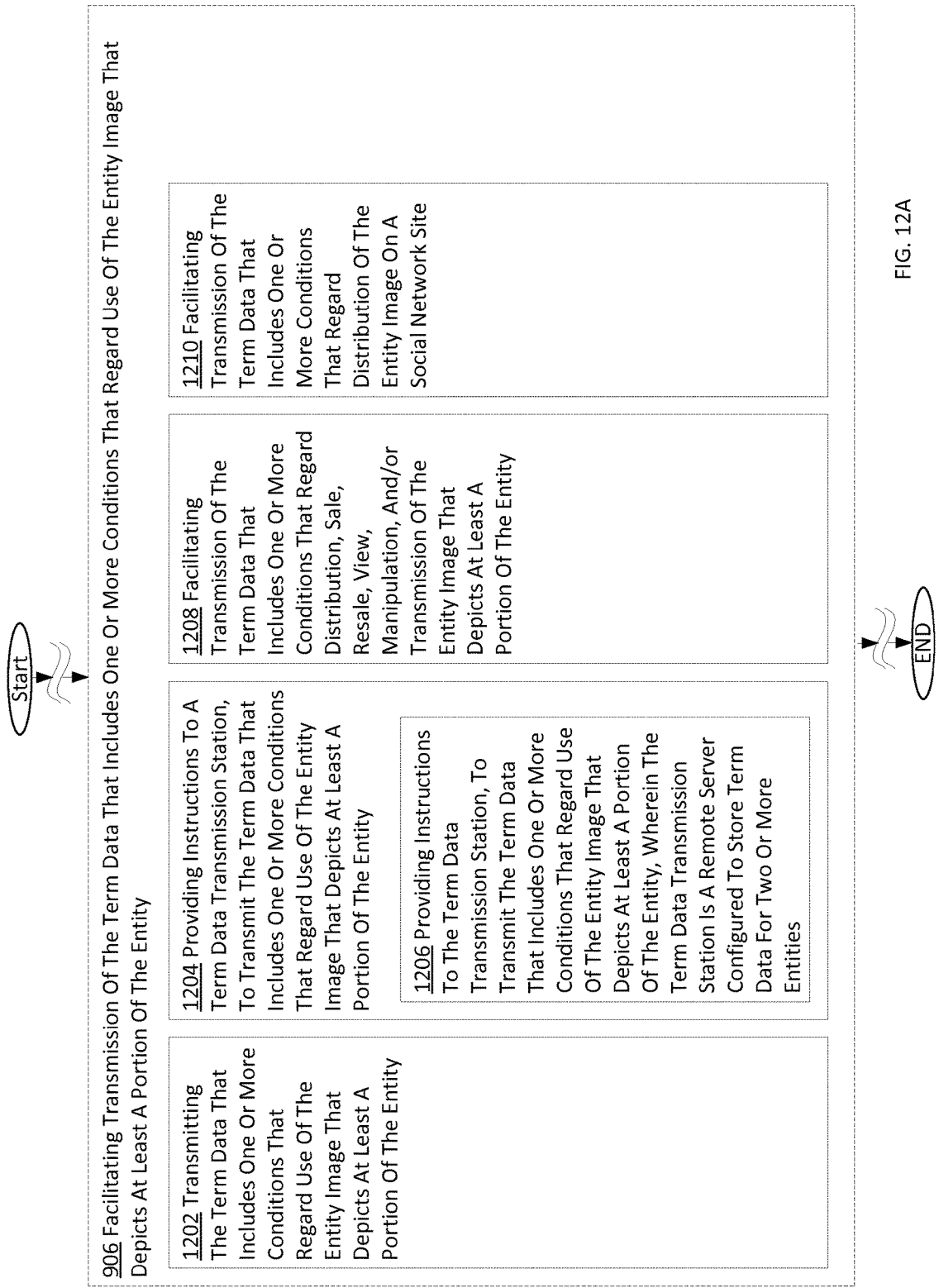

FIG. 12A is a high-level logic flow chart of a process depicting alternate implementations of a facilitating transmission of the term data operation 906, according to one or more embodiments.

FIG. 12B is a high-level logic flow chart of a process depicting alternate implementations of a facilitating transmission of the term data operation 906, according to one or more embodiments.

Figure 12C:
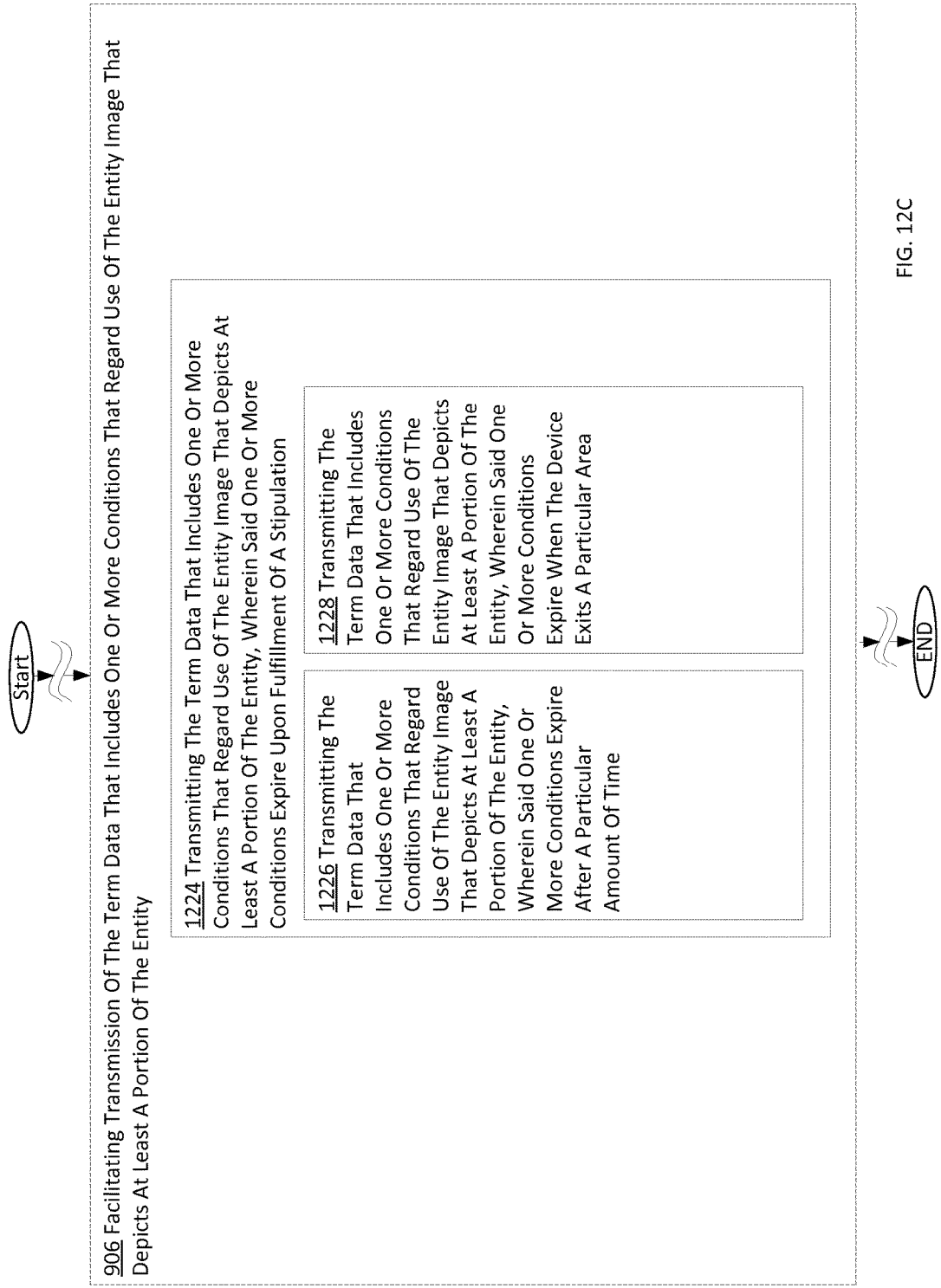

FIG. 12C is a high-level logic flow chart of a process depicting alternate implementations of a facilitating transmission of the term data operation 906, according to one or more embodiments.

Figure 12D:
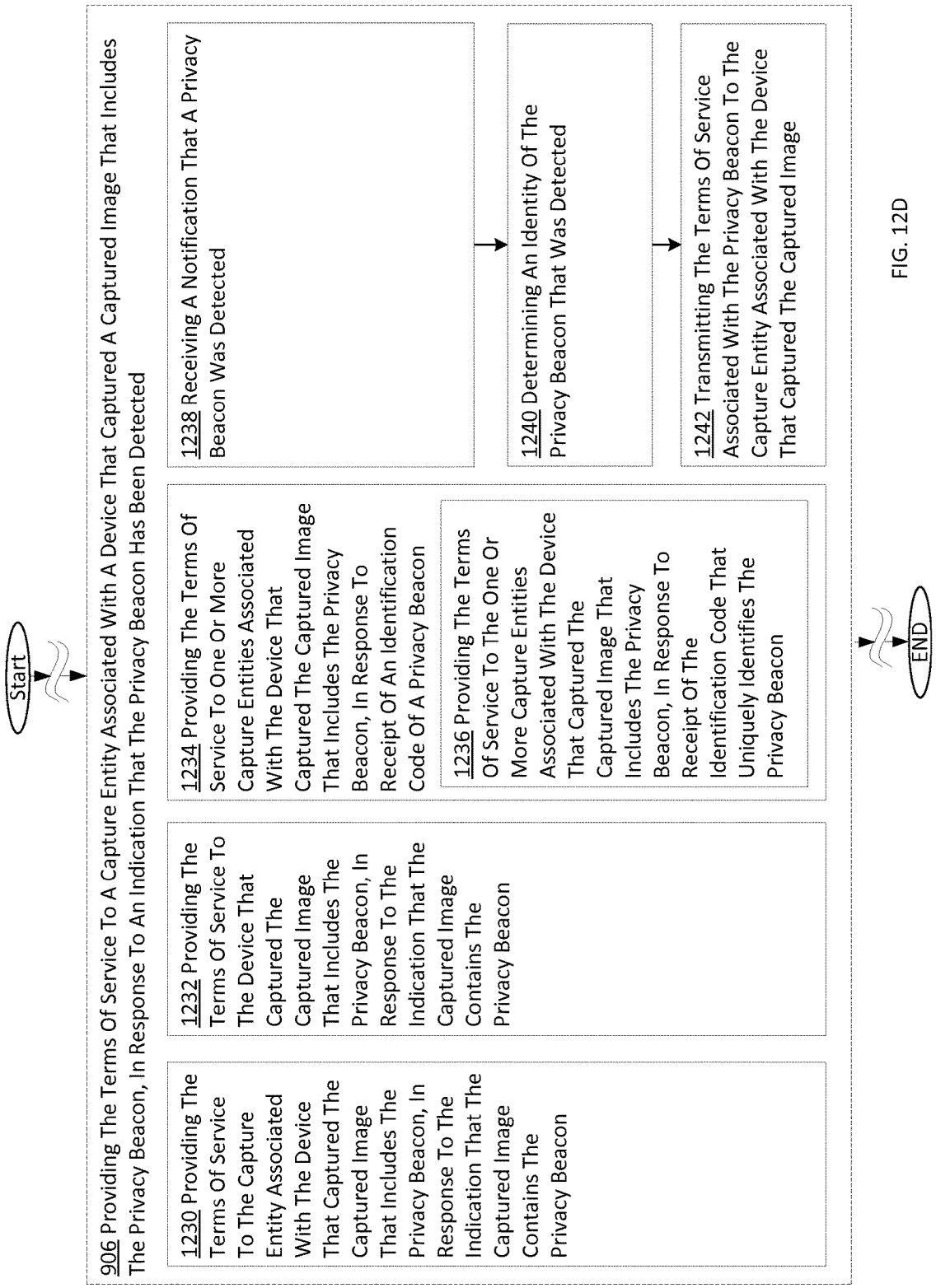

FIG. 12D is a high-level logic flow chart of a process depicting alternate implementations of a facilitating transmission of the term data operation 906, according to one or more embodiments.

DETAILED DESCRIPTION

In the following detailed description, reference is made to the accompanying drawings, which form a part hereof. In the drawings, similar symbols typically identify similar or identical components or items, unless context dictates otherwise. The illustrative embodiments described in the detailed description, drawings, and claims are not meant to be limiting. Other embodiments may be utilized, and other changes may be made, without departing from the spirit or scope of the subject matter presented here.

Thus, in accordance with various embodiments, computationally implemented methods, systems, circuitry, articles of manufacture, ordered chains of matter, and computer program products are designed to, among other things, provide an interface for broadcasting, from an active indicator generator associated with an entity, a privacy indicator that is configured to indicate a presence of term data associated with the entity, acquiring an indication that the privacy indicator associated with the entity has been detected by a device that captured an entity image that depicts at least one feature of the entity, and facilitating transmission of the term data that includes one or more conditions that regard use of the entity image that depicts at least a portion of the entity.

The claims, description, and drawings of this application may describe one or more of the instant technologies in operational/functional language, for example as a set of operations to be performed by a computer. Such operational/functional description in most instances would be understood by one skilled the art as specifically-configured hardware (e.g., because a general purpose computer in effect becomes a special purpose computer once it is programmed to perform particular functions pursuant to instructions from program software).

Importantly, although the operational/functional descriptions described herein are understandable by the human mind, they are not abstract ideas of the operations/functions divorced from computational implementation of those operations/functions. Rather, the operations/functions represent a specification for the massively complex computational machines or other means. As discussed in detail below, the operational/functional language must be read in its proper technological context, i.e., as concrete specifications for physical implementations.

The logical operations/functions described herein are a distillation of machine specifications or other physical mechanisms specified by the operations/functions such that the otherwise inscrutable machine specifications may be comprehensible to the human mind. The distillation also allows one of skill in the art to adapt the operational/functional description of the technology across many different specific vendors' hardware configurations or platforms, without being limited to specific vendors' hardware configurations or platforms.

Some of the present technical description (e.g., detailed description, drawings, claims, etc.) may be set forth in terms of logical operations/functions. As described in more detail in the following paragraphs, these logical operations/functions are not representations of abstract ideas, but rather representative of static or sequenced specifications of various hardware elements. Differently stated, unless context dictates otherwise, the logical operations/functions will be understood by those of skill in the art to be representative of static or sequenced specifications of various hardware elements. This is true because tools available to one of skill in the art to implement technical disclosures set forth in operational/functional formats—tools in the form of a high-level programming language (e.g., C, java, visual basic, etc.), or tools in the form of Very high speed Hardware Description Language ("VHDL," which is a language that uses text to describe logic circuits)—are generators of static or sequenced specifications of various hardware configurations. This fact is sometimes obscured by the broad term "software," but, as shown by the following explanation, those skilled in the art understand that what is termed "software" is a shorthand for a massively complex interchaining/specification of ordered-matter elements. The term "ordered-matter elements" may refer to physical components of computation, such as assemblies of electronic logic gates, molecular computing logic constituents, quantum computing mechanisms, etc.

For example, a high-level programming language is a programming language with strong abstraction, e.g., multiple levels of abstraction, from the details of the sequential organizations, states, inputs, outputs, etc., of the machines that a high-level programming language actually specifies. See, e.g., Wikipedia, High-level programming language, http://en.wikipedia.org/wiki/High-level_programming_language (as of Jun. 5, 2012, 21:00 GMT). In order to facilitate human comprehension, in many instances, high-level programming languages resemble or even share symbols with natural languages. See, e.g., Wikipedia, Natural language, http://en.wikipedia.org/wiki/Natural_language (as of Jun. 5, 2012, 21:00 GMT).

It has been argued that because high-level programming languages use strong abstraction (e.g., that they may resemble or share symbols with natural languages), they are therefore a "purely mental construct" (e.g., that "software"—a computer program or computer programming—is somehow an ineffable mental construct, because at a high level of abstraction, it can be conceived and understood in the human mind). This argument has been used to characterize technical description in the form of functions/operations as somehow "abstract ideas." In fact, in technological arts (e.g., the information and communication technologies) this is not true.

The fact that high-level programming languages use strong abstraction to facilitate human understanding should not be taken as an indication that what is expressed is an abstract idea. In fact, those skilled in the art understand that just the opposite is true. If a high-level programming language is the tool used to implement a technical disclosure in the form of functions/operations, those skilled in the art will recognize that, far from being abstract, imprecise, "fuzzy," or "mental" in any significant semantic sense, such a tool is instead a near incomprehensibly precise sequential specification of specific computational machines—the parts of which are built up by activating/selecting such parts from typically more general computational machines over time (e.g., clocked time). This fact is sometimes obscured by the superficial similarities between high-level programming languages and natural languages. These superficial similarities also may cause a glossing over of the fact that high-level programming language implementations ultimately perform valuable work by creating/controlling many different computational machines.

The many different computational machines that a high-level programming language specifies are almost unimaginably complex. At base, the hardware used in the computational machines typically consists of some type of ordered matter (e.g., traditional electronic devices (e.g., transistors), deoxyribonucleic acid (DNA), quantum devices, mechanical switches, optics, fluidics, pneumatics, optical devices (e.g., optical interference devices, molecules, etc.) that are arranged to form logic gates. Logic gates are typically physical devices that may be electrically, mechanically, chemically, or otherwise driven to change physical state in order to create a physical reality of Boolean logic.

Logic gates may be arranged to form logic circuits, which are typically physical devices that may be electrically, mechanically, chemically, or otherwise driven to create a physical reality of certain logical functions. Types of logic circuits include such devices as multiplexers, registers, arithmetic logic units (ALUs), computer memory, etc., each type of which may be combined to form yet other types of physical devices, such as a central processing unit (CPU)—the best known of which is the microprocessor. A modern microprocessor will often contain more than one hundred million logic gates in its many logic circuits (and often more than a billion transistors). See, e.g., Wikipedia, Logic gates, http://en.wikipedia.org/wiki/Logic_gates (as of Jun. 5, 2012, 21:03 GMT).

The logic circuits forming the microprocessor are arranged to provide a microarchitecture that will carry out the instructions defined by that microprocessor's defined Instruction Set Architecture. The Instruction Set Architecture is the part of the microprocessor architecture related to programming, including the native data types, instructions, registers, addressing modes, memory architecture, interrupt and exception handling, and external Input/Output. See, e.g., Wikipedia, Computer architecture, http://en.wikipedia.org/wiki/Computer_architecture (as of Jun. 5, 2012, 21:03 GMT).

The Instruction Set Architecture includes a specification of the machine language that can be used by programmers to use/control the microprocessor. Since the machine language instructions are such that they may be executed directly by the microprocessor, typically they consist of strings of binary digits, or bits. For example, a typical machine language instruction might be many bits long (e.g., 32, 64, or 128 bit strings are currently common). A typical machine language instruction might take the form "11110000101011110000111100111111" (a 32 bit instruction).

It is significant here that, although the machine language instructions are written as sequences of binary digits, in actuality those binary digits specify physical reality. For example, if certain semiconductors are used to make the operations of Boolean logic a physical reality, the apparently mathematical bits "1" and "0" in a machine language instruction actually constitute shorthand that specifies the application of specific voltages to specific wires. For example, in some semiconductor technologies, the binary number "1" (e.g., logical "1") in a machine language instruction specifies around +5 volts applied to a specific "wire" (e.g., metallic traces on a printed circuit board) and the binary number "0" (e.g., logical "0") in a machine language instruction specifies around −5 volts applied to a specific "wire." In addition to specifying voltages of the machines' configuration, such machine language instructions also select out and activate specific groupings of logic gates from the millions of logic gates of the more general machine. Thus, far from abstract mathematical expressions, machine language instruction programs, even though written as a string of zeros and ones, specify many, many constructed physical machines or physical machine states.

Machine language is typically incomprehensible by most humans (e.g., the above example was just ONE instruction, and some personal computers execute more than two billion instructions every second). See, e.g., Wikipedia, Instructions per second, http://en.wikipedia.org/wiki/Instructions_per_second (as of Jun. 5, 2012, 21:04 GMT). Thus, programs written in machine language—which may be tens of millions of machine language instructions long—are incomprehensible. In view of this, early assembly languages were developed that used mnemonic codes to refer to machine language instructions, rather than using the machine language instructions' numeric values directly (e.g., for performing a multiplication operation, programmers coded the abbreviation "mult," which represents the binary number "011000" in MIPS machine code). While assembly languages were initially a great aid to humans controlling the microprocessors to perform work, in time the complexity of the work that needed to be done by the humans outstripped the ability of humans to control the microprocessors using merely assembly languages.

At this point, it was noted that the same tasks needed to be done over and over, and the machine language necessary to do those repetitive tasks was the same. In view of this, compilers were created. A compiler is a device that takes a statement that is more comprehensible to a human than either machine or assembly language, such as "add 2+2 and output the result," and translates that human understandable statement into a complicated, tedious, and immense machine language code (e.g., millions of 32, 64, or 128 bit length strings). Compilers thus translate high-level programming language into machine language.

This compiled machine language, as described above, is then used as the technical specification which sequentially constructs and causes the interoperation of many different computational machines such that humanly useful, tangible, and concrete work is done. For example, as indicated above, such machine language—the compiled version of the higher-level language—functions as a technical specification which selects out hardware logic gates, specifies voltage levels, voltage transition timings, etc., such that the humanly useful work is accomplished by the hardware.

Thus, a functional/operational technical description, when viewed by one of skill in the art, is far from an abstract idea. Rather, such a functional/operational technical description, when understood through the tools available in the art such as those just described, is instead understood to be a humanly understandable representation of a hardware specification, the complexity and specificity of which far exceeds the comprehension of most any one human. With this in mind, those skilled in the art will understand that any such operational/functional technical descriptions—in view of the disclosures herein and the knowledge of those skilled in the art—may be understood as operations made into physical reality by (a) one or more interchained physical machines, (b) interchained logic gates configured to create one or more physical machine(s) representative of sequential/combinatorial logic(s), (c) interchained ordered matter making up logic gates (e.g., interchained electronic devices (e.g., transistors), DNA, quantum devices, mechanical switches, optics, fluidics, pneumatics, molecules, etc.) that create physical reality representative of logic(s), or (d) virtually any combination of the foregoing. Indeed, any physical object which has a stable, measurable, and changeable state may be used to construct a machine based on the above technical description. Charles Babbage, for example, constructed the first computer out of wood and powered by cranking a handle.

Thus, far from being understood as an abstract idea, those skilled in the art will recognize a functional/operational technical description as a humanly-understandable representation of one or more almost unimaginably complex and time sequenced hardware instantiations. The fact that functional/operational technical descriptions might lend themselves readily to high-level computing languages (or high-level block diagrams for that matter) that share some words, structures, phrases, etc. with natural language simply cannot be taken as an indication that such functional/operational technical descriptions are abstract ideas, or mere expressions of abstract ideas. In fact, as outlined herein, in the technological arts this is simply not true. When viewed through the tools available to those of skill in the art, such functional/operational technical descriptions are seen as specifying hardware configurations of almost unimaginable complexity.

As outlined above, the reason for the use of functional/operational technical descriptions is at least twofold. First, the use of functional/operational technical descriptions allows near-infinitely complex machines and machine operations arising from interchained hardware elements to be described in a manner that the human mind can process (e.g., by mimicking natural language and logical narrative flow). Second, the use of functional/operational technical descriptions assists the person of skill in the art in understanding the described subject matter by providing a description that is more or less independent of any specific vendor's piece(s) of hardware.

The use of functional/operational technical descriptions assists the person of skill in the art in understanding the described subject matter since, as is evident from the above discussion, one could easily, although not quickly, transcribe the technical descriptions set forth in this document as trillions of ones and zeroes, billions of single lines of assembly-level machine code, millions of logic gates, thousands of gate arrays, or any number of intermediate levels of abstractions. However, if any such low-level technical descriptions were to replace the present technical description, a person of skill in the art could encounter undue difficulty in implementing the disclosure, because such a low-level technical description would likely add complexity without a corresponding benefit (e.g., by describing the subject matter utilizing the conventions of one or more vendor-specific pieces of hardware). Thus, the use of functional/operational technical descriptions assists those of skill in the art by separating the technical descriptions from the conventions of any vendor-specific piece of hardware.

In view of the foregoing, the logical operations/functions set forth in the present technical description are representative of static or sequenced specifications of various ordered-matter elements, in order that such specifications may be comprehensible to the human mind and adaptable to create many various hardware configurations. The logical operations/functions disclosed herein should be treated as such, and should not be disparagingly characterized as abstract ideas merely because the specifications they represent are presented in a manner that one of skill in the art can readily understand and apply in a manner independent of a specific vendor's hardware implementation.

Those having skill in the art will recognize that the state of the art has progressed to the point where there is little distinction left between hardware, software (e.g., a high-level computer program serving as a hardware specification), and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software (e.g., a high-level computer program serving as a hardware specification), and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software (e.g., a high-level computer program serving as a hardware specification) implementation; or, yet again alternatively, the implementer may opt for some combination of hardware, software (e.g., a high-level computer program serving as a hardware specification), and/or firmware in one or more machines, compositions of matter, and articles of manufacture, limited to patentable subject matter under 35 U.S.C. §101. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software (e.g., a high-level computer program serving as a hardware specification), and or firmware.

In some implementations described herein, logic and similar implementations may include computer programs or other control structures. Electronic circuitry, for example, may have one or more paths of electrical current constructed and arranged to implement various functions as described herein. In some implementations, one or more media may be configured to bear a device-detectable implementation when such media hold or transmit device detectable instructions operable to perform as described herein. In some variants, for example, implementations may include an update or modification of existing software (e.g., a high-level computer program serving as a hardware specification) or firmware, or of gate arrays or programmable hardware, such as by performing a reception of or a transmission of one or more instructions in relation to one or more operations described herein. Alternatively or additionally, in some variants, an implementation may include special-purpose hardware, software (e.g., a high-level computer program serving as a hardware specification), firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operation described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled/implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, etc.), or (g) a wired/wireless services entity (e.g., Sprint, Cingular, Nextel, etc.), etc.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

A sale of a system or method may likewise occur in a territory even if components of the system or method are located and/or used outside the territory. Further, implementation of at least part of a system for performing a method in one territory does not preclude use of the system in another territory In a general sense, those skilled in the art will recognize that the various embodiments described herein can be implemented, individually and/or collectively, by various types of electro-mechanical systems having a wide range of electrical components such as hardware, software, firmware, and/or virtually any combination thereof, limited to patentable subject matter under 35 U.S.C. 101; and a wide range of components that may impart mechanical force or motion such as rigid bodies, spring or torsional bodies, hydraulics, electro-magnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs (e.g., graphene based circuitry). Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into an image processing system. Those having skill in the art will recognize that a typical image processing system generally includes one or more of a system unit housing, a video display device, memory such as volatile or non-volatile memory, processors such as microprocessors or digital signal processors, computational entities such as operating systems, drivers, applications programs, one or more interaction devices (e.g., a touch pad, a touch screen, an antenna, etc.), control systems including feedback loops and control motors (e.g., feedback for sensing lens position and/or velocity; control motors for moving/distorting lenses to give desired focuses). An image processing system may be implemented utilizing suitable commercially available components, such as those typically found in digital still systems and/or digital motion systems.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

Those skilled in the art will recognize that at least a portion of the devices and/or processes described herein can be integrated into a mote system. Those having skill in the art will recognize that a typical mote system generally includes one or more memories such as volatile or non-volatile memories, processors such as microprocessors or digital signal processors, computational entities such as operating systems, user interfaces, drivers, sensors, actuators, applications programs, one or more interaction devices (e.g., an antenna USB ports, acoustic ports, etc.), control systems including feedback loops and control motors (e.g., feedback for sensing or estimating position and/or velocity; control motors for moving and/or adjusting components and/or quantities). A mote system may be implemented utilizing suitable components, such as those found in mote computing/communication systems. Specific examples of such components entail such as Intel Corporation's and/or Crossbow Corporation's mote components and supporting hardware, software, and/or firmware.

For the purposes of this application, "cloud" computing may be understood as described in the cloud computing literature. For example, cloud computing may be methods and/or systems for the delivery of computational capacity and/or storage capacity as a service. The "cloud" may refer to one or more hardware and/or software components that deliver or assist in the delivery of computational and/or storage capacity, including, but not limited to, one or more of a client, an application, a platform, an infrastructure, and/or a server The cloud may refer to any of the hardware and/or software associated with a client, an application, a platform, an infrastructure, and/or a server. For example, cloud and cloud computing may refer to one or more of a computer, a processor, a storage medium, a router, a switch, a modem, a virtual machine (e.g., a virtual server), a data center, an operating system, a middleware, a firmware, a hardware back-end, a software back-end, and/or a software application. A cloud may refer to a private cloud, a public cloud, a hybrid cloud, and/or a community cloud. A cloud may be a shared pool of configurable computing resources, which may be public, private, semi-private, distributable, scaleable, flexible, temporary, virtual, and/or physical. A cloud or cloud service may be delivered over one or more types of network, e.g., a mobile communication network, and the Internet.

As used in this application, a cloud or a cloud service may include one or more of infrastructure-as-a-service ("IaaS"), platform-as-a-service ("PaaS"), software-as-a-service ("SaaS"), and/or desktop-as-a-service ("DaaS"). As a non-exclusive example, IaaS may include, e.g., one or more virtual server instantiations that may start, stop, access, and/or configure virtual servers and/or storage centers (e.g., providing one or more processors, storage space, and/or network resources on-demand, e.g., EMC and Rackspace). PaaS may include, e.g., one or more software and/or development tools hosted on an infrastructure (e.g., a computing platform and/or a solution stack from which the client can create software interfaces and applications, e.g., Microsoft Azure). SaaS may include, e.g., software hosted by a service provider and accessible over a network (e.g., the software for the application and/or the data associated with that software application may be kept on the network, e.g., Google Apps, SalesForce). DaaS may include, e.g., providing desktop, applications, data, and/or services for the user over a network (e.g., providing a multi-application framework, the applications in the framework, the data associated with the applications, and/or services related to the applications and/or the data over the network, e.g., Citrix). The foregoing is intended to be exemplary of the types of systems and/or methods referred to in this application as "cloud" or "cloud computing" and should not be considered complete or exhaustive.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

The term module, as used in the foregoing/following disclosure, may refer to a collection of one or more components that are arranged in a particular manner, or a collection of one or more general-purpose components that may be configured to operate in a particular manner at one or more particular points in time, and/or also configured to operate in one or more further manners at one or more further times. For example, the same hardware, or same portions of hardware, may be configured/reconfigured in sequential/parallel time(s) as a first type of module (e.g., at a first time), as a second type of module (e.g., at a second time, which may in some instances coincide with, overlap, or follow a first time), and/or as a third type of module (e.g., at a third time which may, in some instances, coincide with, overlap, or follow a first time and/or a second time), etc. Reconfigurable and/or controllable components (e.g., general purpose processors, digital signal processors, field programmable gate arrays, etc.) are capable of being configured as a first module that has a first purpose, then a second module that has a second purpose and then, a third module that has a third purpose, and so on. The transition of a reconfigurable and/or controllable component may occur in as little as a few nanoseconds, or may occur over a period of minutes, hours, or days.

In some such examples, at the time the component is configured to carry out the second purpose, the component may no longer be capable of carrying out that first purpose until it is reconfigured. A component may switch between configurations as different modules in as little as a few nanoseconds. A component may reconfigure on-the-fly, e.g., the reconfiguration of a component from a first module into a second module may occur just as the second module is needed. A component may reconfigure in stages, e.g., portions of a first module that are no longer needed may reconfigure into the second module even before the first module has finished its operation. Such reconfigurations may occur automatically, or may occur through prompting by an external source, whether that source is another component, an instruction, a signal, a condition, an external stimulus, or similar.

For example, a central processing unit of a personal computer may, at various times, operate as a module for displaying graphics on a screen, a module for writing data to a storage medium, a module for receiving user input, and a module for multiplying two large prime numbers, by configuring its logical gates in accordance with its instructions.

Such reconfiguration may be invisible to the naked eye, and in some embodiments may include activation, deactivation, and/or re-routing of various portions of the component, e.g., switches, logic gates, inputs, and/or outputs. Thus, in the examples found in the foregoing/following disclosure, if an example includes or recites multiple modules, the example includes the possibility that the same hardware may implement more than one of the recited modules, either contemporaneously or at discrete times or timings. The implementation of multiple modules, whether using more components, fewer components, or the same number of components as the number of modules, is merely an implementation choice and does not generally affect the operation of the modules themselves. Accordingly, it should be understood that any recitation of multiple discrete modules in this disclosure includes implementations of those modules as any number of underlying components, including, but not limited to, a single component that reconfigures itself over time to carry out the functions of multiple modules, and/or multiple components that similarly reconfigure, and/or special purpose reconfigurable components.

To the extent that formal outline headings are present in this application, it is to be understood that the outline headings are for presentation purposes, and that different types of subject matter may be discussed throughout the application (e.g., device(s)/structure(s) may be described under process(es)/operations heading(s) and/or process(es)/operations may be discussed under structure(s)/process(es) headings; and/or descriptions of single topics may span two or more topic headings). Hence, any use of formal outline headings in this application is for presentation purposes, and is not intended to be in any way limiting.

Throughout this application, examples and lists are given, with parentheses, the abbreviation "e.g.," or both. Unless explicitly otherwise stated, these examples and lists are merely exemplary and are non-exhaustive. In most cases, it would be prohibitive to list every example and every combination. Thus, smaller, illustrative lists and examples are used, with focus on imparting understanding of the claim terms rather than limiting the scope of such terms.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

Although user 105 is shown/described herein, e.g., in FIG. 1, and other places, as a single illustrated figure, those skilled in the art will appreciate that user 105 may be representative of one or more human users, robotic users (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") generally encompass active-state components and/or inactive-state components and/or standby-state components, unless context requires otherwise.

It is noted that "wearable computer" is used throughout this specification, and in the examples given, it is generally a wearable computer that captures images. However, this is merely for exemplary purposes. The same systems may apply to conventional digital cameras, and any other camera, including security cameras, surveillance cameras, motor vehicle mounted cameras, road/traffic cameras, cameras at automated teller machines, and the like.

Referring now to FIG. 1, in an embodiment, an entity, e.g., a user of a privacy beacon, e.g., user 2105, e.g., a person, e.g., "Jules Caesar," may be associated with a "Don't Capture Me" (hereinafter "DCM") privacy beacon, e.g., DCM Beacon 2110. In an embodiment, a DCM beacon may be active, e.g., may contain circuitry and be an active unit, e.g., something wearable, e.g., on a piece of clothing, or on a ring, or on a drone associated with the user. In an embodiment, the DCM beacon may be passive, e.g., it may be something that can be detected in the electromagnetic spectrum, or can be otherwise detected but does not contain any circuitry or advanced logic gates of its own. In an embodiment, the DCM beacon may be a combination of the two.

In an embodiment, a DCM beacon may be detectable by a machine or a human being (e.g., a stop sign painted on a user's forehead may be a DCM beacon). In an embodiment, a DCM beacon may be detectable by a particular type of machine, structure, or filter, and may be otherwise undetectable or difficult to detect through human senses. For example, in an embodiment, a DCM beacon may be seen using ultraviolet or infrared light, or a DCM beacon may emit light outside the visible spectrum. In an embodiment, a DCM beacon may be visible or detectable after a filter is applied, e.g., a DCM beacon may be visible after a red filter is applied, or after a transformation is applied to a captured image, e.g., a Fourier transformation.

In an embodiment, a DCM beacon may be detected optically. In another embodiment, a DCM beacon may be detected by sensing a different kind of wave emitted by a DCM beacon, e.g., a wave in the nonvisible electromagnetic spectrum, a sound wave, an electromagnetic wave, and the like. In an embodiment, a DCM beacon may use quantum entanglement (e.g., through use of an entanglement-based protocol, among others).

In an embodiment, a DCM beacon may transmit data, e.g., a terms of service for the user (e.g., user 2105) for which the DCM beacon (e.g., DCM beacon 2110) is associated or linked. In an embodiment, a DCM beacon may be encoded with a location of data, e.g., a web address of a server where terms of service for the user (e.g., user 2105) for which the DCM beacon (e.g., DCM beacon 2110) is associated.

In an embodiment, a DCM beacon may be provided by a drone, of any size, e.g., nanometers to full-sized aircraft, that is associated with the user.

In an embodiment, a DCM beacon may be provided by a piece of electronics that a user carries, e.g., a cellular telephone, tablet, watch, wearable computer, or otherwise.

In an embodiment, a DCM beacon may be embedded in the user, ingested by the user, implanted in the user, taped to the skin of the user, or may be engineered to grow organically in the user's body.

In an embodiment, a DCM beacon may be controlled by a magnetic field or other field emitted by a user, either through a user's regular electromagnetic field or through a field generated by a device, local or remote, associated with the user.

Referring again to FIG. 1, in an embodiment, a different user, e.g., a wearable computer user 3105, may have a wearable computer 3100. A wearable computer may be a pair of eyeglasses, a watch, jewelry, clothing, shoes, a piece of tape placed on the user's skin, it may be ingested by the user or otherwise embedded into the user's body. Wearable computer 3100 may be a piece of electronics carried by a user 3105. Wearable computer 3100 may not be a "wearable" computer in a traditional sense, but may be a laptop computer, tablet device, or smartphone carried by a user. In an embodiment, wearable computer 3100 may not be associated with a user at all, but may simply be a part of a surveillance system, e.g., a security camera, or a camera at an Automated Teller Machine ("ATM").

Wearable Computer that Captures the Image (FIGS. 1-I; 1-J, 1-N, 1-O).

Referring now to FIG. 1, e.g., FIG. 1-J, wearable computer 3100 may include a wearable computer image capturing device 3110, e.g., a lens. Wearable computer image capturing device 3110 may include functionality to capture images, e.g., an image sensor, e.g., a charge-coupled device ("CCM") or a complementary metal-oxide semiconductor ("CMOS"), an analog-to digital converter, and/or any other equipment used to convert light into electrons. Wearable computer image capturing device 3110 may capture the optical data, which may remain as light data, or may be converted into electrons through an image sensor, as raw data. This raw data, e.g., raw data 2200 may be captured by the optical image data acquiring module 3120 of wearable computer 3100. Optical image data acquiring module 3120 may be configured to acquire an image, e.g., an image of user 2105. As described above, a DCM beacon 2110 may be associated with user 2105. In an embodiment, at this point in the operation of wearable computer 3100, no processing has been performed on the raw image data 2200.

Although not pictured here, wearable computer image capturing device 3110 may also include circuitry to detect audio (e.g., a microphone) and/or video (e.g., the ability to capture frames above a certain rate of frames per second). This circuitry and its related explanation have been omitted to maintain simplicity of the drawing, however, through this application, "raw image data 2200" should be considered to also possibly include still pictures, video, and audio, in some embodiments.

Referring now to FIG. 1-I, in an embodiment, wearable computer 3100 then may transfer the raw/optical image data 2200 to an image path splitting module 3130. This splitting path may be optical, e.g., a set of mirrors/lenses, for the case in which raw image data 2200 is still in optical form, or digital, e.g., through use of known electrical signal splitters. Image path splitting module 3130 may be implemented as hardware, software, or a combination thereof.

Referring again to FIG. 1, e.g., FIG. 1-I, in an embodiment, the north (upper) branch, as illustrated in FIG. 1, transmits the raw image data 2200 to an image prior-to-processing encryption module 3150. Image prior-to-processing encryption module 3150 may receive the raw image data 2200. From there, image prior-to-processing encryption module 3150 may acquire an encryption key that is device-specific, e.g., wearable computer device specific encryption key 3182. In an embodiment, wearable computer device-specific encryption key 3182 may be stored in wearable computer device memory 3180, which also may include encrypted image storage 3184, and a wearable computer user-specific encryption key 3186. In another embodiment, device-specific encryption key 3182 may be retrieved from elsewhere, e.g., cloud storage. In another embodiment, device-specific encryption key 3182 may be generated in real time by the device. In another embodiment, device-specific encryption key 3182 may be generated in real time by the device based on random user input (e.g., the last five words spoken by the device and recorded).

In an embodiment, image prior-to-processing encryption module 3150 may generate encrypted image data 2210. Encrypted image data 2210 may be stored in encrypted image storage 3184 of wearable computer device memory 3180. In an embodiment, encrypted image data 2210 also may be transmitted to central server encrypted data and beacon metadata transmission module 3170.

Referring again to FIG. 1-I and FIG. 1-N, in an embodiment, the south (lower) branch, as illustrated in FIG. 1, may transmit the raw image data 2200 to a DCM beacon detecting module 3140. In an embodiment, DCM beacon detecting module 3140 may include one or more of optics-based DCM beacon detecting module 3142, which may be configured to detect the DCM beacon in an optical signal (e.g., light). In an embodiment, DCM beacon detecting module 3140 may include digital image processing-based DCM beacon detecting module 3144, which may be configured to detect the DCM beacon in a converted electron signal (e.g., data signal). In an embodiment, DCM beacon detecting module 3140 is configured to detect a presence or an absence of a DCM beacon, e.g., DCM beacon 2110, associated with the entity (e.g., user 2105, e.g., "Jules Caesar"), without performing any additional processing on the image, or releasing the image for other portions of wearable computer 3100 to use. In an embodiment, for example, raw image data 2200 is not stored in device memory of wearable computer 3100 in a form that is accessible to other applications and/or programs available to wearable computer 3100 or other computing devices that may communicate with wearable computer 3100. For example, a user 3105 of wearable computer 3100 may not, at this stage in processing, capture the raw data 2200 and upload it to a social networking site, e.g., Facebook. In an embodiment, DCM beacon detecting module 3140 may be implemented in hardware, which may prevent users or third parties from bypassing the DCM beacon detecting module 3140, without disassembling the device and physically altering the circuit/logic.

Referring now to FIG. 1-N, in an embodiment, the DCM beacon detecting module 3140 may detect the DCM beacon 2110. For example, in the exemplary embodiment shown in FIG. 1, DCM beacon detecting module 3140 may detect the DCM beacon 2110 that is associated with user 2105, e.g., Jules Caesar. Thus, DCM beacon detecting module 3140 now knows to lock the image data and prevent unencrypted image data from being accessed on the device. Although not shown in this example, if the DCM beacon had not been found, then in an embodiment, the image data 2200 would have been released for use by the device, e.g., for uploading to social network or cloud storage, for example.

In an embodiment, the detected DCM beacon 2110 associated with Jules Caesar may be transmitted to DCM beacon metadata generating module 3160. DCM beacon metadata generating module 3160 may generate metadata based on the detection of the beacon. The metadata may be as simple as "the image data contains a privacy beacon," e.g., Boolean data. In an embodiment, the metadata may be more complex, and may identify the user associated with the privacy beacon, e.g., the metadata may describe "A privacy beacon associated with Jules Caesar has been found in the image data." In another embodiment, the metadata may include the terms of service associated with the personality rights of Jules Caesar, an example of which terms of service will be provided in more detail herein.

In an embodiment, the detected DCM beacon 2110 may be very simple (e.g., optically detectable), and to obtain/generate metadata associated with the detected DCM beacon 2110, DCM beacon metadata generating module 3160 may include a DCM server contacting module 3162, which may contact one or more entities to obtain more information regarding the DCM beacon 2110. The DCM beacon metadata generating module 3160 may, in some embodiments, transmit the DCM beacon, or the image in which the DCM beacon was captured, to the external entity, in order to obtain more accurate data. For example, the DCM server contacting module 3162 may contact service term management server 5000, which may have DCM beacon registry 5010, which will be discussed in more detail further herein.

In an embodiment, DCM beacon metadata generating module 3160 may generate the DCM beacon metadata 2230, and transfer DCM beacon metadata 2230 to central server encrypted data and beacon metadata transmission module 3170.

Referring again to FIG. 1, e.g., FIG. 1-I, central server encrypted data and beacon metadata transmission module 3170 may receive the encrypted image data 2210 and the DCM beacon metadata 2230 (e.g., see FIG. 1-N). In an embodiment, central server encrypted data and beacon metadata transmission module 3170 may facilitate the transmission of encrypted image data 2210 and DCM beacon metadata 2230 to a server, e.g., wearable computer encrypted data receipt and determination server 4000, which will be discussed in more detail herein. In an embodiment, central server encrypted data and beacon metadata transmission module 3170 may include one or more of DCM beacon metadata transmission module 3172, which may be configured to transmit the DCM beacon metadata 2230, and encrypted data transmission module 3174, which may be configured to transmit the encrypted image data 2210.

Wearable Computer server (FIGS. 1-H, 1-G)

Referring again to FIG. 1, e.g., FIG. 1-H, in an embodiment, a system may include a wearable computer server, e.g., wearable computer encrypted data receipt and determination server 4000. In an embodiment, a wearable computer server may be provided by a manufacturer of the wearable device 3100. In an embodiment, a wearable computer server may be provided by a developer of one or more software applications for the wearable device 3100. In an embodiment, wearable computer server 4000 may not have a direct relationship with wearable device 3100 prior to receiving the encrypted image data and the DCM beacon metadata 2230, as will be discussed in more detail herein. In an embodiment, a wearable computer server 4000 may be implemented at a home computer of a user, for example, and may communicate only with wearable devices that are associated with that user. In another embodiment, a wearable computer server 4000 may communicate with many wearable devices 3100, which may or may not have some relationship. In an embodiment, wearable computer server 4000 may communicate with one or more wearable devices 3100 through use of a communication network, which may use any known form of device communication. In an embodiment, wearable computer server 4000 may be chosen by wearable device 3100, either due to proximity or due to one or more properties or characteristics of wearable computer server 4000. In an embodiment, wearable computer server 4000 may be free to agree or disagree to process DCM beacon and image data received from various wearable devices 3100. In an embodiment, wearable computer server 4000 may be distributed across many computers and/or servers.

In an embodiment, wearable computer encrypted data receipt and determination server 4000 may include an encrypted data and beacon metadata reception module 4100. Encrypted data and beacon metadata reception module 4100 may receive encrypted image data 2210 and DCM beacon metadata 2230 from wearable computer 3100, e.g., central server encrypted data and beacon metadata transmission module 3170. In an embodiment, encrypted data and beacon metadata reception module 4100 may include a DCM beacon metadata reception module 4104. DCM beacon metadata reception module 4104 may be configured to acquire a privacy metadata, e.g., DCM beacon metadata 2230, corresponding to a detection of a DCM beacon, e.g., DCM beacon 2110, in the one or more images captured by the image capture device, e.g., wearable computer 3100. In an embodiment, encrypted data and beacon metadata reception module 4100 may include encrypted data reception module 4102. In an embodiment, encrypted data reception module 4102 may be configured to acquire one or more of a block of encrypted data corresponding to one or more images that previously have been encrypted, e.g., encrypted image data 2210. In an embodiment, encrypted data module 4102 may transmit, or facilitate the transmission of, encrypted image data 2210 to an entity that will perform a secondary detection of the privacy beacon, e.g., DCM beacon detection test duplicating server 4800, which will be discussed in more detail further herein.

Referring again to FIG. 1-H, in an embodiment, encrypted data and beacon metadata reception module 4100 may transmit the received DCM beacon metadata to DCM beacon metadata reading module 4120. If the DCM beacon metadata 2230 indicates that a DCM beacon was not found, then, in an embodiment, processing may transfer to module 4220, which will be discussed in more detail further herein. In the example shown in FIG. 1, the DCM beacon 2110 associated with Jules Caesar was found, and the DCM beacon metadata 2230 indicates this state to DCM beacon metadata reading module 4120.

Referring now to FIG. 1-G, in an embodiment, when the presence of the DCM beacon 2110 is determined through the DCM beacon metadata, e.g., DCM beacon metadata 2230, then a DCM beacon TOS retrieval module 4122 may retrieve term data from a location, which may be a remote location, e.g., a DCM beacon management server 5100, which will be discussed in more detail further herein. In an embodiment, DCM beacon TOS retrieval module 4122 may retrieve term data that includes a terms of service that specifies one or more conditions in which the image containing the DCM beacon 2110 may be used. In an embodiment, the TOS may also specify one or more penalties for using the personality rights that may be associated with the image, without acquiring permission or paying a licensing fee prior to releasing or utilizing the image. In an embodiment, the TOS also may include language forcing the entity that viewed the privacy beacon to accept the TOS upon viewing of the beacon. The TOS will be described in more detail with respect to modules 5000 and 5100.

Referring again to FIG. 1-G, in an embodiment, wearable computer encrypted data receipt and determination server 4000 also may include an encrypted data value calculation module 4130. Encrypted data value calculation module 4130 may use one or more algorithms or other methods of inducing or deducing an estimate regarding how much advertising or other revenue may be garnered by using the images containing the entity associated with the privacy beacon. For example, in an embodiment, encrypted data value calculation module 4130 may include a facial recognition program to recognize the person or persons associated with the beacon. In another embodiment, however, this may not be necessary, because the DCM beacon metadata and/or the ToS may identify the person. In an embodiment, encrypted data value calculation module 4130 may use various heuristics to calculate ad revenue, e.g., based on models used by popular advertising methods, or based on prior releases of images of the person associated with the DCM beacon 2110. In an embodiment, module 4130 may use social networking to acquire a focus group and test the image on the focus group, in order to assist in revenue determination. For example, in the example shown in FIG. 1, the image in question is of Jules Caesar, who is the reclusive leader of the Roman Empire, and so the ad revenue generated from having an actual picture of Jules Caesar, or a video of Jules Caesar drinking a mead-and-tonic, may have high net value.

Referring again to FIG. 1-G, in an embodiment, the ToS acquired from DCM beacon TOS retrieval module 4122, and the encrypted data valuation calculated from encrypted data value calculation module 4130 may be sent to release of encrypted data determination module 4140. Release of encrypted data determination module 4140 may make a determination, at least partly based on the acquired metadata, and at least partly based on a value calculation based on the representation of the feature of the person associated with the DCM beacon 2110 (e.g., Jules Caesar drinking a mead-and-tonic). That determination may be regarding whether to allow an action, e.g., processing, decryption, distribution, editing, releasing, sharing, saving, posting to a social network, and the like, of the image. In an embodiment, the decision may be based on whether the potential advertising revenue outweighs the potential damages retrieved from the terms of service. In an embodiment, this calculation may be a strict number comparison (e.g., is "revenue" greater than "damages"). In an embodiment, the calculation may include more complex factors, e.g., likelihood of success on a damages claim, likelihood that revenues will increase, secondary revenue factors from increased traffic and/or brand awareness, and the like. In addition, in an embodiment, the comparison may not be strictly less than/greater than, e.g., in a risk adverse algorithm, if the numbers are close, then the determination may be to not release the encrypted data, even if the potential ad revenue is calculated as larger than the potential damages by a small amount.

Referring again to FIG. 1-G, if the determination made by release of encrypted data determination module 4140 is "NO," e.g., the potential revenue is less than the potential damages, then the encrypted data 2210 is moved to an encrypted data holding and/or quarantine module 4150. In an embodiment, the data from encrypted data holding and/or quarantine module 4150 is deleted after a predetermined time period, e.g., seven days. In an embodiment, the data is simply stored, encrypted and locked away. In an embodiment, the encrypted image data 2210 may be transmitted to an ad replacement value determination server 4400, shown in FIG. 1-F, which will be discussed in more detail herein.

Referring again to FIG. 1-G, if the determination made by release of encrypted data determination module 4140 is "YES," e.g., the potential revenue is more than the potential damages, then the encrypted data 2210 is transferred to encrypted data decryption enabling module 4152, shown in FIG. 1-H. In an embodiment, encrypted data decryption enabling module 4152 may be configured to determine whether to perform decryption of at least a portion of the encrypted data 2210 based on the result from module 4140 by transmitting the encrypted image data 2210 to wearable computer acquired encrypted data decryption and re-encryption server 4200, which will be discussed in more detail.

Wearable Computer Acquired Encrypted Data Decryption and Re-Encryption Server 4200 (FIGS. 1-L and 1-M)

Referring now to FIG. 1-M, in an embodiment, the system may include wearable computer acquired encrypted data decryption and re-encryption server 4200. In an embodiment, wearable computer acquired encrypted data decryption and re-encryption server 4200 may be a portion of wearable computer server 4000. In an embodiment, however, wearable computer acquired encrypted data decryption and re-encryption server 4200 may be a different server than wearable computer server 4000, and may be controlled by a different entity. For example, in an embodiment, the owner of the wearable computer 3100 hardware may control wearable computer server 4000. After the decision is made to decrypt the data at the wearable computer server 4000, control may be handed off to a different server in control of software on the wearable computer, e.g., software that handles pictures taken by the wearable computer 3100. In another embodiment, wearable computer acquired encrypted data decryption and re-encryption server 4200 may be controlled by a social networking/media site, e.g., Facebook, who may have an agreement to acquire the image data at the same time as the device.

Referring again to FIG. 1-M, in an embodiment, wearable computer acquired encrypted data decryption and re-encryption server 4200 may include encrypted data acquiring module 4210, which may acquire the encrypted image data 2210 from the wearable computer server 4000. In an embodiment, wearable computer acquired encrypted data decryption and re-encryption server 4200 may include a privacy metadata acquiring module 4220, which may acquire privacy metadata from module 4120, if the DCM beacon was never detected and the image is free to be used. For example, in an embodiment, image data with no DCM beacon may be treated similarly to image data with a DCM beacon, but that has been determined to have an advertising value greater than a potential damages value. For example, in an embodiment, image data with no DCM beacon may be treated as image data with potential damages value of zero.

Referring again to FIG. 1-M, in an embodiment, wearable computer acquired encrypted data decryption and re-encryption server 4200 may include data indicating profitability of image with DCM beacon acquiring module 4230, which may receive data from module 4150 of wearable computer server 4000 indicating that the image should be decrypted regardless of the DCM beacon because of its potential profitability.

Referring again to FIG. 1-M, in an embodiment, wearable computer acquired encrypted data decryption and re-encryption server 4200 may include image data decryption preparation module 4240, which may receive data from one or more of data indicating profitability of image with DCM beacon acquiring module 4230, encrypted data acquiring module 4210, and privacy metadata acquiring module 4220. In an embodiment, module 4240 may prepare the image or images for decryption, e.g., perform pre-processing, check image integrity, reconfirm the privacy beacon calculations, and the like.

Referring now to FIG. 1-L, wearable computer acquired encrypted data decryption and re-encryption server 4200 may include device-specific key retrieving module 4250 which may retrieve the device-specific key used to encrypt/decrypt the encrypted image data 2210. In an embodiment, device-specific key retrieving module 4250 may include a device-specific key retrieving from device module 4252, which may be configured to retrieve the device-specific key directly from the device that encrypted the image, e.g., wearable computing device 3100. In an embodiment, device-specific key retrieving module 4250 may include a device-specific key retrieving from server module 4254, which may be configured to retrieve the device-specific key from a server, e.g., from wearable computer encrypted data receipt and determination server 400, or from DCM beacon detection test duplicating server 4800, or from another server not depicted in FIG. 1.

Referring again to FIG. 1-L, in an embodiment, image data decryption with device-specific key module 4260 may take the device-specific key retrieved from module 4250, and apply it to the encrypted image data 2210 to generate decrypted image data 2280, as shown by the icon with the unlocked lock in FIG. 1-L.

Referring again to FIG. 1-L, the image data has been decrypted. However, to protect security, in some embodiments, the data may be re-encrypted with a key that is not tied to a specific device, but may be tied to a specific user of the device, e.g., the key may be related to user 3105, rather than wearable device 3100. This embodiment will be described in more detail herein. This embodiment allows the re-encrypted data to be securely sent to a different device belonging to the user, e.g., a smart TV, a home computer, a video game system, or another portable electronic device, e.g., a cellular smartphone. In an embodiment, the re-encryption with a user specific key may be omitted.

In an embodiment, wearable computer acquired encrypted data decryption and re-encryption server 4200 may include a user-specific key retrieving module 4270, that may be configured to obtain, through generation, acquisition, reception, or retrieval, of a user-specific encryption key. The user-specific encryption key may be delivered to image data encrypting with user-specific key module 4280, which, in an embodiment, also may receive the decrypted image data 2280.

Referring again to FIG. 1-L, in an embodiment, image data encrypting with user-specific key module 4280 may be configured to encrypt the block of decrypted data through use of a unique user code that is related to the user 3105 of the wearable device 3100. The again-encrypted image data then may be transferred to encrypted image data transmitting module 4290. In an embodiment, encrypted image data transmitting module 4290 may transmit the image data that has been encrypted with a user-specific key to one or more other devices, which will be discussed in more detail herein.

Computing Device that Receives the Image Data (FIGS. 1-S and 1-T).

Referring now to FIG. 1-S, in an embodiment, the system may include a computing device 3200, which may be a wearable computer or other device. In an embodiment, computing device 3200 may be the same as wearable computer 3100, but it does not necessarily have to be the same. In an embodiment, computing device 3200 receives the image data. In an embodiment, as described above, the received image data has been encrypted with a user-specific code. Thus, in such an embodiment, computing device 3200 may be associated with user 3105 of the wearable computing device 3100. For example, a user 3105 may have a wearable computing device 3100 that captures images of people. After processing those images at the server 4000, for example, the images, which, in some embodiments, now may be encrypted with a user-specific code, may be transmitted to computing device 3200, which may be the user 3105's home media center back at her house. In another embodiment, computing device 3200 may be user 3105's laptop device, or user 3105's smartphone or tablet device. And, as previously mentioned, in another embodiment, computing device 3200 may simply be the user 3105's wearable computing device 3100 that captured the images originally.

In an embodiment, the computing device 3200 and the wearable computing device 3100 pictured in FIG. 1 are the same device. In an embodiment, the encryption, transmission to a server, decryption, and transmission back, may occur invisibly to the user 3105, e.g., to the user 3105 of the wearable computing device 3100, the images are available to her after they are recorded and saved, with a delay that is not specified. In some embodiments, the user 3105 may not be informed of the path taken by the captured image data.

In an embodiment, wearable computing device 3100 may include an encrypted image data receiving module 3210 configured to acquire the data encrypted by the user-specific key code from encrypted image data transmitting module 4290 of wearable computer 4200. In an embodiment, computing device 3200 may include image data release verification acquiring module 3220, which may be configured to determine that the images received from the encrypted image data transmitting module 4290 of wearable computer 4200 have been approved for release and/or use. In an embodiment, the determination may be made based on the ground that the images are encrypted with a user-specific key rather than a device specific key, if it is possible to tell from the encrypted information (e.g., in some embodiments, different types of encryption that may leave a different "signature" may be used). In an embodiment, the determination may be made by again analyzing the image data. In an embodiment, image data release verification acquiring module 3220 may include encrypted image data analysis module 3222 which may perform analysis on the encrypted image data, including, but not limited to, reading metadata attached to the encrypted image data, to verify that the received encrypted image data is approved for release and/or processing. In an embodiment, image data release verification acquiring module 3220 may include release verification data retrieving module 3224, which may be configured to obtain release verification data from the device that performed the verification, e.g., server 4000, or from a different device.

Referring now to FIG. 1-T, in an embodiment, computing device 3200 may include device memory 3280. Device memory 3280 may store the wearable computer user-specific encryption/decryption key 3286, which may be used to decrypt the received encrypted image data. In an embodiment, device memory 3280 also may include encrypted image storage 3284, which may include one or more image data, which may be encrypted.

Referring again to FIG. 1-S, in an embodiment, computing device 3200 may include user-specific decryption key obtaining module 3230, which may obtain the user-specific encryption/decryption key. In an embodiment, user-specific decryption key obtaining module 3230 may include encryption/decryption key external source obtaining module 3232, which may be configured to obtain the encryption/decryption key from an external source, e.g., server 4000. In an embodiment, user-specific decryption key obtaining module may include encryption/decryption key memory retrieving module 3234, which may be configured to retrieve the encryption/decryption key from device memory 3280 of computing device 3200.

Referring again to FIG. 1-S, in an embodiment, computing device 3200 may include image decryption module 3240, which may use the user-specific encryption/decryption key to decrypt the image data. In an embodiment, the decrypted image data then may be sent to decrypted image release module 3250, where the clear image data may be accessed by the device, and transmitted to other locations, posted to social networking or cloud storage, be shared, manipulated, saved, edited, and otherwise have open access to the decrypted image data.

Ad Replacement Value Determination Server (FIG. 1-F).

Referring back to FIG. 1-G, as discussed briefly above, release of encrypted data determination module 4140 may determine not to release the encrypted data, which may be stored in an encrypted data holding and/or quarantine module 4150. In an embodiment, the encrypted data and the DCM beacon may be transmitted to an ad replacement value determination server, as shown in FIG. 1-F.

Referring now to FIG. 1-F, in an embodiment, the system may include an ad replacement value determination server 4400. Ad replacement value determination server 4400 may take the encrypted image data and determine if there is a way to monetize the images such that the monetization may outweigh the potential damages. For example, ad replacement value determination server 4400 may calculate potential earnings and limited damages liability, if, for example, an entity with the DCM beacon, e.g., Jules Caesar, is instead shown with an advertisement where his head would normally be. In an embodiment, ad replacement value server may be controlled by a different entity than server 4000, and there may be an agreement in place for the ad replacement value determination server 4400 to receive encrypted data for which the server 4000 decides it does not want to allow distribution. For example, ad replacement value server 4400 may be run by a smaller social networking site that cares less about potential damages because they have fewer assets, or are less risk-averse. In another embodiment, ad replacement value determination server 4400 may be part of server 4000, and it may be a practice of server 4000 to send an encrypted image for further analysis after the server 4000 determines that the image is not likely to be profitable without modification.

Referring again to FIG. 1-F, in an embodiment, ad replacement value determination server 4400 may include a DCM beacon metadata reception module 4410 configured to receive the DCM beacon metadata from the wearable computer encrypted data receipt and determination server 4000. In an embodiment, ad replacement value determination server 4400 may include an encrypted data reception module 4420 that may be configured to receive the encrypted data from the wearable computer encrypted data receipt and determination server 4000, e.g., from the encrypted data holding module 4150.

Referring again to FIG. 1-F, in an embodiment, ad replacement value determination server 4400 may include a DCM beacon term acquiring module 4430, which may acquire one or more terms of service from service term management server 5000 and/or DCM beacon management server 5100, similarly to DCM beacon terms-of-service retrieval module 4122 of wearable computer encrypted data receipt and determination server 4000. In an embodiment, DCM beacon term acquiring module may include DCM beacon remote retrieval module 4432. In an embodiment, DCM beacon term acquiring module may be configured to retrieve term data from a remote location, e.g., service term management server 5000, which term data may correspond to a term of service associated with a release of image data that includes the person with which the DCM beacon is associated, e.g., Jules Caesar.

Referring again to FIG. 1-F, in an embodiment, ad replacement value determination server 4400 may include an encrypted data value calculation with standard ad placement module 4440. In an embodiment, standard ad placement module 4440 may perform a similar calculation as encrypted data value calculation module 4130 of wearable computer encrypted data receipt and determination server 4000. In an embodiment, for example, encrypted data value calculation with standard ad placement module 4440 may calculate whether an estimated advertising revenue from one or more advertisement images placed in the encrypted image data will be greater than an estimated potential liability for distribution of the images. In an embodiment, the estimated potential liability is based at least in part on the terms of service which may be retrieved by the DCM beacon term acquiring module 4430.

Referring again to FIG. 1-F, in an embodiment, ad replacement value determination server 4400 may include encrypted image data modification with intentionally obscuring ad placement module 4450. In an embodiment, encrypted image data modification with intentionally obscuring ad placement module 4450 may be configured to modify the encrypted image data (e.g., which, in some embodiments, may require limited decryption and then re-encryption) by replacing one or more areas associated with the entity related to the DCM beacon, e.g., Jules Caesar's face (e.g., or in another embodiment, Jules Caesar's genitalia, if, e.g., it was a naked picture of Jules Caesar), with one or more advertisement images.

Referring again to FIG. 1-F, in an embodiment, ad replacement value determination server 4400 may include modified encrypted data value calculation with intentionally obscuring ad placement module 4460. In an embodiment, modified encrypted data value calculation with intentionally obscuring ad placement module 4460 may be configured to calculate an estimated advertising revenue from the modified image data. In an embodiment, the modified image data then may be distributed through modified encrypted data distributing module 4470.

Tracking Server (FIG. 1-E).

Referring now to FIG. 1-E, in an embodiment, a system may include tracking server 9000. Tracking server 9000 may be configured to log use of a "Don't Capture Me" (hereinafter "DCM") beacon by one or multiple users. In an embodiment, tracking server 9000 may track active DCM beacons, e.g., beacon 2110, through communication with said one or more beacons. In an embodiment, tracking server may track DCM beacons through other means, e.g., social networking and the like. The DCM beacon does not need to be an active DCM beacon in order to be tracked by tracking server 9000.

In an embodiment, tracking server 9000 may include deployment of one or more active and/or passive DCM beacons monitoring module 9010. Deployment of one or more active and/or passive DCM beacons monitoring module 9010 may include one or more of active DCM beacon monitoring module 9012 and passive DCM beacon monitoring/data gathering module 9020. In an embodiment, passive DCM beacon monitoring/data gathering module 9020 may gather data about the passive DCM beacon by observing it, e.g., through satellite video capture, through other image capturing devices, e.g., phone cameras, security cameras, laptop webcams, and the like, or through other means. In an embodiment, passive DCM beacon monitoring/data gathering module 9020 may include user input module 9022, which may receive an indication from a user, e.g., a switch flipped on a user's cell phone, indicating that the user is using the DCM beacon. In an embodiment, passive DCM beacon monitoring/data gathering module 9020 may include a device status module which tracks a device with which the passive DCM beacon is associated, e.g., a wearable computer that is a shirt, or a cellular phone device in the pocket. In an embodiment, passive DCM beacon monitoring/data gathering module 9020 may include a social media monitoring module that monitors posts on social networking sites to determine if the DCM beacon is being used, and a location of the user.

Referring again to FIG. 1-E, in an embodiment, tracking server 9000 may include a record of the deployment of the one or more active and/or passive DCM beacons storing module 9030, which may be configured to store a record of usage and/or detection logs of the DCM beacons that are monitored. In an embodiment, record of the deployment of the one or more active and/or passive DCM beacons storing module 9030 may store a record of the deployment in deployment record storage 9032. In an embodiment, record of the deployment of the one or more active and/or passive DCM beacons storing module 9030 may transmit all or portions of the recorded record through record of the deployment of one or more active and/or passive DCM beacons transmitting module 9040.

Service Term Management Server 5000 (FIG. 1-A)

Referring now to FIG. 1-A, in an embodiment, the system may include service term management server 5000, which may manage terms of service that are associated with a DCM beacon and/or a person. In an embodiment, service term management server 5000 may include a DCM beacon registry 5010. In an embodiment, the DCM beacon registry 5010 may include one or more of a user's name, e.g., Jules Caesar, a terms of service associated with Jules Caesar, which may be custom to Jules Caesar, or may be a generic terms of service that is used for many persons, and various representations of portions of Jules Caesar, e.g., likeness, handprint, footprint, voiceprint, pictures of private areas, and the like.

Referring again to FIG. 1-A, in an embodiment, the system may include a terms of service generating module 5020. Terms of service generating module 5020 may create a terms of service for the user Jules Caesar. A sample Terms of Service is shown in FIG. 1-A and is reproduced here. It is noted that this is a condensed Terms of Service meant to illustrate an exemplary operation of the system in the environment, and accordingly, several necessary legal portions may be omitted. Accordingly, the example Terms of Service should not be considered as a binding, legal document, but rather a representation of what the binding, legal document would look like, that would enable one skilled in the art to create a full Terms of Service.

Exemplary Terms of Service for User 2105 (Jules Caesar)

1. By capturing an image of any part of the user Jules Caesar (hereinafter "Image"), or providing any automation, design, resource, assistance, or other facilitation in the capturing of the Image, you agree that you have captured these Terms of Service and that you acknowledge and agree to them. If you cannot agree to these Terms of Service, you should immediately delete the captured Image. Failure to do so will constitute acceptance of these Terms of Service.

2. The User Jules Caesar owns all of the rights associated with the Image and any representation of any part of Jules Caesar thereof;

3. By capturing the Image, you agree to provide the User Jules Caesar just compensation for any commercialization of the User's personality rights that may be captured in the Image.

4. By capturing the Image, you agree to take all reasonable actions to track the Image and to provide an accounting of all commercialization attempts related to the Image, whether successful or not.

5. By capturing the Image, you accept a Liquidated Damages agreement in which unauthorized use of the Image will result in mandatory damages of at least, but not limited to, $1,000,000.

In an embodiment, terms of service generating module may include one or more of a default terms of service storage module 5022, a potential damage calculator 5024, and an entity interviewing for terms of service generation module. In an embodiment, default terms of service storage module 5022 may store the default terms of service that are used as a template for a new user, e.g., when Jules Caesar signs up for the service, this is the terms of service that is available to him. In an embodiment, potential damage calculator 5024 may determine an estimate of how much in damages that Jules Caesar could collect for a breach of his personality rights. In an embodiment, for example, potential damage calculator may search the internet to determine how much Jules Caesar appears on social media, blogs, and microblog (e.g., Twitter) accounts. In an embodiment, entity interviewing for terms of service generation module 5026 may create an online questionnaire/interview for Jules Caesar to fill out, which will be used to calculate potential damages to Jules Caesar, e.g., through determining Jules Caesar's net worth, for example.

In an embodiment, service term management server 5000 may include terms of service maintenance module 5030, which may maintain the terms of service and modify them if, for example, the user becomes more popular, or gains a larger online or other presence. In an embodiment, terms of service maintenance module 5030 may include one or more of a social media monitoring module 5042, that may search social networking sites, and an entity net worth tracking module 5034 that may have access to the entity's online bank accounts, brokerage accounts, property indexes, etc., and monitor the entity's wealth.

In an embodiment, serviced term management server 5000 may include a use of representations of an entity detecting module 5040. In an embodiment, use of representations of an entity detecting module 5040 may include one or more of a social media monitoring module 5042, a public photo repository monitoring module 5044, and a public blog monitoring module 5046. In an embodiment, use of representations of an entity detecting module 5040 may track uses of representations, e.g., images, of the user Jules Caesar, to try to detect violations of the terms of service, in various forums.

DCM Beacon Management Server 5100 (FIG. 1-C)

Referring now to FIG. 1-C, in an embodiment, the system may include a DCM beacon management server 5100, which may be configured to manage the DCM beacon associated with a user, e.g., DCM beacon 2110 for user 2105, e.g., Jules Caesar. In an embodiment, DCM beacon management server 5100 and service term management server 5000 may be the same server. In another embodiment, DCM beacon management server 5100 and service term management server 5000 may be hosted by different entities. For example, a specialized entity may handle the terms of service generation, e.g., a valuation company that may be able to determine a net "social network" worth of a user, e.g., Jules Caesar, and use that to fashion the terms of service.

Referring again to FIG. 1-C, in an embodiment, DCM beacon management server 5100 may include DCM beacon communication with entity wanting to avoid having their image captured module 5110. DCM beacon communication with entity wanting to avoid having their image captured module 5110 may be configured to communicate with a user, e.g., user 2105, e.g., Jules Caesar, and may handle the creation, generation, maintenance, and providing of the DCM beacon 2110 to Jules Caesar, whether through electronic delivery or through conventional delivery systems (e.g., mail, pickup at a store, etc.). In an embodiment, DCM beacon communication with entity wanting to avoid having their image captured module 5110 may include one or more of DCM beacon transmission module 5112, DCM beacon receiving module 5114, and DCM beacon generating module 5116.

In an embodiment, DCM beacon management server 5100 may include entity representation acquiring module 5120. Entity representation acquiring module 5100 may be configured to receive data regarding one or more features of the user that will be associated with the DCM beacon. For example, the user might upload pictures of his body, face, private parts, footprint, handprint, voice recording, hairstyle, silhouette, or any other representation that may be captured and/or may be deemed relevant.

In an embodiment, DCM beacon management server 5100 may include DCM beacon association with one or more terms of service and one or more entity representations module 5130. In an embodiment, DCM beacon association with one or more terms of service and one or more entity representations module 5130 may be configured to, after generation of a DCM beacon, obtain a terms of service to be associated with that DCM beacon. In an embodiment, the terms of service may be received from service term management server 5000.

In an embodiment, DCM beacon management server 5100 may include a DCM beacon capture detecting module 5140. DCM beacon capture detection module 5140 may detect when a DCM beacon is captured, e.g., if it is an active beacon, or it may receive a notification from various servers (e.g., server 4000) and/or wearable devices (e.g., wearable device 3100) that a beacon has been detected, if it is a passive DCM beacon.

In an embodiment, when a DCM beacon is detected, DCM beacon management server 5100 may include terms of service associated with DCM beacon distributing module, which may be configured to provide the terms of service associated with the DCM beacon to an entity that captured the image including the DCM beacon, e.g., to module 4122 of wearable computer encrypted data receipt and determination server 4000, or DCM beacon remote retrieval module 4430 of ad replacement value determination server 4400, for example.

Wearable Computer with Optional Paired Personal Device 3300 (FIGS. 1-Q and 1-R)

Referring now to FIG. 1-R, in an embodiment, the system may include a wearable computer 3300. Wearable computer 3300 may have additional functionality beyond capturing images, e.g., it may also store a user's contact list for emails, phone calls, and the like. In another embodiment, wearable computer 3300 may be paired with another device carried by a user, e.g., the user's smartphone device, which stores the user's contact list. As will be described in more detail herein, wearable computer 3300 operates similarly to wearable computer 3100, except that entities with DCM beacons are obscured, unless they have a preexisting relationship with the user. It is noted that DCM beacon detection and encryption may operate similarly in wearable computer 3300 as in wearable computer 3100, and so substantially duplicated parts have been omitted.

Referring again to FIG. 1-R, in an embodiment, wearable computer 3300 may include an image capturing module 3310, which may capture an image of Jules Caesar, who has DCM beacon "A", Beth Caesar, who has DCM beacon "B", and Auggie Caesar, who has no DCM beacon. In an embodiment, wearable computer 3300 may include an image acquiring module 3320, which may be part of image capturing module 3310, to acquire one or more images captured by an image capture device, e.g., the image of Jules Caesar, Beth Caesar, and Auggie Caesar.

In an embodiment, wearable computer 3300 may include an entity identification module 3330, which may perform one or more recognition algorithms on the image in order to identify persons in the image. Entity identification module may use known facial recognition algorithms, for example, or may ask the user for input, or may search the internet for similar images that have been identified, for example.

Referring again to FIG. 1-R, in an embodiment, wearable computer 3300 may include preexisting relationship data retrieval module 3340, which may retrieve names of known persons, e.g., from a device contact list, e.g., device contact list 3350. In the example shown in FIG. 1, Jules Caesar is in the contact list of the device 3300. It is noted that the device contact list 3350 may be stored on a different device, e.g., the user's cellular telephone.

Referring now to FIG. 1-Q, in an embodiment, wearable computer 3300 may include data indicating an identified entity from the image data has a preexisting relationship obtaining module 3360, which, in an embodiment, may obtain data indicating that one of the entities recorded in the image data (e.g., Jules Caesar) is in the user's contact list.

Referring again to FIG. 1-Q, in an embodiment, wearable computer 3300 may include entities with preexisting relationship marking to prevent obfuscation module 3370. In an embodiment, entities with preexisting relationship marking to prevent obfuscation module 3370 may attach a marker to the image, e.g., a real marker on the image or a metadata attachment to the image, or another type of marker, that prevents obfuscation of that person, regardless of DCM beacon status, because they are in the user's contact list.

Referring again to FIG. 1-Q, in an embodiment, wearable computer 3300 may include unknown entities with DCM beacon obscuring module 3380, which may obfuscate any of the entities in the image data that have a DCM beacon and are not in the contact list. For example, in the example shown in FIG. 1, Beth Caesar's image is obscured, e.g., blurred, blacked out, covered with advertisements, or the like, because she has a DCM beacon associated with her image, and because she is not in the user's contact list. Jules Caesar, on the other hand, is not obscured because a known entity marker was attached to his image at module 3370, because Jules Caesar is in the contact list of an associated device of the user. Auggie Caesar is not obscured regardless of contact list status, because there is no DCM beacon associated with Auggie Caesar.

Referring again to FIG. 1-Q, after the image is obscured, obscured image 3390 of wearable computer 3300 may release the image to the rest of the device for processing, or to another device, the Internet, or cloud storage, for further operations on the image data.

Active DCM Beacon 6000 (FIGS. 1-P and 1-K).

Referring now to FIG. 1-P, in an embodiment, a user 2107 may be associated with an active DCM beacon 2610, which will be discussed in more detail herein. The word "Active" in this context merely means that the DCM beacon has some form of circuitry or emitter.

Referring now to FIG. 1-K, in an embodiment, the system may include an active DCM beacon 6000, which may show an active DCM beacon, e.g., active DCM beacon 2610, in more detail. In an embodiment, beacon 6000 may include DCM beacon broadcasting module 6010. In an embodiment, DCM beacon broadcasting module 6010 may broadcast a privacy beacon associated with at least one user, e.g., user 2107, from at or near the location of user 2107. The beacon may be detected by an image capturing device when the user is captured in an image.

Referring again to FIG. 1-K, in an embodiment, the beacon 6000 may include an indication of DCM beacon detection module 6020, which may detect, be informed of, or otherwise acquire an indication that the active DCM beacon has been captured by an image capturing device. In an embodiment, indication of DCM beacon detection module 6020 may include one or more of DCM beacon scanning module 6022, which may scan nearby devices to see if they have detected the beacon, and DCM beacon communications handshake module 6024, which may establish communication with one or more nearby devices to determine if they have captured the beacon.

Referring again to FIG. 1-K, in an embodiment, beacon 6000 may include term data broadcasting module 6030, which may broadcast, or which may order to be broadcasted, term data, which may include the terms of service. In an embodiment, term data broadcasting module 6030 may include one or more of a substantive term data broadcasting module 6032, which may broadcast the actual terms of service, and pointer to term data broadcasting module 6034, which may broadcast a pointer to the terms of service data that a capturing device may use to retrieve the terms of service from a particular location.

DCM Beacon Test Duplicating Sever 4800 (FIGS. 1-C and 1-D)

Referring now to FIG. 1-C, in an embodiment, the system may include a DCM beacon test duplicating server 4800. In an embodiment, the DCM beacon test duplicating server 4800 may take the image data, and perform the test for capturing the beacon again, as a redundancy, as a verification, or as a protection for wearable computer server 4000. In an embodiment, DCM beacon test duplicating server 4800 may be a part of wearable computer server 4000. In another embodiment, DCM beacon test duplicating server 4800 may be separate from wearable computer server 4000, and may be controlled by a different entity, e.g., a watchdog entity, or an independent auditing agency.

Referring again to FIG. 1-C, in an embodiment, DCM beacon test duplicating server 4800 may include encrypted data reception for secondary DCM beacon detection module 4810, which may acquire the encrypted image data containing the user, e.g., user 2105, e.g., Jules Caesar, and the associated DCM beacon, e.g., DCM beacon 2110.

Referring again to FIG. 1-C, in an embodiment, DCM beacon test duplicating server 4800 may include a device-specific key retrieving module 4820, which may retrieve the device-specific key, e.g., from wearable computer device 3100, or from wearable computer server 4000. In an embodiment, DCM beacon test duplicating server 4800 may include image data decryption with device-specific key module 4830, which may apply the device-specific key obtained by device-specific key retrieving module 4820, and apply it to the encrypted image data, to generate decrypted image data.

Referring again to FIG. 1-C, in an embodiment, the unencrypted image data may be sent to DCM beacon detecting module 4840 of DCM beacon test duplicating server 4800. If the raw image data was optical in its original form, then it may be reconverted to optical (e.g., light) data. In an embodiment, DCM beacon detecting module 4840 may perform a detection for the DCM beacon, as previously described. In an embodiment, DCM beacon detecting module 4840 may include one or more of an optics-based DCM beacon detecting module 4842 and a digital image processing-based DCM beacon detecting module 4844.

Referring now to FIG. 1-D, after the test for detecting the DCM beacon 2220 (which may be the same as the DCM beacon 2210, but is detected at a different place, so a different number has been assigned), DCM beacon detection at duplicating sever result obtaining module 4850 may obtain the result of the detection performed at DCM beacon test duplicating server 4800. Similarly, DCM beacon detection at device result obtaining module 4860 may obtain the result from the DCM beacon detection performed at wearable computer device 3100. The results from module 4850 and 4860 may be stored at DCM beacon test result storage and logging module 4870 of DCM beacon test duplicating server 4800.

Referring again to FIG. 1-D, the test results from DCM beacon test duplicating server 4800 and from wearable computer 3100 may be stored at DCM beacon test result storage and logging module 4870, and such results may be kept for a predetermined length of time. In an embodiment, the results may be transmitted to a requesting party using DCM beacon test result transmitting module 4880.

Referring again to the system, in an embodiment, a computationally-implemented method may include acquiring an image, said image including at least one representation of a feature of at least one entity, detecting a presence of a privacy beacon associated with the at least one entity from the acquired image, without performance of a further process on the acquired image, encrypting the image using a unique device code prior to performance of one or more image processes other than privacy beacon detection, said unique device code unique to an image capture device and not transmitted from the image capture device, and facilitating transmission of the encrypted image and privacy beacon data associated with the privacy beacon to a location configured to perform processing on one or more of the encrypted image and the privacy beacon data.

Referring again to the system, in an embodiment, a computationally-implemented method may include acquiring a block of encrypted data corresponding to one or more images that have previously been encrypted through use of a unique device code associated with an image capture device configured to capture the one or more images, wherein at least one of the one or more images includes at least one representation of a feature of at least one entity, acquiring a privacy metadata, said privacy metadata corresponding to a detection of a privacy beacon in the one or more images captured by the image capture device, said privacy beacon associated with the at least one entity, and determining, at least partly based on the obtained privacy metadata, and partly based on a value calculation based on the representation of the feature of the at least one entity for which the privacy beacon is associated, whether to allow processing, which may include distribution, decryption, etc., of the encrypted data block.

Referring again to the system, in an embodiment, a computationally-implemented method may include acquiring a block of encrypted data corresponding to one or more images that have previously been encrypted through use of a unique device code associated with an image capture device configured to capture the one or more images, wherein at least one of the one or more images includes at least one representation of a feature of at least one entity, acquiring a privacy metadata indicating detection of a privacy beacon in the one or more images captured by the image capture device, said privacy beacon associated with the at least one entity, retrieving term data from a remote location, said term data corresponding to a term of service associated with a potential release of the block of encrypted data corresponding to the one or more images that have previously been encrypted through use of the unique device code associated with the image capture device configured to capture the one or more images, calculating an expected valuation corresponding to potential revenue associated with the release of at least a portion of the block of encrypted data corresponding to the one or more images that have previously been encrypted through use of the unique device code associated with the image capture device configured to capture the one or more images, and determining whether to perform decryption of at least a portion of the block of encrypted data at least partially based on the calculation of the expected valuation corresponding to the potential revenue associated with the release of the at least the portion of the block of encrypted data, and at least partially based on the retrieved term data corresponding to the term of service.

Referring again to the system, in an embodiment, a computationally-implemented method may include acquiring a block of encrypted data corresponding to one or more images that have previously been encrypted through use of a unique device code associated with an image capture device configured to capture the one or more images, wherein at least one of the one or more images includes at least one representation of a feature of at least one entity, acquiring a privacy metadata indicating a lack of detection of a privacy beacon in the one or more images captured by the image capture device, decrypting the block of encrypted data corresponding to the one or more images that have previously been encrypted through use of a unique device code associated with the image capture device, and encrypting the block of decrypted data through use of a unique entity code that is related to an entity associated with the image capture device configured to capture the one or more images. Referring again to the system, in an embodiment, a computationally-implemented method may include acquiring a block of encrypted data from a remote location, said block of encrypted data corresponding to one or more images captured by an image capture device, said block of encrypted data previously encrypted through use of a unique entity code that is related to an entity associated with the image capture device, receiving an indication that the one or more images captured by the image capture device were approved for decryption through a verification related to privacy metadata associated with the one or more images, obtaining the unique entity code related to the entity associated with the image capture device, and releasing the one or more images through decryption of the block of encrypted data acquired from the remote location using the obtained unique entity code related to the entity associated with the image capture device.

Referring again to the system, in an embodiment, a computationally-implemented method may include acquiring a block of encrypted data corresponding to one or more images that have previously been encrypted through use of a unique device code associated with an image capture device configured to capture the one or more images, wherein at least one of the one or more images includes at least one representation of a feature of at least one entity, retrieving term data from a remote location, said term data corresponding to a term of service associated with a potential release of the one or more images that have previously been encrypted through use of the unique device code associated with the image capture device configured to capture the one or more images, calculating whether an estimated advertising revenue from one or more advertisement images placed in the one or more images of the block of encrypted data will be greater than an estimated potential liability for distribution of the one or more images of the block of encrypted data, said estimated potential liability at least partly based on the retrieved term data, modifying the one or more images of the block of encrypted data by replacing one or more areas associated with one or more entities at least partially depicted in the one or more images with the one or more advertisement images, and calculating a modified estimated advertising revenue from the modified one or more images of the block of encrypted data.

Referring again to the system, in an embodiment, a computationally-implemented method may include monitoring a deployment of a privacy beacon associated with a user, said privacy beacon configured to alert a wearable computer of one or more terms of service associated with said user in response to recordation of image data that includes said privacy beacon by said wearable computer, and said privacy beacon configured to instruct said wearable computer to execute one or more processes to impede transmission of the one or more images that include the user associated with said privacy beacon, and storing a record of the deployment of the privacy beacon associated with the user, said record configured to be retrieved upon request to confirm whether the privacy beacon associated with the user was active at a particular time.

Referring again to the system, in an embodiment, a computationally-implemented method may include receiving data regarding one or more features of one or more entities that are designated for protection by one or more terms of service, associating the one or more terms of service with a privacy beacon configured to be captured in an image when the one or more features of the one or more entities are captured in the image, and providing the terms of service to one or more media service providers associated with a device that captured an image that includes the privacy beacon, in response to receipt of an indication that an image that includes the privacy beacon has been captured.

Referring again to the system, in an embodiment, a computationally-implemented method may include acquiring one or more images that have previously been captured by an image capture device, wherein at least one of the one or more images includes at least one representation of a feature of one or more entities, identifying a first entity for which at least one representation of a first entity feature is present in the one or more images, and a second entity for which at least one representation of a second entity feature is present in the one or more images, obtaining data indicating that the first entity has a preexisting relationship with an entity associated with the image capture device, e.g., in a contact list, preventing an obfuscation of the representation of the first entity for which the preexisting relationship with the entity associated with the image capture device has been indicated, and obfuscating the representation of the second entity for which at least one representation of the second entity feature is present in the one or more images.

Referring again to the system, in an embodiment, a computationally-implemented method may include broadcasting a privacy beacon associated with at least one entity from a location of the at least one entity, said privacy beacon configured to be detected by an image capturing device upon capture of an image of the at least one entity, acquiring an indication that the privacy beacon associated with the at least one entity has been captured by the image capturing device, and broadcasting term data including one or more conditions and/or consequences of distribution of one or more images that depict at least a portion of the at least one entity.

Referring again to the system, in an embodiment, a computationally-implemented method may include acquiring a block of encrypted data corresponding to one or more images that have previously been encrypted through use of a unique device code associated with an image capture device configured to capture the one or more images, wherein at least one of the one or more images includes at least one representation of a feature of at least one entity, decrypting the block of encrypted data corresponding to the one or more images that have previously been encrypted through use of the unique device code associated with the image capture device configured to capture the one or more images, performing an operation to detect a presence of a privacy beacon associated with the at least one entity from the one or more images, wherein the privacy beacon previously had been detected by the image capture device, and storing outcome data corresponding an outcome of the operation to detect the presence of the privacy beacon associated with the at least one entity of the one or more images, wherein said outcome data includes an indication of whether a result of the performed operation to detect the presence of the privacy beacon associated with the at least one entity from the one or more images matches the previous detection of the privacy beacon by the image capture device.

Referring now to FIG. 2, e.g., FIG. 2A, FIG. 2A illustrates an example environment 200 in which the methods, systems, circuitry, articles of manufacture, and computer program products and architecture, in accordance with various embodiments, may be implemented by one or more indicator projection devices 210 configured to broadcast an active indicator. As shown in FIG. 2A, one or more indicator projection devices 210 may broadcast a privacy indicator that indicates a presence of term data that regards an entity module, that is captured by a computing device 220. For example, computing device 220 may capture an image of an entity 105 associated with a privacy indicator, e.g., a DCM ("Don't Capture Me") indicator 110. In this and some other examples, the captured entity is named "Jules Caesar."

Referring again to FIG. 2A, computing device 220 may capture the image data as image data 22, which may be optical data, e.g., light data, digital data, e.g., a digital signal, or data in another form. In a process that will be discussed in more detail herein according to various embodiments, image data 22 may be encrypted using a device-specific code, shown here as encrypted image data 24. Encrypted image data 24 may be transmitted to a server device 230, which may be an example of wearable computer server 3000 shown in FIG. 1. In an embodiment, computing device 220 may generate indicator metadata 114 from the detected DCM indicator 110. In an embodiment, indicator metadata 114 may be binary indicator metadata that indicates whether an indicator has been detected, e.g., yes or no. In an embodiment, indicator metadata 114 may include a data string that identifies the indicator, the entity, the type of indicator, data about the indicator, or a combination of the foregoing. In an embodiment, such an indicator metadata 114 may be used by server device 230 to obtain additional information about the entity, e.g., terms of service data, which will be described in more detail herein. In an embodiment, indicator metadata 114 may include terms of service data associated with the entity, e.g., Jules Caesar. The types of indicator metadata 114 are not limited to those listed in this paragraph, and the foregoing types of indicator metadata 114 will be described in more detail further herein with respect to FIGS. 4A-4E, and with respect to the specific examples listed herein.

In an embodiment, indicator projection device 210 may receive an indication that the privacy indicator has been detected. Such indication may come from the computing device 220, the server device 230, from the indicator 110, or from a remote server, e.g., indicator management device 260. In an embodiment, indicator projection device 210 may determine that an image has been captured through a detection mechanism. In an embodiment, the entity 105 may interact with the indicator projection device 210 in order to tell the indicator projection device 210 that an image has been captured that may involve the DCM indicator 110

Referring again to FIG. 2A, in an embodiment, server device 230 may include an image decryption decision module 236 which may receive the encrypted image 24 and the DCM indicator metadata 114, and determine whether to allow decryption of the image. This process is described in more detail with respect to FIGS. 4A-4E, and in previous applications to which priority is claimed, which have been incorporated herein by reference. A repeating of the operation of server device 230 according to various embodiments is omitted here.

Referring again to FIG. 2A, in some embodiments, one or more of the encrypted image data 24 and the DCM beacon metadata are transmitted over one or more communication network(s) 240. In various embodiments, the communication network 240 may include one or more of a local area network (LAN), a wide area network (WAN), a metropolitan area network (MAN), a wireless local area network (WLAN), a personal area network (PAN), a Worldwide Interoperability for Microwave Access (WiMAX), public switched telephone network (PTSN), a general packet radio service (GPRS) network, a cellular network, and so forth. The communication networks 240 may be wired, wireless, or a combination of wired and wireless networks. It is noted that "communication network" as it is used in this application refers to one or more communication networks, which may or may not interact with each other.

Referring again to FIG. 2A, for example, in an embodiment, environment 200 may include an indicator management device 260 Indicator management device 260 may be configured to manage associations between one or more privacy indicators, e.g., between DCM indicator 110 and terms of service associated with DCM indicator 272. Indicator management device 260 may store, create, modify, update, track, or otherwise manipulate various terms of service. In an embodiment, indicator management device also may store, create, modify, track, communicate with, monitor, or otherwise operate on or with one or more privacy indicators (e.g., DCM indicator 110) and/or devices associated with privacy indicators (e.g., device 210) and/or users associated with privacy indicators (e.g., entity 105). In an embodiment, indicator management device 260 may specifically track the detection of privacy indicators by various devices, e.g., through communication with one or more of the aforementioned entities, or through communication with a computing device 220 and/or a server device 230, as shown in FIG. 2A.

In an embodiment, indicator management device 260 may receive notification of a detected privacy indicator, and, at the request of the indicator projection device 210, provide a terms of service, e.g., terms of service 272, to the entity that detected the privacy indicator, e.g., server device 230, or computing device 220. In an embodiment, the indicator management device 260 may provide the terms of service 272 to the indicator projection device 210, which then may facilitate the delivery of the terms of service 272 to the computing device 220 or the server device 230.

Referring again to FIG. 2A, in an embodiment, indicator management device 260 may include a service term acquisition module 262. In an embodiment, service term acquisition module 262 may generate terms of service, e.g., from a predetermined list, or from factors regarding the entity associated with the privacy indicator, e.g., as will be described in more detail with respect to specific non-limiting examples herein. In an embodiment, service term acquisition module 262 may acquire the terms of service, and facilitate their transmission to the computing device 220 or the server device 230, either directly, or via the indicator projection device 210.

Referring again to FIG. 2A, in an embodiment, indicator management device 260 may include an entity monitoring module 264, which may monitor the entity for which the DCM indicator 110 is associated, e.g., entity 105 in FIG. 2A. This monitoring may be used to facilitate the tracking of detection of DCM indicator 110, e.g., as described in this and previous applications, which are incorporated herein by reference. In an embodiment, indicator management device also may include an entity communication device module 266, which may be configured to communicate with a device, e.g., device 210 to facilitate tracking of the privacy indicator, e.g., DCM indicator 110. Device 210 may be related to DCM indicator 110, e.g., device 210 may cause DCM indicator 110 to be projected. In an embodiment, device 210 tracks the detection of DCM indicator 110. In an embodiment, indicator management device 260 tracks the detection of DCM indicator 110, e.g., via satellite, and may inform indicator projection device 210. In an embodiment, device 210 may be a smartphone device carried by the entity 105.

Referring again to FIG. 2A, in an embodiment, indicator management device 260 may include detected indicator communication module 268. Detected indicator communication module 268 may be configured to communicate with one or more capture entities, e.g., server device 230 and computing device 220. For example, computing device 220 may detect the DCM indicator 110, and inform indicator management device 260. Indicator management device 260 may then supply the associated terms of service data, e.g., terms of service 272, that is associated with DCM indicator 110 to computing device 220 and/or server device 230, either directly or through the indicator projection device 210. Similarly, server device 230 may detect DCM indicator 110 and inform indicator management device 260, and receive the associated terms of service, e.g., terms of service 272. Or, in another embodiment, server device 230 may receive a notification from computing device 220 that the DCM indicator 110 was detected, and server device 230 may then notify indicator management device 260, and receive the associated terms of service, e.g., terms of service 272.

Referring again to FIG. 2A, computing device 220 may be any electronic device, portable or not, that may be operated by or associated with one or more users. Computing device 220 is shown as interacting with a user 115. As set forth above, user 115 may be a person, or a group of people, or another entity that mimics the operations of a user. In an embodiment, user 115 may be a computer or a computer-controlled device. Computing device 220 may be, but is not limited to, a wearable computer. Computing device 220 may be any device that is equipped with an image capturing component, including, but not limited to, a cellular phone, a network phone, a smartphone, a tablet, a music player, a walkie-talkie, a radio, an augmented reality device (e.g., augmented reality glasses and/or headphones), wearable electronics, e.g., watches, belts, earphones, or "smart" clothing, earphones, headphones, audio/visual equipment, media player, television, projection screen, flat screen, monitor, clock, appliance (e.g., microwave, convection oven, stove, refrigerator, freezer), a navigation system (e.g., a Global Positioning System ("GPS") system), a medical alert device, a remote control, a peripheral, an electronic safe, an electronic lock, an electronic security system, a video camera, a personal video recorder, a personal audio recorder, and the like.

Referring again to FIG. 2A, indicator projection device 210 may be any electronic device, portable or not, that may be operated by or associated with one or more users. Indicator projection device 210 is shown as interacting with a user 105. As set forth above, user 105 may be a person, or a group of people, or another entity that mimics the operations of a user. In an embodiment, user 105 may be a computer or a computer-controlled device. Indicator projection device 210 may be, but is not limited to, a wearable computer. Indicator projection device 210 may be any device that is equipped with an image capturing component, including, but not limited to, a cellular phone, a network phone, a smartphone, a tablet, a music player, a walkie-talkie, a radio, an augmented reality device (e.g., augmented reality glasses and/or headphones), wearable electronics, e.g., watches, belts, earphones, or "smart" clothing, earphones, headphones, audio/visual equipment, media player, television, projection screen, flat screen, monitor, clock, appliance (e.g., microwave, convection oven, stove, refrigerator, freezer), a navigation system (e.g., a Global Positioning System ("GPS") system), a medical alert device, a remote control, a peripheral, an electronic safe, an electronic lock, an electronic security system, a video camera, a personal video recorder, a personal audio recorder, and the like.

Referring now to FIG. 2B, FIG. 2B shows a detailed description of indicator projection device 210 operating in environment 200, in an embodiment. It is noted that the components shown in FIG. 2B represent merely one embodiment of indicator projection device 260, and any or all components other than processor 222 may be omitted, substituted, or modified, in various embodiments.

Referring again to FIG. 2B, indicator projection device 210 may include a device memory 245. In an embodiment, device memory 245 may include memory, random access memory ("RAM"), read only memory ("ROM"), flash memory, hard drives, disk-based media, disc-based media, magnetic storage, optical storage, volatile memory, nonvolatile memory, and any combination thereof. In an embodiment, device memory 245 may be separated from the device, e.g., available on a different device on a network, or over the air. For example, in a networked system, there may be many indicator projection devices 210 whose device memory 245 is located at a central server that may be a few feet away or located across an ocean. In an embodiment, indicator projection device 210 may include a device memory 245. In an embodiment, memory 245 may comprise of one or more of one or more mass storage devices, read-only memory (ROM), programmable read-only memory (PROM), erasable programmable read-only memory (EPROM), cache memory such as random access memory (RAM), flash memory, synchronous random access memory (SRAM), dynamic random access memory (DRAM), and/or other types of memory devices. In an embodiment, memory 245 may be located at a single network site. In an embodiment, memory 245 may be located at multiple network sites, including sites that are distant from each other.

Referring again to FIG. 2B, indicator projection device 210 may include one or more of device memory 245, service term management module 212, indicator management device communication module 216, computing device communication module 214, and indicator management module 218. FIG. 2B further shows a more detailed description of indicator projection device 210. In an embodiment, indicator projection device 210 may include a processor 222. Processor 222 may include one or more microprocessors, Central Processing Units ("CPU"), a Graphics Processing Units ("GPU"), Physics Processing Units, Digital Signal Processors, Network Processors, Floating Point Processors, and the like. In an embodiment, processor 222 may be a server. In an embodiment, processor 222 may be a distributed-core processor. Although processor 222 is as a single processor that is part of a single indicator projection device 210, processor 222 may be multiple processors distributed over one or many indicator projection devices 210, which may or may not be configured to operate together.

Processor 222 is illustrated as being configured to execute computer readable instructions in order to execute one or more operations described above, and as illustrated in FIGS. 9, 10A-10F, 11A-11F, and 12A-12D. In an embodiment, processor 222 is designed to be configured to operate as processing module 250, which may include one or more of active indicator generator broadcasting of a privacy indicator that indicates a presence of term data that regards an entity module 252, indication of detection of the privacy indicator that is associated with the entity by a device that captured an entity image that depicts at least one feature of the entity obtaining module 254, and term data that specifies one or more conditions that govern use of the entity image that depicts at least a portion of the entity transmission facilitating module 256.

FIGS. 3A-3E refer to an "image capture device," which is defined as any device that is equipped with the ability to capture images, and not necessarily a wearable computer or a device designed specifically to capture images.

Referring now to FIG. 3A, FIG. 3A shows an exemplary embodiment of a computing device 220 as image capture device 302. In an embodiment, image capture device 302 may include an image capture component, e.g., a lens 306A. Image capture component 306A may capture an image including the user 105 and the DCM beacon 110, and capture that image as raw (optical or digital) data 120. In an embodiment, image capture device 302 may include beacon detection module 310A that is configured to detect DCM beacon 110, either optically, digitally, or other, depending on the embodiment. After detection of the beacon, the image data may be sent to an image data encryption module 320A to encrypt the image. In an embodiment, if the beacon is not detected, the image data 120 is released past barrier 340A and the other image capture device modules 350A may operate on the image data 120. In an embodiment, the encrypted data, and data associated with the DCM beacon 110 (although not necessarily the beacon itself) may be transmitted to encrypted data and beacon transmitting module 330A, which may transmit the encrypted data and beacon data to an external source, e.g., server 3000 as described in FIG. 1. It is noted that beacon detection module 310A, image data encryption module 320A, and encrypted data and beacon transmitting module 330A may be separated from other image capture device modules 350A by barrier 340A.

In an embodiment, barrier 340A may be a physical barrier, e.g., beacon detection module 310A, lens 306A, image data encryption module 320A, and encrypted data and beacon transmitting module 330A may be hard-wired to each other and electrically excluded from other image capture device modules 350A. In another embodiment, barrier 340A may be implemented as a programmed barrier, e.g., the image data 120 is not transmitted to modules other than beacon detection module 310A, lens 306A, image data encryption module 320A, and encrypted data and beacon transmitting module 330A. In another embodiment, barrier 340A may be implemented as a data access barrier, e.g., the captured image data 120 may be protected, e.g., with an access or clearance level, so that only beacon detection module 310A, lens 306A, image data encryption module 320A, and encrypted data and beacon transmitting module 330A may read or operate on the image data 120. In another embodiment, barrier 340A may not be a complete barrier, e.g., barrier 340A may allow "read" access to the image data, but not "copy" or "write" access. In another embodiment, barrier 340A may be a barrier to transmission, e.g., the image may be viewed locally at the device, but may be barred from being saved to a removable memory, or uploaded to a cloud storage or social networking site/social media site.

Referring now to FIG. 3B, FIG. 3B shows an embodiment of a computing device 220 as image capture device 304. In an embodiment, image capture device 304 may include an image capture component, e.g., a lens and sensor 306B. Image capture component 306B may capture an image including the user 105 and the DCM beacon 110, and capture that image as raw (optical or digital) data 120. In an embodiment, image capture device 304 may include image path splitting module 305B that may receive the raw data 120 as a signal, e.g., optical or digital, and split the signal into two branches. As shown in FIG. 3B, one branch, e.g., the north branch, sends the raw signal to image data encryption module 320B, which may encrypt the image. In an embodiment, the other branch, e.g., the south branch, may send the signal to a beacon detection module 310B, which may detect the DCM beacon 110. In an embodiment, if the DCM beacon 110 is detected, then the unencrypted image data that arrived at beacon detection module 310B is destroyed. In an embodiment, if the DCM beacon 110 is not detected, then the encrypted image data from image data encryption module 320B is destroyed, and the unencrypted image data at beacon detection module 310B is allowed to pass to other image capture device modules 350B. In an embodiment, the beacon detection result and the encrypted image data are transmitted to the encrypted data and beacon transmitting module 330B. In an embodiment, barrier 340B may separate image path splitting module 305B, beacon detection module 310B, image data encryption module 320B, and encrypted data and beacon transmitting module 330B from other image capture device modules 350B.

In an embodiment, barrier 340B may be a physical barrier, e.g., beacon detection module 310B, lens 306B, image data encryption module 320B, and encrypted data and beacon transmitting module 330B may be hard-wired to each other and electrically excluded from other image capture device modules 350B. In another embodiment, barrier 340B may be implemented as a programmed barrier, e.g., the image data 120 is not transmitted to modules other than image path splitting module 305B, beacon detection module 310B, lens 306B, image data encryption module 320B, and encrypted data and beacon transmitting module 330B. In another embodiment, barrier 340B may be implemented as a data access barrier, e.g., the captured image data may be protected, e.g., with an access or clearance level, so that only beacon detection module 310B, lens 306B, image data encryption module 320B, and encrypted data and beacon transmitting module 330B may read or operate on the image data 120. In another embodiment, barrier 340B may not be a complete barrier, e.g., barrier 340B may allow "read" access to the image data, but not "copy" or "write" access. In another embodiment, barrier 340B may be a barrier to transmission, e.g., the image may be viewed locally at the device, but may be barred from being saved to a removable memory, or uploaded to a cloud storage or social networking site/social media site.

Referring now to FIG. 3C, FIG. 3C shows an embodiment of a computing device 220 implemented as image capture device 306. In an embodiment, image capture device 306 may include an image capture component 306C that captures optical data 120A. In an embodiment, optical data 120A may be sent to optical splitting module 305C, which may split the optical signal, e.g., the light, into two paths. Referring to FIG. 3C, the "south" path may transmit the light to an optical filter 312, which may filter the light for a specific characteristic, e.g., a wavelength or an object, according to known optical filtration techniques. In an embodiment, the filtered optical signal may then be transmitted to a filtered optical signal beacon detection module 310C, which may detect the beacon 110 in the optical data 120A.

Referring again to FIG. 3C, the "north" path from optical splitting module 305C may transmit the optical image data to an optical-to-digital converter 314, e.g., a CMOS or CCD sensor. In an embodiment, the digital signal then may be transmitted to image data encryption module 320C, and the encrypted data transmitted to encrypted data and beacon transmitting module 330C, along with the beacon detection result, for transmission to an external source, e.g., server 3000 as shown in FIG. 1. In an embodiment, barrier 340C may prevent access to the unencrypted image data by other image capture device modules 350C. In an embodiment, barrier 340C may function similarly to barriers 340A and 340B, and the descriptions of those barriers and their possible implementations also may apply to barrier 340C. In an embodiment, image data encryption module 320C, encrypted data beacon and transmitting module 330C, and optical-to-digital converter 314 may be controlled by beacon detection control module 325, which may be part of the processor of image capture device 306C, or may be a separate processor. In an embodiment, beacon detection control module 325 may form part or all of processor 222 of computing device 220 of FIG. 2B.

Referring now to FIG. 3D, FIG. 3D shows an exemplary implementation of a computing device 220 implemented as image capture device 308, according to an embodiment. Image capture device 308 may include an optical image collector 306D that may capture an image including the user 105 and the DCM beacon 110, and capture that image as optical data 120A. Optical data 120A may then be sent to optical splitting module 305D, which may split the optical signal, e.g., the light, into two paths. Referring to FIG. 3D, the "south" path may transmit the light to an optical transformation module 332, which may apply a transformation, e.g., a Fourier transformation, to the optical image data. The transformed optical data from module 332, as well as a reference image from optical beacon reference signal providing module 334 may be transmitted to optical beacon detection module 310D. Optical beacon detection module 310D may optically detect the beacon using Fourier transformation and an optical correlator. The basic operation of performing optical image object detection is described in the publically-available (at the University of Michigan Online Library) paper "Report of Project MICHIGAN, SIGNAL DETECTION BY COMPLEX SPATIAL FILTERING," by A. B. Vander Lugt, printed in July 1963 at the Radar Laboratory at the Institute of Science and Technology, the University of Michigan, which is hereby incorporated by reference in its entirety. Applicant's representative is including a copy of this paper with the filing of this application, for the convenience of the Examiner.

Referring again to FIG. 3D, the "north" path from optical splitting module 305D may transmit the optical image data to an optical-to-digital converter 324, e.g., a CMOS or CCD sensor. In an embodiment, the digital signal then may be transmitted to image data encryption module 320D, and the encrypted data transmitted to encrypted data and beacon transmitting module 330D, along with the beacon detection result, for transmission to an external source, e.g., server 3000 as shown in FIG. 1. In an embodiment, barrier 340D may prevent access to the unencrypted image data by other image capture device modules 350D. In an embodiment, barrier 340D may function similarly to barriers 340A and 340B, and the descriptions of those barriers and their possible implementations also may apply to barrier 340D. In an embodiment, image data encryption module 320D, encrypted data and beacon transmitting module 330D, and optical-to-digital converter 324 may be controlled by beacon detection control module 335, which may be part of the processor of image capture device 308, or may be a separate processor. In an embodiment, beacon detection control module 335 may form part or all of processor 222 of computing device 220 of FIG. 2B.

Referring now to FIG. 3E, FIG. 3E shows an exemplary embodiment of an implementation of computing device 220 as image capture device 309. In an embodiment, image capture device 309 may include an optical image collector 306E, e.g., a lens, which may collect the optical data 120A. Optical data 120A may be emitted to an optical beacon detection module 310E, which may detect the DCM beacon 110 using one of the above-described optical detection methods. After detection of the beacon using optical techniques, the optical signal may be captured by an optical-to-digital conversion module 344, and converted to digital image data, which is transferred to image data encryption module 320E for encryption. In an embodiment, modules 306E, 310E, 344, and 320E, are hard-wired to each other, and separated from encrypted data and beacon transmitting module 330E and other image capture device modules 350E by barrier 340E (which, in this embodiment, is shown for exemplary purposes only, because the physical construction of modules 306E, 310E, 344, and 320E removes the need for a barrier 340E, whether implemented as hardware, programming, security, or access. In this embodiment, the image data is encrypted prior to interaction with the "main" portions of image capture device 309, and after the beacon data has been optically detected.

FIGS. 4A-4E show one or more embodiments of a server device 230, according to one or more embodiments. Unless otherwise stated or contradictory to FIGS. 4A-4E, the server devices 430A, 430B, 430C, 430D, and 430E may include the elements of server device 230, as previously described. Similarly, unless otherwise stated or contradictory to FIGS. 4A-4E, the computing devices 420A, 420B, 420C, 420D, and 420E may include the elements of computing device 220, as previously described.

Referring now to FIG. 4A, FIG. 4A shows an exemplary implementation of server device 230 as server device 430A operating in exemplary environment 400A. In an embodiment, computing device 420A further includes a location and time log and transmission module 422. In an embodiment, location and time log and transmission module 422 may record a location, e.g., through global positioning sensors, triangulation using radio signals, or other methods, of the computing device 420A, and a time that the image is captured, at the time the image is captured. This data of location and time of the image capture, e.g., location and time of detection data 162, may be transmitted to server device 430A, as shown in FIG. 4A.

Referring again to FIG. 4A, server device 430A may include a beacon metadata acquisition module 433. Beacon metadata acquisition module 433 may include location and time of beacon detection data acquisition module 433A. Location and time of beacon detection data acquisition module 433A may receive the location and time of detection data 162. In an embodiment in which the beacon metadata 150 is binary beacon metadata 150A, additional data regarding the image may be obtained. For example, server device 430A may transmit the location and time of detection data 162 to a remote location, e.g., to beacon support server 490. Beacon support server 490 may include, for example, a geotagged and timestamped list of detected beacons 436, which may track a location and time when a beacon is detected. Beacon support server 490 may be associated with DCM beacon 110, and may be configured to log each time DCM beacon 110 is detected, e.g., in an embodiment in which DCM beacon 110 is an active beacon that can determine when it is detected. In an embodiment, beacon support server 490 may use the location and time of detection data 162 to determine which DCM beacon 110 is detected, and transmit the beacon identification information back to server device 430A, e.g., to beacon identification data acquisition module 433B. In an embodiment, this beacon identification information may be used by server device 430A. In an embodiment, the beacon identification information may be used to identify the entity in the image, without decrypting the image, for example.

Referring now to FIG. 4B, FIG. 4B shows an exemplary implementation of server device 230 as server device 430B operating in exemplary environment 400B. In an embodiment, the computing device 420B may generate beacon metadata 150, which may be binary beacon metadata 150A, and transmit the binary beacon metadata 150A to server device 430B. In an embodiment, server device 430B receives the binary beacon metadata 150A, e.g., through use of beacon metadata acquisition module 443, which may describe whether a beacon was detected in the encrypted image data block 160, but which may, in an embodiment, not provide additional data regarding the beacon. In an embodiment, server device 430B may include encrypted image analysis and data extraction module 442, which may perform analysis on the encrypted image 24, if possible. Such analysis may include, for example, that the encrypted image data block 160 may have metadata that is not encrypted or that may be read through the encryption. In an embodiment, for example, the image 22 may be encrypted in such a manner that certain characteristics of the encrypted image 24 may be obtained without decrypting the image. In an embodiment, server device 430B may use encrypted image analysis and data extraction module 442 to determine more information about the image, e.g., which may be used to perform valuation of the image and/or to retrieve term data regarding one or more terms of service associated with the DCM beacon 110 and the entity Jules Caesar 105.

Referring now to FIG. 4C, FIG. 4C shows an exemplary implementation of server device 230 as server device 430C operating in exemplary environment 400C. In an embodiment, computing device 420C may transmit the beacon metadata 150, which may be binary beacon metadata 150A, to server device 430C. Beacon metadata 150 may be obtained by beacon metadata acquisition module 456. In an embodiment, beacon metadata acquisition module 456 may relay data regarding the received metadata to a decision-making portion of server device 430C, e.g., a central processor. In an embodiment, server device 430C may determine that it wants more data regarding the image 22, in order to retrieve term data, or perform a valuation of the image data. Accordingly, in an embodiment, server device 430C may include encrypted image analysis and data extraction module 436, which may operate similarly to encrypted image analysis and data extraction module 442, and also, in an embodiment, encrypted image analysis and data extraction module 436 may transmit the encrypted image data block to a "sandbox," e.g., image decryption sandbox 492. Image decryption sandbox 492 may place the image in a virtual or physical "sandbox" where other processes may be unable to access the data. Image decryption sandbox 492 may be part of server device 430C, or may be a separate entity. In an embodiment, image decryption sandbox 492 may decrypt the encrypted image 24. Encrypted image decryption and beacon identification module 493 may perform analysis on the decrypted image, including identifying the beacon, or identifying the entity, or a combination thereof. The identification data then may be given to beacon identification data reception module 438. In an embodiment, the decrypted image data is then trapped in the sandbox and/or destroyed.

Referring now to FIG. 4D, FIG. 4D shows an exemplary implementation of server device 230 as server device 430D operating in exemplary environment 400D. In an embodiment, computing device 420D may transmit beacon metadata 150, e.g., beacon identifier metadata 150B, to server device 430D. In an embodiment, beacon identifier metadata 150B may identify the beacon, e.g., the DCM beacon 110. The identification may be a unique identification, e.g. "this beacon is associated with user #13606116, Jules Caesar," or, in an embodiment, the identification may be a class of beacon, e.g., "this is a beacon with a $100,000 dollar liquidated damages clause associated with using a likeness of the entity associated with the beacon," or "this is a beacon of a television celebrity," or "this is a beacon provided by Image Protect Corporation."

Referring again to FIG. 4D, server device 430D receives the beacon identifier metadata 150B, e.g., through use of beacon metadata acquisition module 447. In an embodiment, server device 430D may transmit the identifier to an external location, e.g., a terms of service transmission server 485. Terms of service transmission server 485 may store terms of service associated with various beacons in its terms of service repository 489. In an embodiment, each unique beacon may be associated with its own unique terms of service. In another embodiment, there may be common terms of service for various users. In another embodiment, there may be common terms of service for various classes of users. In an embodiment, the terms of service may vary depending on how much the entity, e.g., Jules Caesar, is paying to use the beacon service.

In an embodiment, terms of service transmission server 485 may include beacon identifier lookup table 487. Beacon identifier lookup table 487 may receive the beacon identifier metadata 150B, and use the beacon identifier metadata 150B to obtain the terms of service associated with that beacon, e.g., terms of service data 151. In an embodiment, terms of service data 151 then may be transmitted to server device 430D.

Referring now to FIG. 4E, FIG. 4E shows an exemplary implementation of server device 230 as server device 430E operating in exemplary environment 400E. In an embodiment, computing device 420E may detect the DCM beacon 110, and may obtain the terms of service from the detected beacon (e.g., the terms of service may be read from the beacon, e.g., in compressed binary). In an embodiment, the computing device 420E may use the detected beacon data to obtain the terms of service data from another location, e.g., a terms of service data server (not pictured).

Referring again to FIG. 4E, in an embodiment, computing device 420E may transmit beacon metadata 150, e.g., beacon identifier and terms of service metadata 150C, to server device 430E. Beacon metadata acquisition module 444 may receive the beacon identifier and terms of service metadata 150C, and detect that the terms of service are present in the beacon metadata 150. In an embodiment, beacon metadata terms of service reading module 454 may read the terms of service from the beacon metadata 150.

The foregoing examples are merely provided as examples of how beacon data may operate, and how identifying data and/or term of service data may be obtained by the various server devices, and should not be interpreted as limiting the scope of the invention, which is defined solely by the claims. Any and all components of FIGS. 4A-4E may be combined with each other, modified, or eliminated.

FIGS. 5A-5D show one or more embodiments of a computing device 230, among other components, operating in an environment 500 (e.g., 500A-500D), according to one or more embodiments. Unless otherwise stated or contradictory to FIGS. 5A-5D, the server devices 530A, 530B, 530C, and 530D may include the elements of server device 230, as previously described. Similarly, unless otherwise stated or contradictory to FIGS. 5A-5D, the computing devices 520A, 520B, 520C, and 520D may include the elements of computing device 220, as previously described.

Referring now to FIG. 5A, FIG. 5A shows an exemplary implementation of server device 230 as server device 530A operating in exemplary environment 500A. In an embodiment, as shown in FIG. 5A, computing device 520A may capture an image that includes an entity 105 that may be associated with a privacy beacon, e.g., DCM beacon 110. In an embodiment, the captured image, e.g., image 22, may be encrypted into encrypted image 24 using a device-based encryption key. In an embodiment, encrypted image 24 may be combined with beacon metadata, e.g., beacon metadata 150, in an encrypted image data block 160. In another embodiment, beacon metadata 150 may be separate from encrypted image data block 160. In an embodiment, the encrypted image 24 may be transmitted to a server device 530A by encrypted image data transmitting module 180. In an embodiment, a decryption determination module 532A may determine to decrypt the image, e.g., in a process described in one or more of this and/or previous applications incorporated by reference. In an embodiment, server device 530A may include decryption module 534A, which may apply a device-based decryption key to the encrypted image 24 to generate decrypted image data. In an embodiment, client-based encryption module 536A may apply a client-based encryption key to the decrypted image data, to generate a client-based encrypted image. In an embodiment, the client-based encrypted image then may be transmitted back to the computing device 520A, which may be a wearable computer, e.g., to client-based encrypted data receiving module 190. In an embodiment, upon receipt of the client-based encrypted image the client-based encrypted image decryption module 195 may decrypt the client-based encrypted image.

In an embodiment, one or more of the originally-captured image 22, the decrypted image data in the decryption module 534A of server device 530A, and the decrypted image data in the client-based encryption module 536A may be identical. In another embodiment, the substantive portion of the data (e.g., the color data) may be identical, and other data, e.g., header data or compression data, may be different. In another embodiment, the decrypted image data in the decryption module 534A of server device 530A, and the decrypted image data in the client-based encryption module 536A may be slightly different.

Referring now to FIG. 5B, FIG. 5B shows an exemplary implementation of server device 230 as server device 530B operating in exemplary environment 500B. In an embodiment, as shown in FIG. 5B, computing device 520B may capture an image that includes an entity 105 that may be associated with a privacy beacon, e.g., DCM beacon 110. In an embodiment, the captured image, e.g., image 22, may be encrypted into encrypted image 24 using a device-based encryption key. In an embodiment, encrypted image 24 may be combined with beacon metadata, e.g., beacon metadata 150, in an encrypted image data block 160. In another embodiment, beacon metadata 150 may be separate from encrypted image data block 160. In an embodiment, the encrypted image 24 may be transmitted to a server device 530B by encrypted image data transmitting module 180. In an embodiment, a decryption determination module 532B may determine to decrypt the image, e.g., in a process described in one or more of this and/or previous applications incorporated by reference. In an embodiment, server device 530B may include decryption module 534B, which may apply a device-based decryption key to the encrypted image 24 to generate decrypted image data. In an embodiment, client-based encryption module 536B may apply a client-based encryption key to the decrypted image data, to generate a client-based encrypted image.

Referring again to FIG. 5B, in an embodiment, the client-based encrypted image then may be transmitted to a device that is not the computing device 520B, e.g., rather to other client-associated computer device 550. Other client-associated computer device 550 may include client-based encrypted data receiving module 191 and/or client-based encrypted image decryption module 194 which may decrypt the client-based encrypted image, similarly to modules 190 and 195 of FIG. 5A, but not part of computing device 520B. In an embodiment, computer device 550 may also be worn or carried by the client, e.g., a smartphone carried by the client that was wearing the wearable computer 520B. In an embodiment, computer device 550 may be remote from the client, e.g., the client's home computer. In another embodiment, computer device 550 may be a shared server, e.g., where the client stores images on the cloud. In an embodiment similar to the one described above, the computing device 520B may not possess the decrypted image at any point during the process.

Referring again to FIG. 5B, similarly to FIG. 5A, in an embodiment, one or more of the originally-captured image 22, the decrypted image data in the decryption module 534B of server device 530B, and the decrypted image data in the client-based encryption module 536B may be identical. In another embodiment, the substantive portion of the data (e.g., the color data) may be identical, and other data, e.g., header data or compression data, may be different. In another embodiment, the decrypted image data in the decryption module 534B of server device 530B, and the decrypted image data in the client-based encryption module 536B may be slightly different.

Referring now to FIG. 5C, FIG. 5C shows an exemplary implementation of server device 230 as server device 530C operating in exemplary environment 500C. In an embodiment, as shown in FIG. 5C, computing device 520C may capture an image that includes an entity 105 that may be associated with a privacy beacon, e.g., DCM beacon 110. In an embodiment, the captured image, e.g., image 22, may be encrypted into encrypted image 24 using a device-based encryption key. In an embodiment, encrypted image 24 may be combined with beacon metadata, e.g., beacon metadata 150, in an encrypted image data block 160. In another embodiment, beacon metadata 150 may be separate from encrypted image data block 160. In an embodiment, the encrypted image 24 may be transmitted to a server device 530C by encrypted image data transmitting module 180. In an embodiment, a decryption determination module 532C may determine to decrypt the image, e.g., in a process described in one or more of this and/or previous applications incorporated by reference.

Referring again to FIG. 5C, in an embodiment, one or more of the decision to decrypt the encrypted image 24, and the encrypted image 24 may be transmitted to a client-based encryption handling device 560. In an embodiment, client-based encryption handling device 560 may include decryption module 562, which may apply a device-based decryption key to the encrypted image 24 to generate decrypted image data. In an embodiment, client-based encryption module 564 may apply a client-based encryption key to the decrypted image data, to generate a client-based encrypted image. In an embodiment, the client-based encrypted image, then may be transmitted back to the computing device 520A, which may be a wearable computer, e.g., to client-based encrypted data receiving module 190. In an embodiment, upon receipt of the client-based encrypted image the client-based encrypted image decryption module 195 may decrypt the client-based encrypted image.

Referring again to FIG. 5C, similarly to FIG. 5A, in an embodiment, one or more of the originally-captured image 22, the decrypted image data in the decryption module 562 of client-based encryption handling device 560, and the decrypted image data in the client-based encryption module 564 may be identical. In another embodiment, the substantive portion of the data (e.g., the color data) may be identical, and other data, e.g., header data or compression data, may be different. In another embodiment, the decrypted image data in the decryption module 562 of client-based encryption handling device 560, and the decrypted image data in the client-based encryption module 564 may be slightly different.

Referring now to FIG. 5D, FIG. 5D shows an exemplary implementation of server device 230 as server device 530D operating in exemplary environment 500D. In an embodiment, as shown in FIG. 5D, computing device 520D may capture an image that includes an entity 105 that may be associated with a privacy beacon, e.g., DCM beacon 110. In an embodiment, the captured image, e.g., image 22, may be encrypted into encrypted image 24 using a device-based encryption key. In an embodiment, encrypted image 24 may be combined with beacon metadata, e.g., beacon metadata 150, in an encrypted image data block 160. In another embodiment, beacon metadata 150 may be separate from encrypted image data block 160. In an embodiment, the encrypted image 24 may be transmitted to a server device 530D by encrypted image data transmitting module 180. In an embodiment, a decryption determination module 532D may determine to decrypt the image, e.g., in a process described in one or more of this and/or previous applications incorporated by reference. In an embodiment, server device 530D may include decryption module 534D, which may apply a device-based decryption key to the encrypted image 24 to generate decrypted image data. In an embodiment, client-based encryption module 536D may apply a client-based encryption key to the decrypted image data, to generate a client-based encrypted image.

Referring again to FIG. 5D, in an embodiment, the client-based encrypted image then may be transmitted to a device that is not the computing device 520D, e.g., rather to a social networking server 570 or file repository 570. In an embodiment, social networking server 570 may include client-based encrypted data receiving module 192, similarly to client-based encrypted data receiving module 190 of FIG. 5A. In an embodiment, social networking server 570 may include the client-based encrypted image decryption module 197, which may be similar to the client-based encrypted image decryption module 195 of FIG. 5A, and which may decrypt the client-based encrypted image. In an embodiment, social networking server 570 may automatically decrypt the image, and/or take one or more actions, e.g., posting the image to a user's account, e.g., their "wall" on Facebook, or a similar structure. In another embodiment, the social networking server 570 may wait to decrypt the image, and/or to take one or more actions with the image, until the client that captured the image logs into the social networking service associated with the social networking server 570.

Referring again to FIG. 5D, similarly to FIG. 5A, in an embodiment, one or more of the originally-captured image 22, the decrypted image data in the decryption module 534D of server device 530D, and the decrypted image data in the client-based encryption module 536D may be identical. In another embodiment, the substantive portion of the data (e.g., the color data) may be identical, and other data, e.g., header data or compression data, may be different. In another embodiment, the decrypted image data in the decryption module 534D of server device 530D, and the decrypted image data in the client-based encryption module 536D may be slightly different.

Referring now to FIG. 6, FIG. 6 illustrates an exemplary implementation of the active indicator generator broadcasting of a privacy indicator that indicates a presence of term data that regards an entity module 252. As illustrated in FIG. 6, the active indicator generator broadcasting of a privacy indicator that indicates a presence of term data that regards an entity module may include one or more sub-logic modules in various alternative implementations and embodiments. For example, as shown in FIG. 6, e.g., FIG. 6A, in an embodiment, module 252 may include active indicator generation component broadcasting of a privacy indicator that indicates a presence of term data that regards an entity module 602. In an embodiment, module 602 includes one or more of active indicator generation component broadcasting of a privacy indicator that indicates a presence of term data that regards an entity module that is part of a smartphone device 604, active indicator generation component broadcasting of a privacy indicator that indicates a presence of term data that regards an entity module that is part of an entity-associated device 606, active indicator generation component broadcasting of a privacy indicator that indicates a presence of term data that regards an entity module that is part of a device under control of the entity 608, active indicator generation component broadcasting of a privacy indicator that indicates a presence of term data that regards an entity module that is part of a device that stores data that regards the entity 610, and active indicator generation component broadcasting of a privacy indicator that indicates a presence of term data that regards an entity module that is within a particular proximity to the entity 612.

Referring again to FIG. 6, e.g., FIG. 6B, in an embodiment, module 252 may include active indicator generator transmitting of the privacy indicator that indicates the presence of term data that regards an entity module 614. In an embodiment, module 614 may include one or more of active indicator generator transmitting, without regard for receipt status, of the privacy indicator that indicates the presence of term data that regards an entity module 616 and active indicator generator transmitting, to two or more discrete devices, of the privacy indicator that indicates the presence of term data that regards an entity module 618.

Referring again to FIG. 6, e.g., FIG. 6C, in an embodiment, module 252 may include active indicator generator broadcasting of a privacy indicator that is a detectable signal that indicates a presence of term data that regards an entity module 620. In an embodiment, module 620 may include one or more of active indicator generator broadcasting of a privacy indicator that is an optically-detectable signal that indicates a presence of term data that regards an entity module 622, active indicator generator broadcasting of a privacy indicator that is a light beam signal that indicates a presence of term data that regards an entity module 624, and active indicator generator broadcasting of a privacy indicator that is a detectable signal in a particular pattern that indicates a presence of term data that regards an entity module 630. In an embodiment, module 624 may include active indicator generator broadcasting of a privacy indicator that is a light beam of a particular wavelength that indicates a presence of term data that regards an entity module 626. In an embodiment, module 626 may include active indicator generator broadcasting of a privacy indicator that is a light beam of a particular wavelength in a visible spectrum that indicates a presence of term data that regards an entity module 628. In an embodiment, module 630 may include active indicator generator broadcasting of a privacy indicator that is a detectable signal in a particular pattern of a particular shape that indicates a presence of term data that regards an entity module 632.

Referring again to FIG. 6, e.g., FIG. 6D, in an embodiment, module 252 may include active indicator generator emitting of a signal that indicates a presence of term data that regards an entity module 634. In an embodiment, module 634 may include one or more of active indicator generator emitting of a radio wave signal that indicates a presence of term data that regards an entity module 636, active indicator generator emitting of a sonic wave signal that indicates a presence of term data that regards an entity module 638, and active indicator generator emitting of an electromagnetic wave that indicates a presence of term data that regards an entity module, said emitting of the electromagnetic wave in response to detection of an electromagnetic trigger wave 640. In an embodiment, module 640 may include one or more of active indicator generator emitting of an electromagnetic wave that indicates a presence of term data that regards an entity module, said emitting of the electromagnetic wave in response to detection of an electromagnetic trigger wave associated with a particular type of device 642 and active indicator generator emitting of an electromagnetic wave that indicates a presence of term data that regards an entity module, said emitting of the electromagnetic wave in response to detection of an electromagnetic trigger wave that is associated with image capture functionality 648. In an embodiment, module 642 may include active indicator generator emitting of an electromagnetic wave that indicates a presence of term data that regards an entity module, said emitting of the electromagnetic wave in response to detection of an electromagnetic trigger wave associated with an image capture device 644. In an embodiment, module 644 may include active indicator generator emitting of an electromagnetic wave that indicates a presence of term data that regards an entity module, said emitting of the electromagnetic wave in response to detection of an electromagnetic trigger wave associated with an image capture device produced at least in part by a particular manufacturer 646.

Referring again to FIG. 6, e.g., FIG. 6E, in an embodiment, module 252 may include one or more of active indicator generator component broadcasting of a privacy indicator that indicates a presence of term data that regards an entity module 650, active indicator generator broadcasting of a privacy indicator that indicates a presence of term data that specifies one or more conditions that regard use of a depiction of the entity in an image module 656, and active indicator generator broadcasting of a datastream that indicates a presence of term data that regards an entity module 658. In an embodiment, module 650 may include active indicator generator device component broadcasting of a privacy indicator that indicates a presence of term data that regards an entity module 652. In an embodiment, module 652 may include active indicator generator passive device component broadcasting of a privacy indicator that indicates a presence of term data that regards an entity module 654.

Referring now to FIG. 7, FIG. 7 illustrates an exemplary implementation of indication of detection of the privacy indicator that is associated with the entity by a device that captured an entity image that depicts at least one feature of the entity obtaining module 254. As illustrated in FIG. 7, the indication of detection of the privacy indicator that is associated with the entity by a device that captured an entity image that depicts at least one feature of the entity obtaining module 254 may include one or more sub-logic modules in various alternative implementations and embodiments. For example, as shown in FIG. 7, e.g., FIG. 7A, in an embodiment, module 254 may include one or more of indication of detection of the privacy indicator that is associated with the entity by a device that captured an entity image that depicts at least one feature of the entity receiving module 702 and privacy indicator that is associated with the entity by a device that captured an entity image that depicts at least one feature of the entity detecting module 712. In an embodiment, module 702 may include one or more of indication of detection of the privacy indicator that is associated with the entity by a device that captured an entity image that depicts at least one feature of the entity receiving from the device that captured the entity image module 704, indication of detection of the privacy indicator that is associated with the entity by a device that captured an entity image that depicts at least one feature of the entity receiving from the entity module 708, and indication of detection of the privacy indicator that is associated with the entity by a device that captured an entity image that depicts at least one feature of the entity receiving from a remote server related to the device module 710. In an embodiment, module 704 may include indication of detection of the privacy indicator that is associated with the entity by a device that captured an entity image that depicts at least one feature of the entity receiving from the device that captured the entity image and that detected the privacy indicator module 706. In an embodiment, module 712 may include privacy indicator that is associated with the entity by a device that captured an entity image that depicts at least one feature of the entity detecting in the entity image module 714.

Referring again to FIG. 7, e.g., FIG. 7B, in an embodiment, module 254 may include one or more of notification of detection of the privacy indicator that is associated with the entity by a device that captured an entity image that depicts at least one feature of the entity receiving module 716, indication of detection of the privacy indicator that is associated with the entity by a device that captured an entity image that depicts at least one feature of the entity obtaining at a time of entity image capture module 724, and indication of detection in the entity image of the privacy indicator that is associated with the entity by the device that captured the entity image that depicts at least one feature of the entity obtaining module 726. In an embodiment, module 716 may include notification of detection of the privacy indicator that is associated with the entity and acquisition of the term data by a device that captured an entity image that depicts at least one feature of the entity receiving module 718. In an embodiment, module 718 may include one or more of notification of detection of the privacy indicator that is associated with the entity and acquisition of the term data by a device that captured an entity image that depicts at least one feature of the entity receiving from a term data management server module 720 and notification of detection of the privacy indicator that is associated with the entity and acquisition of the term data by a device that captured an entity image that depicts at least one feature of the entity receiving from the device that captured the entity image module 722.

Referring again to FIG. 7, e.g., FIG. 7C, in an embodiment, module 254 may include one or more of capture indication of device capture of the entity image obtaining module 728 and detection indication of detection of the privacy indicator that is associated with the entity obtaining module 730. In an embodiment, module 728 may include capture indication of device capture of the entity image detecting module 732. In an embodiment, module 730 may include one or more of detection indication of detection of the privacy indicator that is associated with the entity receiving from the device module 734, query that regards whether the privacy indicator was detected transmitting to the device that captured the entity image module 736, and detection indication of the detection of the privacy indicator receiving from the queried device module 738.

Referring again to FIG. 7, e.g., FIG. 7D, in an embodiment, module 254 may include one or more of indication of detection of the privacy indicator that is associated with the entity by an image capture device that captured an entity image that depicts at least one feature of the entity obtaining module 740 and indication of detection of the privacy indicator that is associated with the entity by a device that captured an entity image that depicts at least one feature of the entity obtaining from the active indicator generator module 750. In an embodiment, module 740 may include one or more of indication of detection of the privacy indicator that is associated with the entity by a wearable computing device that captured an entity image that depicts at least one feature of the entity obtaining module 742 and indication of detection of the privacy indicator that is associated with the entity by an image capture device that attempted to covertly capture the entity image that depicts at least one feature of the entity obtaining module 746. In an embodiment, module 742 may include indication of detection of the privacy indicator that is associated with the entity by a wearable computing device that surreptitiously captured an entity image that depicts at least one feature of the entity obtaining module 744. In an embodiment, module 746 may include detection of the privacy indicator that is associated with the entity by an image capture device that attempted to covertly capture the entity image that depicts at least one feature of the entity detecting module 748.

Referring again to FIG. 7, e.g., FIG. 7E, in an embodiment, module 254 may include indication of detection of the privacy indicator that is associated with the entity by a device that captured an entity image in violation of one or more acquired device restrictions obtaining module 752. In an embodiment, module 752 may include one or more of indication of detection of the privacy indicator that is associated with the entity by a device that captured an entity image in violation of a restriction on device capture at a particular location obtaining module 754 and indication of detection of the privacy indicator that is associated with the entity by a device that captured an entity image in violation of a restriction on device capture that has a particular velocity range obtaining module 762. In an embodiment, module 754 may include indication of detection of the privacy indicator that is associated with the entity by a device that captured an entity image in violation of a restriction on device capture at a movie theater obtaining module 756. In an embodiment, module 756 may include indication of detection of the privacy indicator that is associated with the entity by a device that captured a screen image in violation of a restriction on device capture at a movie theater obtaining module 758. In an embodiment, module 758 may include indication of detection of the privacy indicator that is associated with the entity by a device that captured a screen image in violation of a restriction on device capture at a movie theater at a time when a particular protected portion of a move was displayed obtaining module 760.

Referring again to FIG. 7, e.g., FIG. 7F, in an embodiment, module 254 may include one or more of indication of detection of the privacy indicator that is associated with the entity, said indication broadcast by the device that captured the entity image that depicts at least one feature of the entity obtaining module 764, device data receiving from the device module 766, and indication of detection of the privacy indicator that is associated with the entity receiving from the device for which device data was received module 768. In an embodiment, module 766 may include one or more of device data that indicates that the device is in a particular area and that the device is configured to capture images receiving from the device module 770 and device data that includes a request to capture one or more images receiving module 772.

Referring now to FIG. 8, FIG. 8 illustrates an exemplary implementation of term data that specifies one or more conditions that govern use of the entity image that depicts at least a portion of the entity transmission facilitating module 256. As illustrated in FIG. 8, the term data that specifies one or more conditions that govern use of the entity image that depicts at least a portion of the entity transmission facilitating module 256 may include one or more sub-logic modules in various alternative implementations and embodiments. For example, as shown in FIG. 8, e.g., FIG. 8A, in an embodiment, module 256 may include one or more of term data that specifies one or more conditions that govern use of the entity image that depicts at least a portion of the entity transmitting module 802, instructions for transmission of term data that specifies one or more conditions that govern use of the entity image that depicts at least a portion of the entity providing to a term transmission station module 804, term data that specifies one or more conditions that govern distribution of the entity image that depicts at least a portion of the entity transmission facilitating module 808, and term data that specifies one or more conditions that govern distribution on a social network of the entity image on a that depicts at least a portion of the entity transmission facilitating module 810. In an embodiment, module 804 may include instructions for transmission of term data that specifies one or more conditions that govern use of the entity image that depicts at least a portion of the entity providing to a term transmission station configured to manage term data module 806.

Referring again to FIG. 8, e.g., FIG. 8B, in an embodiment, module 256 may include one or more of term data that specifies one or more conditions that specify a potential liability for use of the entity image that depicts the at least the portion of the entity transmission facilitating module 812 and term data that includes a contract that governs use of the entity image that depicts at least a portion of the entity transmission facilitating module 820. In an embodiment, module 812 may include term data that specifies one or more conditions that specify a potential monetary liability for use of the entity image that depicts the at least the portion of the entity transmission facilitating module 814. In an embodiment, module 814 may include one or more of term data that specifies one or more conditions that specify a liquidated damages clause that enumerates a monetary liability for use of the entity image that depicts the at least the portion of the entity transmission facilitating module 816 and term data that specifies one or more conditions that specify a foreseeable damages clause that enumerates a type of monetary liability incurred for use of the entity image that depicts the at least the portion of the entity transmission facilitating module 818. In an embodiment, module 820 may include term data that includes a contract that governs use of the entity image that depicts at least a portion of the entity and that is binding upon receipt transmission facilitating module 822.

Referring again to FIG. 8, e.g., FIG. 8C, in an embodiment, module 256 may include term data that specifies one or more conditions that expire upon a particular condition and that govern use of the entity image that depicts at least a portion of the entity transmission facilitating module 824. In an embodiment, module 824 may include one or more of term data that specifies one or more conditions that expire after a particular amount of elapsed time and that govern use of the entity image that depicts at least a portion of the entity transmission facilitating module 826 and term data that specifies one or more conditions that expire after the device travels a particular distance and that govern use of the entity image that depicts at least a portion of the entity transmission facilitating module 828.

Following are a series of flowcharts depicting implementations. For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

Further, in FIG. 9 and in the figures to follow thereafter, various operations may be depicted in a box-within-a-box manner. Such depictions may indicate that an operation in an internal box may comprise an optional example embodiment of the operational step illustrated in one or more external boxes. However, it should be understood that internal box operations may be viewed as independent operations separate from any associated external boxes and may be performed in any sequence with respect to all other illustrated operations, or may be performed concurrently. Still further, these operations illustrated in FIGS. 10-12 as well as the other operations to be described herein may be performed by at least one of a machine, an article of manufacture, or a composition of matter.

It is noted that, the term "associated" does not require physical proximity. A device could be associated with a user if the user purchased that device, or stores information on that device, or has ever logged in and identified herself to that device. In addition, a device may be associated with a user if the user holds the device, carries the device, operates the device, or is assigned the device. Similarly, a privacy beacon may be associated with a terms of service if they are both associated with the same entity, or if they share some link to each other, e.g., the privacy beacon may refer to the terms of service, e.g., directly or indirectly, e.g., the privacy beacon might contain an address at which the terms of service may be retrieved.

It is noted that "indicator" and "indication" may, in various embodiments, refer to many different things, including any of electronic signals (e.g., pulses between two components), human-understandable signals (e.g., information being displayed on a screen, or a lighting of a light, or a playing of a sound), and non-machine related signals (e.g., two people talking, a change in ambient temperature, the occurrence of an event, whether large scale (e.g., earthquake) or small-scale (e.g., the time becomes 4:09 p.m. and 32 seconds)), alone or in any combination.

Referring now to FIG. 9, FIG. 9 shows operation 900, e.g., an example operation of a beacon management device 260 operating in an environment 200. In an embodiment, operation 900 may include operation 902 depicting broadcasting, from an active indicator generator associated with an entity, a privacy indicator that is configured to indicate a presence of term data associated with the entity. For example, FIG. 2, e.g., FIG. 2B, shows active indicator generator broadcasting of a privacy indicator that indicates a presence of term data that regards an entity module 252 broadcasting (e.g., transmitting, sending, facilitating transmission, communicating, dispersing, transferring, disseminating, passing, making known, making available, contacting, handshaking, establishing a connection, etc.), from an active (e.g., in this context "active" means "plays a role in facilitating," e.g., plays a role in facilitating the broadcast of the privacy indicator) indicator (e.g., something that can be detected, e.g., a light beam, a radio wave, a bar code, a pattern in a particular shape, a sonic wave at a particular frequency, e.g., whether detectable by human senses or not) generator (e.g., a device or component of a device configured to generate, emit, or facilitate generation or emission of the active indicator) associated with (e.g., is related to, includes, identifies, specifies, facilitates, assists, stores data about, is owned by, is carried by, is controlled by, etc.) an entity (e.g., a thing, e.g., a person, a rock, a deer, anything that has separate and distinct existence and objective or conceptual reality), a privacy indicator (e.g., a marker detectable by some sensor or other action, which may be passive, active, visible or invisible, may operate on the electromagnetic spectrum or in another field, a partial list of which is included below) that is configured to indicate (e.g., facilitates a signaling or a passing of data/information to a device/entity) a presence (e.g., an existence of, regardless of location, time, or tangibility, e.g., data "exists" if it is stored somewhere) of term data (e.g., data that may include one or more conditions regarding one or more actions, an example of which includes, but is not limited to, one or more terms of service (e.g., one or more terms, definitions, agreements, disclaimers, proclamations, and the like, that are intended to be binding legally upon one or more parties upon execution of an action, e.g., like viewing a privacy beacon, detecting a privacy beacon, or reading the terms of service themselves, where such terms may include user rights and responsibilities, limits of usage, penalties for misuse, liquidated damages clauses, general damages clauses, acceptance of risk, assumption of liability, covenant not to sue, other covenants and agreements, and the like, a non-limiting example of which is provided below)), associated (e.g., is related to, includes, identifies, specifies, facilitates, assists, is about, is the subject of) with the entity (e.g., a thing, e.g., a person, a rock, a deer, anything that has separate and distinct existence and objective or conceptual reality).

Referring again to FIG. 9, operation 900 may include operation 904 depicting acquiring an indication that the privacy indicator associated with the entity has been detected by a device that captured an entity image that depicts at least one feature of the entity. For example, FIG. 2, e.g., FIG. 2B, shows indication of detection of the privacy indicator that is associated with the entity by a device that captured an entity image that depicts at least one feature of the entity obtaining module 254 acquiring (e.g., obtaining, receiving, calculating, selecting from a list or other data structure, receiving, retrieving, or receiving information regarding, performing calculations to find out, retrieving data that indicates, receiving notification, receiving information that leads to an inference, whether by human or automated process, or being party to any action or transaction that results in informing, inferring, or deducting, including but not limited to circumstances without absolute certainty, including more-likely-than-not and/or other thresholds) an indication (e.g., a signal, message, notification, or any other form of data/information) that the privacy indicator (e.g., a marker detectable by some sensor or other action, which may be passive, active, visible or invisible, may operate on the electromagnetic spectrum or in another field, a partial list of which is included below) associated (e.g., is related to, includes, identifies, specifies, facilitates, assists, is about, is the subject of) with the entity (e.g., a thing, e.g., a person, a rock, a deer, anything that has separate and distinct existence and objective or conceptual reality) has been detected by a device (e.g., this could be an image capture device, e.g., as in FIG. 2A, or any other device that is capable of capturing images or receiving captured images) that captured (e.g., acquired, e.g., gathered the light, pixels, or other representation of the image) an entity image (e.g., a description of a graphic picture that is a visual representation of something, regardless of whether that something is coherent, nonsensical, abstract, or otherwise) that depicts at least one feature (e.g., a body, a part of a body, a thing carried by a body, a thing worn by a body, a thing possessed by a body, where the body is not necessarily human, living, or animate) of the entity (e.g., a thing, e.g., a person, a rock, a deer, anything that has separate and distinct existence and objective or conceptual reality).

Referring again to FIG. 9, operation 900 may include operation 906 depicting facilitating transmission of the term data that includes one or more conditions that regard use of the entity image that depicts at least a portion of the entity. For example, FIG. 2, e.g., FIG. 2B, shows term data that specifies one or more conditions that govern use of the entity image that depicts at least a portion of the entity transmission facilitating module 256 facilitating (e.g., taking one or more steps to assist in the furtherance of, whether successful or not, including actions that record steps or create other steps, and actions that ultimately result in an unintended result) transmission of the term data (e.g., data that may include one or more conditions regarding one or more actions, an example of which includes, but is not limited to, one or more terms of service) that includes one or more conditions (e.g., one or more terms, definitions, agreements, disclaimers, proclamations, and the like, e.g., a terms of service, that may be intended to be binding legally upon one or more parties upon execution of an action, e.g., like viewing a privacy indicator, detecting a privacy indicator, or reading the terms of service themselves, where such terms may include user rights and responsibilities, limits of usage, penalties for misuse, liquidated damages clauses, general damages clauses, acceptance of risk, assumption of liability, covenant not to sue, other covenants and agreements, and the like, a non-limiting example of which is provided below) that regard use (e.g., one or more of viewing, saving, sending, transmitting, sharing, manipulating, e-mailing, posting, sale of, distribution of, and the like) of the entity image (e.g., a description of a graphic picture that is a visual representation of something, regardless of whether that something is coherent, nonsensical, abstract, or otherwise) that depicts at least a portion (e.g., a feature, e.g., a body, a part of a body, a thing carried by a body, a thing worn by a body, a thing possessed by a body, where the body is not necessarily human, living, or animate) of the entity (e.g., a thing, e.g., a person, a rock, a deer, anything that has separate and distinct existence and objective or conceptual reality).

An example terms of service is listed below with the numbered paragraphs 1-5. Many other variations of terms of service are known and used in click-through agreements that are common at the time of filing, and the herein example is intended to be exemplary only and not limiting in any way.

1. By capturing an image of any part of the user Jules Caesar (hereinafter "Image"), or providing any automation, design, resource, assistance, or other facilitation in the capturing of the Image, you agree that you have captured these Terms of Service and that you acknowledge and agree to them. If you cannot agree to these Terms of Service, you should immediately delete the captured Image. Failure to do so will constitute acceptance of these Terms of Service.

2. The User Jules Caesar owns all of the rights associated with the Image and any representation of any part of Jules Caesar thereof;

3. By capturing the Image, you agree to provide the User Jules Caesar just compensation for any commercialization of the User's personality rights that may be captured in the Image.

4. By capturing the Image, you agree to take all reasonable actions to track the Image and to provide an accounting of all commercialization attempts related to the Image, whether successful or not.

5. By capturing the Image, you accept a Liquidated Damages agreement in which unauthorized use of the Image will result in mandatory damages of at least, but not limited to, $1,000,000.

A privacy beacon may include, but is not limited to, one or more of a marker that reflects light in a visible spectrum, a marker that reflects light in a nonvisible spectrum, a marker that emits light in a visible spectrum, a marker that emits light in a nonvisible spectrum, a marker that emits a radio wave, a marker that, when a particular type of electromagnetic wave hits it, emits a particular electromagnetic wave, an RFID tag, a marker that uses near-field communication, a marker that is in the form of a bar code, a marker that is in the form of a bar code and painted on a user's head and that reflects light in a nonvisible spectrum, a marker that uses high frequency low penetration radio waves (e.g., 60 GHz radio waves), a marker that emits a particular thermal signature, a marker that is worn underneath clothing and is detectable by an x-ray-type detector, a marker that creates a magnetic field, a marker that emits a sonic wave, a marker that emits a sonic wave at a frequency that cannot be heard by humans, a marker that is tattooed to a person's bicep and is detectable through clothing, a marker that is a part of a user's cellular telephone device, a marker that is broadcast by a part of a user's cellular telephone device, a marker that is broadcast by a keychain carried by a person, a marker mounted on a drone that maintains a particular proximity to the person, a marker mounted in eyeglasses, a marker mounted in a hat, a marker mounted in an article of clothing, the shape of the person's face is registered as the beacon, a feature of a person registered as the beacon, a marker displayed on a screen, a marker in the form of an LED, a marker embedded on a page, or a book, a string of text or data that serves as a marker, a marker embedded or embossed onto a device, and the like.

FIGS. 10A-10C depict various implementations of operation 902, depicting broadcasting, from an active indicator generator associated with an entity, a privacy indicator that is configured to indicate a presence of term data associated with the entity according to embodiments. Referring now to FIG. 10A, operation 902 may include operation 1002 depicting broadcasting, from an active indicator generation device associated with the entity, a privacy indicator that is configured to indicate a presence of term data associated with the entity. For example, FIG. 6, e.g., FIG. 6A, shows active indicator generation component broadcasting of a privacy indicator that indicates a presence of term data that regards an entity module 602 broadcasting (e.g., emitting), from an active indicator generation device (e.g., a cellular telephone device with a light emitting component) associated with the entity (e.g., carried by the person), a privacy indicator (e.g., a light beam of a particular wavelength) that is configured to indicate a presence of term data (e.g., a terms of service) associated with the entity (e.g., the person).

Referring again to FIG. 10A, operation 1002 may include operation 1004 depicting broadcasting, from a smartphone device that is the active indicator generation device associated with the entity, a privacy indicator that is configured to indicate the presence of the term data associated with the entity. For example, FIG. 6, e.g., FIG. 6A, shows active indicator generation component broadcasting of a privacy indicator that indicates a presence of term data that regards an entity module that is part of a smartphone device 604 broadcasting, from a smartphone device that is the active indicator generation device associated with the entity, a privacy indicator (e.g., a sonic wave of a particular frequency) that is configured to indicate the presence of the term data (e.g., a terms of service that includes a liquidated damages clause) associated with the entity (e.g., the person that carries the smartphone device).

Referring again to FIG. 10A, operation 1002 may include operation 1006 depicting broadcasting, from the active indicator generation device carried by the entity, a privacy indicator that is configured to indicate a presence of term data associated with the entity. For example, FIG. 6, e.g., FIG. 6A, shows active indicator generation component broadcasting of a privacy indicator that indicates a presence of term data that regards an entity module that is part of an entity-associated device 606 broadcasting, from the active indicator generation device (e.g., an article of smart clothing) carried (e.g., in a pocket, or worn), by the entity, a privacy indicator (e.g., a high frequency low penetration radio wave (e.g., 60 GHz radio waves)) that is configured to indicate a presence of term data (e.g., a terms of service that includes a consequential damages clause) associated with the entity (e.g., a person wearing the smart clothing).

Referring again to FIG. 10A, operation 1002 may include operation 1008 depicting broadcasting, from the active indicator generation device under control and/or dominion of the entity, the privacy indicator that is configured to indicate the presence of term data associated with the entity. For example, FIG. 6, e.g., FIG. 6A, shows active indicator generation component broadcasting of a privacy indicator that indicates a presence of term data that regards an entity module that is part of a device under control of the entity 608 broadcasting, from the active indicator generation device (e.g., a component mounted on the top of a laptop device) under control and/or dominion (e.g., the entity is the laptop, and the component receives commands from the laptop), the privacy indicator (e.g., an emitted electromagnetic wave) that is configured to indicate a presence of term data (e.g., a terms of service that has a foreseeable damages clause) associated with the entity (e.g., the laptop, and/or one or more documents displayed on the screen of the laptop).

Referring again to FIG. 10A, operation 1002 may include operation 1010 depicting broadcasting, from the active indicator generation device that has access to data about the entity, the privacy indicator that is configured to indicate the presence of term data associated with the entity. For example, FIG. 6, e.g., FIG. 6A, shows active indicator generation component broadcasting of a privacy indicator that indicates a presence of term data that regards an entity module that is part of a device that stores data that regards the entity 610 broadcasting, from the active indicator generation device (e.g., a wearable computing device, e.g., Google Glass, worn by the person who does not wish to be photographed/videoed) that has access to data about the entity (e.g., a name of the entity, or has the term data stored within), the privacy indicator (e.g., an RFID signal) that is configured to indicate a presence of term data (e.g., a terms of service with a strict liability for personality rights violation clause) associated with the entity.

Referring again to FIG. 10A, operation 1002 may include operation 1012 depicting broadcasting, from an active indicator generation device that is within a particular proximity to the entity, the privacy indicator that is configured to indicate the presence of term data associated with the entity. For example, FIG. 6, e.g., FIG. 6A, shows active indicator generation component broadcasting of a privacy indicator that indicates a presence of term data that regards an entity module that is within a particular proximity to the entity 612 broadcasting, from an active indicator generation device (e.g., a keychain carried by the entity) that is within a particular proximity (e.g., three feet) to the entity (e.g., the person), the privacy indicator (e.g., a particular thermal signature emitted by the keychain) that is configured to indicate a presence of term data (e.g., a terms of service including a compensatory damages clause) associated with the entity.

Referring now to FIG. 10B, operation 902 may include operation 1014 depicting transmitting, from the active indicator generation device associated with the entity, the privacy indicator that is configured to indicate the presence of term data associated with the entity. For example, FIG. 6, e.g., FIG. 6B, shows active indicator generator transmitting of the privacy indicator that indicates the presence of term data that regards an entity module 614 transmitting, from an active indicator generation device (e.g., a smartphone device carried by the user) associated with the entity (e.g., owned by the user), the privacy indicator (e.g., a light wave in the nonvisible spectrum) that is configured to indicate the presence of term data (e.g., a terms of service include a market value of personality rights clause) associated with the entity (e.g., the person carrying the smartphone device).

Referring again to FIG. 10B, operation 1014 may include operation 1016 depicting transmitting, without regard to a receipt status, from an active indicator generation device associated with the entity, the privacy indicator that is configured to indicate the presence of term data associated with the entity. For example, FIG. 6, e.g., FIG. 6B, shows active indicator generator transmitting, without regard for receipt status, of the privacy indicator that indicates the presence of term data that regards an entity module 616 transmitting, without regard to a receipt status (e.g., whether or not the transmitted signal/data was received), from an active indicator generation device (e.g., a beacon emitter) associated with the entity (e.g., a celebrity), the privacy indicator (e.g., a light wave emitted from the beacon emitter) that is configured to indicate a presence of term data (e.g., a terms of service that includes a punitive damages clause) associated with the entity (e.g., the celebrity).

Referring again to FIG. 10B, operation 1014 may include operation 1018 depicting transmitting, to two or more devices with image capture capability, and without regard to the receipt status, from the active indicator generation device that is associated with the entity, the privacy indicator that is configured to indicate the presence of term data associated with the entity. For example, FIG. 6, e.g., FIG. 6B, shows active indicator generator transmitting, to two or more discrete devices, of the privacy indicator that indicates the presence of term data that regards an entity module 618 transmitting, to two or more devices with image capture capability (e.g., the ability to capture still images and/or video), and without regard to the receipt status (e.g., without determining whether the transmitted signal/data was received), from the active indicator generation device (e.g., a smartphone device) that is associated with the entity (e.g., the entity logs into this particular smartphone device), the privacy indicator (e.g., an emitted light beam that has a particular shape) that is configured to indicate the presence of term data (e.g., a terms of service that includes an enforceable penalty clause) associated with the entity (e.g., the person that logs into the particular smartphone device that broadcasts the privacy indicator).

Referring now to FIG. 10C, operation 902 may include operation 1020 depicting broadcasting, from the active indicator generator associated with the entity, the privacy indicator that is a detectable signal that is configured to indicate the presence of the term data associated with the entity. For example, FIG. 6, e.g., FIG. 6C, shows active indicator generator broadcasting of a privacy indicator that is a detectable signal that indicates a presence of term data that regards an entity module 620 broadcasting, from the active indicator generator (e.g., a device that projects an infrared bar code onto a user's forehead) associated with the entity (e.g., the person with the device), the privacy indicator (e.g., the generated projected infrared bar code projected onto the user's forehead) that is a detectable signal (e.g., detectable with an infrared filter) that is configured to indicate the presence of the term data (e.g., a terms of service that includes a lost profits damages clause for the sale of an image containing the entity) associated with the entity.

Referring again to FIG. 10C, operation 1020 may include operation 1022 depicting broadcasting, from the active indicator generator associated with the entity, the privacy indicator that is an optically detectable signal that is configured to indicate the presence of the term data associated with the entity. For example, FIG. 6, e.g., FIG. 6C, shows active indicator generator broadcasting of a privacy indicator that is an optically-detectable signal that indicates a presence of term data that regards an entity module 622 broadcasting, from the active indicator generator (e.g., a smartphone device) associated with the entity (e.g., a person whose picture is being taken), the privacy indicator (e.g., a particular beam of light that causes a particular pattern to appear on an image) that is an optically detectable (e.g., detectable at a device through use of optical components) that is configured to indicate the presence of the term data (e.g., a terms of service that includes a lost profits damages clause for the distribution of an image containing the entity) associated with the entity (e.g., the person whose picture is being taken, e.g., user 105).

Referring again to FIG. 10C, operation 1020 may include operation 1024 depicting broadcasting, from the active indicator generator associated with the entity, the privacy indicator that is a light beam that is configured to indicate the presence of the term data associated with the entity. For example, FIG. 6, e.g., FIG. 6C, shows active indicator generator broadcasting of a privacy indicator that is a light beam signal that indicates a presence of term data that regards an entity module 624 broadcasting, from the active generator (e.g., a specific device configured to emit the indicator, that is carried by the entity) associated with the entity, the privacy indicator that is a light beam that is configured to indicate the presence of the term data (e.g., a terms of service that includes a consequential damages clause).

Referring again to FIG. 10C, operation 1024 may include operation 1026 depicting broadcasting, from the active indicator generator associated with the entity, the privacy indicator that is a light beam of a particular wavelength that is configured to indicate the presence of the term data associated with the entity. For example, FIG. 6, e.g., FIG. 6C, shows active indicator generator broadcasting of a privacy indicator that is a light beam of a particular wavelength that indicates a presence of term data that regards an entity module 626 broadcasting, from the active indicator generator (e.g., an application module that uses existing hardware on a smartphone device) associated with the entity, the privacy indicator that is a light beam of a particular wavelength that is configured to indicate the presence of the term data (e.g., a terms of service that includes a foreseeable damages clause) associated with the entity.

Referring again to FIG. 10C, operation 1026 may include operation 1028 depicting broadcasting, from the active indicator generator associated with the entity, the privacy indicator that is a light beam of a particular wavelength in the visible spectrum that is configured to indicate the presence of the term data associated with the entity. For example, FIG. 6, e.g., FIG. 6C, shows active indicator generator broadcasting of a privacy indicator that is a light beam of a particular wavelength in a visible spectrum that indicates a presence of term data that regards an entity module 628 broadcasting, from the active indicator generator (e.g., a component of a music player device) associated with the entity, the privacy indicator that is a light beam of a particular wavelength in the visible spectrum that is configured to indicate the presence of the term data (e.g., a terms of service that includes a consequential damages clause) associated with the entity.

Referring again to FIG. 10C, operation 1020 may include operation 1030 depicting broadcasting, from the active indicator generator associated with the entity, the privacy indicator that is a detectable signal that is configured to indicate the presence of the term data associated with the entity, wherein the active indicator generator is configured to generate a signal that appears as a particular pattern. For example, FIG. 6, e.g., FIG. 6C, shows active indicator generator broadcasting of a privacy indicator that is a detectable signal in a particular pattern that indicates a presence of term data that regards an entity module 630 broadcasting, from the active indicator generator (e.g., a component of a laptop device) associated with the entity, the privacy indicator that is a detectable signal that is configured to indicate the presence of the term data (e.g., a terms of service that includes a compensatory damages clause) associated with the entity (e.g., the person whose image is taken), wherein the active indicator generator is configured to generate a signal (e.g., a light beam reflecting off of a user's forehead, for example), that appears as a particular pattern (e.g., a bar code).

Referring again to FIG. 10C, operation 1030 may include operation 1032 depicting broadcasting, from the active indicator generator associated with the entity, the privacy indicator that is a detectable signal that is configured to indicate the presence of the term data associated with the entity, wherein the active indicator generator is configured to generate a signal that appears as a particular shape when captured in an image. For example, FIG. 6, e.g., FIG. 6C, shows active indicator generator broadcasting of a privacy indicator that is a detectable signal in a particular pattern of a particular shape that indicates a presence of term data that regards an entity module 632 broadcasting, from the active indicator generator associated with the entity Referring now to FIG. 10D, operation 902 may include operation 1034 depicting broadcasting, from the active indicator generator that is configured to emit a signal and that is associated with the entity, the privacy indicator that is the signal that is configured to indicate the presence of the term data associated with the entity. For example, FIG. 6, e.g., FIG. 6D, shows active indicator generator emitting of a signal that indicates a presence of term data that regards an entity module 634 broadcasting, from the active indicator generator that is configured to emit a signal and that is associated with the entity, the privacy indicator (e.g., a near-field communication signal) that is the signal that is configured to indicate the presence of term data (e.g., a terms of service that includes an enforceable penalty clause) associated with (e.g., applies to) the entity.

Referring again to FIG. 10D, operation 1034 may include operation 1036 depicting broadcasting, from the active indicator generator that is configured to emit a radio wave and that is associated with the entity, the privacy indicator that is a radio wave signal that is configured to indicate the presence of the term data associated with the entity. For example, FIG. 6, e.g., FIG. 6D, shows active indicator generator emitting of a radio wave signal that indicates a presence of term data that regards an entity module 636 broadcasting, from the active indicator generator (e.g., a device that is placed in the home of the entity and that emits radio waves) that is configured to emit a radio wave and that is associated with (e.g., owned by) the entity (e.g., a person at a particular location, e.g., their house, that does not want to be recorded through image or video), the privacy indicator that is a radio wave signal that is configured to indicate the presence of the term data (e.g., data that includes a terms of service that incorporates a liquidated damages clause) associated with the entity (e.g., the person at a particular location, e.g., their house, that does not want to be recorded through image or video Referring again to FIG. 10D, operation 1034 may include operation 1038 depicting broadcasting, from the active indicator generator that is configured to emit a sonic wave and that is associated with the entity, the privacy indicator that is a sonic wave signal that is configured to indicate the presence of the term data associated with the entity. For example, FIG. 6, e.g., FIG. 6D, shows active indicator generator emitting of a sonic wave signal that indicates a presence of term data that regards an entity module 638 broadcasting, from the active indicator generator (e.g., a device in a public place where people can go and know that they are protected from filming/having their picture taken) that is configured to emit a sonic wave (e.g., a wave of sound, whether detectable by the human ear or not) and is associated with the entity (e.g., the entity has provided data, e.g., a name, to the device in the public place), the privacy indicator that is a sonic wave signal that is configured to indicate the presence of the term data (e.g., a terms of service that includes a consequential damages clause) associated with the entity (e.g., the person in the public place).

Referring again to FIG. 10D, operation 1034 may include operation 1040 depicting broadcasting, from the active indicator generator that is configured to emit an electromagnetic wave in response to detecting a particular electromagnetic wave and that is associated with the entity, the privacy indicator that is the electromagnetic wave that is configured to indicate the presence of the term data associated with the entity. For example, FIG. 6, e.g., FIG. 6D, shows active indicator generator emitting of an electromagnetic wave that indicates a presence of term data that regards an entity module, said emitting of the electromagnetic wave in response to detection of an electromagnetic trigger wave 640 broadcasting, from the active indicator generator (e.g., a smartphone device carried by a person) that is configured to emit an electromagnetic wave in response to detecting a particular electromagnetic wave (e.g., a wave emitted by the image capturing device, whether intentionally, e.g., to let the device know that its image is being captured, or unintentionally, e.g., the device was intending to do something else, e.g., communicate with a network, or take an image, and an electromagnetic wave that was emitted as a result of that operation was detected) and that is associated with the entity, the privacy indicator that is the electromagnetic wave that is configured to indicate the presence of the term data (e.g., a foreseeable damages clause) associated with the entity).

Referring again to FIG. 10D, operation 1040 may include operation 1042 depicting broadcasting, from the active indicator generator that is configured to emit an electromagnetic wave in response to detecting a particular electromagnetic wave associated with a particular type of device, the privacy indicator that is the electromagnetic wave that is configured to indicate the presence of the term data associated with the entity. For example, FIG. 6, e.g., FIG. 6D, shows active indicator generator emitting of an electromagnetic wave that indicates a presence of term data that regards an entity module, said emitting of the electromagnetic wave in response to detection of an electromagnetic trigger wave associated with a particular type of device 642 broadcasting, from the active indicator generator that is configured to emit an electromagnetic wave (e.g., a data stream through near-field communication) in response to detecting a particular electromagnetic wave (e.g., a signal emitted by the image capture device) associated with a particular type of device (e.g., a device that has network capacity, or a device that has image capture capacity, or a device manufactured by a particular manufacturer, e.g., Apple), the privacy indicator that is the electromagnetic wave that is configured to indicate the presence of the term data (e.g., a terms of service that includes a compensatory damages clause) associated with the entity.

Referring again to FIG. 10D, operation 1042 may include operation 1044 depicting broadcasting, from the active indicator generator that is configured to emit an electromagnetic wave in response to detecting a particular electromagnetic wave associated with an image capture device, the privacy indicator that is the electromagnetic wave that is configured to indicate the presence of the term data associated with the entity. For example, FIG. 6, e.g., FIG. 6D, shows active indicator generator emitting of an electromagnetic wave that indicates a presence of term data that regards an entity module, said emitting of the electromagnetic wave in response to detection of an electromagnetic trigger wave associated with an image capture device 644 broadcasting, from the active indicator generator (e.g., a device carried by the user whose picture is being taken) that is configured to emit an electromagnetic wave (e.g., a magnetic field) in response to detecting a particular electromagnetic wave (e.g., a wave generated by an RFID tag) associated with an image capture device (e.g., a wearable computer that is required by law to be RFID-tagged), the privacy indicator that is the electromagnetic wave (e.g., the magnetic field that is generated) that is configured to indicate (e.g., upon detection of this particular magnetic field, the image capture device knows there is term data to be retrieved) the presence of the term data (e.g., a terms of service that includes a market value of personality rights clause) associated with the entity).

Referring now to FIG. 10E, operation 1044 may include operation 1046 depicting broadcasting, from the active indicator generator that is configured to emit an electromagnetic wave in response to detecting a particular electromagnetic wave associated with an image capture device manufactured by a particular manufacturer, the privacy indicator that is the electromagnetic wave that is configured to indicate the presence of the term data associated with the entity. For example, FIG. 6, e.g., FIG. 6D, shows active indicator generator emitting of an electromagnetic wave that indicates a presence of term data that regards an entity module, said emitting of the electromagnetic wave in response to detection of an electromagnetic trigger wave associated with an image capture device produced at least in part by a particular manufacturer 646 broadcasting, from the active indicator generator (e.g., a specialized device that clips to a keychain) that is configured to emit an electromagnetic wave (e.g., a data stream signal) in response to detecting a particular electromagnetic wave (e.g., a wave generated by an RFID tag) associated with an image capture device (e.g., a wearable computer that is required by law to be RFID-tagged) manufactured by a particular manufacturer, the privacy indicator that is the electromagnetic wave (e.g., the data stream that is generated) that is configured to indicate (e.g., the data stream includes the term data) the presence of the term data (e.g., a terms of service that includes a market value of personality rights clause) associated with the entity).

Referring again to FIG. 10E, operation 1040 may include operation 1048 depicting broadcasting, from the active indicator generator that is configured to emit the electromagnetic wave in response to detecting the particular electromagnetic wave associated with image capture functionality, the privacy indicator that is the electromagnetic wave that is configured to indicate the presence of the term data associated with the entity. For example, FIG. 6, e.g., FIG. 6D, shows active indicator generator emitting of an electromagnetic wave that indicates a presence of term data that regards an entity module, said emitting of the electromagnetic wave in response to detection of an electromagnetic trigger wave that is associated with image capture functionality 648 broadcasting, from the active indicator generator (e.g., a portion of a smartphone device that is running a particular application) that is configured to emit the electromagnetic wave (e.g., a focused light wave) in response to detecting the particular electromagnetic wave associated with image capture functionality (e.g., a light wave associated with a flash, or an "indicator" data stream that is required by law to be broadcast when a wearable computer captures an image), the privacy indicator (e.g., the projection of the focused light wave) that is the electromagnetic wave that is configured to indicate the presence of the term data (e.g., a terms of service including a punitive damages clause) associated with the entity).

Referring now to FIG. 10F, operation 902 may include operation 1050 depicting broadcasting, from an active indicator generator component that is associated with the entity, a privacy indicator that is configured to indicate a presence of term data associated with the entity. For example, FIG. 6, e.g., FIG. 6E, shows active indicator generator component broadcasting of a privacy indicator that indicates a presence of term data that regards an entity module 650 broadcasting, from an active indicator generator component (e.g., a portion of a device, e.g., a smartphone or tablet device) that is associated with the entity (e.g., the person whose image is being taken), a privacy indicator (e.g., light emitted in the visible spectrum) that is configured to indicate a presence of term data (e.g., a terms of service including a compensatory damages clause) associated with the entity.

Referring again to FIG. 10F, operation 1050 may include operation 1052 depicting broadcasting, from an active indicator generator component that is part of a device that is associated with the entity, a privacy indicator that is configured to indicate a presence of term data associated with the entity. For example, FIG. 6, e.g., FIG. 6E, shows active indicator generator device component broadcasting of a privacy indicator that indicates a presence of term data that regards an entity module 652 broadcasting, from an active indicator generator component that is part of a device (e.g., a smartphone device) that is associated with (e.g., is owned by) the entity (e.g., the person whose image is guarded and protected by the term data), a privacy indicator (e.g., light emitted in a nonvisible spectrum) that is configured to indicate a presence of term data (e.g., a terms of service that includes a lost profits damages clause for the sale of) associated with the entity.

Referring again to FIG. 10F, operation 1052 may include operation 1054 depicting broadcasting, from the active indicator generator component that is part of a passive device that is associated with the entity, the privacy indicator that is configured to indicate the presence of term data associated with the entity. For example, FIG. 6, e.g., FIG. 6E, shows active indicator generator passive device component broadcasting of a privacy indicator that indicates a presence of term data that regards an entity module 654 broadcasting, from the active indicator generator component that is part of a passive device (e.g., a device that does not execute any operations other than the ones associated with the active indicator generator component) that is associated with the entity, the privacy indicator that is configured to indicate the presence of term data associated with the entity.

Referring again to FIG. 10F, operation 902 may include operation 1056 depicting broadcasting, from the active indicator generator associated with the entity, a privacy indicator that is configured to indicate the presence of term data associated with the entity, said term data configured to specify one or more conditions that regard use of the entity image that depicts at least a portion of the entity. For example, FIG. 6, e.g., FIG. 6E, shows active indicator generator broadcasting of a privacy indicator that indicates a presence of term data that specifies one or more conditions that regard use of a depiction of the entity in an image module 656 broadcasting, from the active indicator generator associated with the entity, a privacy indicator that is configured to indicate the presence of term data associated with the entity, said term data configured to specify one or more conditions (e.g., a liquidated damages clause) that regard use of the entity image that depicts at least a portion of the entity).

Referring again to FIG. 10F, operation 902 may include operation 1058 depicting broadcasting, from an active indicator generator that is associated with the entity, a datastream that defines the presence of term data associated with the entity. For example, FIG. 6, e.g., FIG. 6E, shows active indicator generator broadcasting of a datastream that indicates a presence of term data that regards an entity module 658 broadcasting, from an active indicator generator (e.g., a portion of a cellular telephone device) that is associated with the entity, a data stream (e.g., one or more packets of data) that defines the presence of term data (e.g., a terms of service that includes a consequential damages clause) associated with the entity (e.g., the terms of service specifies the entity within its contents.

FIGS. 11A-11F depict various implementations of operation 904, depicting acquiring an indication that the privacy indicator associated with the entity has been detected by a device that captured an entity image that depicts at least one feature of the entity, according to embodiments. Referring now to FIG. 11A, operation 904 may include operation 1102 depicting receiving the indication that the privacy indicator associated with the entity has been detected by the device that captured the entity image that depicts the at least one feature of the entity. For example, FIG. 7, e.g., FIG. 7A, shows indication of detection of the privacy indicator that is associated with the entity by a device that captured an entity image that depicts at least one feature of the entity receiving module 702 receiving the indication that the privacy indicator (e.g., a light beam reflected in a visible spectrum) associated with the entity has been detected by the device (e.g., the wearable computer, e.g., Google Glass) that captured the entity image (e.g., an image depicting the person protected by the privacy indicator) that depicts the at least one feature of the entity).

Referring again to FIG. 11A, operation 1102 may include operation 1104 depicting receiving the indication, from the device that detected the indication, that the privacy indicator associated with the entity has been detected by the device that captured the entity image that depicts the at least one feature of the entity. For example, FIG. 7, e.g., FIG. 7A, shows indication of detection of the privacy indicator that is associated with the entity by a device that captured an entity image that depicts at least one feature of the entity receiving from the device that captured the entity image module 704 receiving the indication, from the device (e.g., the wearable computer, e.g., the EyeTap device) that detected the indication, that the privacy indicator (e.g., a light beam in a visible spectrum that makes a particular pattern) associated with the entity has been detected by the device (e.g., the wearable computer, e.g., the EyeTap device) that captured the entity image (e.g., the image depicting the person protected by the privacy indicator) that depicts the at least one feature of the entity.

Referring again to FIG. 11A, operation 1104 may include operation 1106 depicting receiving the indication, from the device that optically detected the indication, that the privacy indicator associated with the entity has been detected by the device that captured the entity image that depicts the at least one feature of the entity. For example, FIG. 7, e.g., FIG. 7A, shows indication of detection of the privacy indicator that is associated with the entity by a device that captured an entity image that depicts at least one feature of the entity receiving from the device that captured the entity image and that detected the privacy indicator module 706 receiving the indication, from the device (e.g., a wearable computer, e.g., a hypothetical Apple-branded wearable computer, e.g., Apple iGlasses), that the privacy indicator associated with the entity has been detected by the device that captured the entity image that depicts the at least one feature of the entity.

Referring again to FIG. 11A, operation 1102 may include operation 1108 depicting receiving the indication, from the entity, that the privacy indicator associated with the entity has been detected by the device that captured the entity image that depicts the at least one feature of the entity. For example, FIG. 7, e.g., FIG. 7A, shows indication of detection of the privacy indicator that is associated with the entity by a device that captured an entity image that depicts at least one feature of the entity receiving from the entity module 708 receiving the indication, from the entity (e.g., the person whose image was captured notices that their image was captured, and presses a button on the device that houses the active indicator generator, or speaks to the device, or interacts with the device somehow), that the privacy indicator (e.g., a particular type of electromagnetic wave) associated with the entity has been detected by the device (e.g., the wearable computer) that captured the entity image that depicts the at least one feature of the entity.

Referring again to FIG. 11A, operation 1102 may include operation 1110 depicting receiving the indication, from a remote server related to the device that detected the privacy indicator, that the privacy indicator associated with the entity has been detected by the device that captured the entity image that depicts the at least one feature of the entity. For example, FIG. 7, e.g., FIG. 7A, shows indication of detection of the privacy indicator that is associated with the entity by a device that captured an entity image that depicts at least one feature of the entity receiving from a remote server related to the device module 710 receiving the indication, from a remote server related to the device (e.g., the wearable computer) that detected the privacy indicator, that the privacy indicator associated with the entity has been detected by the device (e.g., the wearable computer) that captured the entity image that depicts at least one feature of the entity).

Referring again to FIG. 11A, operation 904 may include operation 1112 depicting detecting that the privacy indicator associated with the entity has been detected by the device that captured the entity image that depicts the at least one feature of the entity. For example, FIG. 7, e.g., FIG. 7A, shows privacy indicator that is associated with the entity by a device that captured an entity image that depicts at least one feature of the entity detecting module 712 detecting that the privacy indicator associated with the entity has been detected by the device (e.g., a wearable computer, e.g., a hypothetical Microsoft-branded wearable computer, e.g., KinectVision) that captured the entity image that depicts the at least one feature of the entity.

Referring again to FIG. 11A, operation 1112 may include operation 1114 depicting detecting that the privacy indicator associated with the entity has been detected in the entity image by the device that captured the entity image that depicts the at least one feature of the entity. For example, FIG. 7, e.g., FIG. 7A, shows privacy indicator that is associated with the entity by a device that captured an entity image that depicts at least one feature of the entity detecting in the entity image module 714 detecting that the privacy indicator (e.g., a particular pattern of cotemporaneous light beams) associated with the entity (e.g., the person whose personality rights are protected) has been detected in the entity image by the device (e.g., the image capture device, e.g., a stationary mounted camera) that captured the entity image that depicts the at least one feature of the entity.

Referring now to FIG. 11B, operation 904 may include operation 1116 depicting receiving notification that the privacy indicator associated with the entity has been detected by the device that captured the entity image that depicts the at least one feature of the entity. For example, FIG. 7, e.g., FIG. 7B, shows notification of detection of the privacy indicator that is associated with the entity by a device that captured an entity image that depicts at least one feature of the entity receiving module 716 receiving notification that the privacy indicator (e.g., a signal broadcast over high frequency low penetration radio waves (e.g., 60 GHz radio waves)) associated with the entity has been detected by the device (e.g., a stationary camera, e.g., a camera mounted in an automated teller machine) that captured the entity image that depicts the at least one feature of the entity.

Referring again to FIG. 11B, operation 1116 may include operation 1118 depicting receiving notification that the device that captured the entity image has obtained the term data that includes one or more conditions that regard use of the entity image that depicts the at least one feature of the entity. For example, FIG. 7, e.g., FIG. 7B, shows notification of detection of the privacy indicator that is associated with the entity and acquisition of the term data by a device that captured an entity image that depicts at least one feature of the entity receiving module 718 receiving notification that the device (e.g., the wearable computer, e.g., the Nokia SMARTglasses) that captured the entity image has obtained the term data (e.g., a terms of service specifying terms for using the captured image) that includes one or more conditions that regard use of the entity image that depicts the at least one feature of the entity.

Referring again to FIG. 11B, operation 1118 may include operation 1120 depicting receiving, from a remote server that is configured to manage the term data, notification that the device that captured the entity image has obtained the term data that includes one or more conditions that regard use of the entity image that depicts the at least one feature of the entity. For example, FIG. 7, e.g., FIG. 7B, shows notification of detection of the privacy indicator that is associated with the entity and acquisition of the term data by a device that captured an entity image that depicts at least one feature of the entity receiving from a term data management server module 720 receiving, from a remote server (e.g., indicator management device 260) that is configured to manage the term data (e.g., data regarding the terms of service associated with the personality rights of the entity), notification that the device that captured the entity image has obtained the term data that includes one or more conditions that regard use of the entity image that depicts the at least one feature of the entity.

Referring again to FIG. 11B, operation 1118 may include operation 1122 depicting receiving, from the device that captured the entity image, notification that the device that captured the entity image has obtained the term data that includes one or more conditions that regard use of the entity image that depicts the at least one feature of the entity. For example, FIG. 7, e.g., FIG. 7B, shows notification of detection of the privacy indicator that is associated with the entity and acquisition of the term data by a device that captured an entity image that depicts at least one feature of the entity receiving from the device that captured the entity image module 722 receiving, from the device (e.g., the image capture device, e.g., the wearable computer) that captured (e.g., surreptitiously captured) the entity image (e.g., an image of a person at a bar), notification that the device that captured the entity image has obtained the term data that includes one or more conditions (e.g., a market value of personality rights clause) that regard use (e.g., sale and/or distribution of) of the entity image that depicts the at least one feature of the entity).

Referring again to FIG. 11B, operation 904 may include operation 1124 depicting acquiring the indication that the privacy indicator associated with the entity has been detected by the device at a time that the device captured the entity image that depicts at least one feature of the entity. For example, FIG. 7, e.g., FIG. 7B, shows indication of detection of the privacy indicator that is associated with the entity by a device that captured an entity image that depicts at least one feature of the entity obtaining at a time of entity image capture module 724 acquiring the indication that the privacy indicator associated with the entity has been detected by the device at a time that the device (e.g., the wearable computer) captured the entity image that depicts at least one feature of the entity.

Referring again to FIG. 11B, operation 904 may include operation 1126 depicting acquiring the indication that the privacy indicator associated with the entity has been detected in the entity image by the device that captured the entity image that depicts at least one feature of the entity. For example, FIG. 7, e.g., FIG. 7B, shows indication of detection in the entity image of the privacy indicator that is associated with the entity by the device that captured the entity image that depicts at least one feature of the entity obtaining module 726 acquiring the indication that the privacy indicator (e.g., a pattern that is projected onto the user so that it is detectable in an image of the user) associated with the entity (e.g., the person whose personality rights are being protected) has been detected in the entity image by the device (e.g., a wearable computer, e.g., a hypothetical Samsung-branded wearable computer, e.g., Samsung Spectacles) that captured the entity image that depicts the at least one feature of the entity.

Referring now to FIG. 11C, operation 904 may include operation 1128 depicting acquiring a capture indication that the device has captured the entity image. For example, FIG. 7, e.g., FIG. 7B, shows indication of device capture of the entity image obtaining module 724 acquiring a capture indication (e.g., data that indicates a capture of the entity has occurred) that the device (e.g., the wearable computer, e.g., the Oculon Optoelectronics) has captured the entity image.

Referring again to FIG. 11C, operation 904 may include operation 1130 depicting obtaining a privacy indication that the privacy indicator has been detected. For example, FIG. 7, e.g., FIG. 7B, shows detection indication of detection of the privacy indicator that is associated with the entity obtaining module 730 obtaining a privacy indication (e.g., data that indicates the privacy indicator was found) that the privacy indicator (e.g., a light beam that is broadcast by a device carried by the entity) has been detected.

Referring again to FIG. 11C, operation 1128 may include operation 1132 depicting detecting that the entity has been captured in an entity image by the device. For example, FIG. 7, e.g., FIG. 7B, shows capture indication of device capture of the entity image detecting module 732 detecting that the entity has been captured in an entity image by the device (e.g., a wearable computer, e.g., the Fujitsu Laser EyeWear).

Referring again to FIG. 11C, operation 1130 may include operation 1134 depicting receiving a signal from the device that indicates that the privacy indicator has been detected. For example, FIG. 7, e.g., FIG. 7C, shows detection indication of detection of the privacy indicator that is associated with the entity receiving from the device module 734 receiving a signal from the device (e.g., the wearable computer, e.g., Google Glass) that indicates that the privacy indicator (e.g., a particular pattern of infrared light waves) has been detected.

Referring again to FIG. 11C, operation 1130 may include operation 1136 depicting sending a query to the device for which the capture indication was acquired, said query regarding whether the privacy indicator was detected. For example, FIG. 7, e.g., FIG. 7C, shows query that regards whether the privacy indicator was detected transmitting to the device that captured the entity image module 736 sending a query (e.g., data, and a request for a transmission of further data in response) to the device (e.g., the device that captured the image, e.g., the image capture device, e.g., the wearable computer, e.g., the EyeTap) for which the capture indication was acquired, said query regarding whether the privacy indicator (e.g., a marker of emitted light) was detected.

Referring again to FIG. 11C, operation 1130 may include operation 1138 depicting obtaining, from the device, the privacy indication that the privacy indicator has been detected. For example, FIG. 7, e.g., FIG. 7C, shows detection indication of the detection of the privacy indicator receiving from the queried device module 738 obtaining, from the device, the privacy indication that the privacy indicator has been detected.

Referring now to FIG. 11D, operation 904 may include operation 1140 depicting acquiring the indication that the privacy indicator associated with the entity has been detected by an image capture device that captured the entity image that depicts at least one feature of the entity. For example, FIG. 7, e.g., FIG. 7D, shows indication of detection of the privacy indicator that is associated with the entity by an image capture device that captured an entity image that depicts at least one feature of the entity obtaining module 740 acquiring the indication that the privacy indicator (e.g., an emitted light signal in the shape of a rectangle) associated with the entity has been detected by an image capture device that captured the entity image that depicts at least one feature of the entity.

Referring again to FIG. 11D, operation 1140 may include operation 1142 depicting acquiring the indication that the privacy indicator associated with the entity has been detected by a wearable computer that covertly captured the entity image that depicts at least one feature of the entity. For example, FIG. 7, e.g., FIG. 7D, shows indication of detection of the privacy indicator that is associated with the entity by a wearable computing device that captured an entity image that depicts at least one feature of the entity obtaining module 742 acquiring the indication that the privacy indicator (e.g., a specific pattern of three colors of emitted light) has been detected by a wearable computer that covertly (e.g., without the knowledge of the entity) captured the entity image that depicts at least one feature of the entity).

Referring again to FIG. 11D, operation 1142 may include operation 1144 depicting acquiring the indication, from the active indicator generator, that the privacy indicator associated with the entity has been detected by a wearable computer that covertly captured the entity image that depicts at least one feature of the entity. For example, FIG. 7, e.g., FIG. 7D, shows indication of detection of the privacy indicator that is associated with the entity by a wearable computing device that surreptitiously captured an entity image that depicts at least one feature of the entity obtaining module 744 acquiring the indication, from the active indicator generator (e.g., a component carried by the entity that generates the privacy indicator, e.g., through electromagnetic waves), that the privacy indicator associated with the entity has been detected by a wearable computer (e.g., Google Glass wearable computer) that covertly (e.g., without knowledge of the entity) captured the entity image that depicts at least one feature of the entity.

Referring again to FIG. 11D, operation 1140 may include operation 1146 depicting acquiring the indication that the privacy indicator associated with the entity has been detected by the image capture device that attempted to surreptitiously capture the entity image that depicts at least one feature of the entity. For example, FIG. 7, e.g., FIG. 7D, shows indication of detection of the privacy indicator that is associated with the entity by an image capture device that attempted to covertly capture the entity image that depicts at least one feature of the entity obtaining module 746 acquiring the indication that the privacy indicator associated with the entity has been detected by the image capture device (e.g., a wearable computer, e.g., a hypothetical Apple-branded wearable computer, e.g., iGlasses) that attempted to surreptitiously capture the entity image that depicts at least one feature of the entity, Referring again to FIG. 11D, operation 1146 may include operation 1148 depicting detecting that the privacy indicator associated with the entity has been detected by the image capture device that attempted to surreptitiously capture the entity image that depicts at least one feature of the entity. For example, FIG. 7, e.g., FIG. 7D, shows detection of the privacy indicator that is associated with the entity by an image capture device that attempted to covertly capture the entity image that depicts at least one feature of the entity detecting module 748 detecting that the privacy indicator (e.g., a signal broadcast using near-field communication to cover a particular visible range) associated with the entity has been detected by the image capture device (e.g., the wearable computer, e.g., a hypothetical Microsoft-branded wearable computer, e.g., KinectVision) that attempted to surreptitiously capture the entity image that depicts at least one feature of the entity.

Referring again to FIG. 11D, operation 904 may include operation 1150 depicting acquiring, from the active indicator generator, the indication that the privacy indicator associated with the at least one entity has been captured by the device that obtained the entity image that depicts at least one feature of the entity. For example, FIG. 7, e.g., FIG. 7D, shows indication of detection of the privacy indicator that is associated with the entity by a device that captured an entity image that depicts at least one feature of the entity obtaining from the active indicator generator module 750 acquiring, from the active indicator generator (e.g., the component carried by the entity to generate the privacy indicator to provide some protection from being captured in images), the indication that the privacy indicator associated with the at least one entity has been captured by the device (e.g., the image capture device, e.g., the wearable computer) that obtained the entity image that depicts at least one feature of the entity.

Referring now to FIG. 11E, operation 904 may include operation 1152 depicting acquiring an indication that the privacy indicator associated with the entity has been detected by the device that captured the entity image in violation of one or more restrictions set forth upon the device. For example, FIG. 7, e.g., FIG. 7E, shows indication of detection of the privacy indicator that is associated with the entity by a device that captured an entity image in violation of one or more acquired device restrictions obtaining module 752 acquiring an indication that the privacy indicator (e.g., a signal transmitted through use of a thermal signature) associated with the entity has been detected by the device (e.g., the image capture device, e.g., the wearable computer) that captured the entity image in violation of one or more restrictions set forth upon the device (e.g., the device is located in an area that prohibits filming, e.g., a live sporting event).

Referring again to FIG. 11E, operation 1152 may include operation 1154 depicting acquiring the indication that the privacy indicator associated with the entity has been detected by the device that captured the entity image in violation of a restriction of capturing an image in a particular geographic area. For example, FIG. 7, e.g., FIG. 7E, shows indication of detection of the privacy indicator that is associated with the entity by a device that captured an entity image in violation of a restriction on device capture at a particular location obtaining module 754 acquiring the indication that the privacy indicator associated with the entity has been detected by the device (e.g., the wearable computer) that captured the entity image in violation of a restriction of capturing an image in a particular geographic area (e.g., within the confines of a Las Vegas pool area).

Referring again to FIG. 11E, operation 1154 may include operation 1156 depicting acquiring the indication that the privacy indicator associated with the entity has been detected by the device that captured the entity image in violation of the restriction of image capture inside a movie theater. For example, FIG. 7, e.g., FIG. 7E, shows indication of detection of the privacy indicator that is associated with the entity by a device that captured an entity image in violation of a restriction on device capture at a movie theater obtaining module 756 acquiring the indication that the privacy indicator (e.g., a beam of light arranged in a particular pattern) associated with the entity has been detected by the device (e.g., a wearable computer) that captured the entity image in violation of the restriction of capturing the image inside a movie theater.

Referring again to FIG. 11E, operation 1156 may include operation 1158 depicting acquiring the indication that the privacy indicator associated with the entity has been detected by the device that captured an image of a movie screen in violation of the restriction of image capture inside the movie theater. For example, FIG. 7, e.g., FIG. 7E, shows indication of detection of the privacy indicator that is associated with the entity by a device that captured a screen image in violation of a restriction on device capture at a movie theater obtaining module 756 acquiring the indication that the privacy indicator (e.g., a beam of light arranged in a particular pattern) associated with the entity has been detected by the device (e.g., a wearable computer) that captured an image of a movie screen in violation of the restriction of capturing the image inside a movie theater.

Referring again to FIG. 11E, operation 1158 may include operation 1160 depicting acquiring the indication that the privacy indicator associated with the entity has been detected by the device that captured an image of a movie screen at a time while a particular protected portion of a movie was displayed, in violation of the restriction of image capture inside the movie theater. For example, FIG. 7, e.g., FIG. 7E, shows indication of detection of the privacy indicator that is associated with the entity by a device that captured a screen image in violation of a restriction on device capture at a movie theater at a time when a particular protected portion of a move was displayed obtaining module 758 acquiring the indication that the privacy indicator (e.g., a beam of light arranged in a particular pattern) associated with the entity has been detected by the device (e.g., a wearable computer) that captured an image of a movie screen at a time while a particular protected portion of a movie (e.g., not the credits, or the previews; or, in an embodiment, a particularly scandalous portion of the movie, e.g., a racy scene with a famous actress) was displayed, in violation of the restriction of capturing the image inside a movie theater.

Referring again to FIG. 11E, operation 1152 may include operation 1162 depicting acquiring the indication that the privacy indicator associated with the entity has been detected by the device that captured the entity image in violation of a restriction of capturing an image while traveling above a particular speed. For example, FIG. 7, e.g., FIG. 7E, shows indication of detection of the privacy indicator that is associated with the entity by a device that captured an entity image in violation of a restriction on device capture that has a particular velocity range obtaining module 762 acquiring the indication that the privacy indicator (e.g., a signal broadcast from an RFID tag affixed to a user's shirt) associated with the entity (e.g., the person wearing the RFID-affixed shirt) has been detected by the device that captured the entity image in violation of a restriction of capturing an image while traveling above a particular speed (e.g., while driving a car).

Referring now to FIG. 11F, operation 904 may include operation 1164 depicting acquiring an indication that is broadcast by the device that captured the entity image, said indication configured to indicate that the device has captured the entity image that depicts the at least one feature of the entity. For example, FIG. 7, e.g., FIG. 7F, shows indication of detection of the privacy indicator that is associated with the entity, said indication broadcast by the device that captured the entity image that depicts at least one feature of the entity obtaining module 764 acquiring an indication that is broadcast by the device (e.g., an image capture device) that captured the entity image, said indication configured to indicate that the device has captured the entity image that depicts the at least one feature of the entity.

Referring again to FIG. 11F, operation 904 may include operation 1166 depicting receiving device data from the device. For example, FIG. 7, e.g., FIG. 7F, shows device data receiving from the device module 766 receiving device data (e.g., data that regards the device, e.g., status of the device, name of the device, owner of the device, specific capabilities of the device, whether the device is recording, whether the device is capable of recording, content that the device already has captured; etc.) from the device (e.g., the image capture device).

Referring again to FIG. 11F, operation 904 may include operation 1168 depicting acquiring, from the device for which the device data was received, the indication that the privacy indicator associated with the entity has been detected by the device. For example, FIG. 7, e.g., FIG. 7F, shows indication of detection of the privacy indicator that is associated with the entity receiving from the device for which device data was received module 768 acquiring, from the device (e.g., the image capture device) for which the device data (e.g., data that regards the device, e.g., status of the device, name of the device, owner of the device, specific capabilities of the device, whether the device is recording, whether the device is capable of recording, content that the device already has captured; etc.) was received, the indication that the privacy indicator associated with the entity has been detected by the device.

Referring again to FIG. 11F, operation 1166 may include operation 1170 depicting receiving device data that provides notification that the device is in a particular area and that the device has a capacity to capture one or more images. For example, FIG. 7, e.g., FIG. 7F, shows device data that indicates that the device is in a particular area and that the device is configured to capture images receiving from the device module 770 receiving device data that provides notification that the device (e.g., the image capture device) is in a particular area (e.g., a bar that has banned recording of people) and that the device has a capacity (e.g., the ability to) capture one or more images (e.g., the device has an image capture component).

Referring again to FIG. 11F, operation 1166 may include operation 1172 depicting receiving a request from the device to capture one or more images. For example, FIG. 7, e.g., FIG. 7F, shows device data that includes a request to capture one or more images receiving module 772 receiving a request from the device (e.g., the image capture device) to capture one or more images FIGS. 12A-12D depict various implementations of operation 906, depicting facilitating transmission of the term data that includes one or more conditions that regard use of the entity image that depicts at least a portion of the entity, according to embodiments. Referring now to FIG. 12A, operation 906 may include operation 1202 depicting transmitting the term data that includes one or more conditions that regard use of the entity image that depicts at least a portion of the entity. For example, FIG. 8, e.g., FIG. 8A, shows term data that specifies one or more conditions that govern use of the entity image that depicts at least a portion of the entity transmitting module 802 transmitting the term data that includes one or more conditions that regard use of the entity image that depicts at least a portion of the entity, Referring again to FIG. 12A, operation 906 may include operation 1204 depicting providing instructions to a term data transmission station, to transmit the term data that includes one or more conditions that regard use of the entity image that depicts at least a portion of the entity. For example, FIG. 8, e.g., FIG. 8A, shows instructions for transmission of term data that specifies one or more conditions that govern use of the entity image that depicts at least a portion of the entity providing to a term transmission station module 804 providing instructions to a term data transmission station (e.g., a remote server that stores term data for a particular set of users, e.g., users that have subscribed to a service that issues active indicator generators that generate privacy indicators), to transmit the term data that includes one or more conditions (e.g., a liquidated damages clause) that regard use of the entity image that depicts at least a portion of the entity.

Referring again to FIG. 12A, operation 1204 may include operation 1206 depicting providing instructions to the term data transmission station, to transmit the term data that includes one or more conditions that regard use of the entity image that depicts at least a portion of the entity, wherein the term data transmission station is a remote server configured to store term data for two or more entities. For example, FIG. 8, e.g., FIG. 8A, shows instructions for transmission of term data that specifies one or more conditions that govern use of the entity image that depicts at least a portion of the entity providing to a term transmission station configured to manage term data module 806 providing instructions to a term data transmission station (e.g., a remote server that stores term data for a particular set of users, e.g., users that have subscribed to a service that issues active indicator generators that generate privacy indicators), to transmit the term data that includes one or more conditions (e.g., a liquidated damages clause) that regard use of the entity image that depicts at least a portion of the entity, wherein the term data transmission station is a remote server configured to store term data for two or more entities (e.g., two users who have subscribed to the service).

Referring again to FIG. 12A, operation 906 may include operation 1208 depicting facilitating transmission of the term data that includes one or more conditions that regard distribution, sale, resale, view, manipulation, and/or transmission of the entity image that depicts at least a portion of the entity. For example, FIG. 8, e.g., FIG. 8A, shows term data that specifies one or more conditions that govern distribution of the entity image that depicts at least a portion of the entity transmission facilitating module 808 facilitating transmission of the term data that includes one or more conditions (e.g., a consequential damages clause) that regard distribution, sale, resale, view, manipulation, and/or transmission of the entity image that depicts at least a portion of the entity.

Referring again to FIG. 12A, operation 906 may include operation 1210 depicting facilitating transmission of the term data that includes one or more conditions that regard distribution of the entity image on a social network site. For example, FIG. 8, e.g., FIG. 8A, shows term data that specifies one or more conditions that govern distribution on a social network of the entity image on a that depicts at least a portion of the entity transmission facilitating module 810 facilitating transmission of the term data that includes one or more conditions (e.g., a punitive damages clause that fines a person 1,000 dollars for posting an image to a social networking site, e.g., Facebook) that regard distribution (e.g., uploading) of the entity image on a social networking site.

Referring now to FIG. 12B, operation 906 may include operation 1212 depicting facilitating transmission of the term data that includes one or more conditions that specify a potential liability for use of the entity image that depicts at least a portion of the entity. For example, FIG. 8, e.g., FIG. 8B, shows term data that specifies one or more conditions that specify a potential liability for use of the entity image that depicts the at least the portion of the entity transmission facilitating module 812 facilitating transmission of the term data that includes one or more conditions that specify a potential liability (e.g., an enforceable penalty clause of a penalty of $500) for use (e.g., posting the image on a personal website to drive traffic and ad revenue) of the entity image that depicts at least a portion of the entity.

Referring again to FIG. 12B, operation 1212 may include operation 1214 depicting facilitating transmission of the term data that includes one or more conditions that specify monetary damage liability for use of the entity image that depicts at least a portion of the entity. For example, FIG. 8, e.g., FIG. 8B, shows term data that specifies one or more conditions that specify a potential monetary liability for use of the entity image that depicts the at least the portion of the entity transmission facilitating module 814 facilitating transmission of the term data that includes one or more conditions that specify monetary damage liability for use of the entity image (e.g., an image of two prominent politicians meeting) that depicts at least a portion of the entity.

Referring again to FIG. 12B, operation 1214 may include operation 1216 depicting facilitating transmission of the term data that includes one or more conditions that specify a liquidated damages of a particular monetary amount clause for use of the entity image that depicts at least a portion of the entity. For example, FIG. 8, e.g., FIG. 8B, shows term data that specifies one or more conditions that specify a liquidated damages clause that enumerates a monetary liability for use of the entity image that depicts the at least the portion of the entity transmission facilitating module 816 facilitating transmission of the term data that includes one or more conditions that specify a liquidated damages of a particular monetary amount (e.g., $5,000) clause for use of the entity image (e.g., a picture of two people on a data at a restaurant) that depicts at least a portion of (e.g., a face and shoulders) the entity (e.g., one of the two people in the picture).

Referring again to FIG. 12B, operation 1214 may include operation 1218 depicting facilitating transmission of the term data that includes one or more conditions that specify foreseeable damages of a calculable monetary amount clause for use of the entity image that depicts at least a portion of the entity. For example, FIG. 8, e.g., FIG. 8B, shows term data that specifies one or more conditions that specify a foreseeable damages clause that enumerates a type of monetary liability incurred for use of the entity image that depicts the at least the portion of the entity transmission facilitating module 818 facilitating transmission of the term data that includes one or more conditions that specify foreseeable damages (e.g., damages that the person that distributed the image foresaw or should have foresaw from the distribution) of a calculable monetary amount (e.g., $15,000) clause for use (e.g., distribution or sale) of the entity image that depicts at least a portion of the entity (e.g., the person in the picture).

Referring again to FIG. 12B, operation 906 may include operation 1220 depicting facilitating transmission of the term data that includes a terms of service contract, wherein the terms of service contract regards use of the entity image. For example, FIG. 8, e.g., FIG. 8B, shows term data that includes a contract that governs use of the entity image that depicts at least a portion of the entity transmission facilitating module 820 facilitating transmission of the term data that includes a terms of service contract (e.g., a contract that includes a compensatory damages clause for distributing the entity image of a celebrity at the beach), wherein the terms of service contract regards use (e.g., distribution, e.g., e-mailing) of the entity image (e.g., an image of a celebrity at the beach).

Referring again to FIG. 12B, operation 1220 may include operation 1222 depicting facilitating transmission of the term data that includes a terms of service contract that is binding upon receipt of the term data, wherein the terms of service contract regards use of the entity image. For example, FIG. 8, e.g., FIG. 8B, shows term data that includes a contract that governs use of the entity image that depicts at least a portion of the entity and that is binding upon receipt transmission facilitating module 822 facilitating transmission of the term data that includes a terms of service contract (e.g., a terms of service contract that includes a foreseeable damages clause for posting the entity image to a social networking site) that is binding upon receipt (e.g., by the device that received the term data) of the term data, wherein the terms of service contract regards use (e.g., posting to a social networking site) of the entity image.

Referring now to FIG. 12C, operation 906 may include operation 1224 depicting transmitting the term data that includes one or more conditions that regard use of the entity image that depicts at least a portion of the entity, wherein said one or more conditions expire upon fulfillment of a stipulation. For example, FIG. 8, e.g., FIG. 8B, shows term data that specifies one or more conditions that expire upon a particular condition and that govern use of the entity image that depicts at least a portion of the entity transmission facilitating module 824 transmitting the term data that includes one or more conditions (e.g., "the device is forbidden to transmit the image) that regard use (e.g., transmission) of the entity image (e.g., an image of a particular person) that depicts at least a portion of the entity, wherein said one or more conditions expire upon fulfillment of a stipulation (e.g., when the device has left a particular area).

Referring again to FIG. 12C, operation 1224 may include operation 1226 depicting transmitting the term data that includes one or more conditions that regard use of the entity image that depicts at least a portion of the entity, wherein said one or more conditions expire after a particular amount of time. For example, FIG. 8, e.g., FIG. 8B, shows term data that specifies one or more conditions that expire after a particular amount of elapsed time and that govern use of the entity image that depicts at least a portion of the entity transmission facilitating module 826 transmitting the term data that includes one or more conditions (e.g., "this device is forbidden from taking more than three seconds of video at a time") that regard use of the entity image (e.g., a three-second video) that depicts at least a portion of the entity (e.g., a baseball player), wherein said one or more conditions (e.g., "this device is forbidden from taking more than three seconds of video at a time") expire after a particular amount of time (e.g., after thirty minutes).

Referring again to FIG. 12C, operation 1224 may include operation 1228 depicting transmitting the term data that includes one or more conditions that regard use of the entity image that depicts at least a portion of the entity, wherein said one or more conditions expire when the device exits a particular area. For example, FIG. 8, e.g., FIG. 8B, shows term data that specifies one or more conditions that expire after the device travels a particular distance and that govern use of the entity image that depicts at least a portion of the entity transmission facilitating module 828 transmitting the term data that includes one or more conditions (e.g., a liquidated damages condition) that regard use (e.g., sale) of the entity image (e.g., an image of a celebrity at a bar) that depicts at least a portion of (e.g., a face) of the entity, wherein said one or more conditions (e.g., the liquidated damages condition) expire when the device exits a particular area (e.g., exits a theatre).

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software (e.g., a high-level computer program serving as a hardware specification), firmware, or virtually any combination thereof, limited to patentable subject matter under 35 U.S.C. 101. In an embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, limited to patentable subject matter under 35 U.S.C. 101, and that designing the circuitry and/or writing the code for the software (e.g., a high-level computer program serving as a hardware specification) and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

All of the above U.S. patents, U.S. patent application publications, U.S. patent applications, foreign patents, foreign patent applications and non-patent publications referred to in this specification and/or listed in any Application Data Sheet, are incorporated herein by reference, to the extent not inconsistent herewith.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

This application may make reference to one or more trademarks, e.g., a word, letter, symbol, or device adopted by one manufacturer or merchant and used to identify and/or distinguish his or her product from those of others. Trademark names used herein are set forth in such language that makes clear their identity, that distinguishes them from common descriptive nouns, that have fixed and definite meanings, or, in many if not all cases, are accompanied by other specific identification using terms not covered by trademark. In addition, trademark names used herein have meanings that are well-known and defined in the literature, or do not refer to products or compounds for which knowledge of one or more trade secrets is required in order to divine their meaning. All trademarks referenced in this application are the property of their respective owners, and the appearance of one or more trademarks in this application does not diminish or otherwise adversely affect the validity of the one or more trademarks. All trademarks, registered or unregistered, that appear in this application are assumed to include a proper trademark symbol, e.g., the circle R or bracketed capitalization (e.g., [trademark name]), even when such trademark symbol does not explicitly appear next to the trademark. To the extent a trademark is used in a descriptive manner to refer to a product or process, that trademark should be interpreted to represent the corresponding product or process as of the date of the filing of this patent application.

Throughout this application, the terms "in an embodiment," 'in one embodiment," "in an embodiment," "in several embodiments," "in at least one embodiment," "in various embodiments," and the like, may be used. Each of these terms, and all such similar terms should be construed as "in at least one embodiment, and possibly but not necessarily all embodiments," unless explicitly stated otherwise. Specifically, unless explicitly stated otherwise, the intent of phrases like these is to provide non-exclusive and non-limiting examples of implementations of the invention. The mere statement that one, some, or may embodiments include one or more things or have one or more features, does not imply that all embodiments include one or more things or have one or more features, but also does not imply that such embodiments must exist. It is a mere indicator of an example and should not be interpreted otherwise, unless explicitly stated as such.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

What is claimed is:

1. A system comprising:
    circuitry configured to acquire an indication that a device has captured an image that depicts at least one feature of an entity;
    circuitry configured to send a query to the device as to whether a broadcasted privacy indicator that indicates a presence of term data associated with the entity has been detected, at least partly in response to the indication that the device has captured the image;
    circuitry configured to acquire from the device an indication of detection of the broadcasted privacy indicator that indicates a presence of term data associated with the entity, at least partly in response to the query sent to the device as to whether the broadcasted privacy indicator has been detected; and
    circuitry configured to transmit to the device term data associated with the entity and that specifies one or more conditions that govern use of the image that depicts the at least one feature of the entity.

2. The device of claim 1, wherein said circuitry configured to send a query to the device as to whether a broadcasted privacy indicator that indicates a presence of term data associated with the entity has been detected, at least partly in response to the indication that the device has captured the image comprises:
    circuitry configured to send a query to the device as to whether a signal that indicates a presence of term data associated with the entity has been detected, at least partly in response to the indication that the device has captured the image.

3. The device of claim 2, wherein said circuitry configured to send a query to the device as to whether a signal that indicates a presence of term data associated with the entity has been detected, at least partly in response to the indication that the device has captured the image comprises:
    circuitry configured to send a query to the device as to whether an optical signal that indicates a presence of term data associated with the entity has been detected, at least partly in response to the indication that the device has captured the image.

4. The device of claim 2, wherein said circuitry configured to send a query to the device as to whether a signal that indicates a presence of term data associated with the entity has been detected, at least partly in response to the indication that the device has captured the image comprises:
    circuitry configured to send a query to the device as to whether a signal in a particular pattern that indicates a presence of term data associated with the entity has been detected, at least partly in response to the indication that the device has captured the image.

5. The device of claim 1, wherein said circuitry configured to send a query to the device as to whether a broadcasted privacy indicator that indicates a presence of term data associated with the entity has been detected, at least partly in response to the indication that the device has captured the image comprises:
    circuitry configured to send a query to the device as to whether an emitted signal that indicates a presence of term data associated with the entity has been detected, at least partly in response to the indication that the device has captured the image.

6. The device of claim 5, wherein said circuitry configured to send a query to the device as to whether an emitted signal that indicates a presence of term data associated with the entity has been detected, at least partly in response to the indication that the device has captured the image comprises:
    circuitry configured to send a query to the device as to whether an emitted electromagnetic wave that indicates a presence of term data associated with the entity has been detected, at least partly in response to the indication that the device has captured the image.

7. The device of claim 1, wherein said circuitry configured to acquire an indication that a device has captured an image that depicts at least one feature of an entity comprises:

circuitry configured to acquire an indication that an image capture device has captured an image that depicts at least one feature of an entity.

8. The device of claim 7, wherein said circuitry configured to acquire an indication that an image capture device has captured an image that depicts at least one feature of an entity comprises:
circuitry configured to acquire an indication that a wearable image capture device has captured an image that depicts at least one feature of an entity.

9. The device of claim 1, wherein said circuitry configured to transmit to the device term data associated with the entity and that specifies one or more conditions that govern use of the image that depicts the at least one feature of the entity comprises:
circuitry configured to transmit to the device term data associated with the entity and that specifies one or more restrictions of use of the image that depicts the at least one feature of the entity.

10. The device of claim 9, wherein said circuitry configured to transmit to the device term data associated with the entity and that specifies one or more restrictions of use of the image that depicts the at least one feature of the entity comprises:
circuitry configured to transmit to the device term data associated with the entity and that specifies one or more location-based restrictions of use of the image that depicts the at least one feature of the entity.

11. The device of claim 1, further comprising:
circuitry configured to acquire an indication that the device is in a particular area.

12. The device of claim 1, wherein said circuitry configured to transmit to the device term data associated with the entity and that specifies one or more conditions that govern use of the image that depicts the at least one feature of the entity comprises:
circuitry configured to transmit to the device term data associated with the entity and that specifies one or more liabilities for use of the image that depicts the at least one feature of the entity.

13. The device of claim 1, wherein said circuitry configured to transmit to the device term data associated with the entity and that specifies one or more conditions that govern use of the image that depicts the at least one feature of the entity comprises:
circuitry configured to transmit to the device one or more contracts that specifies one or more conditions that govern use of the image that depicts the at least one feature of the entity.

14. The device of claim 1, wherein said circuitry configured to transmit to the device term data associated with the entity and that specifies one or more conditions that govern use of the image that depicts the at least one feature of the entity comprises:
circuitry configured to transmit to the device term data associated with the entity and that specifies one or more conditions that govern use of the image and that expire after the device travels a particular distance.

15. The system of claim 1, wherein the circuitry configured to acquire an indication that a device has captured an image that depicts at least one feature of an entity comprises:
circuitry configured to acquire an indication that a device has captured an image that depicts at least one of the following features of a human entity: facial or body part.

16. The system of claim 1, wherein the circuitry configured to acquire an indication that a device has captured an image that depicts at least one feature of an entity comprises:
circuitry configured to acquire an indication that a device has captured an image that depicts at least one feature of an object entity.

17. The system of claim 1, wherein the circuitry configured to acquire an indication that a device has captured an image that depicts at least one feature of an entity comprises:
circuitry configured to acquire an indication that a device has captured an image that depicts at least one feature of an entity and a privacy beacon.

18. The system of claim 1, further comprising:
circuitry configured to impede transmission of the image in accordance with the term data.

19. The system of claim 1, wherein the circuitry configured to acquire an indication that a device has captured an image that depicts at least one feature of an entity comprises:
circuitry configured to acquire an indication that a device has captured an image that depicts at least one feature of an entity, the image being subject to an access barrier and/or encryption on the device.

20. The system of claim 1, wherein the circuitry configured to transmit to the device term data associated with the entity and that specifies one or more conditions that govern use of the image that depicts the at least one feature of the entity comprises:
circuitry configured to transmit to the device term data associated with metadata of the broadcasted privacy indicator and that specifies one or more conditions that govern use of the image that depicts the at least one feature of the entity.

21. The system of claim 1, wherein the circuitry configured to send a query to the device as to whether a broadcasted privacy indicator that indicates a presence of term data associated with the entity has been detected, at least partly in response to the indication that the device has captured the image comprises:
circuitry configured to send a query to the device as to whether a smartphone-broadcasted privacy indicator that indicates a presence of term data associated with the entity has been detected, at least partly in response to the indication that the device has captured the image.

22. The system of claim 1, wherein the circuitry configured to send a query to the device as to whether a broadcasted privacy indicator that indicates a presence of term data associated with the entity has been detected, at least partly in response to the indication that the device has captured the image comprises:
circuitry configured to send a query to the device as to whether a broadcasted privacy indicator that indicates a presence of term data associated with the entity has been detected in response to an electromagnetic trigger wave, at least partly in response to the indication that the device has captured the image.

23. The system of claim 1, wherein the circuitry configured to transmit to the device term data associated with the entity and that specifies one or more conditions that govern use of the image that depicts the at least one feature of the entity comprises:
circuitry configured to transmit to the device term data associated with the entity and that specifies one or more conditions that govern distribution, viewing, saving, editing, and/or transmission of the image that depicts the at least one feature of the entity.

24. The system of claim 1, further comprising:
circuitry configured for transmitting an image decryption decision with respect to the image based at least partly on the term data.

25. The system of claim 1, wherein the circuitry configured to acquire an indication that a device has captured an image that depicts at least one feature of an entity comprises:
circuitry configured to acquire an encrypted image from an image capture device; and
circuitry configured to decrypt the encrypted image at least partly using at least one device specific key.

26. A computer processor programmed by one or more executable instructions to perform operations comprising:
acquiring, using the computer processor, an indication that a device has captured an image that depicts at least one feature of an entity;
sending to the device, using the computer processor, a query as to whether a broadcasted privacy indicator that indicates a presence of term data associated with the entity has been detected, at least partly in response to the indication that the device has captured the image;
acquiring from the device, using the computer processor, an indication of detection of the broadcasted privacy indicator that indicates a presence of term data associated with the entity, at least partly in response to the query sent to the device as to whether the broadcasted privacy indicator has been detected; and
transmitting to the device, using the computer processor, term data associated with the entity and that specifies one or more conditions that govern use of the image that depicts the at least one feature of the entity.

27. A computer-implemented method comprising:
acquiring an indication that a device has captured an image that depicts at least one feature of an entity;
sending a query to the device as to whether a broadcasted privacy indicator that indicates a presence of term data associated with the entity has been detected, at least partly in response to the indication that the device has captured the image;
acquiring from the device an indication of detection of the broadcasted privacy indicator that indicates a presence of term data associated with the entity, at least partly in response to the query sent to the device as to whether the broadcasted privacy indicator has been detected; and
transmitting to the device term data associated with the entity and that specifies one or more conditions that govern use of the image that depicts the at least one feature of the entity.

\* \* \* \* \*